(12) United States Patent
Hirata

(10) Patent No.: US 12,487,438 B2
(45) Date of Patent: Dec. 2, 2025

(54) OBSERVATION APPARATUS AND METHOD OF VISUALIZING PHASE OBJECT

(71) Applicant: Evident Corporation

(72) Inventor: Tadashi Hirata, Nagano (JP)

(73) Assignee: Evident Corporation, Nagano (JP)

( * ) Notice: Subject to any disclaimer, the term of this patent is extended or adjusted under 35 U.S.C. 154(b) by 453 days.

(21) Appl. No.: 18/085,801

(22) Filed: Dec. 21, 2022

(65) Prior Publication Data
US 2023/0280576 A1   Sep. 7, 2023

(30) Foreign Application Priority Data
Mar. 7, 2022   (JP) .................. 2022-034726

(51) Int. Cl.
*G02B 21/04*   (2006.01)
*G02B 21/00*   (2006.01)
*G02B 21/08*   (2006.01)
*G02B 21/14*   (2006.01)
*G02B 21/36*   (2006.01)

(52) U.S. Cl.
CPC .......... *G02B 21/04* (2013.01); *G02B 21/082* (2013.01); *G02B 21/14* (2013.01); *G02B 21/362* (2013.01)

(58) Field of Classification Search
CPC ...... G02B 21/04; G02B 21/082; G02B 21/14; G02B 21/362; G02B 27/52
See application file for complete search history.

(56) References Cited

U.S. PATENT DOCUMENTS

2017/0261732 A1\* 9/2017 Takahashi ................ C12M 1/34
2019/0187450 A1\* 6/2019 Hirata ................ G02B 21/0088

FOREIGN PATENT DOCUMENTS

JP   2006343490 A   * 12/2006

\* cited by examiner

*Primary Examiner* — Mustak Choudhury
(74) *Attorney, Agent, or Firm* — Scully, Scott, Murphy & Presser, P.C.

(57) ABSTRACT

An observation apparatus includes: an illumination optical system provided below an installation position of a multi-well plate; a reflector provided above the installation position, the reflector being configured to reflect light emitted from the illumination optical system; and an observation optical system provided below the installation position, the observation optical system being configured to condense the light reflected by the reflector. The reflector is installed such that a marginal ray to enter the observation optical system travels via a peripheral well different from an on-axis well located on an optical axis of the observation optical system before reflection due to the reflector.

14 Claims, 74 Drawing Sheets

SIZE OF WELL: UPPER PORTION 3.8 mm, BOTTOM 3.2 mm
384 WELLS=24X16

SIZE OF WELL: UPPER PORTION 3.8 mm, BOTTOM 3.2 mm

● ROW OF MIRRORS FOR ILLUMINATION OF WELLS INDICATED WITH DOTTED LINES
○ ROW OF MIRRORS FOR ILLUMINATION OF WELLS INDICATED WITH SOLID LINES

OBSERVATION APPARATUS AND METHOD OF VISUALIZING PHASE OBJECT

CROSS REFERENCE TO RELATED APPLICATIONS

This application is based upon and claims the benefit of priority from prior Japanese Patent Application No. 2022-034726, filed Mar. 7, 2022, the entire contents of which are incorporated herein by this reference.

TECHNICAL FIELD

The disclosure of the present specification relates to an observation apparatus and a method of visualizing a phase object.

BACKGROUND

A biological sample, such as a cell, is cultured in an incubator such that its culture environment is maintained. During culture, the state of such a biological sample is checked periodically. If the biological sample is taken out from the incubator for periodic checking, the growth of the biological sample is likely to receive an adverse influence.

An exemplary technology related to solution of such a problem is described in US 2019/0187450 A. Use of an observation apparatus adopting oblique illumination described in US 2019/0187450 A enables observation of a cell or the like without an increase in the size of the apparatus. Thus, a biological sample having been being cultured in the limited inner space of an incubator can be observed continuously, without taking out the biological sample having been being cultured from the incubator.

SUMMARY

According to one aspect of the present invention, provided is an observation apparatus including: an illumination optical system provided below an installation position of a multi-well plate; a reflector provided above the installation position, the reflector being configured to reflect light emitted from the illumination optical system; and an observation optical system provided below the installation position, the observation optical system being configured to condense the light reflected by the reflector, in which the reflector is installed such that a marginal ray to enter the observation optical system travels via a peripheral well different from an on-axis well located on an optical axis of the observation optical system before reflection due to the reflector.

According to one aspect of the present invention, provided is a method of visualizing a phase object housed in a multi-well plate, the method including: emitting light from an illumination optical system provided below an installation position of the multi-well plate to the multi-well plate; reflecting the light emitted from the illumination optical system with a reflector provided above the installation position; and condensing the light reflected by the reflector with an observation optical system provided below the installation position, in which the reflecting the light emitted from the illumination optical system includes causing light having traveled via a peripheral well different from an on-axis well located on an optical axis of the observation optical system before reflection due to the reflector, to enter, as a marginal ray, the observation optical system.

BRIEF DESCRIPTION OF DRAWINGS

The present invention will be more apparent from the following detailed description when the accompanying drawings are referenced.

FIG. 119 illustrates a distribution of contrast acquired by the observation apparatus;

FIG. 120 is an explanatory view for the contrast of each well in the multi-well plate;

FIG. 121 is an explanatory view for the configuration of an observation apparatus according to an eleventh embodiment;

FIG. 122 is an explanatory view for the relationship between a reflective face and a well line that reflected light enters; and FIG. 123 is an explanatory view for the contrast of each well in a multi-well plate.

DESCRIPTION OF EMBODIMENTS

In a case where a multi-well plate is used, in particular, a multi-well plate small in well diameter, such as a 96-well plate, is used as a culture container, the observation apparatus described above has difficulty in achieving high observation performance with oblique illumination.

In consideration of the above situation, embodiments of the present invention will be described.

Figure 1:
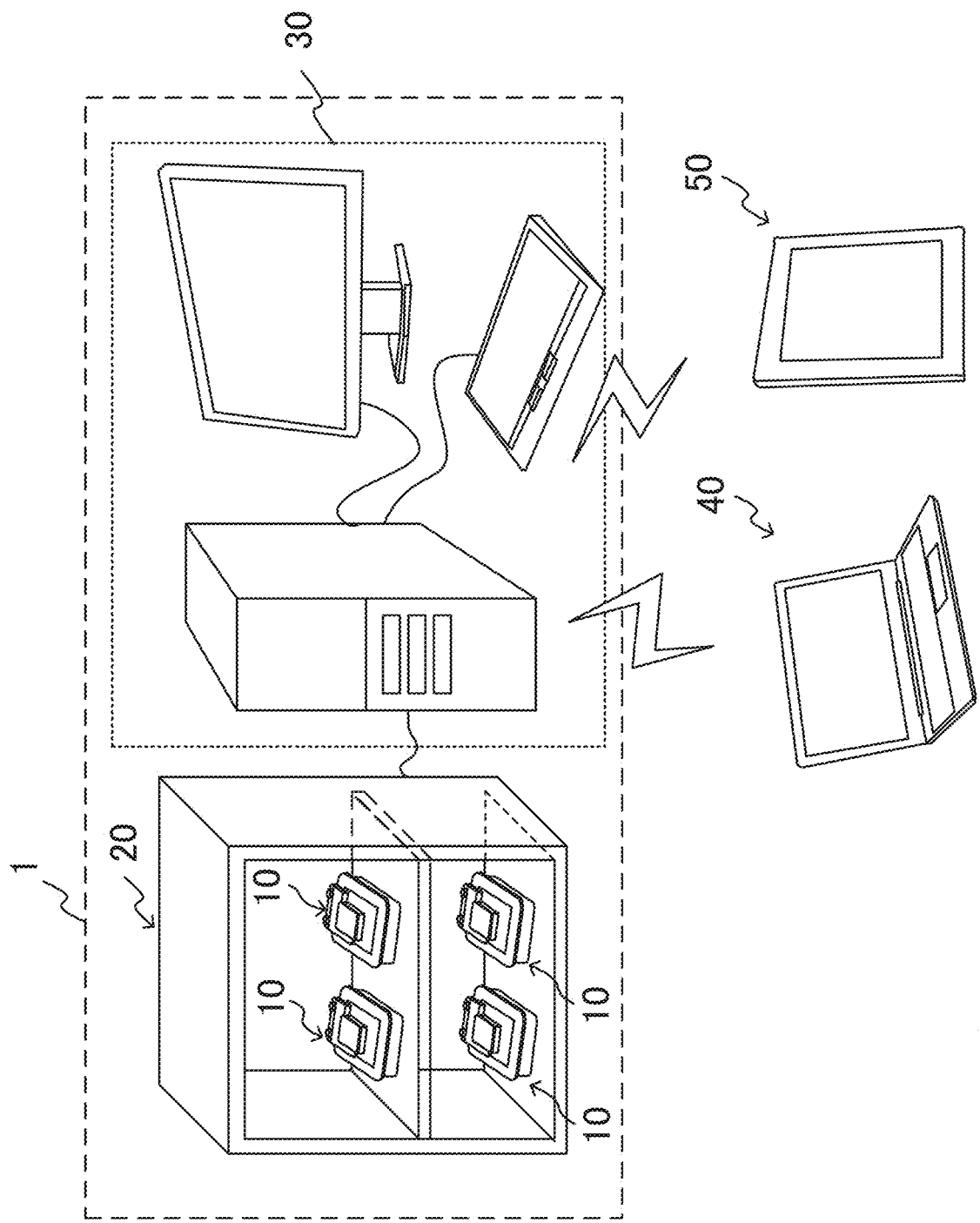
FIG. 1 illustrates an exemplary configuration of a system.
Figure 2:
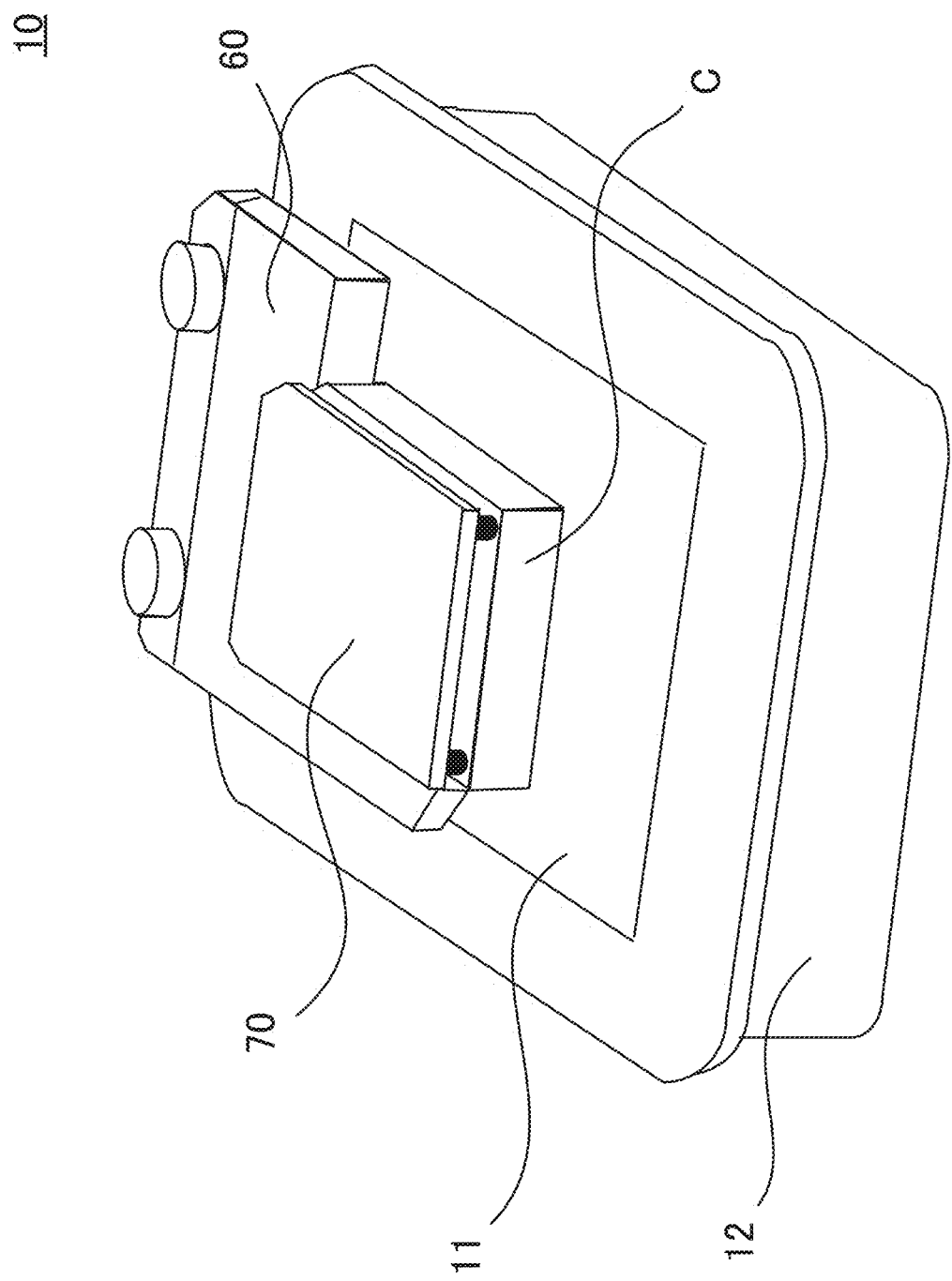
FIG. 2 is a perspective view of an observation apparatus.
Figure 3:
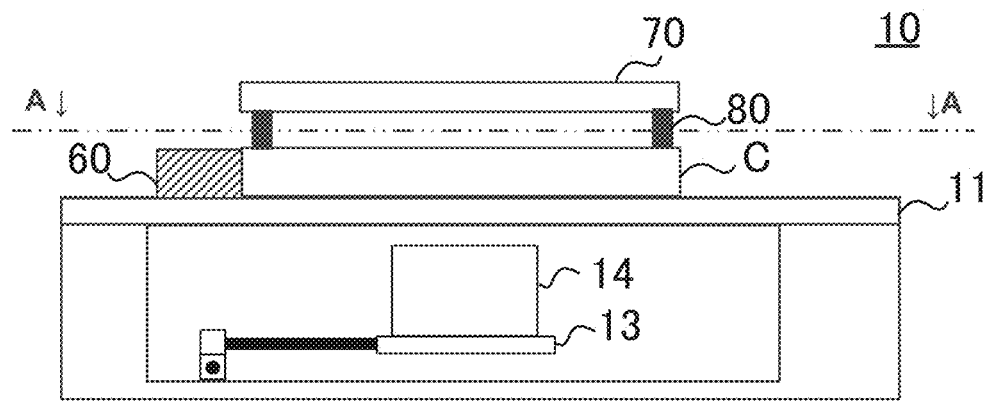
FIG. 3 illustrates the inner configuration of the observation apparatus.
Figure 4:
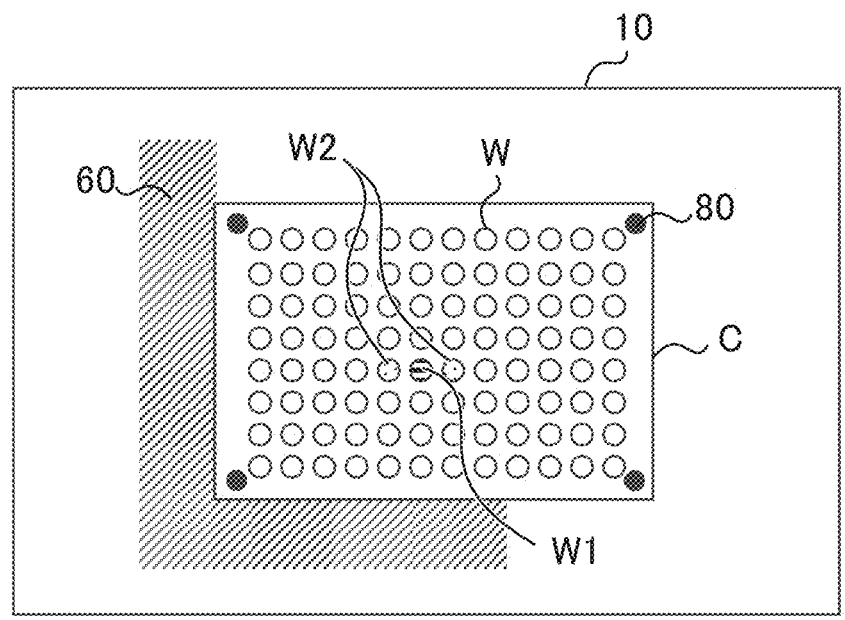
FIG. 4 is a sectional view taken along line A-A of FIG. 3.
Figure 5:
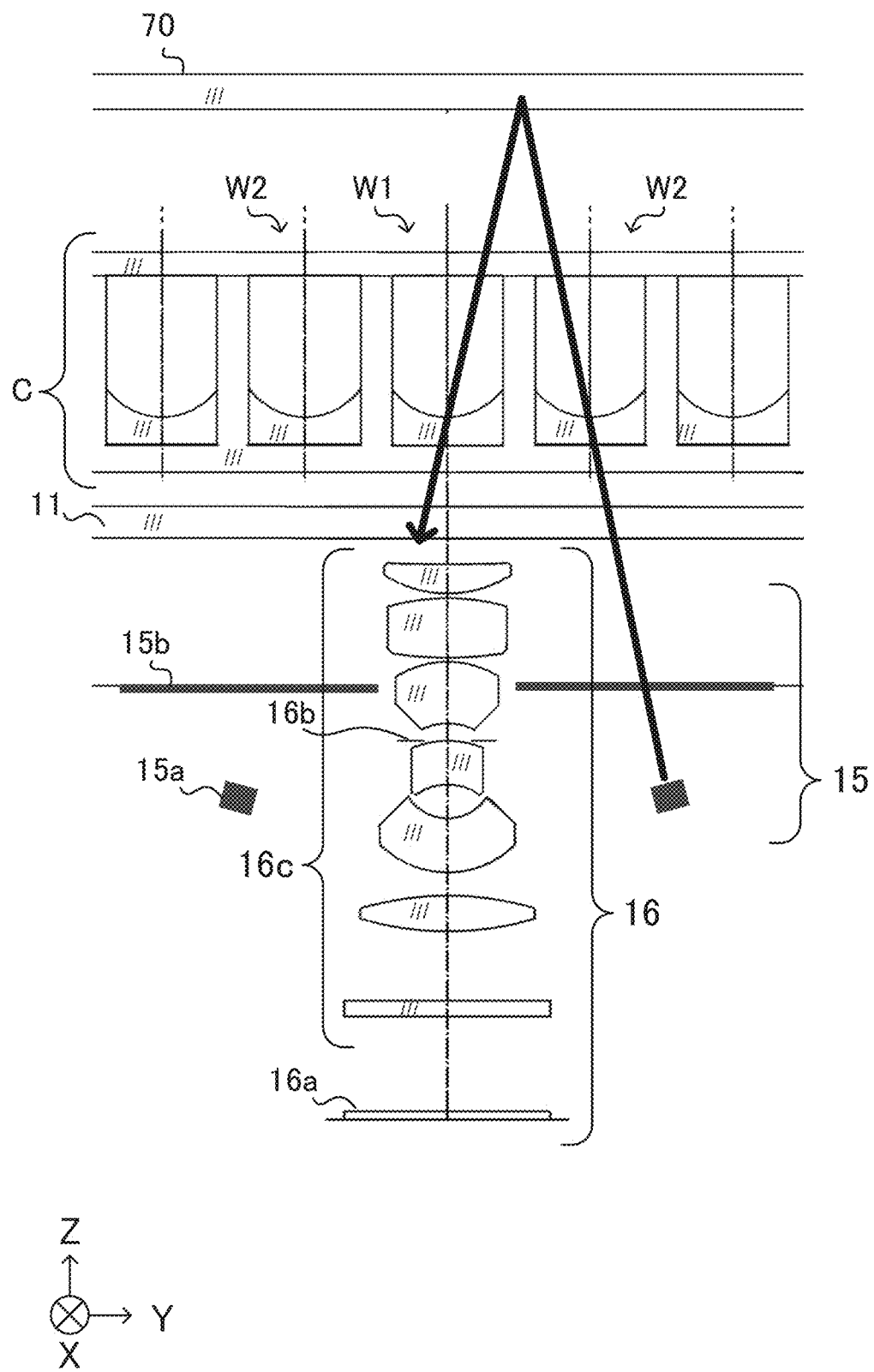
FIG. 5 illustrates the optical path of a ray in the observation apparatus.
Figure 6:
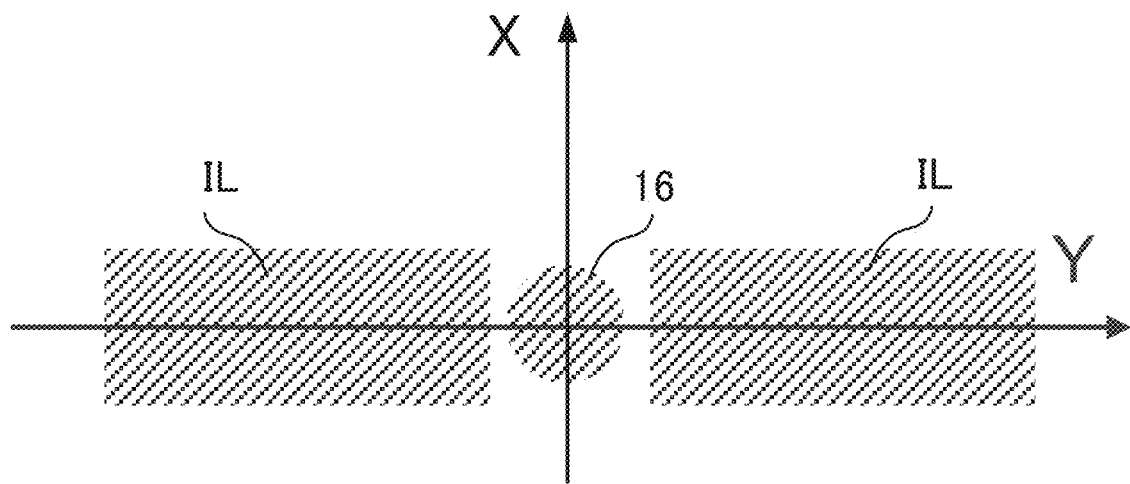
FIG. 6 is an explanatory view for arrangement of emission regions of illuminating light.

FIG. 1 illustrates an exemplary configuration of a system 1. FIG. 2 is a perspective view of an observation apparatus 10. FIG. 3 illustrates the inner configuration of the observation apparatus 10. FIG. 4 is a sectional view taken along line A-A of FIG. 3. FIG. 5 illustrates the optical path of a ray in the observation apparatus 10. FIG. 6 is an explanatory view for arrangement of emission regions IL of illuminating light. The configuration of the system 1 will be described below with reference to FIGS. 1 to 6.

The system 1 illustrated in FIG. 1 serves as an observation system for observing a sample that is housed in a multi-well plate and is being cultured. Such a sample to be observed is any cultured cell and is, for example, a colorless and transparent phase object. The number of wells of such a multi-well plate is not particularly limited. The system 1 is particularly suitable to a case where a multi-well plate of which the number of wells is 96 or more is used.

The system 1 includes one or more observation apparatuses 10 that each acquire an image of a sample having been being cultured in a multi-well plate and a control apparatus 30 that controls each observation apparatus 10. Each observation apparatus 10 and the control apparatus 30 are required to exchange data mutually. Therefore, each observation apparatus 10 and the control apparatus 30 may be connected communicably by wire as illustrated in FIG. 1 or may be connected communicably by wireless.

Such an observation apparatus 10 serves as an image capturing apparatus that captures a sample housed in a multi-well plate, from below the multi-well plate. In order to capture a sample without taking out the sample from an incubator 20, for example, as illustrated in FIG. 1, the observation apparatus 10 is disposed so as to be used in the incubator 20. More particularly, the observation apparatus 10 is disposed in the incubator 20 with a multi-well plate C placed on a transmissive window 11 of the observation apparatus 10 as illustrated in FIG. 2. In accordance with an instruction form the control apparatus 30, the observation apparatus 10 acquires an image of a sample housed in a well of the multi-well plate C.

As illustrated in FIG. 2, the observation apparatus 10 includes: a housing 12 that is boxy and has, as its upper face, the transmissive window 11 that is transparent and has the multi-well plate C disposed thereon; a positioning member 60 that positions, to the observation apparatus 10, the multi-well plate C at a predetermined position on the transmissive window 11 (placement face); and a reflector 70 attached to the multi-well plate C.

The transmissive window 11 provided at the housing 12 corresponds to a transparent top as the upper face of the housing 12 of the observation apparatus 10 and serves as the placement face on which the multi-well plate C is placed. That is, in the observation apparatus 10, the installation position of the multi-well plate C is on the transmissive window 11. For example, the transmissive window 11 is made of glass or transparent resin.

The positioning member 60 is fixed to the housing 12. Note that the positioning member 60 can be detached as necessary.

The reflector 70 serves as a plane mirror having a planar reflective face. The reflector 70 is attached to the multi-well plate C, so that, as illustrated in FIG. 2, the reflector 70 is provided above the installation position of the multi-well plate C. For attachment of the reflector 70, for example, as illustrated in FIG. 3, the reflector 70 is mounted on the upper face of the multi-well plate C through a support member 80. Note that the support member 80 may be provided at the positioning member 60 as long as the reflector 70 can be disposed at a predetermined height. When the observation apparatus 10 captures a sample from below the multi-well plate C, the reflector 70 reflects light emitted from an illumination optical system 15 to be described below.

As illustrated in FIG. 4, for example, the multi-well plate C serves as a 96-well plate having 96 (=12×8) wells W. The longitudinal width and lateral width of the multi-well plate C are determined in advance, for example, based on ANSI/SBS standards.

As illustrated in FIG. 3, the observation apparatus 10 further includes, inside the housing 12, a stage 13 that moves in the housing 12 and an image capturing unit 14 provided on the stage 13. As illustrated in FIG. 5, the image capturing unit 14 includes an illumination optical system 15 and an observation optical system 16.

The stage 13 is an exemplary moving device that moves in the observation apparatus 10. The stage 13 moves the illumination optical system 15 and the observation optical system 16 relative to the multi-well plate C in the direction orthogonal to the optical axis of the observation optical system 16. That is, the stage 13 changes the relative position of the image capturing unit 14 to the multi-well plate C. The stage 13 is capable of moving in the direction orthogonal to the optical axis of the observation optical system 16, more specifically, in the mutually orthogonal X and Y directions parallel to the transmissive window 11 (placement face). The stage 13 may further move in the Z direction orthogonal to both the X and Y directions.

As illustrated in FIG. 5, the illumination optical system 15 is provided below the installation position of the multi-well plate C (namely, the upper face of the transmissive window 11), and includes a light source 15a and a diffusing plate 15b. For example, the light source 15a includes a light emitting diode (LED). The light source 15a may include a white LED or a plurality of LEDs that emits light having a plurality of different wavelengths, such as red (R), green (G), and blue (B). Light emitted from the light source 15a enters the diffusing plate 15b.

The diffusing plate 15b diffuses the light emitted from the light source 15a. For example, the diffusing plate 15b is, but is not particularly limited to, a frosted-type of diffusing plate having asperities on its surface. Note that the diffusing plate 15b may be an opal-type of diffusing plate having its surface coated or may be any other type of diffusing plate. The light emitted from the diffusing plate 15b travels in various directions to enter a well W at various angles.

Referring to FIG. 5, the illumination optical system 15 includes two light sources 15a located symmetrically through the observation optical system 16. Thus, as illustrated in FIG. 6, due to illuminating light emitted from the illumination optical system 15, two emission regions IL are formed at symmetrical positions through the observation optical system 16. That is, the illumination optical system 15 performs selective light emission between the light sources 15a, so that the illumination direction can be switched between two directions symmetrical with respect to the optical axis of the observation optical system 16. Hereinafter, regarding the two directions orthogonal to the optical axis of the observation optical system 16, the direction in which the emission regions IL are arrayed, namely, the direction in which the light sources 15a are arrayed is defined as the Y direction and the direction orthogonal thereto is defined as the X direction.

As illustrated in FIG. 5, the observation optical system 16 includes an image capturing element 16a, a diaphragm 16b, and a lens group 16c. The observation optical system 16 is provided below the installation position of the multi-well plate C. The observation optical system 16 condenses light having entered in the housing 12 through the transmissive window 11 after reflection from the reflector 70. More specifically, the lens group 16c condenses light from the bottom face of a well W in which a sample is present, onto the image capturing element 16a, resulting in formation of an optical image of the sample on the image capturing element 16a. The observation optical system 16 is telecentric on its sample side such that a change in focusing causes no change in magnification.

The image capturing element 16a serves as an optical sensor that converts detected light into an electric signal. The image capturing element 16a captures the sample in the well located on the optical axis of the observation optical system 16. The image capturing element 16a captures the sample at a plurality of different positions due to relative movement of the illumination optical system 15 and the observation optical system 16 to the multi-well plate C by the stage 13. Note that the image capturing element 16a corresponds to an image sensor and is, for example, but is not particularly limited to, a charge-coupled device (CCD) image sensor or a complementary MOS (CMOS) image sensor.

In the example of FIG. 3, the illumination optical system 15 and the observation optical system 16 in the image capturing unit 14 are installed on the stage 13 and move together in the housing 12. The illumination optical system 15 and the observation optical system 16 may each move independently in the housing 12. In the example of FIG. 5, the light sources 15a in pairs are disposed left and right through the observation optical system 16. However, the arrangement and number of light sources 15a are not limited to this example. For example, three or more light sources 15a may be provided or a single light source 15a may be provided in the image capturing unit 14.

The observation apparatus 10 having such a configuration as above adopts oblique illumination in order to visualize a sample as a phase object. Specifically, as illustrated in FIG. 5, light emitted from a light source 15a diffuses due to the diffusing plate 15b and is emitted outward from the housing 12 through the transmissive window 11. After that, part of the light emitted outside the housing 12 is reflected, for example, off the interface of liquid in a well W, the lid covering the container body of the multi-well plate C, and the reflector 70 attached to the multi-well plate C, resulting in deflection above the sample.

Figure 7:
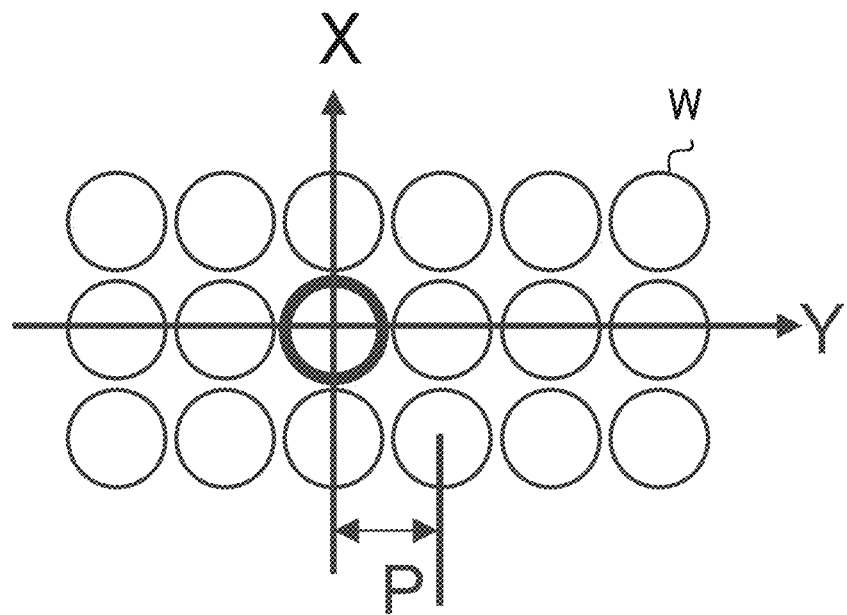
FIG. 7 is an explanatory view for arrangement of wells of a multi-well plate.

Furthermore, the sample is irradiated with part of the light deflected above the sample, so that the part enters the housing 12 through the sample and the transmissive window 11. Then, part of the light having entered the housing 12 is condensed by the observation optical system 16, resulting in formation of an image of the sample on the image capturing element 16a in the observation optical system 16. For image formation, the light reflected from the reflector 70 is mainly used. In particular, for observation with a multi-well plate having a small pitch P between wells W like a 96-well plate (refer to FIG. 7), used is incident light to the reflector 70 via a peripheral well (particularly, a well W2 adjacent to the on-axis well) different from the on-axis well (well W1) located on the optical axis of the observation optical system 16. This point will be described in detail below. Then, finally, the observation apparatus 10 generates an image of the sample, based on an electric signal output from the image capturing element 16a, and outputs the image of the sample to the control apparatus 30.

The control apparatus 30 controls the observation apparatus 10. The control apparatus 30 is required to include one or more processors and one or more non-transitory computer-readable media. For example, the control apparatus 30 may be a general-purpose computer. The one or more processors are each a hardware electric circuit including, for example, a central processing unit (CPU), a graphics processing unit (GPU), or a digital signal processor (DSP), and execute a program stored in the one or more non-transitory computer-readable media, so that programmed processing is performed. The one or more processors may include, for example, an application specific integrated circuit (ASIC) or a field-programmable gate array (FPGA).

The control apparatus 30 having such a configuration as above transmits an instruction for image acquisition to the observation apparatus 10 disposed in the incubator 20 and then receives the image acquired by the observation apparatus 10. The control apparatus 30 may display the image acquired from the observation apparatus 10, onto a display device included in the control apparatus 30. Thus, the system 1 may function as an observation system enabling a user to observe a sample having been being cultured. Note that the control apparatus 30 may communicate with a client terminal (client terminal 40 or client terminal 50) illustrated in FIG. 1, and may display the image acquired by the observation apparatus 10 onto a display device included in the client terminal. Such a client terminal is required to have a display and may be, for example, a desktop computer, a laptop computer, a tablet, or a smartphone.

In order to visualize a sample as a phase object with high contrast to allow a cell or the like to be recognized, formation of an image of the sample with condensation of light having entered the sample at a proper angle, namely, fulfillment of oblique illumination is important. Specifically, desirably, the light having entered the sample includes light having an angle of incidence larger and light having an angle of incidence smaller than the angle corresponding to the numerical aperture of the observation optical system 16.

The reason can be given as follows. The angle of incidence to the object surface is converted by the observation optical system 16 into the distance from the optical axis on the pupil surface of the observation optical system 16. Thus, a pencil of rays that has its angle of incidence to the object surface satisfying such a condition as above and is distributed wide at a relatively large angle is distributed over the outer edge of the pupil of the observation optical system 16 on the pupil surface. The rays that enter outside the pupil in the pencil of rays (namely, the light having its angle of incidence larger than the angle corresponding to the numerical aperture on the object surface) are eliminated in the observation optical system 16 and thus do not reach the image capturing element 16a. Therefore, due to a pencil of rays having reached the image capturing element 16a, an intensity distribution discontinuous in angle direction, namely, a sharp change in intensity distribution occurs on the image capturing face. As a result, shade occurs in the image of the sample, so that a high-contrast stereoscopic image can be acquired.

Meanwhile, in a case where light having entered the multi-well plate C from the bottom face of the on-axis well (well W1) to be observed after emitted from the illumination optical system 15 is guided from the bottom face of the well W1 to the observation optical system 16 and then the sample in the well W1 is observed, a high-contrast image is not necessarily easy to acquire. In particular, if a multi-well plate having a small pitch P, like a 96-well plate, is used, it is not easy to cause light to enter the object surface (bottom face) at the proper angle described above and further to guide the light into the observation optical system 16. Even with achievement of oblique illumination, a region enabling achievement of high contrast is limited to an extremely limited range in the well. Because an increase in the number of wells causes a reduction in the diameter of each well, for example, use of a 384-well plate causes a further difficulty.

Thus, for observation with a multi-well plate having a small pitch P, the observation apparatus 10 uses actively light from a peripheral well. Specifically, the reflector 70 is installed such that a marginal ray to enter the observation optical system 16 travels via a peripheral well different from the on-axis well (well W1) located on the optical axis of the observation optical system 16 before reflection due to the reflector 70. More specifically, the reflector 70 is set at a proper height to the upper face of the multi-well plate C such that a marginal ray enters the observation optical system 16 via a peripheral well. This leads to achievement of oblique illumination in the on-axis well, so that the sample in the on-axis well can be observed with high contrast.

In general, for at least a central portion of the field of view, observation with high contrast is desired. Thus, desirably, the reflector 70 is installed such that an on-axis marginal ray to enter the observation optical system 16 travels via a peripheral well different from the on-axis well (well W1) located on the optical axis of the observation optical system 16 before reflection due to the reflector 70. This leads to achievement of oblique illumination at least at a central portion of the field of view, so that the central portion of the field of view can be observed with high contrast.

Figure 8:
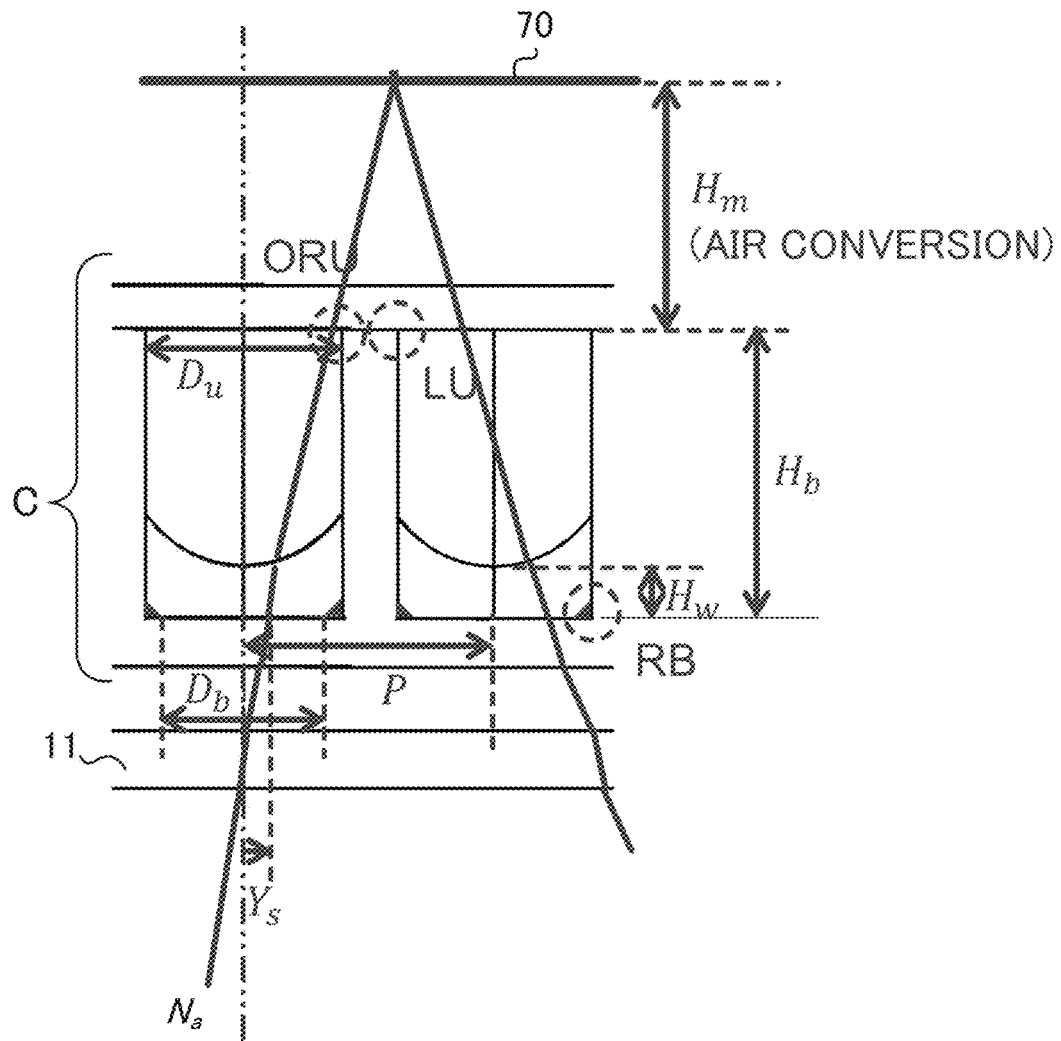
FIG. 8 is an explanatory view for parameters related to arrangement of a reflector.
Figure 9:
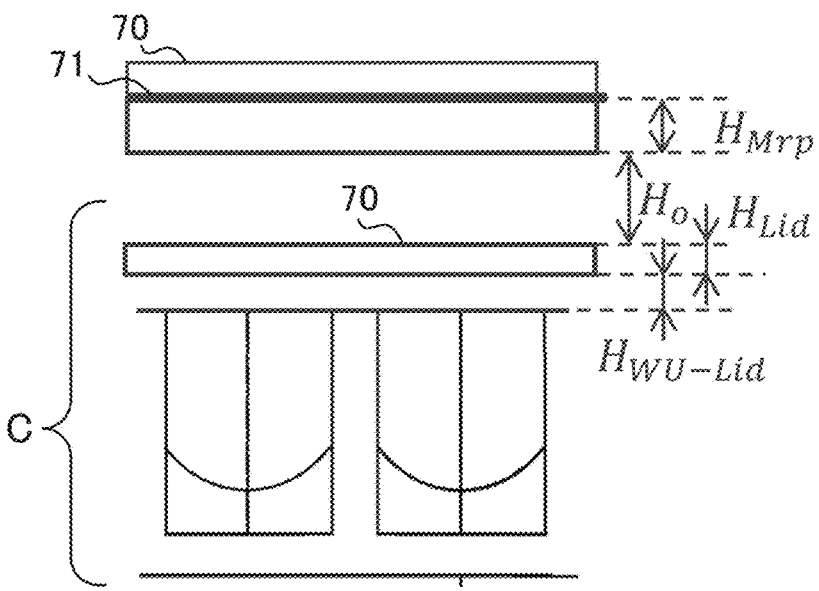
FIG. 9 is another explanatory view for parameters related to arrangement of the reflector.
Figures 10A, 10B, 10C:
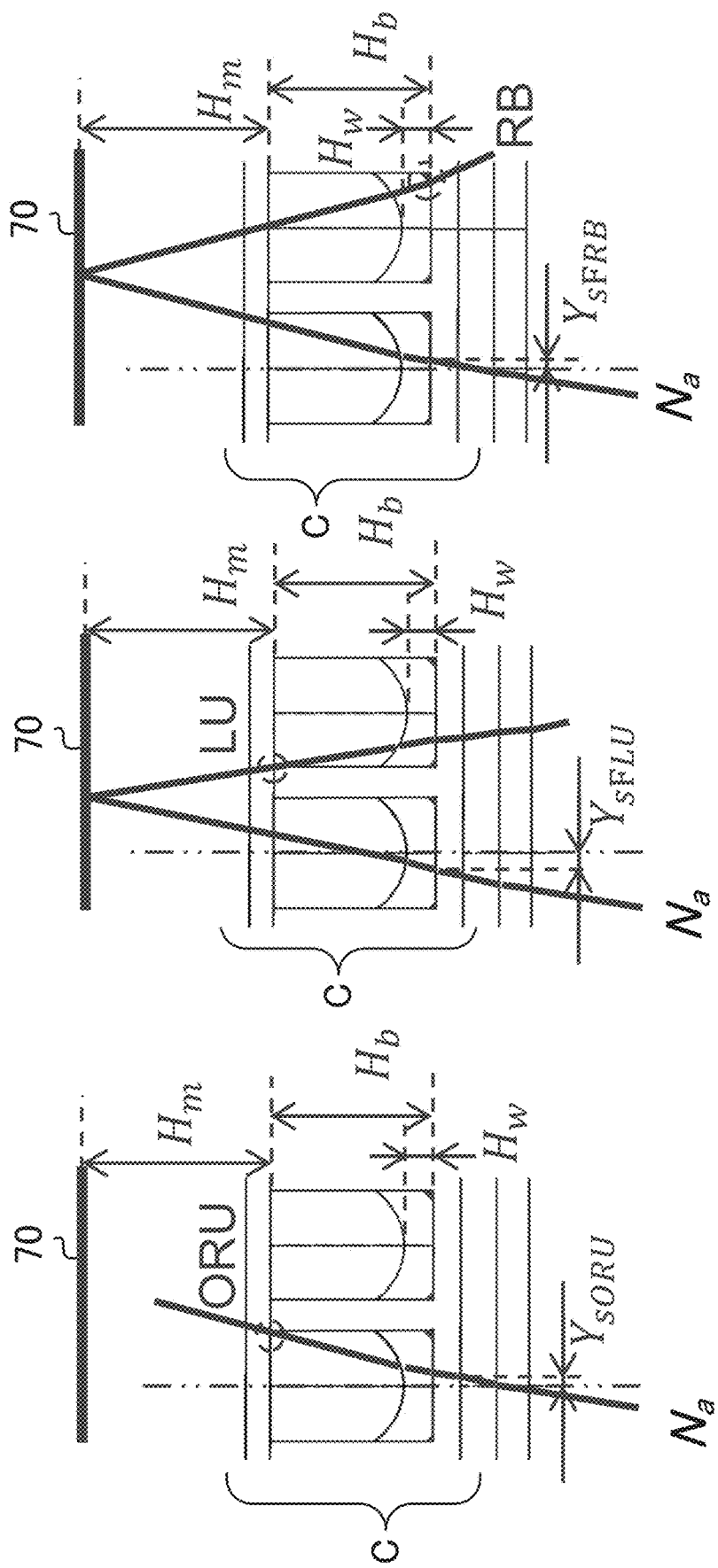
FIGS. 10A to 10C each illustrate the relationship between a marginal ray that passes through a main position of a well and parameters.
Figure 11:
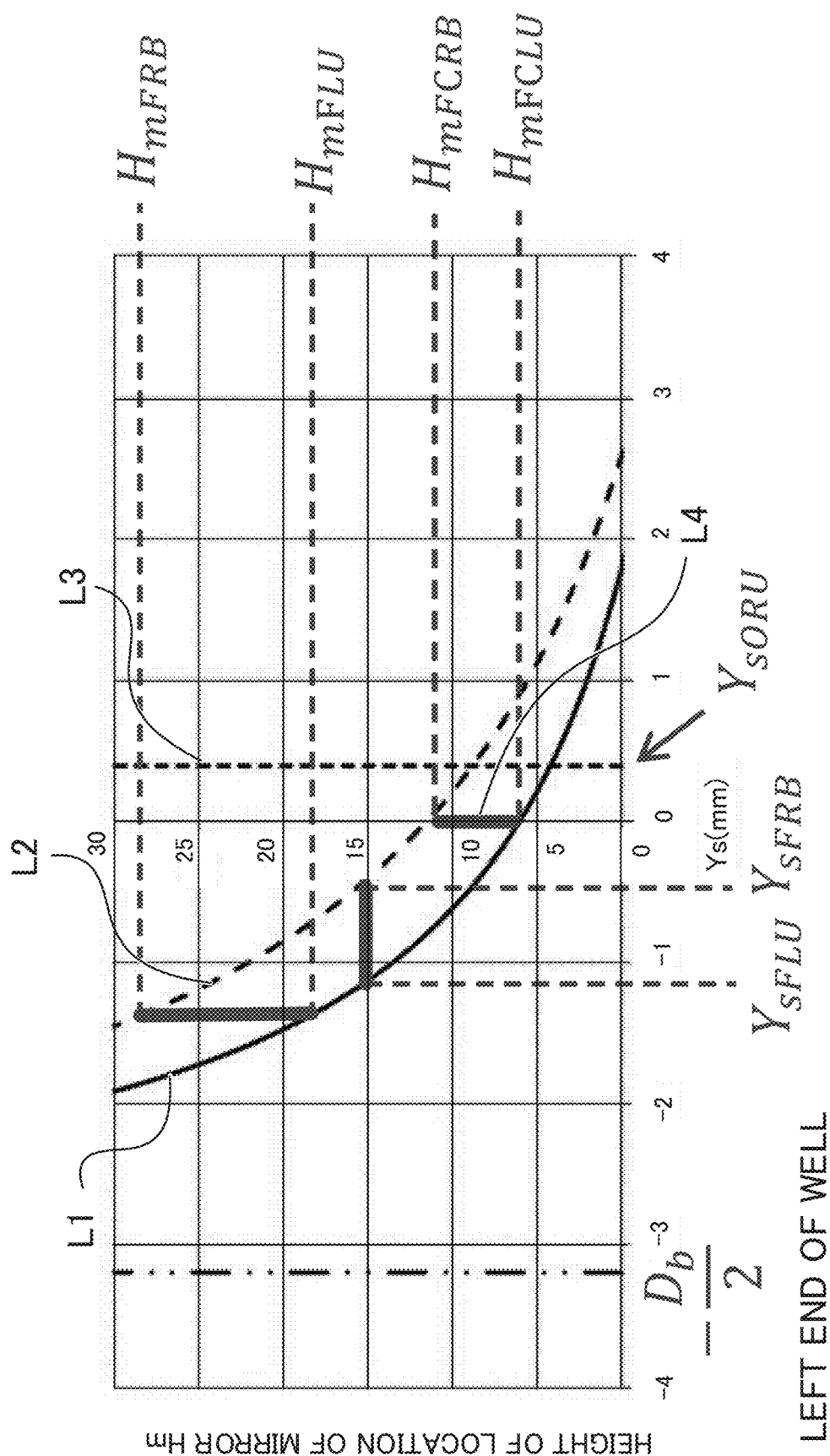
FIG. 11 is a graph indicating conditions for achievement of oblique illumination.

FIGS. 8 and 9 are explanatory views for parameters related to arrangement of the reflector 70. FIGS. 10A to 10C each illustrate the relationship between a marginal ray that passes through a main position of a well W and parameters. FIG. 11 is a graph indicating conditions for achievement of oblique illumination. Conditions for achievement of oblique illumination, particularly, derivation of a proper height for the reflector 70 will be specifically described below with reference to FIGS. 8 to 11.

Main parameters with exemplary entry of illuminating light via a peripheral well on the right side of the on-axis well will be described with reference to FIGS. 8 and 9. Note that, hereinafter, the upper-right end portion of the on-axis well, the upper-left end portion of the adjacent well next on the right of the on-axis well, and the lower-right end portion of the adjacent well next on the right of the on-axis well are abbreviated to ORU, LU, and RB, respectively.

Parameters illustrated in FIG. 8 are as follows. $N_a$ represents the numerical aperture on the sample side of the observation optical system 16. P represents the distance from the center of a well W to the center of an adjacent well W in the multi-well plate C, namely, the pitch between wells. $D_u$ represents the inner diameter of the upper end portion of each well W. $D_b$ represents the inner diameter of the bottom (lower end portion) of each well W. $H_w$ represents the distance from the liquid level of solution (culture fluid) housed in each well W at the center of the well W to the bottom of the well W. $H_b$ represents the distance from the upper end portion to bottom of each well W, namely, the depth of each well W.

$H_m$ represents the height of location of the reflector 70 with respect to the upper end portion of each well W. More exactly, $H_m$ represents the air converted length of the distance from the upper end portion of each well W of the multi-well plate C to the reflective face of the reflector 70. Therefore, in a case where the reflector 70 is a back-surface mirror, $H_m$ can be calculated with the following Expression.

$$H_m = H_{WU-Lid} + H_{Lid}/n_{Lid} + H_o + H_{Mrp}/n_{Mrp} \tag{1}$$

Parameters illustrated in FIG. 9 for use in the above expression are each as follows. $H_{WU-Lid}$ represents the distance (physical length) from the upper end portion of each well W to the lower face of the lid of the multi-well plate C. $H_{Lid}$ represents the thickness (physical length) of the lid of the multi-well plate C. $n_{Lid}$ represents the refractive index of the lid of the multi-well plate C. Ho represents the distance (physical length) from the upper face of the lid of the multi-well plate C to the lower face of the reflector 70. $H_{Mrp}$ represents the thickness (physical length) from the lower face to reflective face of the reflector 70. $n_{Mrp}$ represents the refractive index of the medium (glass) from the lower face to reflective face of the reflector 70.

In addition, $n_w$ represents the refractive index of the solution (culture fluid) housed in each well W. A represents the refractive power of the liquid level of the solution (culture fluid) housed in each well W and is calculated by the following expression: $(n_w-1)A_{c2}$, where $A_{c2}$ represents a coefficient resulting from quadratic-curve approximation of the concave of the liquid level.

Next, various types of limitations that occur in achievement of oblique illumination will be examined with reference to FIGS. 10A to 10C and FIG. 11. Limitations due to ORU will be examined with reference to FIG. 10A.

In a case where the numerical aperture is derived based on a ray that passes through an observation position on the object surface and ORU, the numerical aperture $N_{aORU}$ is given by the following expression. Note that the coordinate $Y_s$ corresponds to the coordinate in the Y direction of the observation position (Y coordinate).

$$N_{aORU} \equiv \frac{\frac{D_u}{2} - Y_s\{1 + A(H_b - H_w)\}}{\left\{\frac{H_w}{n_w} + \left(1 + \frac{AH_w}{n_w}\right)(H_b - H_w)\right\}} \tag{2}$$

In a case where the observation optical system 16 has a numerical aperture larger than the numerical aperture $N_{aORU}$, a pencil of rays from the coordinate $Y_s$ enters inside the diameter of the pupil. Thus, the pencil of rays cannot be distributed over the outer edge of the pupil of the observation optical system 16 on the pupil surface. Thus, no oblique illumination is fulfilled, resulting in no high-contrast observation of the coordinate $Y_s$. That is, Expression (2) for defining the numerical aperture $N_{aORU}$ indicates the upper limit of the numerical aperture of the observation optical system 16. Thus, when the coordinate of a position at least to be observed is defined as the coordinate $Y_s$, desirably, the observation optical system 16 satisfies the following conditional expression.

$$N_a < N_{aORU} \tag{3}$$

Next, limitations due to ORU and the numerical aperture $N_a$ of the observation optical system 16 will be examined. In this case, the coordinate (Y coordinate) $Y_{sORU}$ on the object surface of a marginal ray that passes through ORU, like a ray illustrated in FIG. 10A, is given by the following expression.

$$Y_{sORU} \equiv \frac{\frac{D_u}{2} - N_a\left\{\frac{H_w}{n_w} + \left(1 + \frac{AH_w}{n_w}\right)(H_b - H_w)\right\}}{1 + A(H_b - H_w)} \tag{4}$$

The marginal ray that tries to pass through the region on the illumination side (plus side in this example) with respect to the coordinate $Y_{sORU}$ on the object surface is blocked by ORU. That is, Expression (4) for defining the coordinate $Y_{sORU}$ indicates the maximum coordinate in the Y direction through which the marginal ray can pass on the object surface. Therefore, the region in which high contrast is acquired with fulfillment of oblique illumination in the observation apparatus 10 corresponds to the region on the minus side with respect to at least the coordinate $Y_{sORU}$. The coordinate $Y_s$ of the observation position with fulfillment of oblique illumination satisfies the following conditional expression.

$$Y_s < Y_{sORU} \tag{5}$$

When the coordinate of a position at least to be observed is defined as the coordinate $Y_s$, desirably, the observation apparatus 10 satisfy both Conditional Expression (3) and Conditional Expression (5).

Next, limitations due to LU and RB will be examined with reference to FIGS. 10B and 10C. In a case where a marginal ray is traced from the position of the pupil to the light source, LU and RB are limitations at the peripheral well via which the marginal ray travels. The marginal ray that tries to pass through a position closer to the optical axis than LU is, is eliminated by the edge of the peripheral well. The marginal ray that tries to pass through a position further away from the optical axis than RB is, is eliminated by the side face of the peripheral well. Note that this is not limited to a case where the marginal ray travels via the adjacent well next to the on-axis well. The same applies to a case where the marginal ray passes through any peripheral well (e.g., the second well to the on-axis well).

That is, all marginal rays to enter the observation optical system 16 pass between the marginal ray that passes through LU and the marginal ray that passes through RB. Thus, the marginal ray that passes through LU and the marginal ray that passes through RB will be examined.

In a case where the numerical aperture $N_a$ of the observation optical system 16 is known, the position through a marginal ray passes at the position of the pupil (outer edge of the pupil) is determined. As a result, two points, including LU or RB, through which a ray passes are determined. However, the path of a ray varies depending on the height at which the reflector 70 is installed. Thus, the coordinate on the object surface of the marginal ray that passes through LU or RB will be examined with the height, at which the reflector 70 is installed, fixed (namely, as a variable).

In this case, as illustrated in FIG. 10B, the coordinate on the object surface of the marginal ray that passes through LU is defined as $Y_{sFLU}$, and, as illustrated in FIG. 10C, the coordinate on the object surface of the marginal ray that passes through RB is defined as $Y_{sFRB}$. The coordinate $Y_s$ of the observation position with fulfillment of oblique illumination satisfies the following conditional expression.

$$Y_{sFLU} < Y_s < Y_{sFRB} \tag{6}$$

The coordinate $Y_{sFLU}$ and the coordinate $Y_{sFRB}$ are given by the following expressions including the height $H_m$ of location of the reflector 70. k represents an integer of 1 or more and indicates by how many wells the peripheral well via which the marginal ray travels is away from the on-axis well.

$$Y_{sFLU} \equiv \frac{kP - \frac{D_u}{2} - N_a\left\{\frac{H_w}{n_w} + H_b - H_w + 2H_m\right\}}{1 + A(H_b - H_w + 2H_m)} \tag{7}$$

-continued $$Y_{sFRB} \equiv \frac{\left(1 + \frac{AH_w}{n_w}\right)kP + \frac{D_b}{2} - 2N_a\left(1 + \frac{AH_w}{n_w}\right)\left\{\frac{H_w}{n_w} + \left(1 + \frac{AH_w}{n_w}\right)\right\}}{1 + 2A\left\{\frac{H_w}{n_w} + \left(1 + \frac{AH_w}{n_w}\right)(H_b - H_w + H_m)\right\}} \tag{8}$$

When the coordinate of a position at least to be observed is defined as the coordinate $Y_s$, desirably, the observation apparatus 10 satisfies Conditional Expression (6) in addition to Conditional Expression (3) and Conditional Expression (5).

Next, the height of location of the reflector 70 with fulfillment of oblique illumination will be examined with the coordinate on the object surface, through which the marginal ray passes, fixed (namely, defined as a variable). In this case, the height of location of the reflector 70, in a case where the marginal ray that passes through the coordinate $Y_s$ on the object surface passes through LU, is defined as height $H_{mFLU}$. The height of location of the reflector 70, in a case where the marginal ray that passes through the coordinate $Y_s$ on the object surface passes through RB, is defined as height $H_{mFRB}$. The height $H_m$ of location of the reflector 70 with fulfillment of oblique illumination satisfies the following conditional expression.

$$H_{mFLU} < H_m < H_{mFRB} \tag{9}$$

The height $H_{mFLU}$ and the height $H_{mFRB}$ are given by the following expressions including the coordinate $Y_s$. k represents an integer of 1 or more and indicates by how many wells the peripheral well via which the marginal ray travels is away from the on-axis well.

$$H_{mFLU} \equiv \frac{kP - \frac{D_u}{2} - Y_s - \frac{N_a H_w}{n_w}}{2(N_a + Y_s A)} + \frac{H_w - H_b}{2} \tag{10}$$

$$H_{mFRB} \equiv \frac{kP + \frac{D_b}{2} - Y_s + \frac{AkPH_w}{n_w} - \frac{2\left\{N_a\left(1 + \frac{AH_w}{n_w}\right) + Y_s A\right\}H_w}{n_w}}{2\left\{N_a\left(1 + \frac{AH_w}{n_w}\right) + Y_s A\right\}\left(1 + \frac{AH_w}{n_w}\right)} + H_w - H_b \tag{11}$$

When the coordinate of a position at least to be observed is defined as the coordinate $Y_s$, desirably, the observation apparatus 10 satisfies Conditional Expression (9) in addition to Conditional Expression (3) and Conditional Expression (5).

FIG. 11 illustrates the relationship described above. Note that the graph of FIG. 11 is based on an exemplary case where the numerical aperture $N_a$ is a fixed value and k is 1. A line L1 indicates the relationship between the coordinate on the object surface of the marginal ray that passes through LU and the height of location of the reflector 70. A line L2 indicates the relationship between the coordinate on the object surface of the marginal ray that passes through RB and the height of location of the reflector 70.

The region between the line L1 and the line L2 satisfies a condition in which the marginal ray is not eliminated by the adjacent well. The region on the left side of a line L3 satisfies a condition in which the marginal ray is not eliminated by the on-axis well. Therefore, oblique illumination is fulfilled in the region between the line L1 and the line L2 on the left side of the line L3.

Note that, in general, for observation in a well, desirably, oblique illumination is fulfilled at the center of the well. That is, desirably, oblique illumination is fulfilled at the following coordinate: $Y_s=0$. In this case, desirably, the observation apparatus 10 satisfies the following conditional expressions, instead of Conditional Expression (3) and Conditional Expression (5).

$$N_a < N_{aCORU} \tag{3-1}$$

$$0 < Y_{sORU} \tag{5-1}$$

$N_{aCORU}$ results from substitution of 0 for $Y_s$ in the definition for $N_{aORU}$ and is defined as follows.

$$N_{aCORU} \equiv \frac{D_u}{2\left\{\frac{H_w}{n_w} + \left(1 + \frac{AH_w}{n_w}\right)(H_b - H_w)\right\}} \tag{2-1}$$

Furthermore, desirably, the observation apparatus 10 satisfies the following condition indicated with a line L4 in FIG. 11.

$$H_{mFCLU} < H_m < H_{mFCRB} \tag{9-1}$$

Height $H_{mFCLU}$ results from substitution of 0 for $Y_s$ in the definition for the height $H_{mFLU}$, and height $H_{mFCRB}$ results from substitution of 0 for $Y_s$ in the definition for the height $H_{mFRB}$. The height $H_{mFCLU}$ and the height $H_{mFCR}B$ are defined as follows.

$$H_{mFCLU} \equiv \frac{kP - \frac{D_u}{2} - \frac{N_a H_w}{n_w}}{2N_a} + \frac{H_w - H_b}{2} \tag{10-1}$$

$$H_{mFCRB} \equiv \frac{kP + \frac{D_b}{2} + \frac{AkPH_w}{n_w} - \frac{2N_a H_w\left(1 + \frac{AH_w}{n_w}\right)}{n_w}}{2N_a\left(1 + \frac{AH_w}{n_w}\right)^2} + H_w - H_b \tag{11-1}$$

In observation of the center of a well, desirably, the observation apparatus 10 satisfies Conditional Expression (9-1) in addition to Conditional Expression (3-1) and Conditional Expression (5-1).

Based on the above relationship, for high-contrast observation of the center of a well ($Y_s=0$) in a standard 96-well plate with oblique illumination, desirably, the observation apparatus 10 satisfies the following conditions. Note that a unit of $H_m$ is a millimeter (mm), and a unit of $N_a$ is dimensionless quantity.

$$N_a < 0.31 \tag{3-2}$$

$$\frac{2.8}{N_a} - 5.1 \text{ [mm]} < H_m < \frac{5.4}{N_a} - 10.1 \text{ [mm]} \tag{9-2}$$

Various types of parameters for use of a standard 96-well plate are as follows.

$P=9$ mm, $D_u=6.9$ mm, $D_b=6.4$ mm, $n_w=1.332$,
$A=0.0763$/mm, $H_b=10.7$ mm, $H_w=1.8$ mm, and
$k=1$.

For high-contrast observation of the center of a well ($Y_s=0$) in a standard 384-well plate with oblique illumination, desirably, the observation apparatus 10 satisfies the following conditions. Note that a unit of $H_m$ is a millimeter (mm), and a unit of $N_a$ is dimensionless quantity.

$$N_a < 0.15 \tag{3-3}$$

$$\frac{2.25k - 0.95}{N_a} - 5.3 \text{ [mm]} < H_m < \frac{1.86k + 0.55}{N_a} - 10.3 \text{ [mm]} \tag{9-3}$$

That is, in a case where light from the adjacent well is used ($k=1$), desirably, the observation apparatus 10 satisfies the following conditional expression.

$$\frac{1.3}{N_a} - 5.3 \text{ [mm]} < H_m < \frac{2.41}{N_a} - 10.3 \text{ [mm]} \tag{9-4}$$

In a case where light from the second well is used ($k=2$), desirably, the observation apparatus 10 satisfies the following conditional expression.

$$\frac{3.55}{N_a} - 5.3 \text{ [mm]} < H_m < \frac{4.28}{N_a} - 10.3 \text{ [mm]} \tag{9-5}$$

Various types of parameters for use of a standard 384-well plate are as follows.

$P=4.5$ mm, $D_u=3.8$ mm, $D_b=3.2$ mm, $n_w=1.332$,
$A=0.153$/mm, $H_b=11$ mm, $H_w=1.8$ mm, and
$k=1$ or 2.

Specific examples of the observation apparatus 10 with a plane mirror as a reflector will be described in the following embodiments.

First Embodiment

Figure 12:
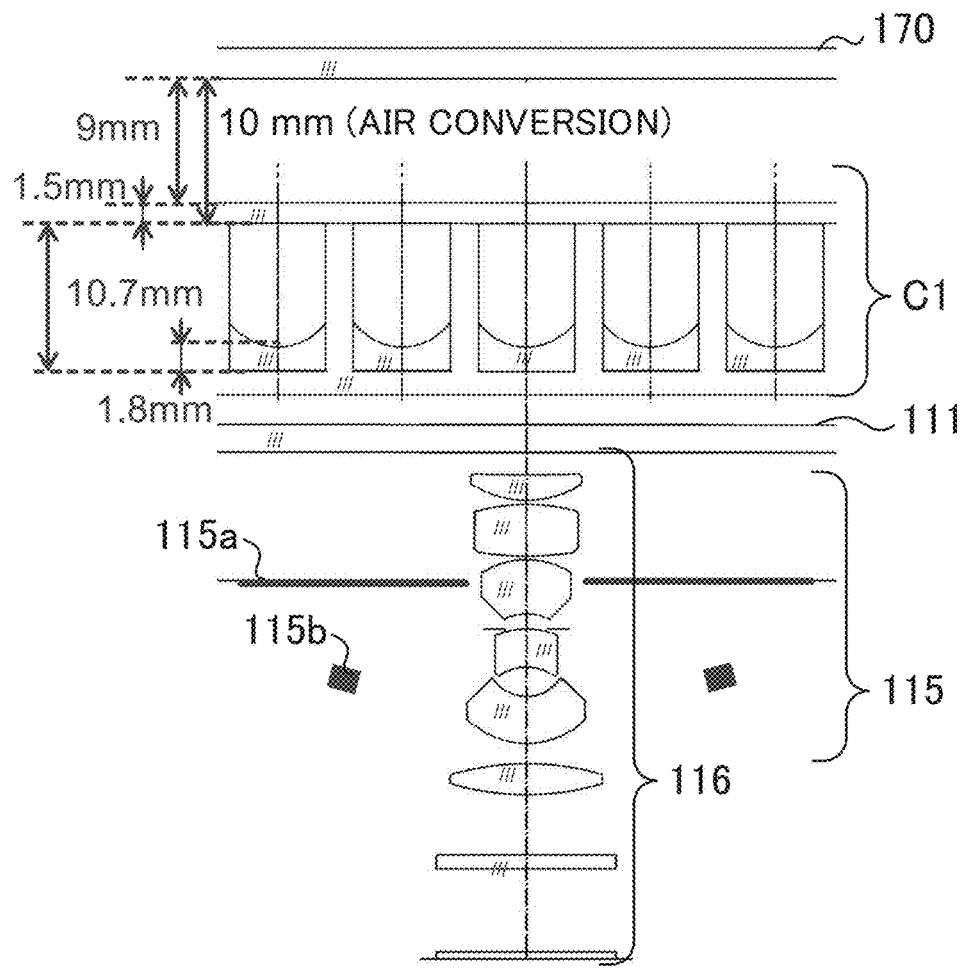
FIG. 12 is an explanatory view for setting in an observation apparatus according to a first embodiment.
Figure 13:
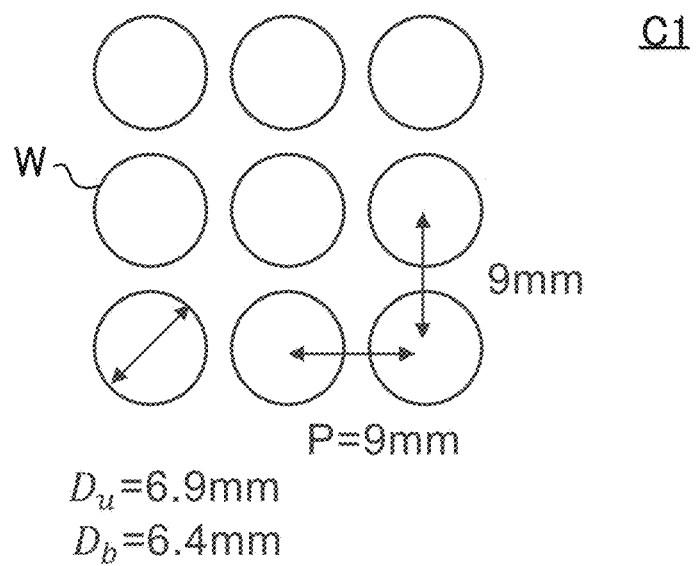
FIG. 13 is an explanatory view for specifications of a multi-well plate for use in the observation apparatus according to the first embodiment.
Figure 14:
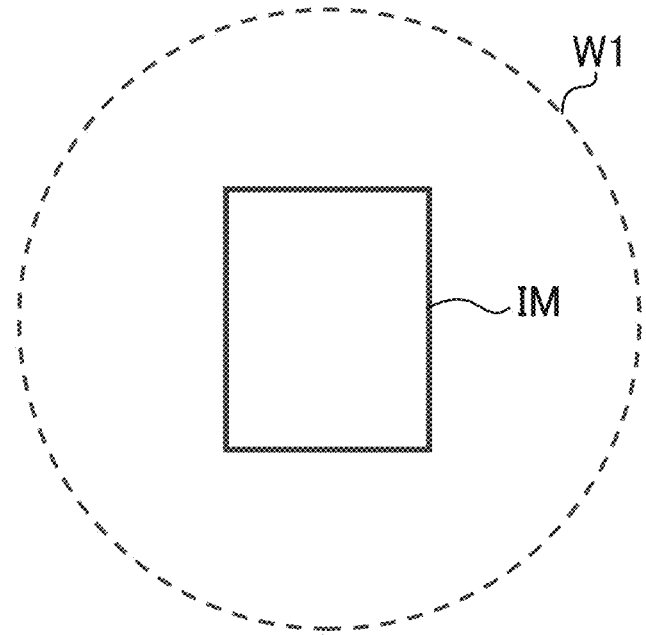
FIG. 14 illustrates the position of an image capturing region to a well.

FIG. 12 is an explanatory view for setting in an observation apparatus 100 according to the present embodiment. FIG. 13 is an explanatory view for specifications of a multi-well plate C1 for use in the observation apparatus 100 according to the present embodiment. FIG. 14 illustrates the position of an image capturing region IM to a well W. The configuration and setting of the observation apparatus 100 will be described below with reference to FIGS. 12 to 14.

The observation apparatus 100 serves as an apparatus for observation of a sample in the multi-well plate C1 and achieves oblique illumination mainly with incident light from an adjacent well ($k=1$). The observation apparatus 100 has a configuration similar to that of the observation apparatus 10 and includes, as illustrated in FIG. 12, an illumination optical system 115, a reflector 170 that reflects light emitted from the illumination optical system 115, and an observation optical system 116 that condenses the light reflected by the reflector 170. The illumination optical system 115 includes a light source 115a and a diffusing plate 115b.

The illumination optical system 115 and the observation optical system 116 are provided below the installation position of the multi-well plate C1. In contrast to this, the reflector 170 is provided above the installation position of the multi-well plate C1. The reflector 170 serves as a plane mirror and is installed such that an on-axis marginal ray to enter the observation optical system 116 travels via an adjacent well before reflection due to the reflector 170.

In the observation apparatus 100, as illustrated in FIGS. 12 and 13, specifications of the observation optical system 116, specifications of the multi-well plate C1, the state of culture fluid in each well, and parameters regarding installation conditions of the reflector 170 are as follows. Note that the multi-well plate C1 serves as a 96-well plate. The thickness of the lid of the multi-well plate C1 is 1.5 mm and is 1.0 mm resulting from air conversion.

$N_a$=0.25, $P$=9 mm, $D_u$=6.9 mm, $D_b$=6.4 mm,
$n_w$=1.332, $A_{c2}$=0.11497/mm, $A$=0.0763/mm,
$H_b$=10.7 mm, $H_w$=1.8 mm, and $H_m$=10 mm.

In this case, in the observation apparatus 100, $N_{aCORU}$, $Y_{sORU}$, $H_{mFCLU}$, and $H_{mFCRB}$ are as follows.

$N_{aCORU}$=0.31, $Y_{sORU}$=0.39 mm, $H_{mFCLU}$=6.0 mm, and $H_{mFCRB}$=11.5 mm.

Therefore, the observation apparatus 100 satisfies Conditional Expression (3-1), Conditional Expression (5-1), and Conditional Expression (9-1), enabling favorable observation of at least the center of a well with oblique illumination.

The observation apparatus 100 having such a configuration as above performs observation, as illustrated in FIG. 14, with the observation optical system 116 having its optical axis aligned with the center of an on-axis well W1.

Figure 15:
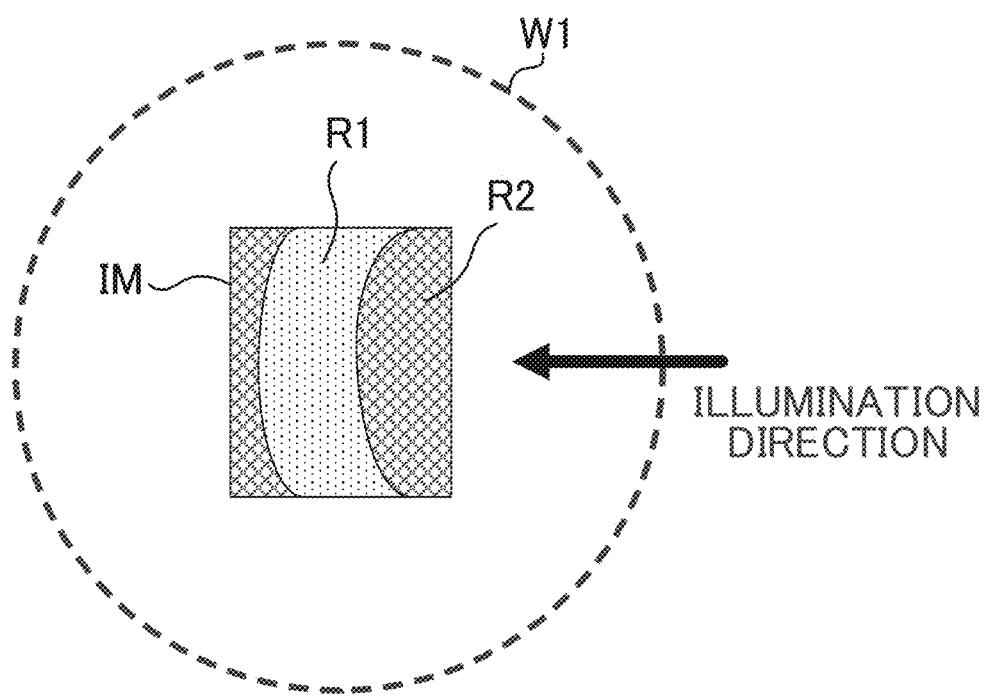
FIG. 15 illustrates a distribution of contrast formed in the image capturing region by the observation apparatus.
Figure 16:
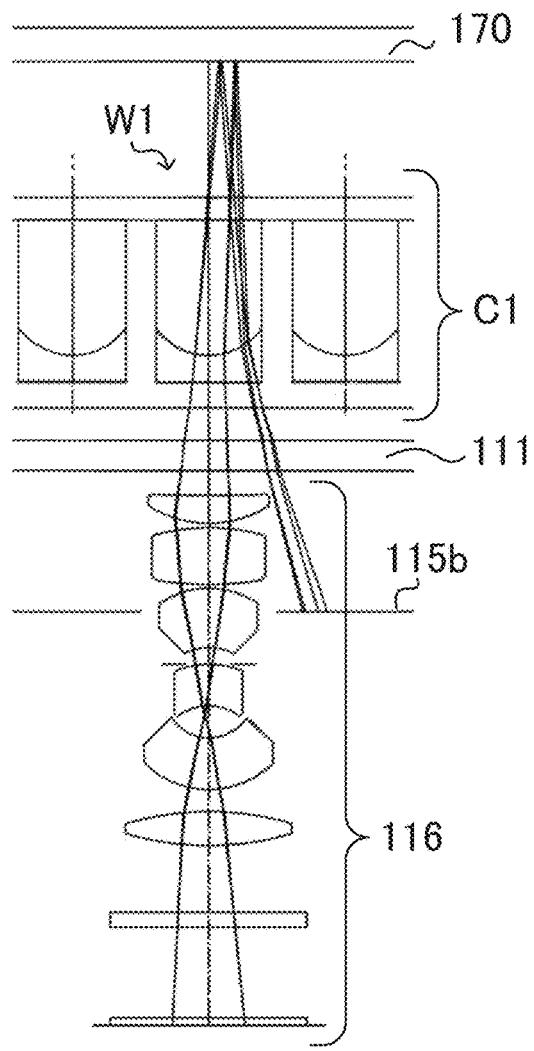
FIG. 16 is a ray diagram of incident light from the on-axis well.
Figure 17:
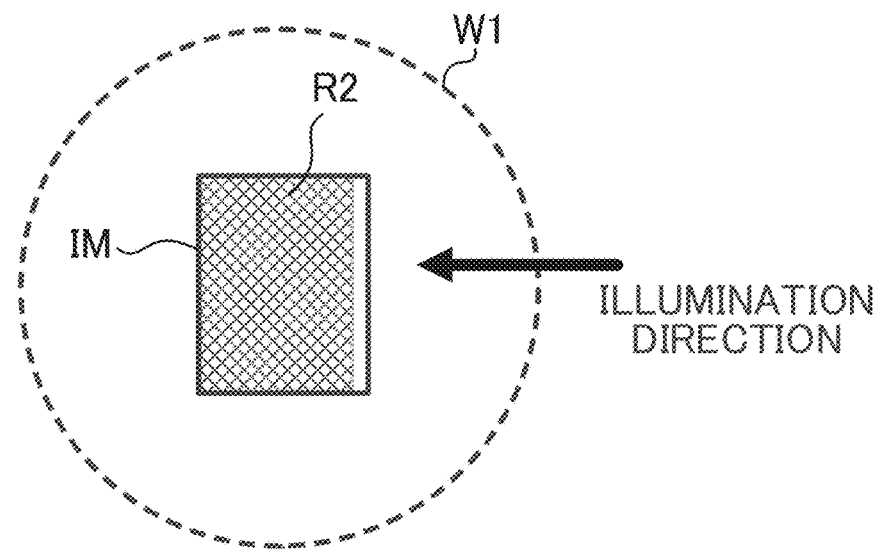
FIG. 17 illustrates a distribution of contrast formed in the image capturing region due to the light illustrated in FIG. 16.
Figure 18:
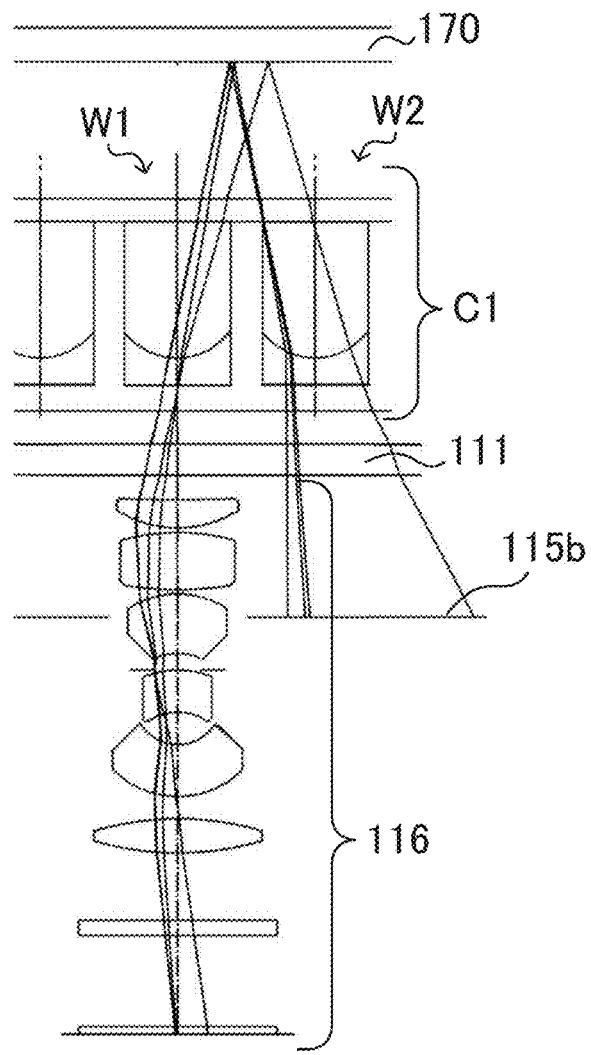
FIG. 18 is a ray diagram of light having passed through a region relatively away from the emission region in the on-axis well, the light being part of incident light from an adjacent well.
Figure 19:
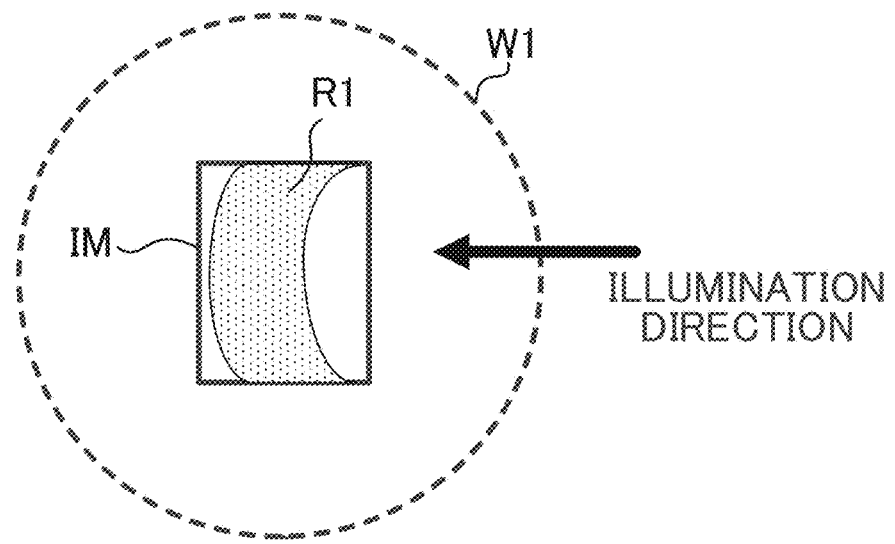
FIG. 19 illustrates a distribution of contrast formed in the image capturing region due to the light illustrated in FIG. 18.
Figure 20:
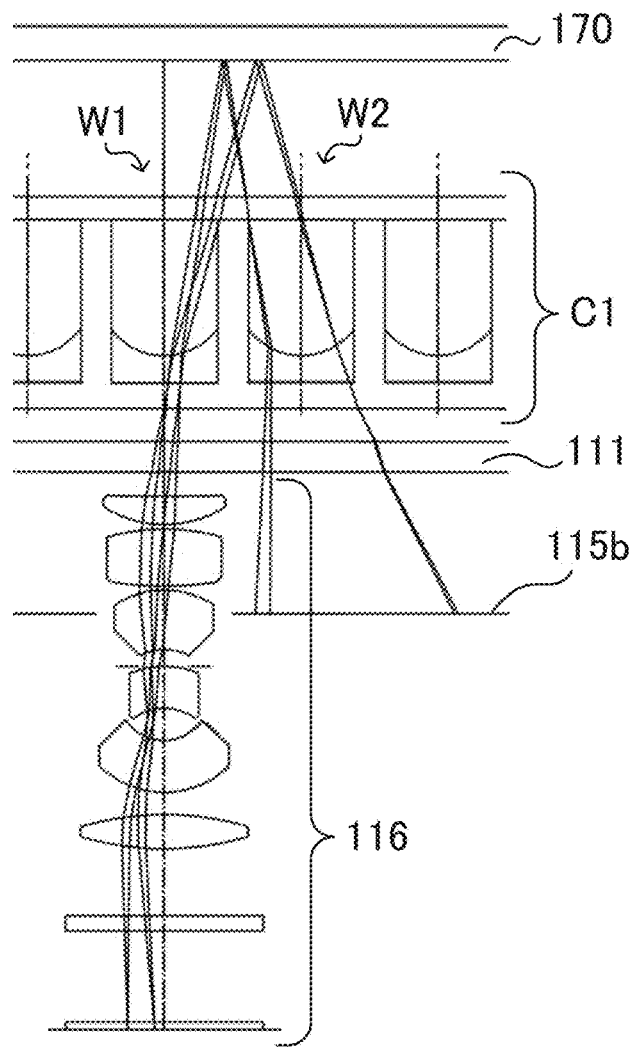
FIG. 20 is a ray diagram of light having passed through a region relatively close to the emission region in the on-axis well, the light being part of incident light from the adjacent well.
Figure 21:
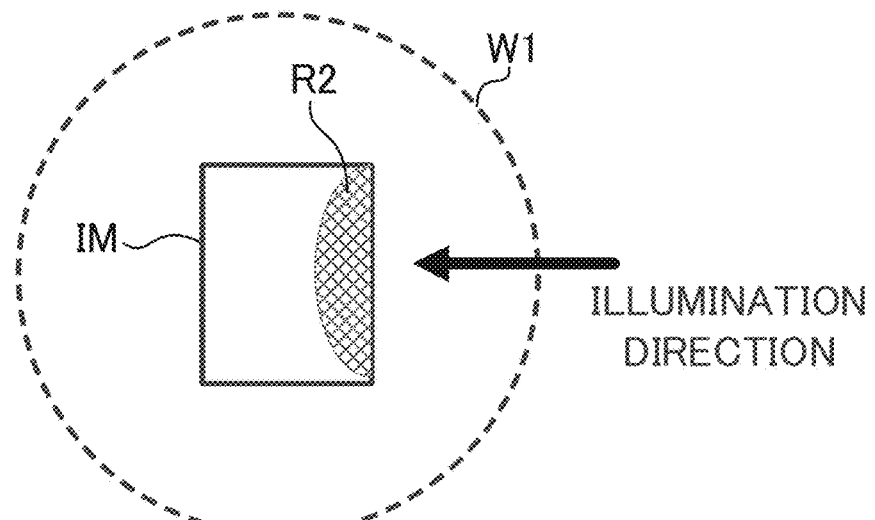
FIG. 21 illustrates a distribution of contrast formed in the image capturing region due to the light illustrated in FIG. 20.
Figure 22:
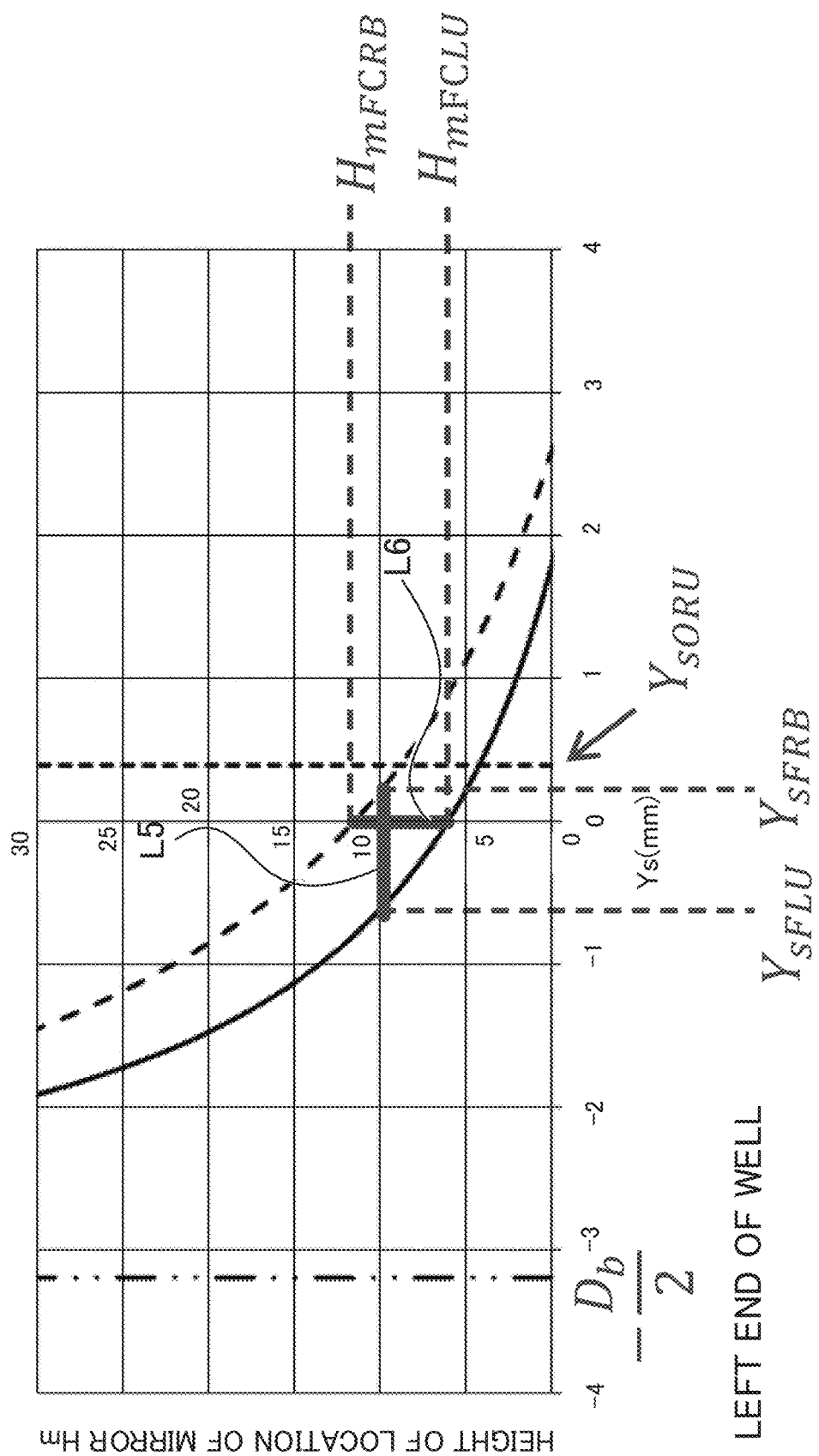
FIG. 22 is a graph indicating conditions for achievement of oblique illumination in the observation apparatus according to the first embodiment.

FIG. 15 illustrates a distribution of contrast formed in the image capturing region IM by the observation apparatus 100. FIG. 16 is a ray diagram of incident light from the on-axis well. FIG. 17 illustrates a distribution of contrast formed in the image capturing region IM due to the light illustrated in FIG. 16. FIG. 18 is a ray diagram of light having passed through a region relatively away from the emission region in the on-axis well, the light being part of incident light from the adjacent well. FIG. 19 illustrates a distribution of contrast formed in the image capturing region IM due to the light illustrated in FIG. 18. FIG. 20 is a ray diagram of light having passed through a region relatively close to the emission region in the on-axis well, the light being part of incident light from the adjacent well. FIG. 21 illustrates a distribution of contrast formed in the image capturing region IM due to the light illustrated in FIG. 20. FIG. 22 is a graph indicating conditions for achievement of oblique illumination in the observation apparatus 100.

Note that, in FIGS. 15, 17, 19, and 21, a region R1 indicates a region with fulfillment of oblique illumination, and a region R2 indicates a region with fulfillment of brightfield illumination.

As illustrated in FIG. 15, the observation apparatus 100 achieves oblique illumination in a wide range (region R1) in the image capturing region IM, enabling favorable observation. More particularly, as illustrated in FIG. 16, due to incident light from the on-axis well W1, brightfield illumination is fulfilled in a wide range (region R2) as illustrated in FIG. 17, but no oblique illumination is fulfilled. However, as illustrated in FIG. 18, due to light having passed through a region relatively away from the emission region in the on-axis well W1 after entry from the adjacent well W2, oblique illumination is fulfilled in the region R1 illustrated in FIG. 19. Note that, as illustrated in FIG. 20, due to light having passed through a region relatively close to the emission region in the on-axis well W1 after entry from the adjacent well W2, brightfield illumination is fulfilled in the region R2 illustrated in FIG. 21. As a result, as illustrated in FIG. 15, oblique illumination is achieved in a wide range (region R1) in the image capturing region IM.

Specifically, oblique illumination is fulfilled in the range of from $Y_{sFLU}$ to $Y_{sFRB}$ at $H_m$=10 mm, indicated with a line L5 in FIG. 22. For fulfillment of oblique illumination at least at the center of the field of view ($Y_s$=0), as indicated with a line L6 in FIG. 22, the height of location of the reflector 170 is required to be set in the range of from $H_{mFCLU}$ to $H_{mFCRB}$.

Figure 23:
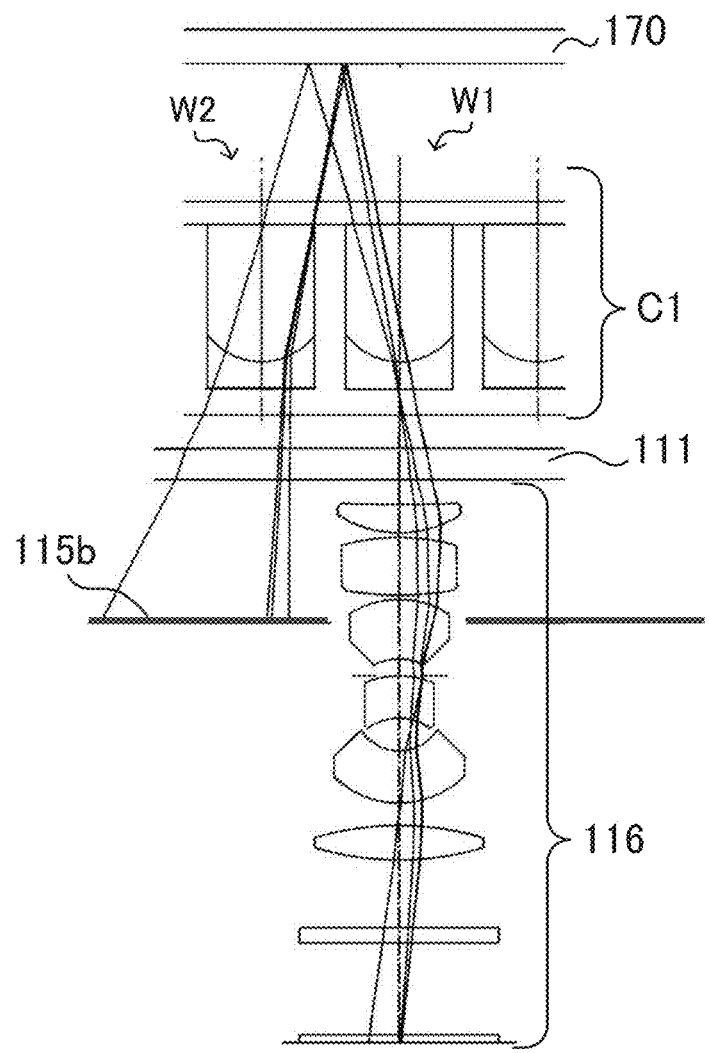
FIG. 23 is a ray diagram of light having passed through a region relatively away from the emission region in the on-axis well at the time of illumination in the direction opposite to the illumination direction illustrated in FIG. 18, the light being part of incident light from the adjacent well.
Figure 24:
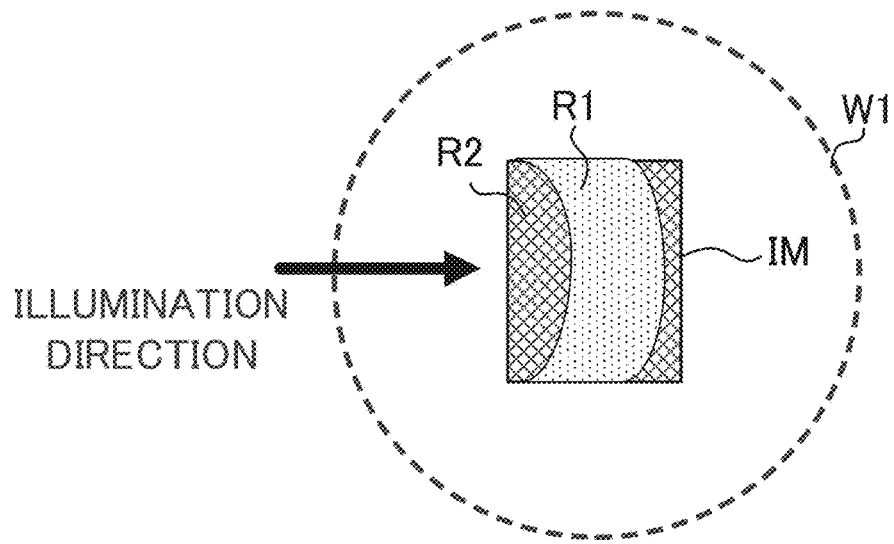
FIG. 24 illustrates a distribution of contrast formed in the image capturing region due to the light illustrated in FIG. 23.
Figure 25:
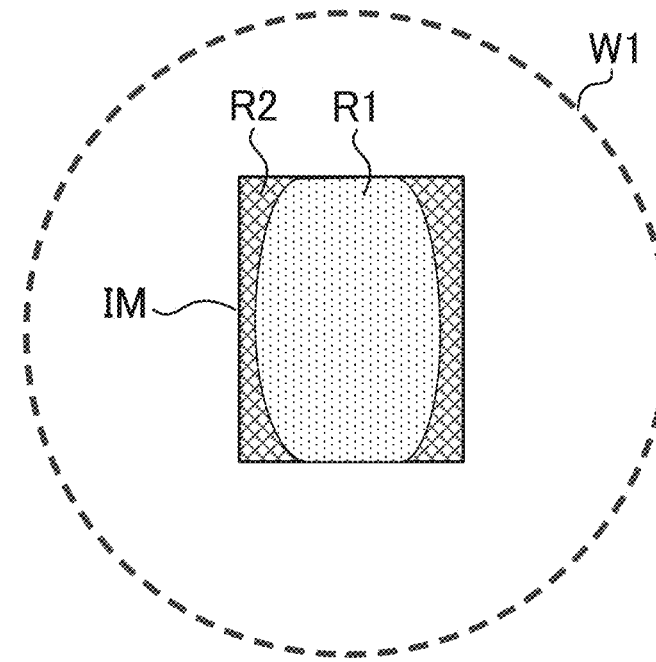
FIG. 25 illustrates a distribution of contrast acquired by combination of the distribution of contrast illustrated in FIG. 19 and the distribution of contrast illustrated in FIG. 24.

FIG. 23 is a ray diagram of light having passed through a region relatively away from the emission region in the on-axis well at the time of illumination in the direction opposite to the illumination direction illustrated in FIG. 18, the light being part of incident light from the adjacent well. FIG. 24 illustrates a distribution of contrast formed in the image capturing region IM due to the light illustrated in FIG. 23. FIG. 25 illustrates a distribution of contrast acquired by combination of the distribution of contrast illustrated in FIG. 19 and the distribution of contrast illustrated in FIG. 24.

Exemplary unidirectional illumination to the on-axis well has been given. However, combined may be images acquired by image capturing with sequential illumination in two or more directions. For example, as illustrated in FIG. 23, due to illumination in the direction opposite to that in FIG. 18, acquired is the region R1 substantially symmetrical with respect to the optical axis to that illustrated in FIG. 19 as illustrated in FIG. 24. Due to symmetrical illumination in two directions based on the above effect, high-contrast observation may be carried out with fulfillment of oblique illumination in a wider range in the field of view as illustrated in FIG. 25.

Figure 26:
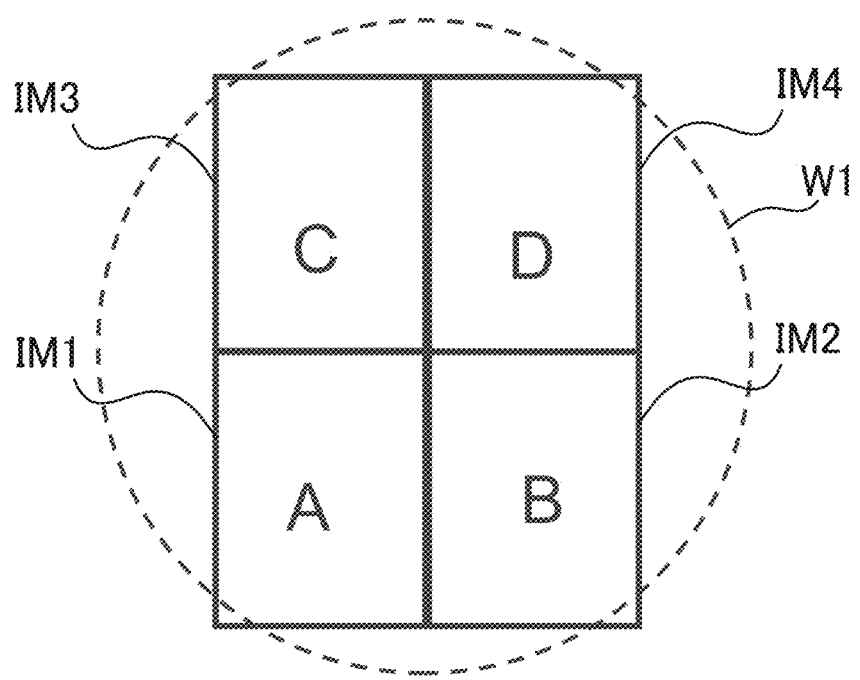
FIG. 26 illustrates the positions of a plurality of image capturing regions to a well.
Figure 27:
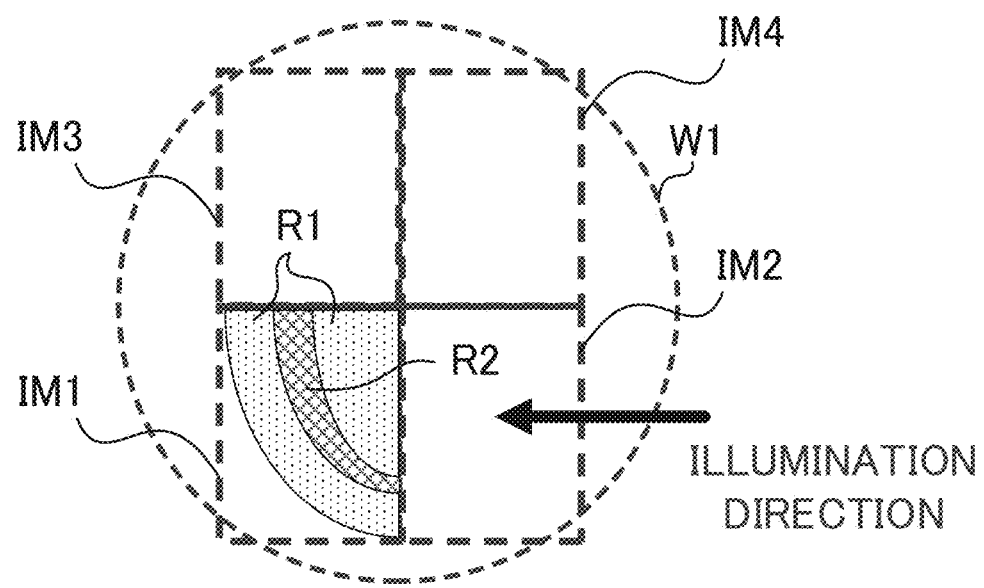
FIG. 27 illustrates the illumination direction at the time of capturing of an image capturing region and a distribution of contrast formed in the image capturing region.
Figure 28:
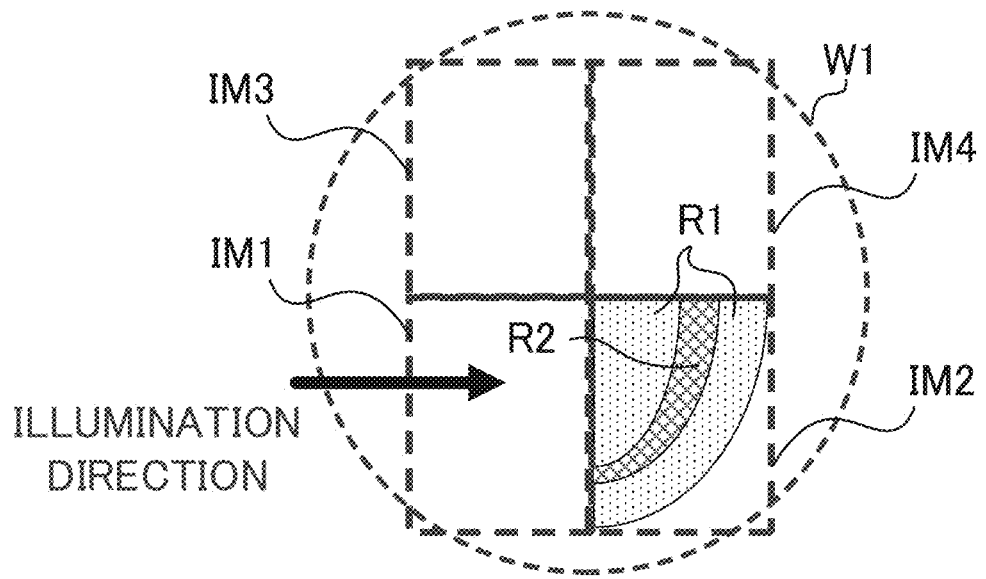
FIG. 28 illustrates the illumination direction at the time of capturing of an image capturing region and a distribution of contrast formed in the image capturing region.
Figure 29:
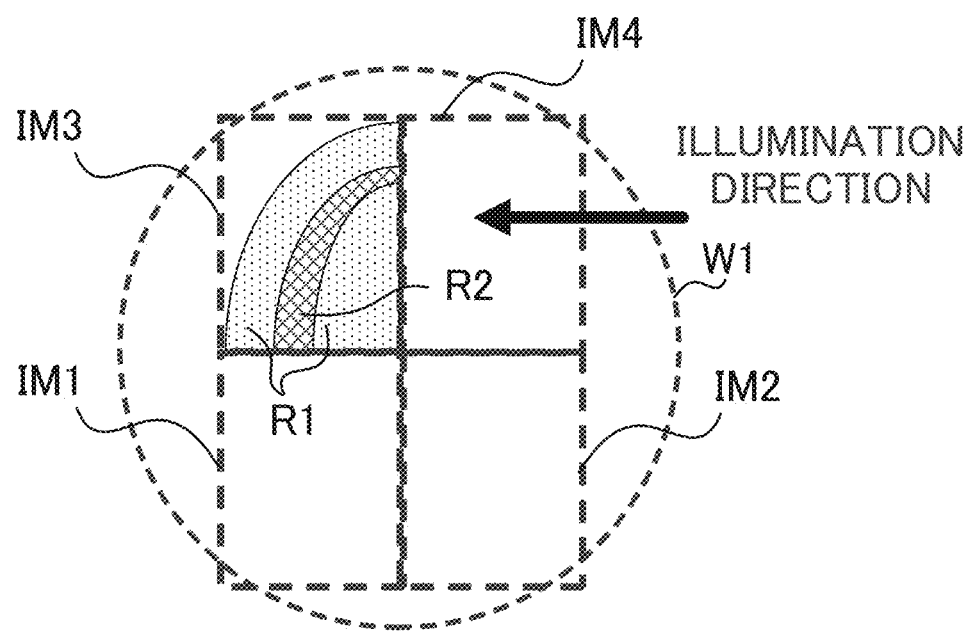
FIG. 29 illustrates the illumination direction at the time of capturing of an image capturing region and a distribution of contrast formed in the image capturing region.
Figure 30:
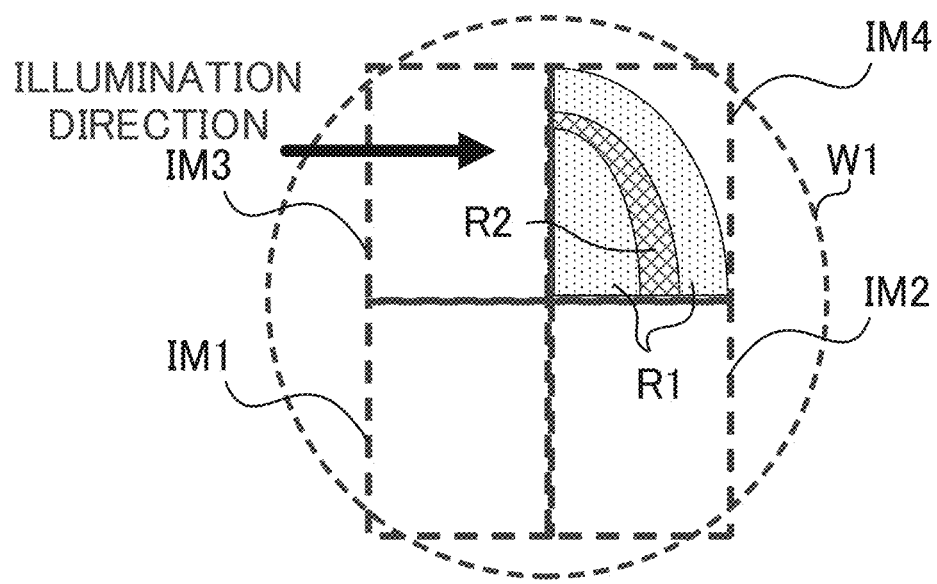
FIG. 30 illustrates the illumination direction at the time of capturing of an image capturing region and a distribution of contrast formed in the image capturing region.
Figure 31:
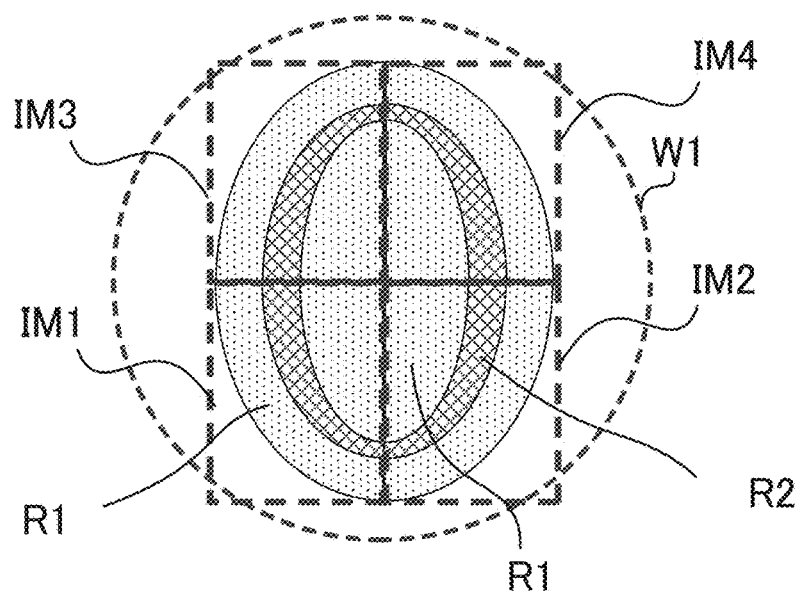
FIG. 31 illustrates a distribution of contrast acquired by combination of the distributions of contrast illustrated in FIGS. 27 to 30.

FIG. 26 illustrates the positions of a plurality of image capturing regions to a well W. FIG. 27 illustrates the illumination direction at the time of capturing of an image capturing region IM1 and a distribution of contrast formed in the image capturing region IM1. FIG. 28 illustrates the illumination direction at the time of capturing of an image capturing region IM2 and a distribution of contrast formed in the image capturing region IM2. FIG. 29 illustrates the illumination direction at the time of capturing of an image capturing region IM3 and a distribution of contrast formed in the image capturing region IM3. FIG. 30 illustrates the illumination direction at the time of capturing of an image capturing region IM4 and a distribution of contrast formed in the image capturing region IM4. FIG. 31 illustrates a distribution of contrast acquired by combination of the distributions of contrast illustrated in FIGS. 27 to 30. Note that a region R2 is interposed between an inner region R1 and an outer region R1, and the outer region R1 in the well corresponds to a region in which oblique illumination is achieved due to light reflected by the reflector 170 through the on-axis well.

Above given has been exemplary observation with the image capturing region IM aligned with the center of the on-axis well. However, a plurality of different image capturing regions may be captured and combined. For example, as illustrated in FIG. 26, with movement of an image capturing unit 14 to the on-axis well W1, four image capturing regions (image capturing regions IM1, IM2, IM3, and IM4) may be sequentially captured. In this case, as illustrated in FIGS. 27 to 30, desirably, illumination is carried out from the side opposite to the side on which each image capturing region is located with respect to the center of the on-axis well W1.

Capturing of each image capturing region deviated from the center of the on-axis well causes the region R1 with fulfillment of oblique illumination not only in the center of the well but also in a portion slightly away from the center, as illustrated in FIGS. 27 to 30. Thus, as illustrated in FIG. 31, combination of acquired images enables high-contrast observation of a region near the center of the well and an annular region slightly away therefrom, so that a wider range in the well can be observed.

Second Embodiment

Figure 32:
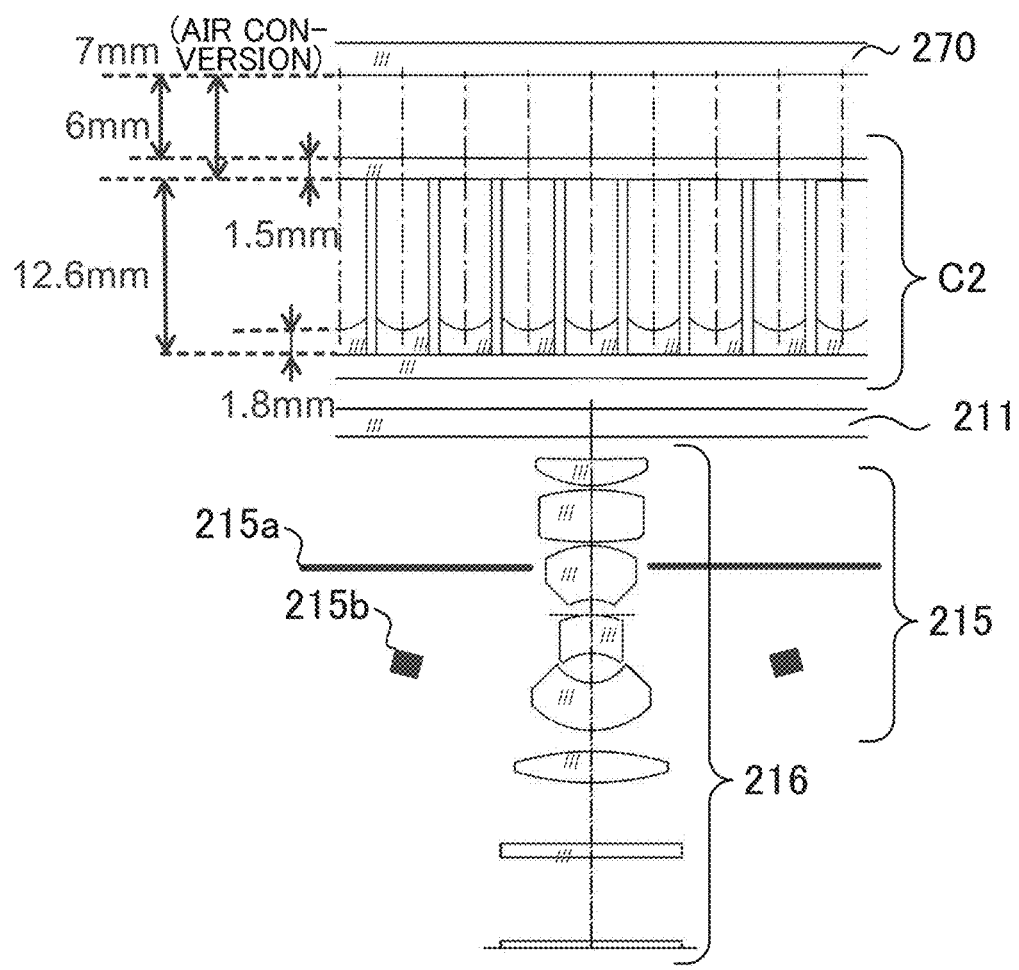
FIG. 32 is an explanatory view for setting in an observation apparatus according to a second embodiment.
Figure 33:
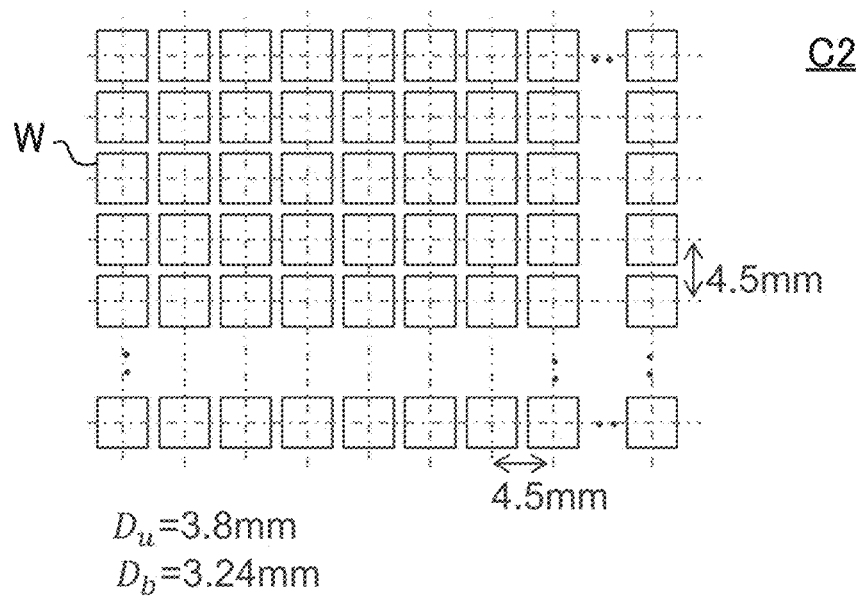
FIG. 33 is an explanatory view for specifications of a multi-well plate for use in the observation apparatus according to the second embodiment.

FIG. 32 is an explanatory view for setting in an observation apparatus 200 according to the present embodiment. FIG. 33 is an explanatory view for specifications of a multi-well plate C2 for use in the observation apparatus 200 according to the present embodiment. The configuration and setting of the observation apparatus 200 will be described below with reference to FIGS. 32 and 33.

The observation apparatus 200 serves as an apparatus for observation of a sample in the multi-well plate C2 and achieves oblique illumination mainly with incident light from an adjacent well (k=1). The observation apparatus 200 has a configuration similar to that of the observation apparatus 10 and includes, as illustrated in FIG. 32, an illumination optical system 215, a reflector 270 that reflects light emitted from the illumination optical system 215, and an observation optical system 216 that condenses the light reflected by the reflector 270. The illumination optical system 215 includes a light source 215a and a diffusing plate 215b.

The illumination optical system 215 and the observation optical system 216 are provided below the installation position of the multi-well plate C2. In contrast to this, the reflector 270 is provided above the installation position of the multi-well plate C2. The reflector 270 serves as a plane mirror and is installed such that an on-axis marginal ray to enter the observation optical system 216 travels via an adjacent well before reflection due to the reflector 270.

In the observation apparatus 200, as illustrated in FIGS. 32 and 33, specifications of the observation optical system 216, specifications of the multi-well plate C2, the state of culture fluid in each well, and parameters regarding installation conditions of the reflector 270 are as follows. Note that the multi-well plate C2 serves as a 384-well plate. The thickness of the lid of the multi-well plate C2 is 1.5 mm and is 1.0 mm resulting from air conversion.

$N_a$=0.12, $P$=4.5 mm, $D_u$=3.8 mm, $D_b$=3.24 mm,
$n_w$=1.332, $A_{c2}$=0.2306/mm, $A$=0.153/mm,
$H_b$=12.6 mm, $H_w$=1.8 mm, and $H_m$=7 mm.

In this case, in the observation apparatus 200, $N_{aCORU}$, $Y_{sORU}$, $H_{mFCLU}$, and $H_{mFCRB}$ are as follows.

$N_{aCORU}$=0.13, $Y_{sORU}$=0.066 mm, $H_{mFCLU}$=4.8 mm, and $H_{mFCRB}$=8.3 mm.

Therefore, the observation apparatus 200 satisfies Conditional Expression (3-1), Conditional Expression (5-1), and Conditional Expression (9-1), enabling favorable observation of at least the center of a well with oblique illumination.

The observation apparatus 200 having such a configuration as above performs observation, similarly to the observation apparatus 100, with the observation optical system 216 having its optical axis aligned with the center of an on-axis well W1.

Figure 34:
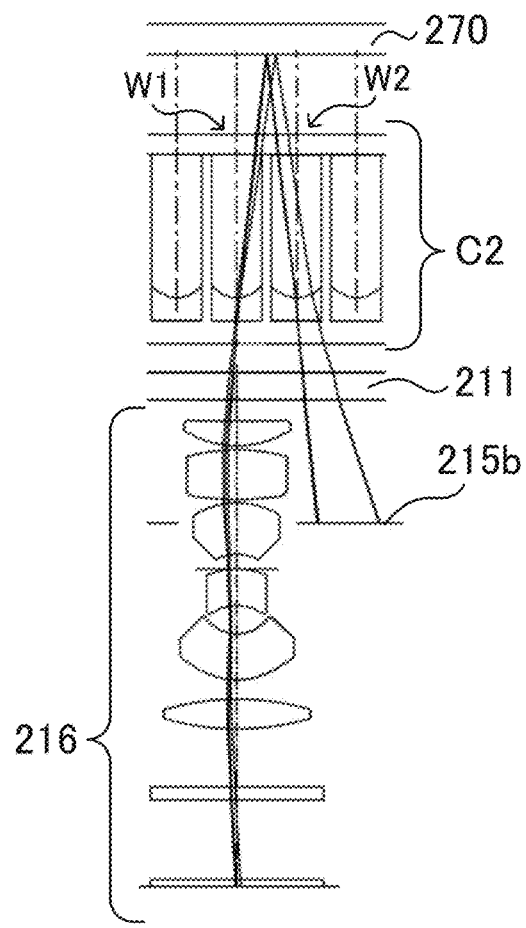
FIG. 34 is a ray diagram of incident light from an adjacent well.
Figure 35:
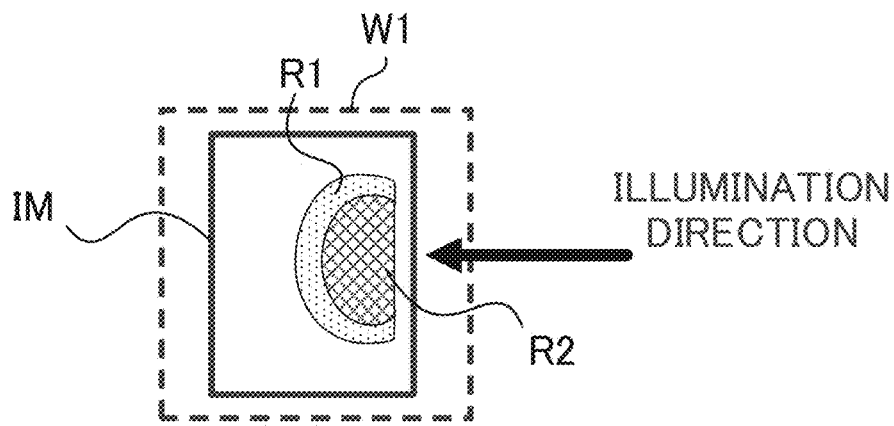
FIG. 35 illustrates a distribution of contrast formed in an image capturing region due to the light illustrated in FIG. 34.
Figure 36:
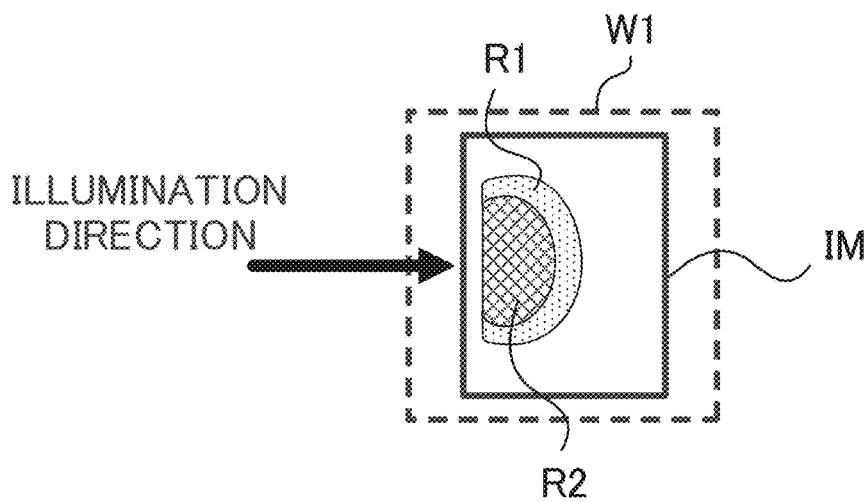
FIG. 36 illustrates a distribution of contrast formed in the image capturing region at the time of illumination in the direction opposite to the illumination direction illustrated in FIG. 34.
Figure 37:
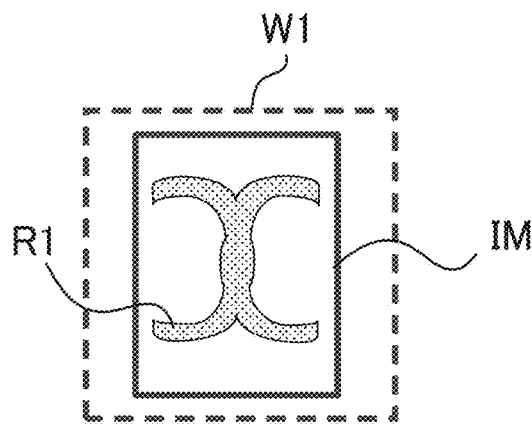
FIG. 37 illustrates a distribution of contrast acquired by combination of the distribution of contrast illustrated in FIG. 35 and the distribution of contrast illustrated in FIG. 36.
Figure 38:
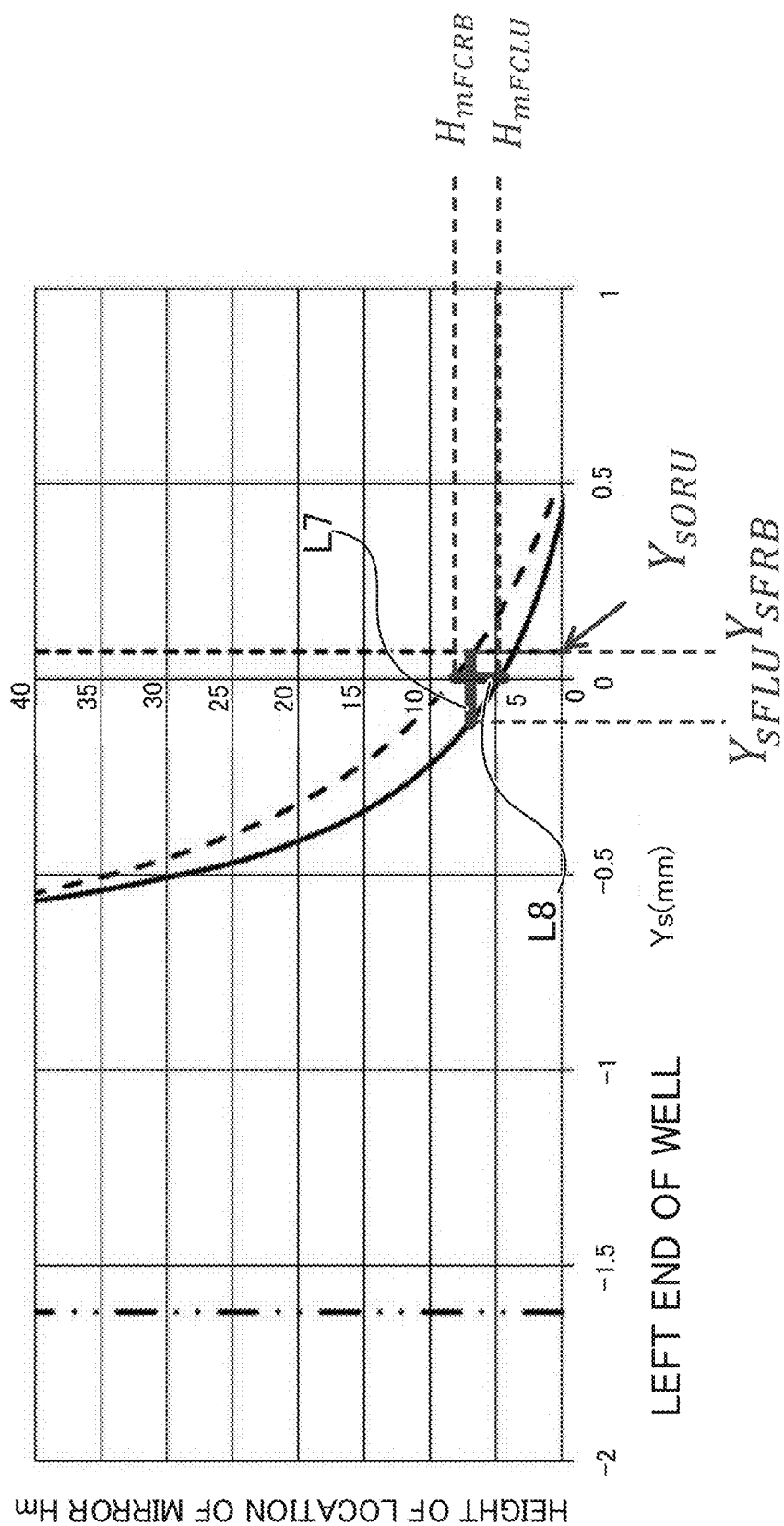
FIG. 38 is a graph indicating conditions for achievement of oblique illumination in the observation apparatus according to the second embodiment.

FIG. 34 is a ray diagram of incident light from an adjacent well. FIG. 35 illustrates a distribution of contrast formed in an image capturing region IM due to the light illustrated in FIG. 34. FIG. 36 illustrates a distribution of contrast formed in the image capturing region IM at the time of illumination in the direction opposite to the illumination direction illustrated in FIG. 34. FIG. 37 illustrates a distribution of contrast acquired by combination of the distribution of contrast illustrated in FIG. 35 and the distribution of contrast illustrated in FIG. 36. FIG. 38 is a graph indicating conditions for achievement of oblique illumination in the observation apparatus 200 according to the present embodiment. Note that, in FIGS. 35 to 37, a region R1 indicates a region with fulfillment of oblique illumination, and a region R2 indicates a region with fulfillment of brightfield illumination.

As illustrated in FIG. 34, with incident light from the adjacent well W2, the observation apparatus 200 fulfills oblique illumination in a crescent range (region R1) as illustrated in FIG. 35. As illustrated in FIG. 36, a switch in the illumination direction causes oblique illumination to be fulfilled in a crescent range (region R1) oppositely oriented to that in FIG. 35. Therefore, combination of images acquired due to switching in the illumination direction enables achievement of oblique illumination in a relatively wide range (region R1) as illustrated in FIG. 37, so that observation in a well in a 384-well plate, which was almost impossible before, can be carried out.

Specifically, oblique illumination is fulfilled in the range of from $Y_{sFLU}$ to $Y_{sFRB}$ at $H_m$=7 mm, indicated with a line L7 in FIG. 38. For fulfillment of oblique illumination at least at the center of the field of view ($Y_s$=0), as indicated with a line L8 in FIG. 38, the height of location of the reflector 270 is required to be set in the range of from $H_{mFCLU}$ to $H_{mFCRB}$.

Third Embodiment

Figure 39:
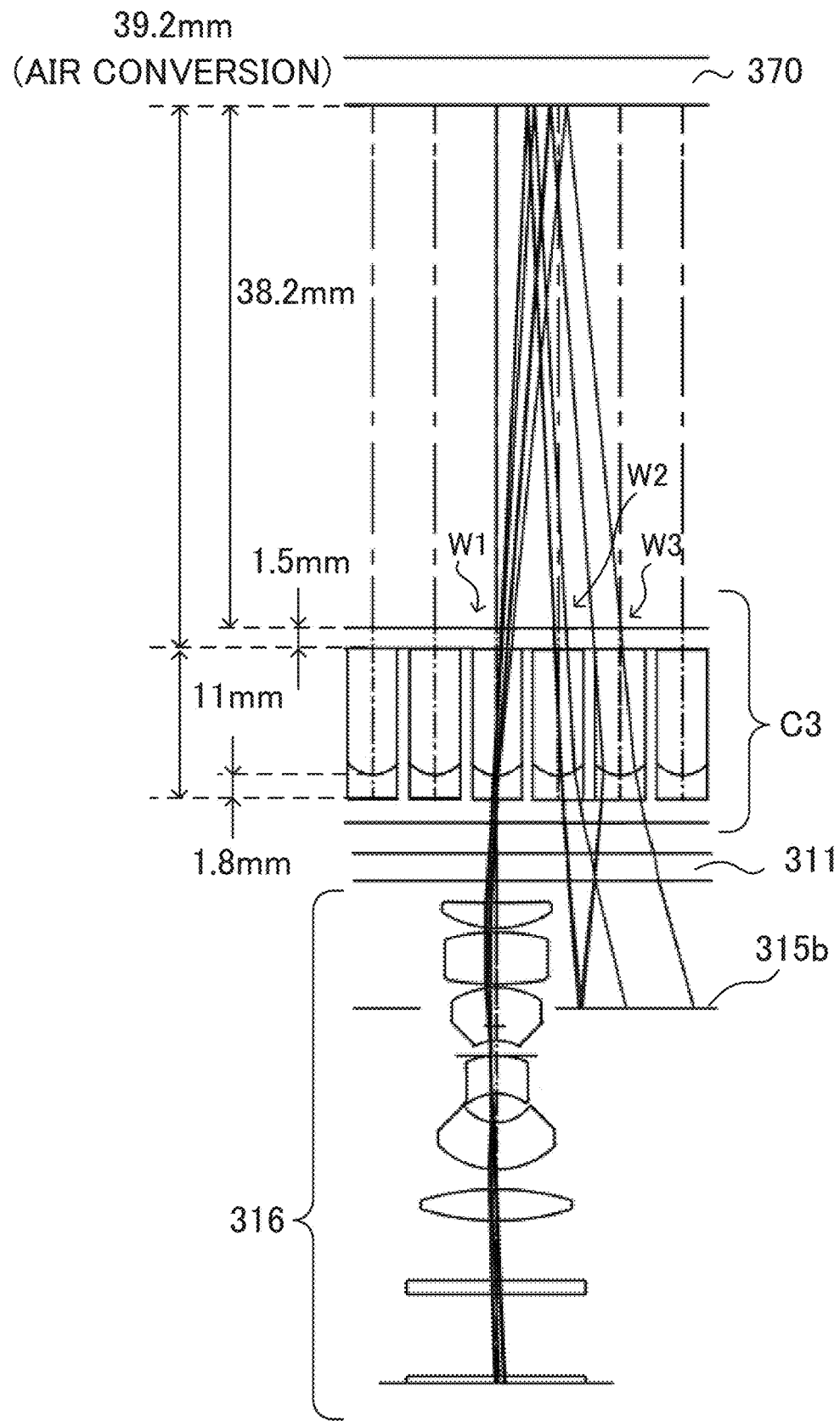
FIG. 39 is an explanatory view for setting in an observation apparatus according to a third embodiment.

FIG. 39 is an explanatory view for setting in an observation apparatus 300 according to the present embodiment. The configuration and setting of the observation apparatus 300 will be described below with reference to FIG. 39.

The observation apparatus 300 serves as an apparatus for observation of a sample in a multi-well plate C3 and achieves oblique illumination mainly with incident light from an adjacent well (k=1) and incident light from the second well (k=2). The observation apparatus 300 has a configuration similar to that of the observation apparatus 10 and includes, as illustrated in FIG. 39, an illumination optical system, a reflector 370 that reflects light emitted from the illumination optical system, and an observation optical system 316 that condenses the light reflected by the reflector 370. The illumination optical system includes a light source not illustrated and a diffusing plate 315b.

The illumination optical system and the observation optical system 316 are provided below the installation position of the multi-well plate C3. In contrast to this, the reflector 370 is provided above the installation position of the multi-well plate C3. The reflector 370 serves as a plane mirror and is installed such that on-axis marginal rays to enter the observation optical system 316 travel via peripheral wells (adjacent well and second well) before reflection due to the reflector 370.

In the observation apparatus 300, as illustrated in FIG. 39, specifications of the observation optical system 316, specifications of the multi-well plate C3, the state of culture fluid in each well, and parameters regarding installation conditions of the reflector 370 are as follows. Note that the multi-well plate C3 serves as a 384-well plate. The thickness of the lid of the multi-well plate C3 is 1.5 mm and is 1.0 mm resulting from air conversion.

$N_a$=0.08, $P$=4.5 mm, $D_u$=3.8 mm, $D_b$=3.2 mm,
$n_w$=1.332, $A_{c2}$=0.2306/mm, $A$=0.153/mm,
$H_b$=11 mm, $H_w$=1.8 mm, and $H_m$=39.2 mm.

In this case, in the observation apparatus 300, $N_{aCORU}$, $Y_{sORU}$, $H_{mFCLU}$, and $H_{mFCRB}$ are as follows.

$N_{aCORU}$=0.13 and $Y_{sORU}$=0.375 mm.

$H_{mFCLU}$=39.1 mm and $H_{mFCRB}$=43.2 mm(k=2).

Therefore, the observation apparatus 300 satisfies Conditional Expression (3-1) and Conditional Expression (5-1), and Conditional Expression (9-1) with k=2, enabling favorable observation of at least the center of a well with oblique illumination.

The observation apparatus 300 having such a configuration as above performs observation, similarly to the observation apparatus 100, with the observation optical system 316 having its optical axis aligned with the center of an on-axis well W1.

Figure 40:
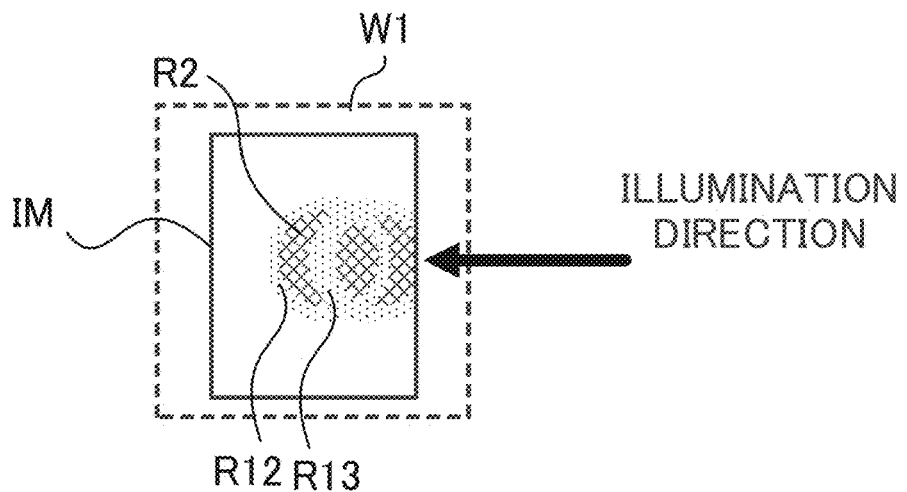
FIG. 40 illustrates a distribution of contrast formed in an image capturing region due to the light illustrated in FIG. 39.
Figure 41:
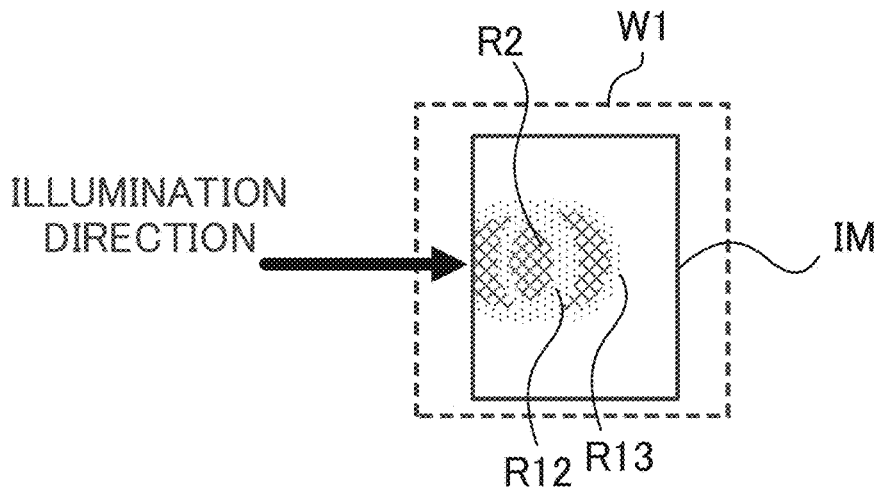
FIG. 41 illustrates a distribution of contrast formed in the image capturing region at the time of illumination in the direction opposite to the illumination direction illustrated in FIG. 39.
Figure 42:
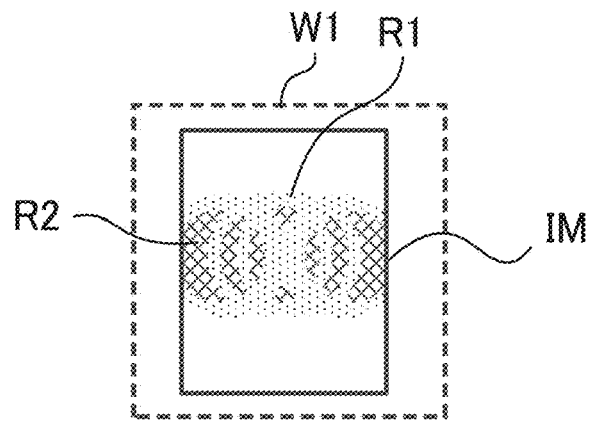
FIG. 42 illustrates a distribution of contrast acquired by combination of the distribution of contrast illustrated in FIG. 40 and the distribution of contrast illustrated in FIG. 41.
Figure 43:
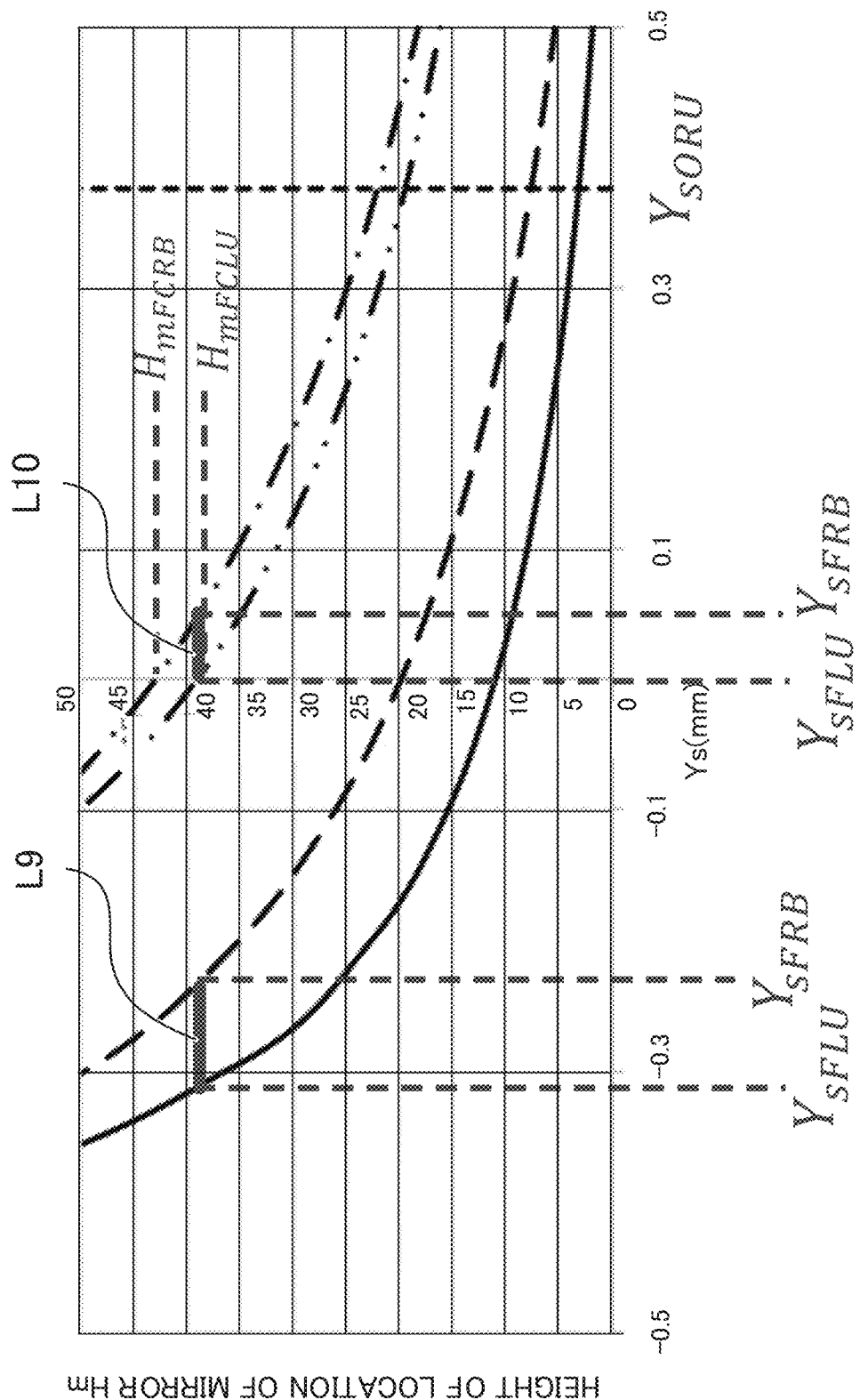
FIG. 43 is a graph indicating conditions for achievement of oblique illumination in the observation apparatus according to the third embodiment.

FIG. 40 illustrates a distribution of contrast formed in an image capturing region IM due to the light illustrated in FIG. 39. FIG. 41 illustrates a distribution of contrast formed in the image capturing region IM at the time of illumination in the direction opposite to the illumination direction illustrated in FIG. 39. FIG. 42 illustrates a distribution of contrast acquired by combination of the distribution of contrast illustrated in FIG. 40 and the distribution of contrast illustrated in FIG. 41. FIG. 43 is a graph indicating conditions for achievement of oblique illumination in the observation apparatus 300 according to the present embodiment. Note that, in FIGS. 40 to 42, a region R1, a region R12, and a region R13 each indicate a region with fulfillment of oblique illumination, and a region R2 indicates a region with fulfillment of brightfield illumination.

As illustrated in FIG. 40, the observation apparatus 300 produces, simultaneously, the region (R12) with oblique illumination formed due to incident light from the adjacent well W2 and the region (R13) with oblique illumination formed due to incident light from the second well W3. As illustrated in FIG. 41, a switch in the illumination direction causes the regions (regions R12 and R13) with oblique illumination symmetrical to those in FIG. 40. Therefore, combination of images acquired due to switching in the illumination direction enables achievement of oblique illumination in a relatively wide range (region R1) as illustrated in FIG. 42, so that observation in a well in a 384-well plate, which was almost impossible before, can be carried out.

Specifically, due to light from the adjacent well W2, oblique illumination is fulfilled in the range of from $Y_{sFLU}$ to $Y_{sFRB}$ at $H_m$=39.2 mm, indicated with a line L9 in FIG. 43. Due to light from the second well W3, oblique illumination is fulfilled in the range of from $Y_{sFLU}$ to $Y_{sFLU}$ at $H_m$=39.2 mm, indicated with a line L10 in FIG. 43.

The observation apparatuses each including a plane mirror as a reflector have been described above. Observation apparatuses each including a curved mirror as a reflector will be described below.

A multi-well plate having 96 or more wells is small in well diameter, and thus the refractive power of the liquid level (concave) of culture fluid housed in each well is relatively large. In a case where the reflector serves as a plane mirror, light reflected by the reflector after traveling via a peripheral well enters the on-axis well at a relatively large angle and then is refracted by the negative refractive power of the liquid level. Thus, a large amount of light travels outside the pupil. As described below, a curved mirror having a positive power, such as a concave mirror, is provided as a reflector, enabling a reduction in the amount of light traveling outside the pupil with suppression of the angle of incidence to the liquid level. Thus, a wider region with fulfillment of oblique illumination can be achieved.

Figure 44:
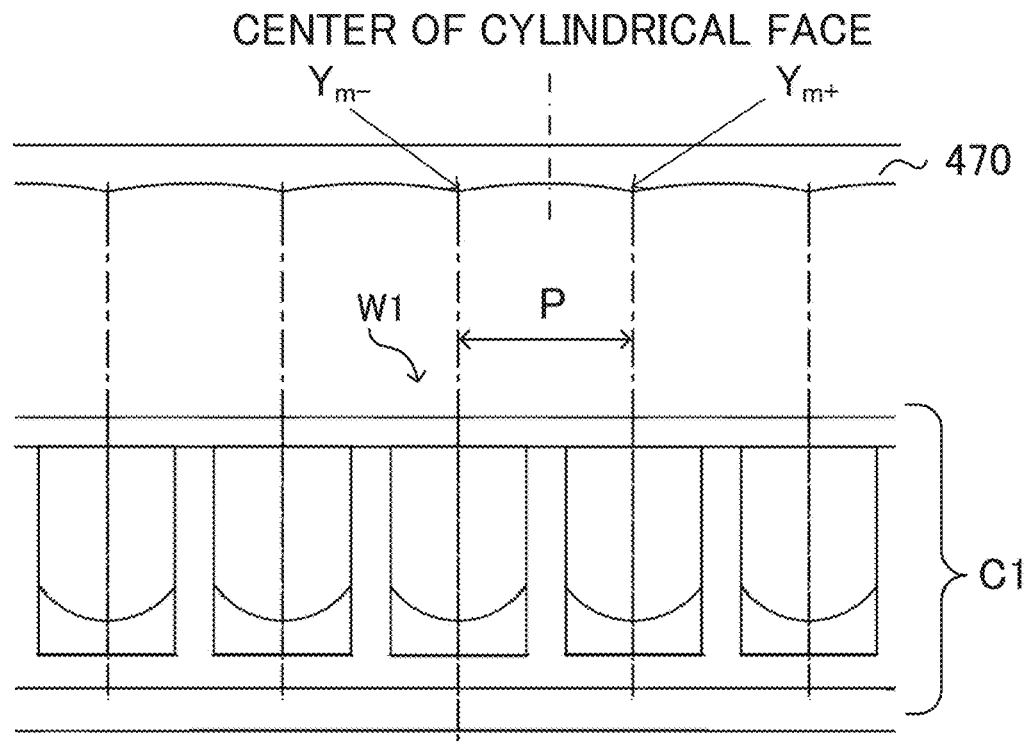
FIG. 44 illustrates an exemplary positional relationship between a multi-well plate and the curved face of a reflector.
Figure 45:
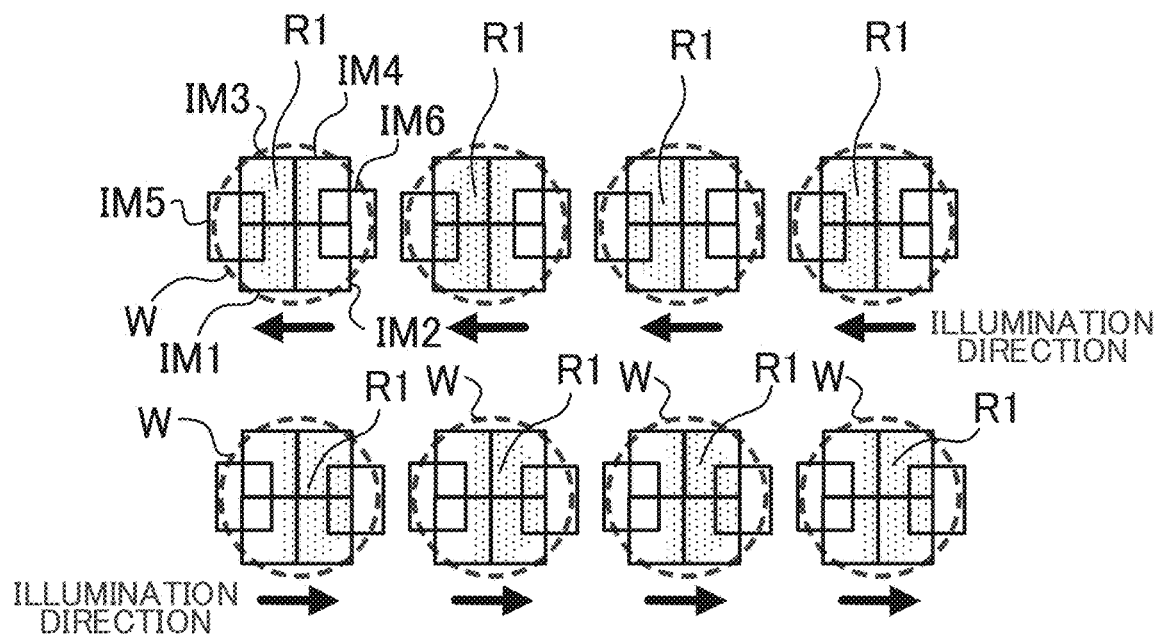
FIG. 45 is an explanatory view for a region with fulfillment of oblique illumination in an observation apparatus including a reflector disposed in the positional relationship illustrated in FIG. 44.
Figure 46:
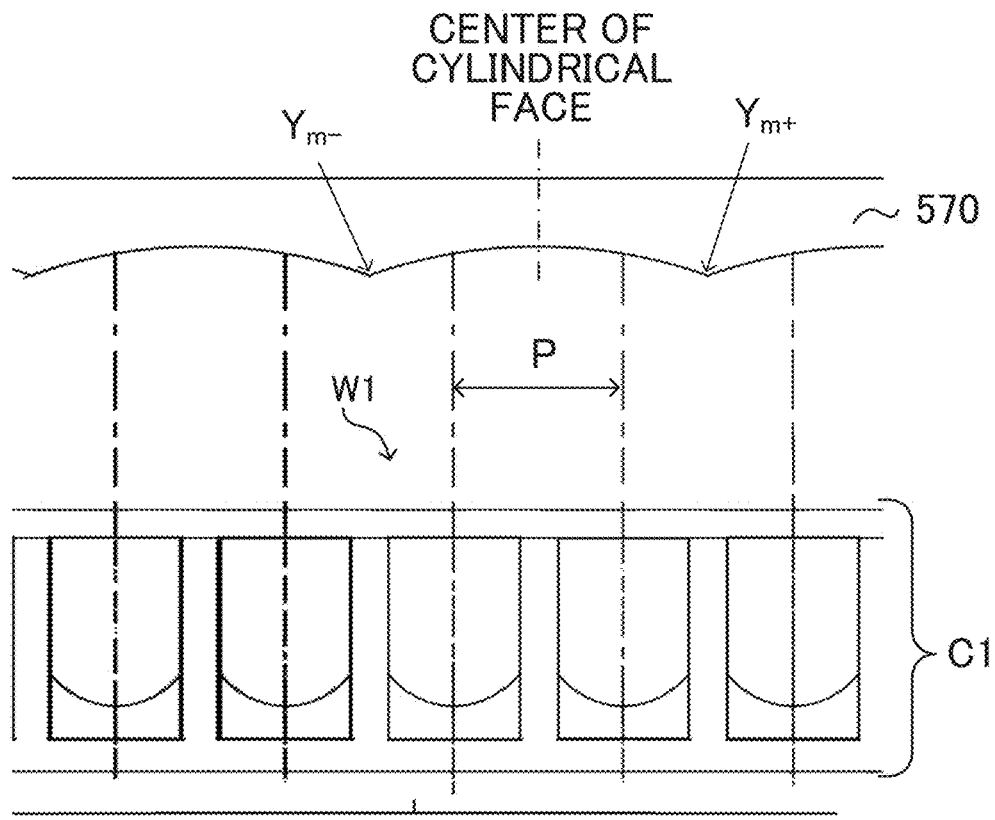
FIG. 46 illustrates another exemplary positional relationship between a multi-well plate and the curved face of a reflector.
Figure 47:
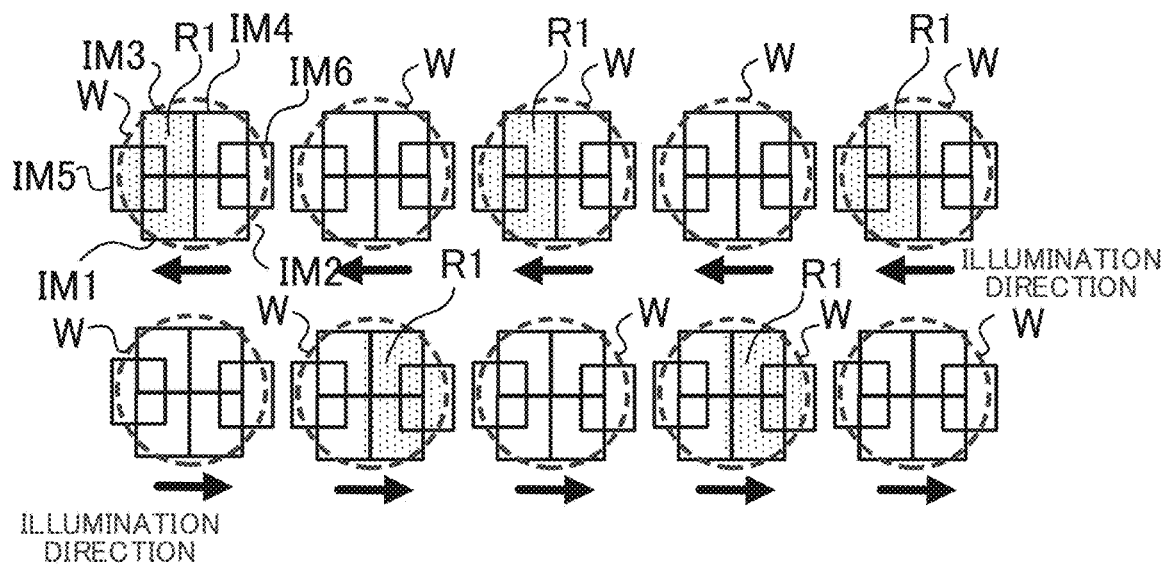
FIG. 47 is an explanatory view for a region with fulfillment of oblique illumination in an observation apparatus including a reflector disposed in the positional relationship illustrated in FIG. 46.
Figure 48:
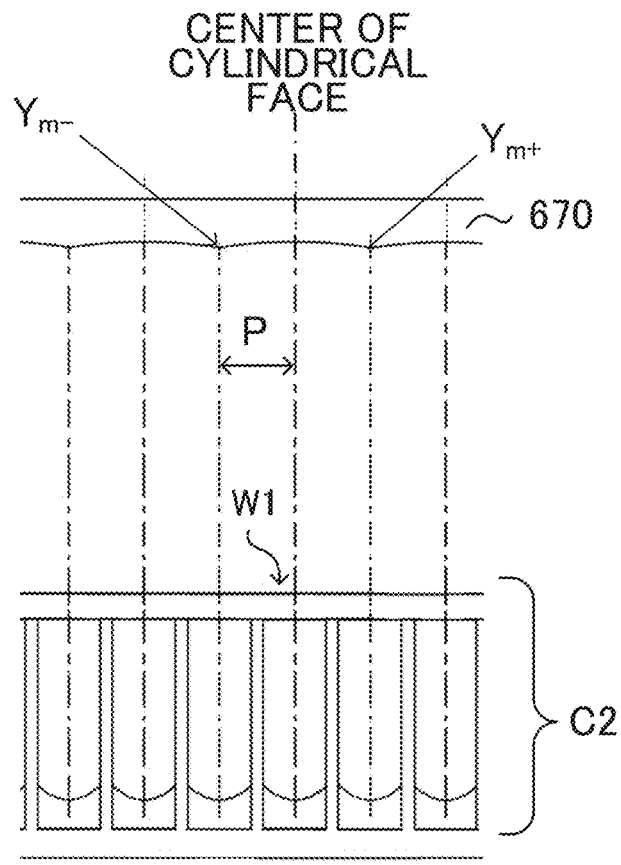
FIG. 48 illustrates another exemplary positional relationship between a multi-well plate and the curved face of a reflector.
Figure 49:
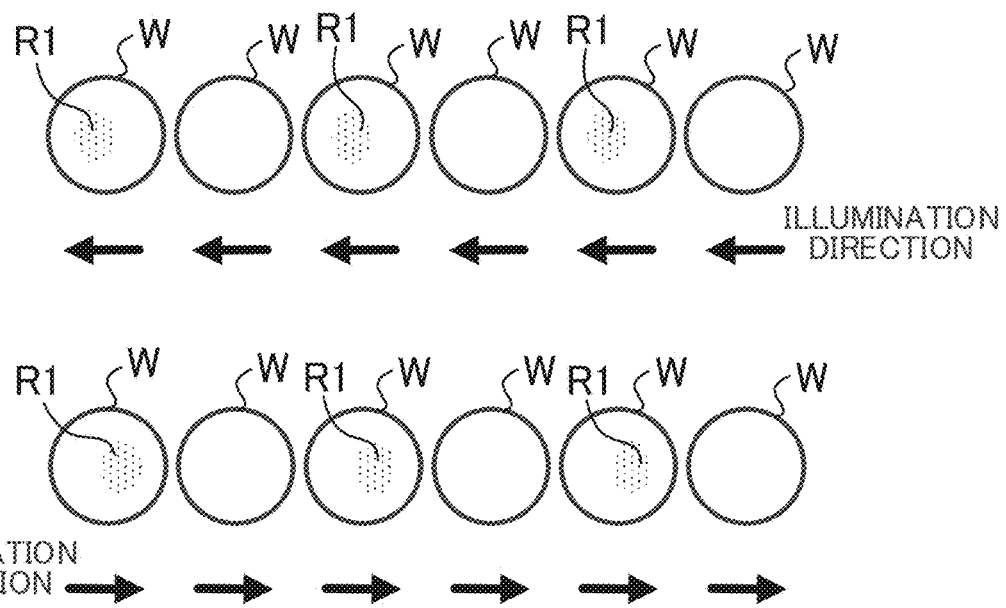
FIG. 49 is an explanatory view for a region with fulfillment of oblique illumination in an observation apparatus including a reflector disposed in the positional relationship illustrated in FIG. 48.

FIGS. 44, 46, and 48 each illustrate an exemplary positional relationship between a multi-well plate and the curved face of a reflector. FIG. 45 is an explanatory view for a region with fulfillment of oblique illumination in an observation apparatus including a reflector disposed in the positional relationship illustrated in FIG. 44. FIG. 47 is an explanatory view for a region with fulfillment of oblique illumination in an observation apparatus including a reflector disposed in the positional relationship illustrated in FIG. 46. FIG. 49 is an explanatory view for a region with fulfillment of oblique illumination in an observation apparatus including a reflector disposed in the positional relationship illustrated in FIG. 48. Three types of observation apparatuses each including a curved mirror will be described below with reference to FIGS. 44 to 49.

Common features between the three types will be described. As illustrated in FIGS. 44, 46, and 48, each curved mirror used as a reflector has a plurality of cylindrical faces arrayed, each cylindrical face having its recessed face oriented toward the multi-well plate. Furthermore, there is no space between the arrayed cylindrical faces, and the axial direction of each cylindrical face is identical to the direction (X direction) orthogonal to the direction in which light sources are arrayed (Y direction).

Next, features of each type will be described. A reflector 470 of a first type illustrated in FIG. 44 has the following two features. (1) The center of each cylindrical face is located between a well and a well. That is, the reflector 470 is installed such that the plurality of cylindrical faces each has its center of curvature located on a plane passing between adjacent wells included in the multi-well plate, the plane being parallel to the optical axis of the observation optical system. (2) The pitch between cylindrical faces is equivalent to the pitch P between wells.

Based on the center of the on-axis well W1, the central coordinate $Y_{mc}$, left-end coordinate $Y_{m-}$, and right-end coordinate $Y_{m+}$ of a cylindrical face above the on-axis well are as follows.

$Y_{mc}=P/2$, $Y_{m-}=0$, and $Y_{m+}=P$.

The reflector 470 is symmetrical in shape with respect to the center of the on-axis well. In addition, this relationship applies to even a case where any well in the multi-well plate C1 is set as the on-axis well W1. Thus, as illustrated in FIG. 45, the region R1 with oblique illumination is reversed in orientation depending on the illumination direction. Furthermore, even for observation of any well, high-contrast observation can be carried out with fulfillment of oblique illumination in the same region in the well. Note that the example in FIG. 45 corresponds to a case where four wells side by side in the Y direction are each captured based on two illumination directions, in which six image capturing regions (image capturing regions IM1 to IM6) are captured in each well.

A reflector 570 of a second type illustrated in FIG. 46 has the following two features. (1) The center of each cylindrical face is located between a well and a well. That is, the reflector 570 is installed such that the plurality of cylindrical faces each has its center of curvature located on a plane passing between adjacent wells included in the multi-well plate, the plane being parallel to the optical axis of the observation optical system. (2) The pitch between cylindrical faces is two time the pitch P between wells. That is, the reflector 570 is the same as the reflector 470 in terms of (1) but is different from the reflector 470 in terms of (2).

Based on the center of the on-axis well W1, the central coordinate $Y_{mc}$, left-end coordinate $Y_{m-}$, and right-end coordinate $Y_{m+}$ of a cylindrical face above the on-axis well are as follows. Note that there are two cases: a case where the on-axis well W1 is located on the left side of the center of the cylindrical face, and a case where the on-axis well W1 is located on the right side of the center of the cylindrical face.

(Case where the on-axis well is located on the left side of the center of the cylindrical face)

$Y_{mc}=P/2$, $Y_{m-}=-P/2$, and $Y_{m+}=3P/2$.

(Case where the on-axis well is located on the right side of the center of the cylindrical face)

$Y_{mc}=-P/2$, $Y_{m-}=-3P/2$, and $Y_{m+}=P/2$.

Differently from the reflector 470, the reflector 570 is asymmetrical in shape with respect to the center of the on-axis well (namely, the optical axis of the observation optical system). In addition, this asymmetry is not necessarily constant in shape in a case where each well in the multi-well plate C1 is individually set as the on-axis well W1. The asymmetry is constant in shape with alternate wells. Thus, as illustrated in FIG. 47, differently from the reflector 470, the region with oblique illumination is not simply oppositely oriented based on a switch in the illumination direction. In each illumination direction, the region R1 with oblique illumination is produced alternately. Note that the reflector 570 enables, in a single time of image capturing, acquisition of the region R1 wider than that due to the reflector 470. Meanwhile, oblique illumination is fulfilled due to only one illumination direction. Thus, in image capturing with switching in the illumination direction, the reflector 470 enables oblique illumination in a wider range than that due to the reflector 570.

A reflector 670 of a third type illustrated in FIG. 48 has the following two features. (1) The center of each cylindrical face is located at the center of a well. That is, the reflector 670 is installed such that the plurality of cylindrical faces each has its center of curvature located on a plane passing through the center of a well included in the multi-well plate, the plane being parallel to the optical axis of the observation optical system. (2) The pitch between cylindrical faces is two time the pitch P between wells. That is, the reflector 670 is the same as the reflector 570 in terms of (2) but is different from the reflector 570 in terms of (1).

Based on the center of the on-axis well W1, the central coordinate $Y_{mc}$, left-end coordinate $Y_{m-}$, and right-end coordinate $Y_{m+}$ of a cylindrical face above the on-axis well are as follows. Note that there are two cases: a case where the center of the cylindrical face is located above the on-axis well W1, and a case where the center of the cylindrical face is located above the adjacent well.

(Case where the center of the cylindrical face is located above the on-axis well W1)

$Y_{mc}=0$, $Y_{m-}=-P$, and $Y_{m+}=P$.

(Case where the center of the cylindrical face is located above the adjacent well W2)

$Y_{mc}=P$, $Y_{m-}=0$, and $Y_{m+}=2P$.

Similarly to the reflector 470, the reflector 670 is symmetrical in shape with respect to the center of the on-axis well (namely, the optical axis of the observation optical system). Note that the symmetry is not necessarily constant in shape in observation of each well and thus varies in shape alternately. Thus, as illustrated in FIG. 49, similarly to the reflector 470, the region R1 with oblique illumination is simply oppositely oriented based on a switch in the illumination direction. However, similarly to the reflector 570, in each illumination direction, the region R1 with oblique illumination is produced alternately. That is, regardless of the illumination direction, wells with fulfillment of oblique illumination and wells with no fulfillment of oblique illumination are produced alternately. Thus, a well with fulfillment of oblique illumination is observed with switching in the illumination direction, so that a wide range can be observed with high contrast.

Figure 50:
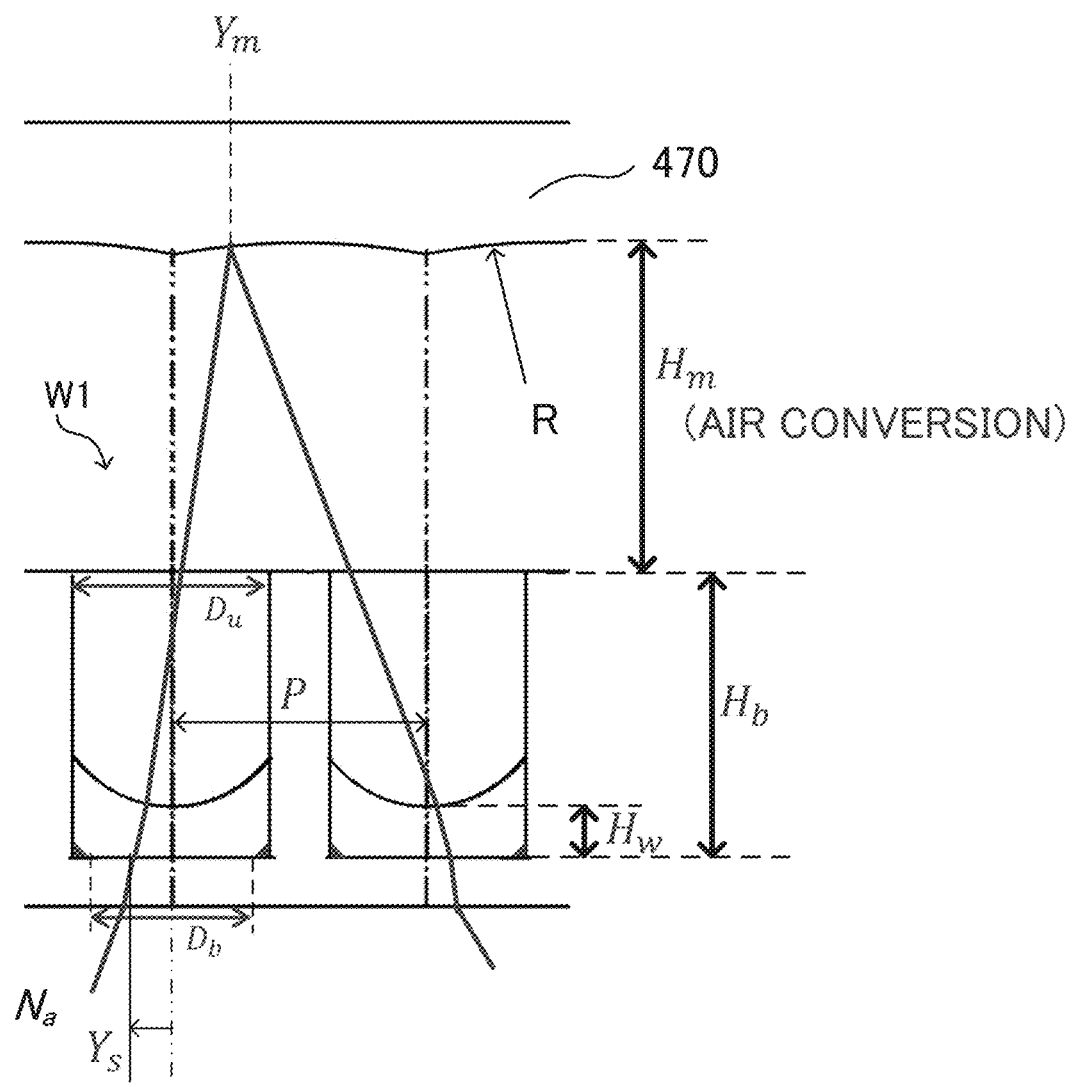
FIG. 50 is an explanatory view for parameters related to arrangement of a reflector.
Figure 51:
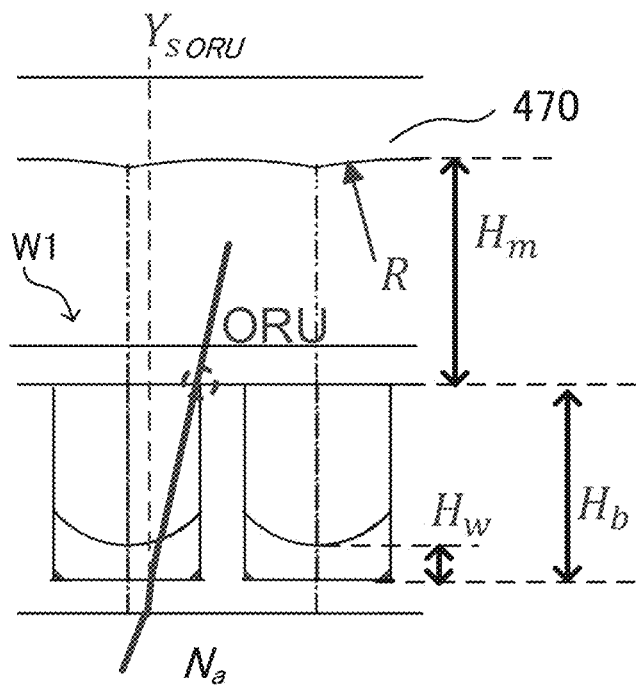
FIG. 51 illustrates the relationship between a marginal ray that passes through the upper-right end portion of the on-axis well and parameters.
Figure 52:
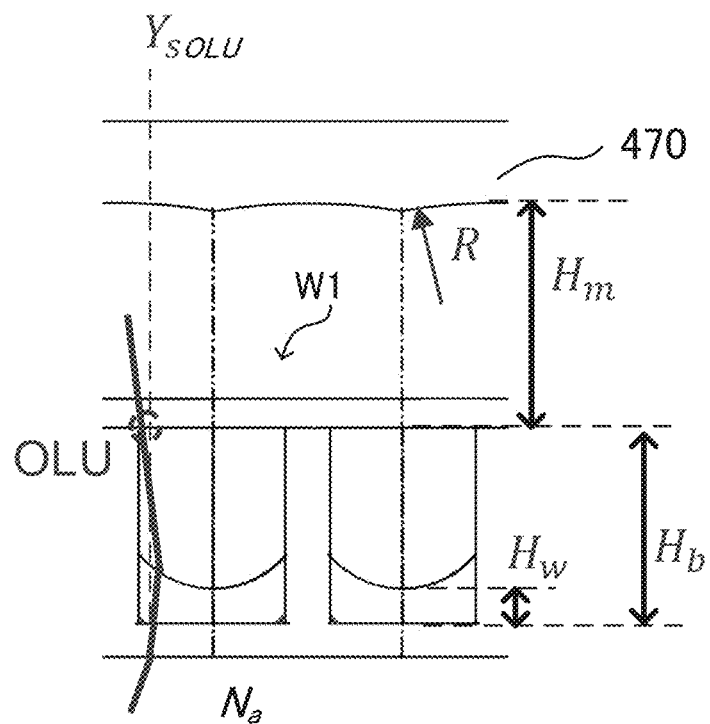
FIG. 52 illustrates the relationship between a marginal ray that passes through the upper-left end portion of the on-axis well and parameters.
Figure 53:
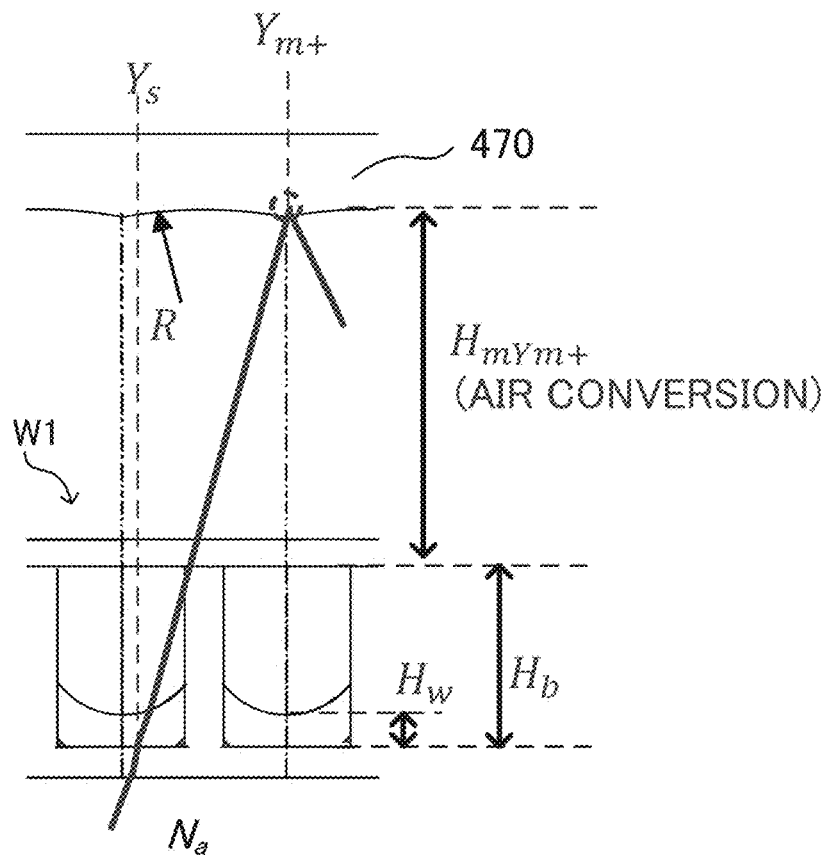
FIG. 53 illustrates the relationship between a marginal ray that passes through the right end of a cylindrical face and parameters.
Figure 54:
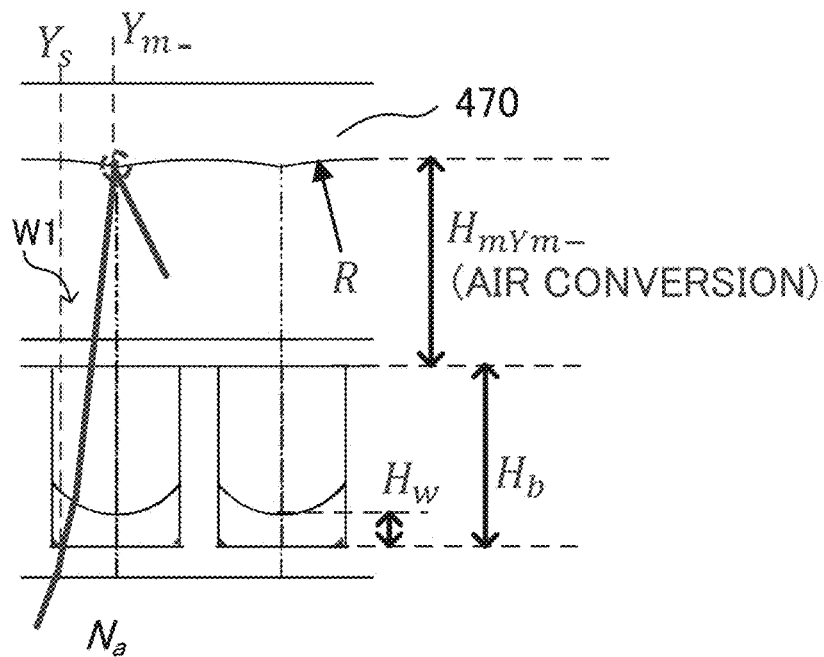
FIG. 54 illustrates the relationship between a marginal ray that passes through the left end of the cylindrical face and parameters.
Figure 55:
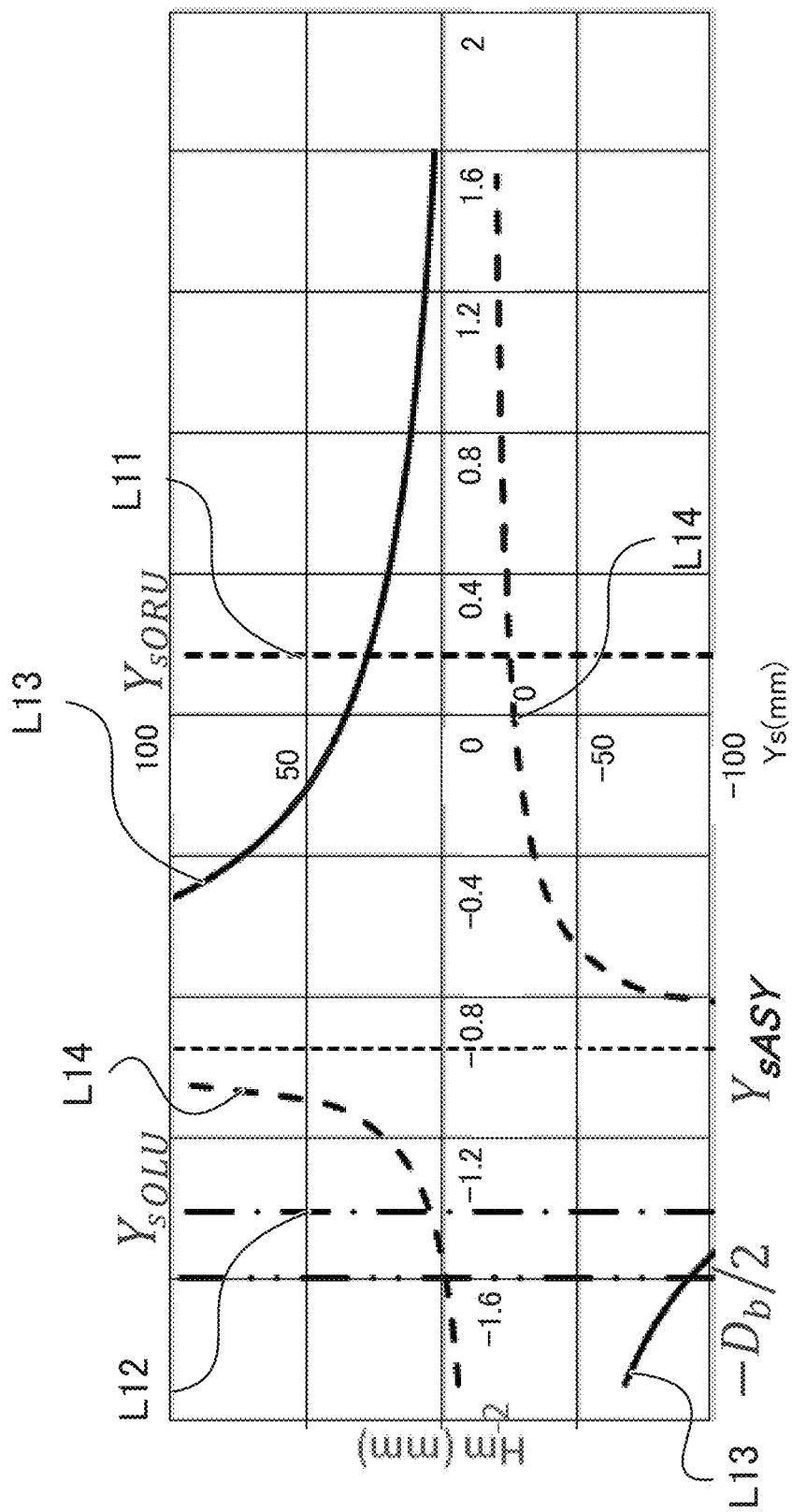
FIG. 55 is a graph indicating conditions for entry to the effective range of the reflective face of the reflector without vignetting by the on-axis well.
Figure 56:
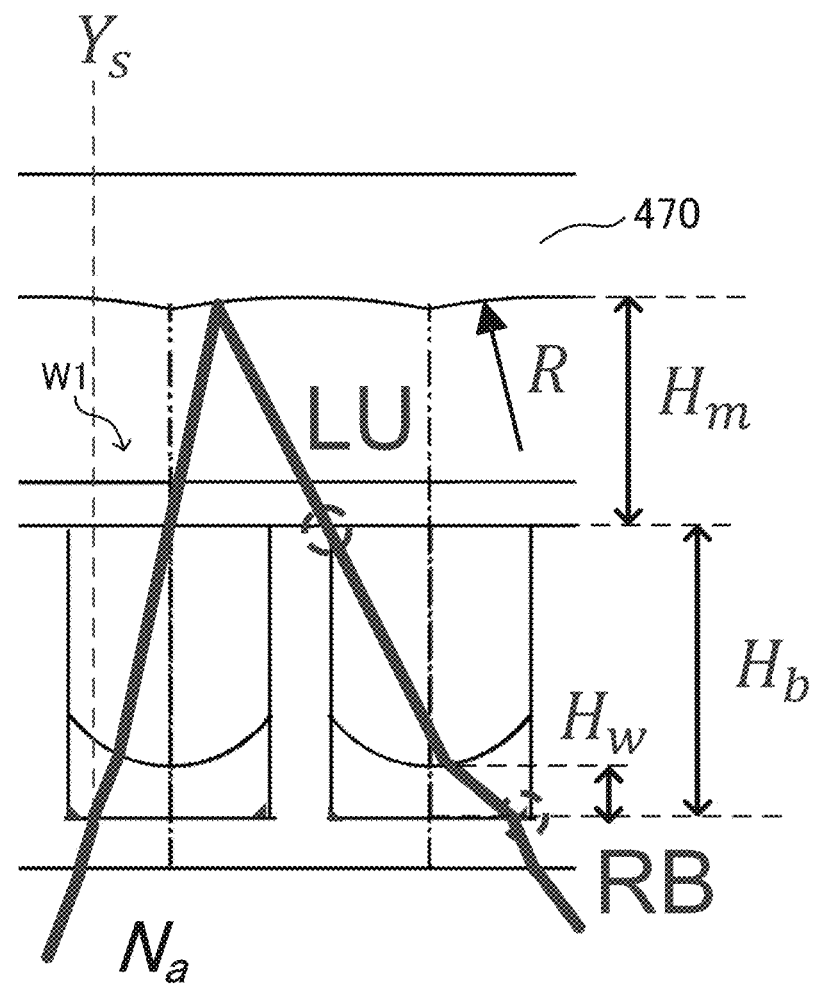
FIG. 56 illustrates an exemplary marginal ray that passes through the upper-left end portion and lower-right end portion of the adjacent well.
Figure 57:
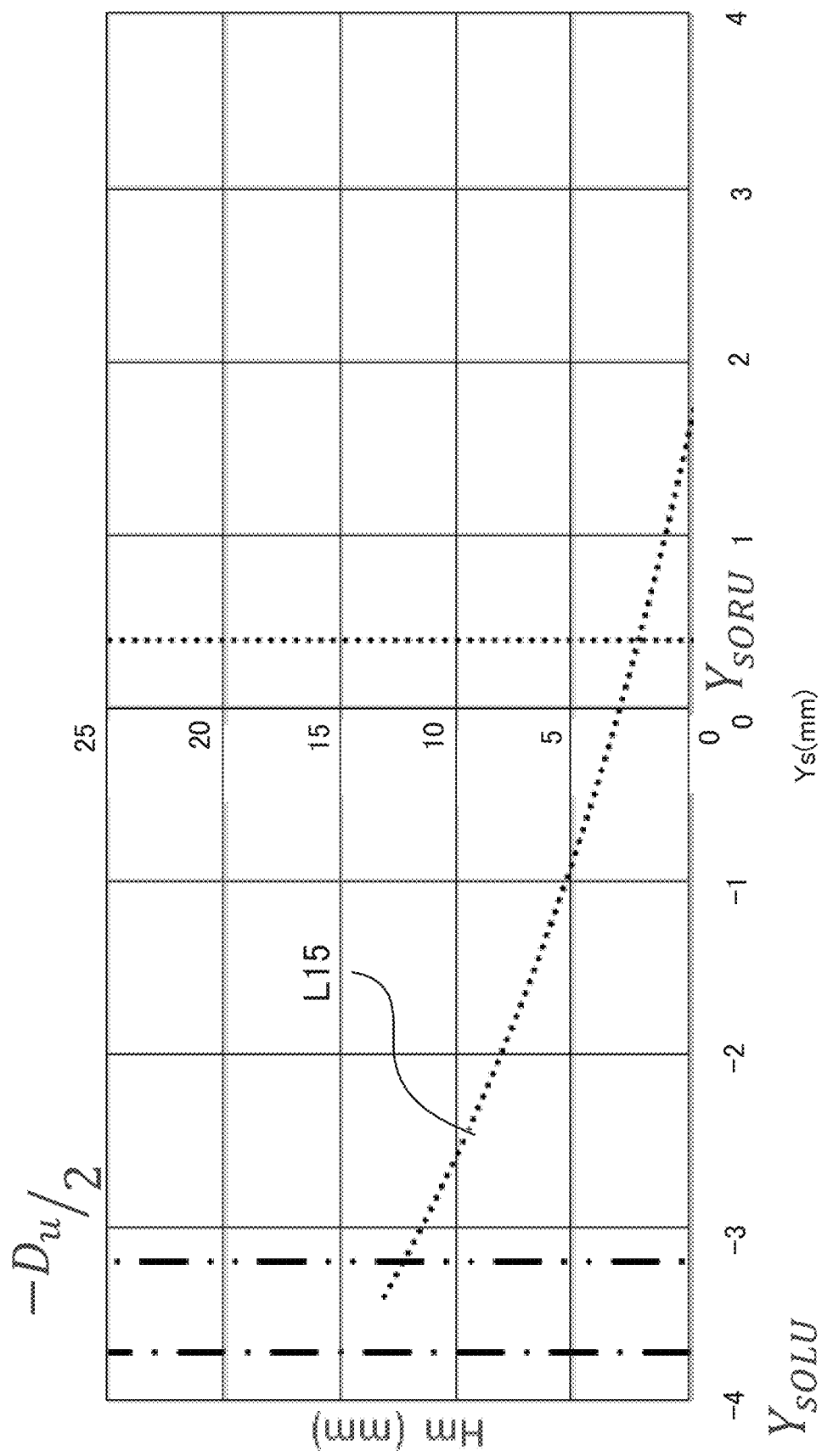
FIG. 57 is a graph indicating the relationship between the height of location of the reflector and the coordinate at which the marginal ray illustrated in FIG. 56 passes through the object surface.
Figure 58:
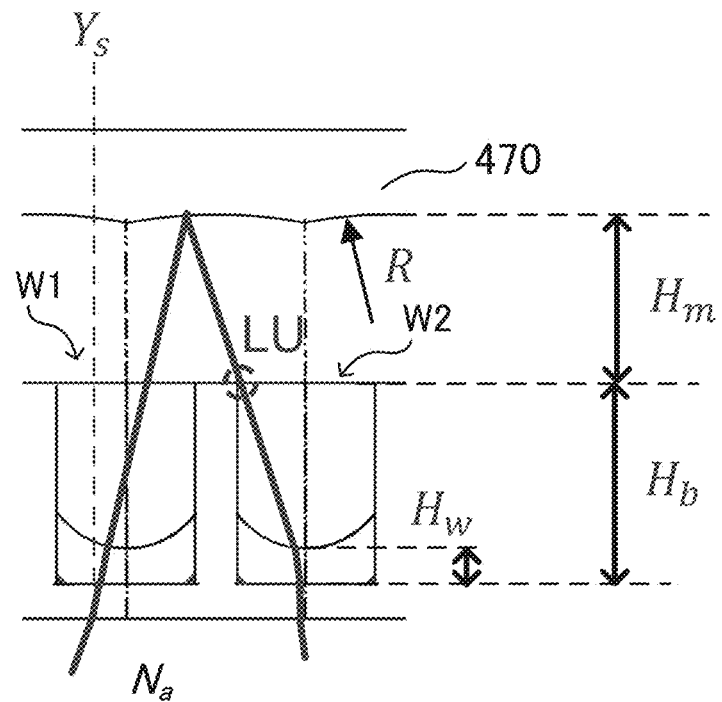
FIG. 58 illustrates an exemplary marginal ray that passes through the upper-left end portion of the adjacent well.
Figure 59:
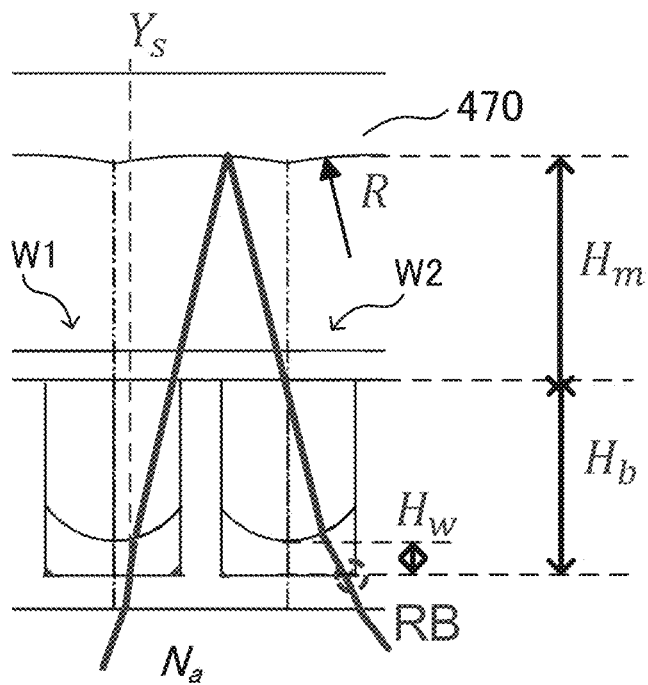
FIG. 59 illustrates an exemplary marginal ray that passes through the lower-right end portion of the adjacent well.
Figure 60:
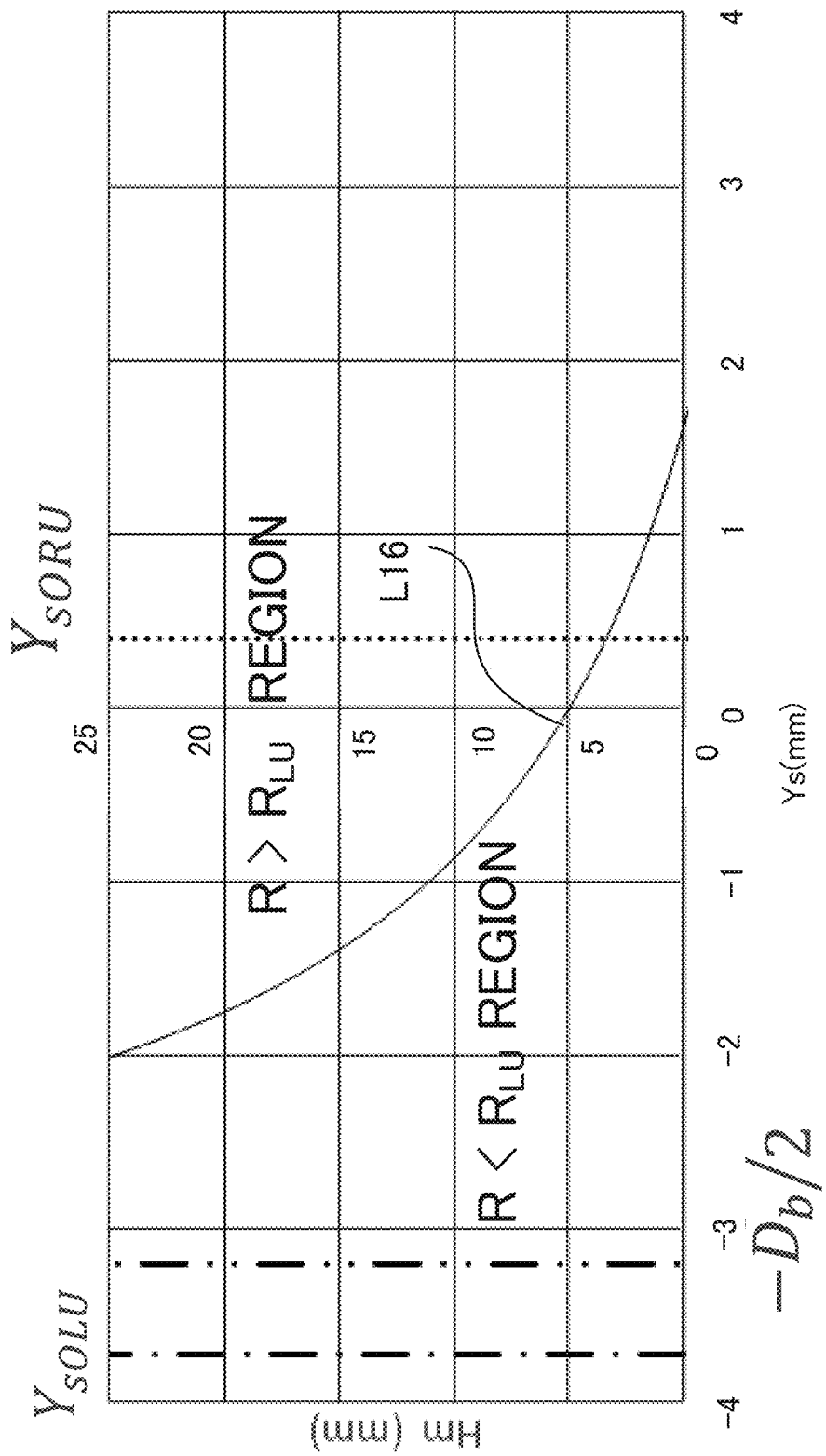
FIG. 60 is a graph indicating the relationship between the height of location of the reflector and the coordinate at which the marginal ray illustrated in FIG. 58 passes through the object surface.
Figure 61:
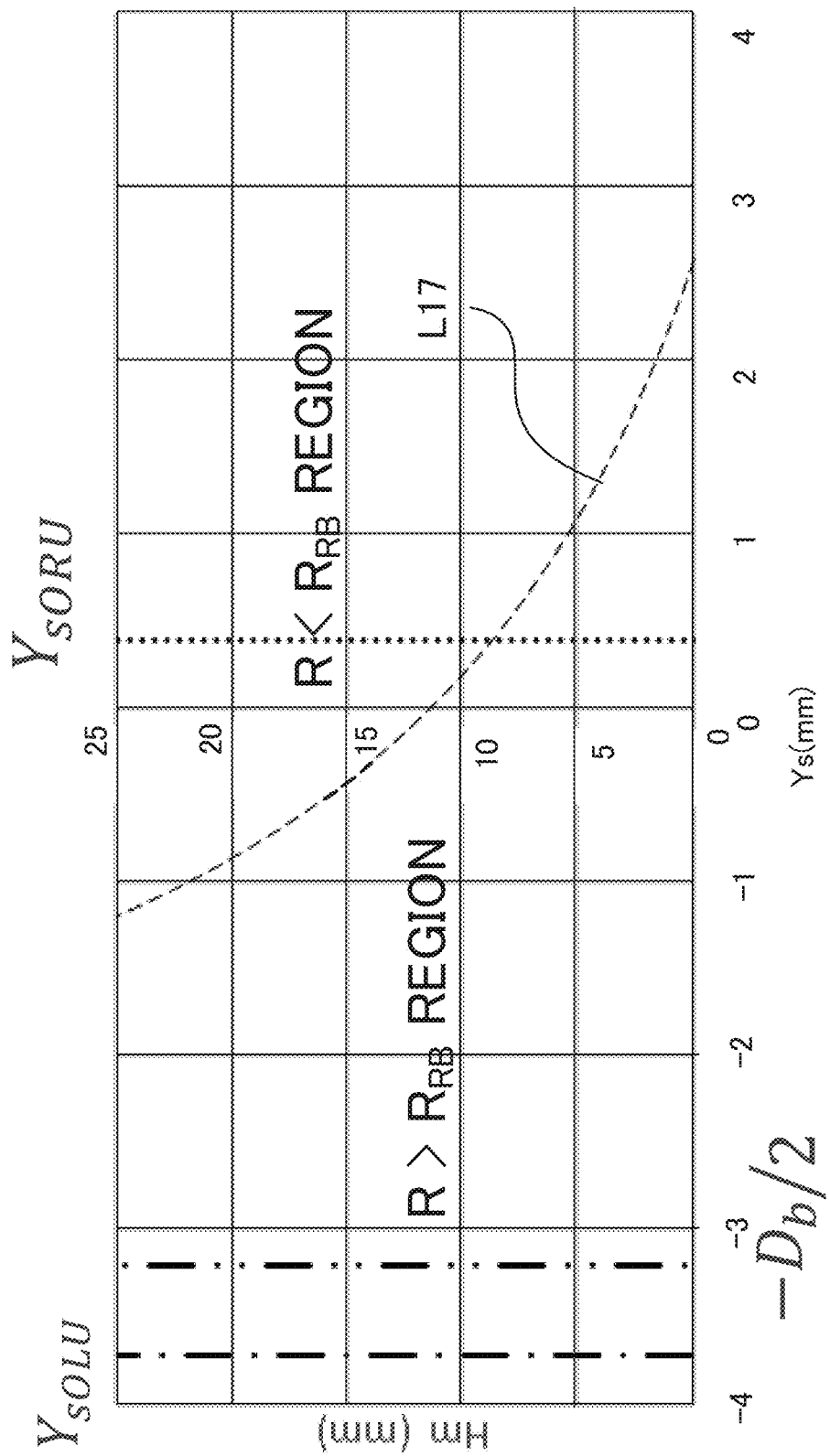
FIG. 61 is a graph indicating the relationship between the height of location of the reflector and the coordinate at which the marginal ray illustrated in FIG. 59 passes through the object surface.
Figure 62:
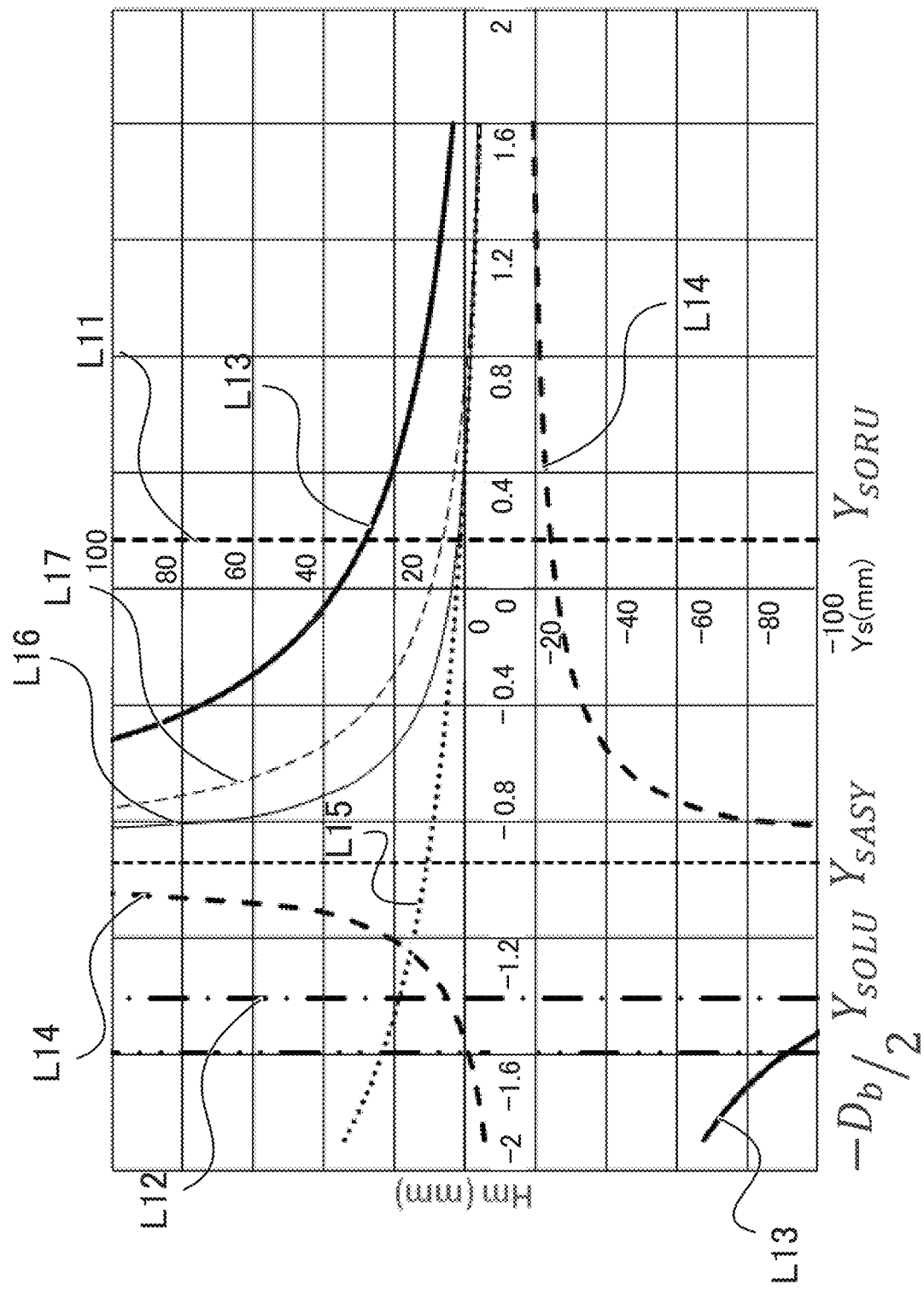
FIG. 62 is a graph indicating conditions for achievement of oblique illumination based on the reflector having cylindrical faces.

FIG. 50 is an explanatory view for parameters related to arrangement of the reflector 470. FIG. 51 illustrates the relationship between a marginal ray that passes through the upper-right end portion (ORU) of the on-axis well and parameters. FIG. 52 illustrates the relationship between a marginal ray that passes through the upper-left end portion (OLU) of the on-axis well and parameters. FIG. 53 illustrates the relationship between a marginal ray that passes through the right end (M+) of a cylindrical face and parameters. FIG. 54 illustrates the relationship between a marginal ray that passes through the left end (M−) of the cylindrical face and parameters. FIG. 55 is a graph indicating conditions for entry to the effective range of the reflective face of the reflector 470 without vignetting by the on-axis well. FIG. 56 illustrates an exemplary marginal ray that passes through the upper-left end portion (LU) and lower-right end portion (RB) of the adjacent well. FIG. 57 is a graph indicating the relationship between the height of location of the reflector 470 and the coordinate at which the marginal ray illustrated in FIG. 56 passes through the object surface. FIG. 58 illustrates an exemplary marginal ray that passes through the upper-left end portion (LU) of the adjacent well. FIG. 59 illustrates an exemplary marginal ray that passes through the lower-right end portion (RB) of the adjacent well. FIG. 60 is a graph indicating the relationship between the height of location of the reflector 470 and the coordinate at which the marginal ray illustrated in FIG. 58 passes through the object surface. FIG. 61 is a graph indicating the relationship between the height of location of the reflector 470 and the coordinate at which the marginal ray illustrated in FIG. 59 passes through the object surface. FIG. 62 is a graph indicating conditions for achievement of oblique illumination based on the reflector 470 having the cylindrical faces. Conditions for achievement of oblique illumination with an observation apparatus including the reflector 470 as a curved mirror, particularly, a method of deriving the height of location of the reflector 470 and the radius of curvature of the reflective face of the reflector 470 will be described below with reference to FIGS. 50 to 62.

Parameters will be described. As illustrated in FIG. 50, the coordinate of the marginal ray to enter the on-axis well, on the reflective face of the reflector 470 is defined as $Y_m$, and the radius of curvature of the reflective face is defined as R. The other parameters in FIG. 50 are as described above. As illustrated in FIG. 51, the coordinate on the object surface of the marginal ray that passes through the upper-right end portion (ORU) of the on-axis well is defined as $Y_{sORU}$. As illustrated in FIG. 52, the coordinate on the object surface of the marginal ray that passes through the upper-left end portion (OLU) of the on-axis well is defined as $Y_{sOLU}$. Furthermore, as illustrated in FIG. 53, the height of location of the reflector 470 when the marginal ray to pass through the coordinate $Y_s$ on the object surface is reflected off the right end portion of a cylindrical face (coordinate $Y_{m+}$) is defined as $H_{mYm+}$. As illustrated in FIG. 54, the height of location of the reflector 470 when the marginal ray to pass through the coordinate $Y_s$ on the object surface is reflected off the left end portion of the cylindrical face (coordinate $Y_{m-}$) is defined as $H_{mYm-}$. Note that the height of location of the reflector having its reflective face curved is defined as the distance from the upper end portion of the multi-well plate to the highest portion of the reflective face.

Limitations due to ORU will be examined with reference to FIG. 51. The limitations due to ORU are as described above with the reflector as a plane mirror. That is, Conditional Expression (3) and Conditional Expression (5) requires satisfying.

Such a curved mirror as the reflector 470 is likely to cause entry of a marginal ray in the direction opposite to the illumination direction. Thus, limitations due to OLU as illustrated in FIG. 52 will be examined.

The coordinate (Y coordinate) $Y_{sORU}$ on the object surface of the marginal ray that passes through OLU is given by the following expression including the numerical aperture $N_a$ of the observation optical system.

$$Y_{sOLU} \equiv \frac{-\frac{D_u}{2} - N_a\left\{\frac{H_w}{n_w} + \left(\frac{AH_w}{n_w} + 1\right)(H_b - H_w)\right\}}{1 + A(H_b - H_w)} \quad (12)$$

The marginal ray that tries to pass through the minus side of the coordinate $Y_{sOLU}$ on the object surface is blocked by OLU. That is, Expression (12) for defining the coordinate $Y_{sORU}$ indicates the minimum coordinate in the Y direction through which the marginal ray can pass on the object surface.

Therefore, for no blocking by ORU and OLU, desirably, the following conditional expression is satisfied.

$$Y_{sOLU} < Y_s < Y_{sORU} \quad (13)$$

Note that, in a case where the numerical aperture $N_a$ of the observation optical system is larger than a threshold $N_{aOLU}$, the coordinate $Y_{sOLU}$ reaches the left end portion of the well. That is, the above expression is fulfilled when the following expression is satisfied: $N_a < N_{aOLU}$. When the following expression is satisfied: $N_a > N_{aOLU}$, desirably, the following expression is satisfied.

$$-\frac{D_b}{2} < Y_s < Y_{sORU} \quad (14)$$

Note that the threshold $N_{aOLU}$ is given by the following expression.

$$N_{aOLU} \equiv \frac{D_b\{1 + A(H_b - H_w)\} - D_u}{2\left\{\frac{H_w}{n_w} + \left(\frac{AH_w}{n_w} + 1\right)(H_b - H_w)\right\}} \quad (15)$$

Next, limitations due to the effective range of the reflective face will be examined with reference to FIGS. 53 and 54. The height $H_{mYm}$ of location of the reflective face in a case where the marginal ray passes through the coordinate $Y_s$ on the object surface and the coordinate $Y_m$ on the reflective face, is given by the following expression.

$$H_{mYm} = \frac{Y_m + \frac{N_a}{A}}{\left(\frac{AH_w}{n_w} + 1\right)N_a + Y_sA} - \frac{1}{A} - (H_b - H_w) \quad (16)$$

In order to guide the marginal ray in the well, the coordinate of the marginal ray on the reflective face needs to be in the effective range (range of from $Y_{m-}$ to $Y_{m+}$) of the reflective face. Whether or not the marginal ray that passes through the coordinate $Y_s$ on the object surface is located in the effective range of the reflective face depends on the height of location of the reflector 470.

Referring to Expression (16), the height $H_m Y_m$ is a hyperbolic function having $Y_s$ as a variable. The asymptotic coordinate $Y_{sASY}$ thereof is given by the following expression.

$$Y_{sASY} \equiv \frac{-\left(\frac{AH_w}{n_w} + 1\right)N_a}{A} \quad (17)$$

When the coordinate $Y_s$ on the object surface is larger than the coordinate $Y_{sASY}$ ($Y > Y_{sASY}$) and the coordinate $Y_m$ on the reflective face is $Y_{m+}$ ($Y_m = Y_{m+}$), the height $H_{mYm+}$ of location of the reflective face is plus and the height $H_{mYm-}$ of location of the reflective face is minus. In contrast, when the coordinate $Y_s$ of the object surface is smaller than the coordinate $Y_{sASY}$ ($Y_s < Y_{sASY}$) and the coordinate $Y_m$ on the reflective face is $Y_{m+}$ ($Y_m = Y_{m+}$), the height $H_{mYm+}$ of location of the reflective face is minus and the height $H_{mYm-}$ of location of the reflective face is plus.

Thus, when the following expression is satisfied: $Y_s > Y_{sASY}$, in order to bring the marginal ray into the effective range of the reflective face, desirably, the height $H_m$ of location of the reflective face is smaller than the height $H_{mYm+}$. Desirably, the following expression is satisfied.

$$H_{mYm-} < H_m < H_{mYm+} \quad (18)$$

When the following expression is satisfied: $Y_s < Y_{sASY}$, in order to bring the marginal ray into the effective range of the reflective face, desirably, the height $H_m$ of location of the reflective face is smaller than the height $H_{mYm-}$. Desirably, the following expression is satisfied.

$$H_{mYm+} < H_m < H_{mYm-} \quad (19)$$

Note that the height $H_{mYm+}$ results from substitution of the coordinate $Y_{s+}$ for the coordinate $Y_s$ in the definition for the height $H_{mYm}$, and the height $H_{mYm-}$ results from substitution of the coordinate $Y_s$ for the coordinate $Y_s$ in the definition for the height $H_{mYm}$.

The height $H_{mYm+}$ and the height $H_{mYm-}$ are as follows.

$$H_{mYm+} \equiv \frac{Y_{m+} + \frac{N_a}{A}}{\left(\frac{AH_w}{n_w} + 1\right)N_a + Y_s A} - \frac{1}{A} - (H_b - H_w) \quad (16\text{-}1)$$

$$H_{mYm-} \equiv \frac{Y_{m-} + \frac{N_a}{A}}{\left(\frac{AH_w}{n_w} + 1\right)N_a + Y_s A} - \frac{1}{A} - (H_b - H_w) \quad (16\text{-}2)$$

That is, for entry of the marginal ray into the effective range of the reflective face without vignetting by the on-axis well W1, with the observation position $Y_s$ between the coordinate $Y_{sORU}$ indicated with a line L11 and the coordinate $Y_{sOLU}$ indicated with a line L12 in FIG. 55, the reflector 470 requires setting between the height indicated with a line L13 and the height indicated with a line L14 at the coordinate $Y_s$ of the observation position.

Next, limitations due to the adjacent well will be examined. A marginal ray that passes through the upper-left end portion (LU) and lower-right end portion (RB) of the adjacent well W2 will be examined with reference to FIGS. 56 and 57.

As illustrated in FIG. 56, the height $H_{mLU\text{-}RB}$ of location of the reflector 470 when the marginal ray that passes through both the upper-left end portion (LU) and lower-right end portion (RB) of the adjacent well W2 passes through the coordinate $Y_s$ on the object surface is given by the following expression.

$$H_{mLU\text{-}RB} = \frac{2\left\{\frac{H_w}{n_w} + \left(\frac{AH_w}{n_w} + 1\right)(H_b - H_w)\right\}\left[kP - \frac{D_u}{2} - N_a\left\{\frac{H_w}{n_w} + \left(\frac{AH_w}{n_w} + 1\right)(H_b - H_w)\right\} - Y_s\{1 + A(H_b - H_w)\}\right]}{\left(\frac{AH_w}{n_w} + 1\right)D_u + D_b + 2\left\{\frac{H_w}{n_w} + \left(\frac{AH_w}{n_w} + 1\right)(H_b - H_w)\right\}\left\{N_a\left(\frac{AH_w}{n_w} + 1\right) + Y_s A\right\}} \quad (20)$$

If the reflector 470 is lower than the height $H_{mLU\text{-}RB}$, the marginal ray is not allowed to pass through the adjacent well. Thus, desirably, the height $H_m$ of location of the reflector 470 satisfies the following condition. That is, desirably, the region on the upper side of a line L15 indicating the height $H_{mLU\text{-}RB}$ in FIG. 57 is used.

$$H_m > H_{mLU\text{-}RB} \quad (21)$$

A marginal ray that passes through the upper-left end portion (LU) or lower-right end portion (RB) of the adjacent well W2 will be examined with reference to FIGS. 58 to 61.

As illustrated in FIG. 58, the radius of curvature $R_{LU}$ of the reflective face of the reflector 470 when the marginal ray that passes through the upper-left end portion (LU) of the adjacent well W2 passes through the coordinate $Y_s$ on the object surface is given by the following expression including the height $H_m$ of location of the reflector 470.

$$R_{LU} = \frac{H_m\left[kP - 2Y_s\{1 + A(H_b - H_w + H_m)\} - 2N_a\left\{\frac{H_w}{n_w} + \left(\frac{AH_w}{n_w} + 1\right)(H_b - H_w + H_m)\right\}\right]}{kP - \frac{D_u}{2} - Y_s\{1 + A(H_b - H_w + 2H_m)\} - N_a\left\{\frac{H_w}{n_w} + \left(\frac{AH_w}{n_w} + 1\right)(H_b - H_w + 2H_m)\right\}} \quad (22)$$

The radius of curvature $R_{LU}$ is a hyperbolic function having the height $H_m$ as a variable. The asymptotic height $H_{mLU}$ thereof is given by the following expression.

$$H_{mLU} \equiv \frac{kP - \frac{D_u}{2} + \frac{N_a}{A}}{2\left\{N_a\left(\frac{AH_w}{n_w} + 1\right) + Y_s A\right\}} - \frac{1}{2A} - \frac{H_b - H_w}{2} \quad (23)$$

In order to cause the marginal ray to pass through the right side of LU without vignetting by the upper-left end portion (LU) of the adjacent well W2, when the height $H_m$ of location of the reflector 470 is lower than the height $H_{mLU}$ ($H_m < H_{mLU}$), the radius of curvature requires reducing. Desirably, the following expression is satisfied.

$$R < R_{LU} \quad (24)$$

When the height $H_m$ of location of the reflector 470 is higher than the height $H_{mLU}$ ($H_m > H_{mLU}$), the radius of curvature requires increasing. Desirably, the following expression is satisfied.

$$R > R_{LU} \quad (25)$$

That is, for avoidance of elimination by the upper-left end portion (LU) of the adjacent well W2, in the region on the upper side of a line L16 indicating the height $H_{mLU}$ in FIG. 60, desirably, the reflective face satisfies Conditional Expression (25). In the region on the lower side of the line L16, desirably, the reflective face satisfies Conditional Expression (24).

As illustrated in FIG. 59, the radius of curvature $R_{RB}$ of the reflective face of the reflector 470 when the marginal ray that passes through the lower-right end portion (RB) of the adjacent well W2 passes through the coordinate $Y_s$ on the object surface is given by the following expression including the height $H_m$ of location of the reflector 470.

$$R_{RB} = \frac{\dfrac{kP}{2\left(\dfrac{AH_w}{n_w}+1\right)} - Y_s\left\{\dfrac{1+A(H_b-H_w+H_m)}{\left(\dfrac{AH_w}{n_w}+1\right)}\right\} - N_a\left\{\dfrac{H_w}{n_w\left(\dfrac{AH_w}{n_w}+1\right)} + (H_b-H_w+H_m)\right\}}{\dfrac{kP\left(\dfrac{AH_w}{n_w}+1\right)+\dfrac{D_b}{2}-Y_s}{2\left(\dfrac{AH_w}{n_w}+1\right)\left\{\dfrac{H_w}{n_w}+\left(\dfrac{AH_w}{n_w}+1\right)(H_b-H_w+H_m)\right\}} - \dfrac{Y_sA}{\left(\dfrac{AH_w}{n_w}+1\right)} - N_a}$$

(26)

The radius of curvature $R_{RB}$ is a hyperbolic function having the height $H_m$ as a variable. The asymptotic height $H_{mRB}$ thereof is given by the following expression.

$$H_{mRB} \equiv \frac{kP + \dfrac{D_b}{2\left(\dfrac{AH_w}{n_w}+1\right)} + \dfrac{N_a}{A}}{2\left\{N_a\left(\dfrac{AH_w}{n_w}+1\right)+Y_sA\right\}} - \frac{1}{\left(\dfrac{AH_w}{n_w}+1\right)}\left(\dfrac{1}{2A}+\dfrac{H_w}{n_w}\right) - (H_b-H_w)$$

(27)

In order to cause the marginal ray to pass through the left side of RB without vignetting by the lower-right end portion (RB) of the adjacent well W2, when the height $H_m$ of location of the reflector 470 is lower than the height $H_{mRB}$ ($H_m < H_{mRB}$), the radius of curvature requires increasing. Desirably, the following expression is satisfied.

$$R > R_{RB} \quad (28)$$

When the height $H_m$ of location of the reflector 470 is higher than the height $H_{mRB}$ ($H_m > H_{mRB}$), the radius of curvature requires reducing. Desirably, the following expression is satisfied.

$$R < R_{RB} \quad (29)$$

That is, for avoidance of elimination by the lower-right end portion (RB) of the adjacent well W2, in the region on the upper side of a line L17 indicating the height $H_{mRB}$ in FIG. 61, desirably, the reflective face satisfies Conditional Expression (29). In the region on the lower side of the line L17, desirably, the reflective face satisfies Conditional Expression (28).

In consideration of the limitations due to the on-axis well W1, the limitations due to the effective range of the reflective face, and the limitations due to the adjacent well W2 described above, the height of location of the reflector 470 and the radius of curvature of the reflective face are required to be determined in accordance with the following procedure.

First, the coordinate $Y_s$ of the observation position is determined between the coordinate $Y_{sORU}$ indicated with a line L11 and the coordinate $Y_{sOLU}$ indicated with a line L12 in FIG. 62.

Next, the height $H_m$ of location of the reflector 470 is set higher than the height $H_{mLU-RB}$ indicated with a line L15, between the height $H_{mYm-}$ indicated with a line L14 and the height $H_{mYm+}$ indicated with a line L13.

Finally, the radius of curvature R is set in accordance with the set height. Specifically, in a case where the set height is lower than the height $H_{mLU}$ indicated with a line L16, the radius of curvature R is set smaller than the radius of curvature $R_{LU}$ and larger than the radius of curvature $R_{RB}$, namely, the radius of curvature R is set to satisfy the following expression: $R_{RB} < R < R_{LU}$. In a case where the set height is higher than the height $H_{mLU}$ indicated with the line L16 and is lower than the height $H_{mRB}$ indicated with a line L17, the radius of curvature R is set larger than the radius of curvature $R_LU$ and larger than the radius of curvature $R_{RB}$, namely, the radius of curvature R is set to satisfy the following expressions: $R > R_{RB}$ and $R > R_{LU}$. Furthermore, in a case where the set height is higher than the height $H_{mRB}$ indicated with the line L17, the radius of curvature R is set larger than the radius of curvature $R_LU$ and smaller than the radius of curvature $R_{RB}$, namely, the radius of curvature R is set to satisfy the following expression: $R_{LU} < R < R_{RB}$.

Thus, oblique illumination is fulfilled at the coordinate $Y_s$ on the on-axis well, enabling favorable observation with high contrast at the observation position.

Note that various types of parameters in use of a standard 96-well plate and a standard 384-well plate are as follows. Note that a unit of height, a unit of coordinate, and a unit of radius of curvature are each a millimeter (mm), and a unit of $N_a$ is dimensionless quantity. Unless otherwise specified, such units are applied.

(96–Well Plate)

$$Y_{sOLU} = -2.05 - 6.65N_a \quad (30)$$

$$Y_{sORU} = 2.05 - 6.65N_a \quad (31)$$

$$Y_{sASY} = -14.5N_a \quad (32)$$

$$H_{mYm+} = \frac{Y_{m+}+13.1N_a}{1.1N_a+0.076Y_s} - 22 \quad (33)$$

$$H_{mYm-} = \frac{Y_{m-}+13.1N_a}{1.1N_a+0.076Y_s} - 22 \quad (34)$$

$$H_{mLU-RB} = \frac{8.16k - 3.13 - 10.1N_a - 1.52Y_s}{0.57+N_a+0.069Y_s} \quad (35)$$

$$H_{mLU} = \frac{4.08k - 1.56 - 0.45Y_s - 0.61N_a}{N_a+0.069Y_s} - 4.45 \quad (36)$$

$$H_{mRB} = \frac{4.08k + 1.31 - 0.41Y_s}{N_a+0.069Y_s} - 10.13 \quad (37)$$

$$R_{LU} = \frac{H_m\{4.08k - Y_s(1.52+0.069H_m) - N_a(10.13+H_m)\}}{4.08k - 1.56 - Y_s(0.76+0.069H_m) - N_a(5.06+H_m)} \quad (38)$$

$$R_{RB} = \frac{4.08k - Y_s(1.52+0.069H_m) - N_a(10.13+H_m)}{\dfrac{4.08k+1.31-0.41Y_s}{10.13+H_m} - 0.069Y_s - N_a} \quad (39)$$

(384–Well Plate)

$$Y_{sOLU} = -0.79 - 5.17N_a \quad (40)$$

$$Y_{sORU} = 0.79 - 5.17N_a \quad (41)$$

$$Y_{sASY} = -7.89N_a \quad (42)$$

$$H_{mYm+} = \frac{Y_{m+}+6.53N_a}{1.21N_a+0.15Y_s} - 15.7 \quad (43)$$

$$H_{mYm-} = \frac{Y_{m-}+6.53N_a}{1.21N_a+0.15Y_s} - 15.7 \quad (44)$$

-continued $$H_{mLU-RB} = \frac{3.73k - 1.57 - 10.32N_a - 2Y_s}{0.26 + N_a + 0.13Y_s} \quad (45)$$

$$H_{mLU} = \frac{1.86k - 0.79 + 2.71N_a}{N_a + 0.127Y_s} - 7.9 \quad (46)$$

$$H_{mRB} = \frac{1.86k + 0.55 - 0.34Y_s}{N_a + 0.13Y_s} - 10.32 \quad (47)$$

$$R_{LU} = \frac{H_m\{1.86k - Y_s(2 + 0.13H_m) - N_a(10.32 + H_m)\}}{1.86k - 0.79 - Y_s(1 + 0.13H_m) - N_a(5.16 + H_m)} \quad (48)$$

$$R_{RB} = \frac{H_m\{1.86k - Y_s(2 + 0.13H_m) - N_a(10.32 + H_m)\}}{\frac{1.86k + 0.55 - 0.41Y_s}{10.32 + H_m} - 0.13Y_s - N_a} \quad (49)$$

The three types described above will be each more specifically described below. For achievement of oblique illumination with the reflector 470 of the first type, the following expressions require simultaneously satisfying.

$$Y_{sOLU} < Y_s \quad (50)$$

$$-D_b/2 < 2 < Y_s \quad (51)$$

$$Y_{sASY} < Y_s \quad (52)$$

$$Y_s < Y_{sORU} \quad (53)$$

$$H_{mLU-RBSym} < H_m \quad (54)$$

$$H_{mSym-} < H_m < H_{mSym+} \quad (55)$$

Height parameters and coordinate parameters are derived, based on substitution of 1 for k, 0 for $Y_{m-}$, and P for $Y_{m+}$, as follows.

$$H_{mLU-RB\_Sym} = \frac{2\left\{\frac{H_w}{n_w} + \left(\frac{AH_w}{n_w} + 1\right)(H_b - H_w)\right\}\left[P - \frac{D_u}{2} - N_a\left\{\frac{H_w}{n_w} + \left(\frac{AH_w}{n_w} + 1\right)(H_b - H_w)\right\} - Y_s\{1 + A(H_b - H_w)\}\right]}{\left(\frac{AH_w}{n_w} + 1\right)D_u + D_b + 2\left\{\frac{H_w}{n_w} + \left(\frac{AH_w}{n_w} + 1\right)(H_b - H_w)\right\}\left\{N_a\left(\frac{AH_w}{n_w} + 1\right) + Y_sA\right\}} \quad (56)$$

$$H_{mSym+} = \frac{P + \frac{N_a}{A}}{\left(\frac{AH_w}{n_w} + 1\right)N_a + Y_sA} - \frac{1}{A} - (H_b - H_w) \quad (57)$$

$$H_{mSym-} = \frac{\frac{N_a}{A}}{\left(\frac{AH_w}{n_w} + 1\right)N_a + Y_sA} - \frac{1}{A} - (H_b - H_w) \quad (58)$$

$$Y_{sORU} \equiv \frac{\frac{D_u}{2} - N_a\left\{\frac{H_w}{n_w} + \left(\frac{AH_w}{n_w} + 1\right)(H_b - H_w)\right\}}{1 + A(H_b - H_w)} \quad (59)$$

$$Y_{sOLU} \equiv \frac{-\frac{D_u}{2} - N_a\left\{\frac{H_w}{n_w} + \left(\frac{AH_w}{n_w} + 1\right)(H_b - H_w)\right\}}{1 + A(H_b - H_w)} \quad (60)$$

$$Y_{sASY} \equiv \frac{-\left(\frac{AH_w}{n_w} + 1\right)N_a}{A} \quad (61)$$

Note that the coordinate $Y_{ssymHm}$ of the height $H_{mSym-}$ in the height $H_m$ of location of the reflector 470 is as follows.

$$Y_{sSymHm} = \frac{-N_a\left\{\left(1 + \frac{AH_w}{n_w}\right)(H_b - H_w + H_m) + \frac{H_w}{n_w}\right\}}{1 + A(H_b - H_w + H_m)} \quad (62)$$

Application of the above to a standard 96-well plate leads to the following derivation. For use of a standard 96-well plate, desirably, the coordinate $Y_s$ and the height $H_m$ satisfy the following conditions.

$$-14.5N_a < Y_s < 2.05 - 6.65N_a \quad (63)$$

$$\frac{5.03 - 10.1N_a - 1.52Y_s}{0.57 + N_a + 0.069Y_s} < H_m \quad (64)$$

$$\frac{11.9N_a}{N_a + 0.069Y_s} - 22 < H_m < \frac{8.16 + 11.9N_a}{N_a + 0.069Y_s} - 22 \quad (65)$$

In this case, the coordinate $Y_{sSymHm}$ of the height $H_{mSym-}$ is as follows.

$$Y_{sSymHm} = \frac{-N_a(146 + 14.5H_m)}{22 + H_m} \quad (66)$$

Similarly, application of the above to a standard 384-well plate leads to the following derivation. For use of a standard 384-well plate, desirably, the coordinate $Y_s$ and the height $H_m$ satisfy the following conditions.

$$-7.89N_a < Y_s < Y_{sORU} = 0.79 - 5.17N_a \quad (67)$$

$$\frac{2.15 - 10.3N_a - 2Y_s}{0.26 + N_a + 0.127Y_s} < H_m \quad (68)$$

$$\frac{5.41N_a}{N_a + 0.127Y_s} - 15.7 < H_m < \frac{3.73 + 5.41N_a}{N_a + 0.127Y_s} - 15.7 \quad (69)$$

In this case, the coordinate $Y_{sSymHm}$ of the height $H_{mSym-}$ is as follows.

$$Y_{sSymHm} = \frac{-N_a(81.4 + 7.89H_m)}{15.7 + H_m} \quad (70)$$

Next, conditions for observation of at least the center of a well with oblique illumination with the first type will be described. For observation of at least the center of a well with oblique illumination, the following expressions require simultaneously satisfying.

$$N_a < N_{aCORU} \quad (71)$$

$$H_{mCLU-RB} < H_m < H_{mSym+C} \quad (72)$$

Furthermore, the following conditions require satisfying, in accordance with the height $H_m$ of location of the reflector 470.

If $H_{mCLU-RB} < H_m < H_{mLUC}$, $R_{RBC} < R < R_{LUC}$ (73)

If $H_{mLUC} < H_m < H_{mRBC}$, $R > R_{LUC}$ and $R > R_{RBC}$ (74)

If $H_{mRBC} < H_m < H_{mSym+}$, $R_{LUC} < R < R_{RBC}$ (75)

A numerical-aperture parameter, height parameters, and radius-of-curvature parameters are derived, based on substitution of 0 for $Y_s$, as follows.

$$N_{aCORU} \equiv \frac{D_u}{2\left\{\frac{H_w}{n_w} + \left(\frac{AH_w}{n_w} + 1\right)(H_b - H_w)\right\}} \tag{76}$$

$$H_{mSym+C} \equiv \frac{\frac{P}{N_a} - \frac{H_w}{n_w}}{\left(\frac{AH_w}{n_w} + 1\right)} - (H_b - H_w) \tag{77}$$

$$H_{mCLU-RB} \equiv \frac{2\left\{\frac{H_w}{n_w} + \left(\frac{AH_w}{n_w} + 1\right)(H_b - H_w)\right\}\left[P - \frac{D_u}{2} - \frac{N_a\left\{\frac{H_w}{n_w} + \left(\frac{AH_w}{n_w} + 1\right)(H_b - H_w)\right\}\right]}{\left(\frac{AH_w}{n_w} + 1\right)D_u + D_b + 2\left\{\frac{H_w}{n_w} + \left(\frac{AH_w}{n_w} + 1\right)(H_b - H_w)\right\}\left\{N_a\left(\frac{AH_w}{n_w} + 1\right)\right\}} \tag{78}$$

$$H_{mLUC} \equiv \frac{P - \frac{D_u}{2}}{2N_a\left(\frac{AH_w}{n_w} + 1\right)} - \frac{H_w}{2n_w\left(\frac{AH_w}{n_w} + 1\right)} - \frac{H_b - H_w}{2} \tag{79}$$

$$H_{mRBC} \equiv \frac{P + \frac{D_b}{2\left(\frac{AH_w}{n_w} + 1\right)}}{2\left(\frac{AH_w}{n_w} + 1\right)N_a} - \frac{H_w}{n_w\left(\frac{AH_w}{n_w} + 1\right)} - (H_b - H_w) \tag{80}$$

$$R_{LUC} \equiv \frac{H_m\left[P - 2N_a\left\{\frac{H_w}{n_w} + \left(\frac{AH_w}{n_w} + 1\right)(H_b - H_w + H_m)\right\}\right]}{P - \frac{D_u}{2} - N_a\left\{\frac{H_w}{n_w} + \left(\frac{AH_w}{n_w} + 1\right)(H_b - H_w + 2H_m)\right\}} \tag{81}$$

$$R_{RBC} \equiv \frac{\frac{P}{2\left(\frac{AH_w}{n_w} + 1\right)} - N_a\left\{\frac{H_w}{n_w\left(\frac{AH_w}{n_w + 1}\right)} + (H_b - H_w + H_m)\right\}}{\frac{P\left(\frac{AH_w}{n_w} + 1\right) + \frac{D_b}{2}}{2\left(\frac{AH_w}{n_w} + 1\right)\left\{\frac{H_w}{n_w} + (H_b - H_w + H_m)\left(\frac{AH_w}{n_w} + 1\right)\right\}} - N_a} \tag{82}$$

Furthermore, with the first type, desirably, the following conditions are satisfied. Thus, the range of oblique illumination can be widened negatively.

$$H_{mLU-RBSymm} < H_m < H_{mSym+C} \tag{83}$$

$$R_{RBSymm\pm} < R < R_{LUSymm\pm} \tag{84}$$

Height parameters and radius-of-curvature parameters are derived, based on substitution of a possible minimum value for $Y_s$, specifically, substitution of $Y_{sSym\pm}$ for $Y_s$, as follows.

$$H_{mLU-RBSymm} \equiv \frac{2\left\{\frac{H_w}{n_w} + \left(\frac{AH_w}{n_w} + 1\right)(H_b - H_w)\right\}\left[AP\left(P - \frac{D_u}{2}\right) + N_a\left(2P - \frac{D_u}{2}\right) - N_a^2\left\{\frac{H_w}{n_w} + \left(\frac{AH_w}{n_w} + 1\right)(H_b - H_w)\right\}\right]}{(AP + N_a)\left\{\left(\frac{AH_w}{n_w} + 1\right)D_u + D_b\right\} + 2N_a^2\left(\frac{AH_w}{n_w} + 1\right)} \tag{85}$$

$$H_{mSym+C} \equiv \frac{\frac{P}{N_a} - \frac{H_w}{n_w}}{\left(\frac{AH_w}{n_w} + 1\right)} - (H_b - H_w) \tag{86}$$

$$R_{LUSymm\pm} \equiv \frac{H_m\left[(AP + 3N_a)P - 2N_a^2\left\{\frac{H_w}{n_w} + \left(\frac{AH_w}{n_w} + 1\right)(H_b - H_w + H_m)\right\}\right]}{AP\left(P - \frac{D_u}{2}\right) + N_a\left(2P - \frac{D_u}{2}\right) - N_a^2\left\{\frac{H_w}{n_w} + \left(\frac{AH_w}{n_w} + 1\right)(H_b - H_w + 2H_m)\right\}} \tag{88}$$

$$R_{RBSymm\pm} \equiv \frac{P(AP + 3N_a) - 2N_a^2\left\{\frac{H_w}{n_w} + \left(\frac{AH_w}{n_w} + 1\right)(H_b - H_w + H_m)\right\}}{AP\left\{P\left(\frac{AH_w}{n_w} + 1\right) + \frac{D_b}{2}\right\} + N_a\left\{2P\left(\frac{AH_w}{n_w} + 1\right) + \frac{D_b}{2}\right\}} - \frac{H_w}{\frac{H_w}{n_w} + \left(\frac{AH_w}{n_w} + 1\right)(H_b - H_w + H_m)} - 2\left(\frac{AH_w}{n_w} + 1\right)N_a^2 \tag{89}$$

Note that the coordinate $Y_{sSym\pm}$ corresponds to the coordinate at which the height $H_{mSym+C}$ is $H_{mSym-}$ and is as follows.

$$Y_{sSym\pm} = \frac{-N_a P\left(\frac{AH_w}{n_w} + 1\right)}{AP + N_a} \tag{90}$$

Furthermore, with the first type, desirably, the following condition is satisfied. Thus, the range of oblique illumination can be widened to the positive limit $Y_{sORU}$.

$$H_{mLU-RBSymm} < H_m < H_{mSymORU} \tag{91}$$

$H_{mSymORU}$ is as follows. $\tag{92}$ $$H_{mSymORU} \equiv \frac{(2P - D_u)\{1 + A(H_b - H_w)\}}{2N_a + D_u A}$$

Application of the above conditions described with the first type to a 96-well plate leads to the following.

Conditions for observation of at least the center of a well with oblique illumination are as follows.

$$N_a < 0.31 \tag{93}$$

$$\frac{5.03 - 10.1 N_a}{0.57 + N_a} < H_m < \frac{8.16}{N_a} - 10.1 \tag{94}$$

If $\frac{5.03 - 1.10 N_a}{0.57 + N_a} < H_m < \frac{2.5}{N_a} - 5.1$, $\tag{95}$ $$\frac{4.1 - N_a(10.1 + H_m)}{\frac{5.4}{10.1 + H_m} - N_a} < R < \frac{H_m[4.1 - N_a(10.1 + H_m)]}{2.5 - N_a(5.1 + H_m)}$$

If $\frac{2.5}{N_a} - 5.1 < H_m < \frac{5.4}{N_a} - 10.1$, $\tag{96}$ $$R > \frac{H_m[4.1 - N_a(10.1 + H_m)]}{2.5 - N_a(5.1 + H_m)} \text{ and } R > \frac{4.1 - N_a(10.1 + H_m)}{\frac{5.4}{10.1 + H_m} - N_a}$$

-continued

If $\frac{5.4}{N_a} - 10.1 < H_m < \frac{8.2}{N_a} - 10.1,$ (97)

$$\frac{H_m[4.1 - N_a(10.1 + H_m)]}{2.5 - N_a(5.1 + H_m)} < R < \frac{4.1 - N_a(10.1 + H_m)}{\frac{5.4}{10.1 + H_m} - N_a}$$

Conditions for widening negatively the range of oblique illumination are as follows.

$$\frac{3.5 + 13N_a - 10N_a^2}{0.39 + 0.57N_a + N_a^2} < H_m < \frac{8.16}{N_a} - 10.1 \quad (98)$$

$$\frac{2.8 + 12.2N_a - N_a^2(2.2 + H_m)}{\frac{3.7 + 9.5N_a}{10.1 + H_m} - N_a^2} < \quad (99)$$

$$R < \frac{H_m[0.55 + 2.4N_a - N_a^2\{2 + 0.2H_m\}]}{0.34 + 1.3N_a - N_a^2\{1 + 0.2H_m\}}$$

A condition for widening positively the range of oblique illumination is as follows.

$$\frac{3.5 + 13N_a - 10N_a^2}{0.39 + 0.57N_a + N_a^2} < H_m < \frac{9.32}{N_a + 0.26} \quad (100)$$

Application of the above conditions described with the first type to a 384-well plate leads to the following.

Conditions for observation of at least the center of a well with oblique illumination are as follows.

$$N_a < 0.15 \quad (101)$$

$$\frac{2.15 - 10.3N_a}{0.26 + N_a} < H_m < \frac{3.73}{N_a} - 10.3 \quad (102)$$

If $\frac{2.15 - 10.3N_a}{0.26 + N_a} < H_m < \frac{1.1}{N_a} - 5.2, \frac{1.9 - N_a(10.3 + H_m)}{\frac{2.4}{10.3 + H_m} - N_a} < R < \frac{H_m[1.9 - H_a(10.3 + H_m)]}{1.1 - N_a(5.2 + H_m)}$ (103)

If $\frac{1.1}{N_a} - 5.2 < H_m < \frac{2.4}{N_a} - 10.3, R > \frac{H_m[1.9 - N_a(10.1 + H_m)]}{1.1 - N_a(5.2 + H_m)}$ and $R > \frac{1.9 - N_a(10.3 + H_m)}{\frac{2.4}{10.3 + H_m} - N_a}$ (104)

If $\frac{2.4}{N_a} - 10.3 < H_m < \frac{3.7}{N_a} - 10.3, \frac{H_m[1.9 - N_a(10.3 + H_m)]}{1.1 - N_a(5.2 + H_m)} < R < \frac{1.9 - N_a(10.3 + H_m)}{\frac{2.4}{10.3 + H_m} - N_a}$ (105)

Conditions for widening negatively the range of oblique illumination are as follows.

$$\frac{31.5 + 5.9N_a - 10N_a^2}{0.18 + 0.26N_a + N_a^2} < H_m < \frac{3.73}{N_a} - 10.3 \quad (106)$$

$$\frac{1.3 + 5.6N_a - N_a^2(10.3 + H_m)}{\frac{1.7 + 4.3N_a}{10.3 + H_m} - N_a^2} < R < \frac{H_m[0.25 + 1.1N_a - N_a^2\{2 + 0.19H_m\}]}{0.14 + 0.57N_a - N_a^2\{1 + 0.19H_m\}} \quad (107)$$

A condition for widening positively the range of oblique illumination is as follows.

$$\frac{31.5 + 5.9N_a - 10N_a^2}{0.18 + 0.26N_a + N_a^2} < H_m < \frac{6.26}{N_a + 0.29} \quad (108)$$

Fourth Embodiment

Figure 63:
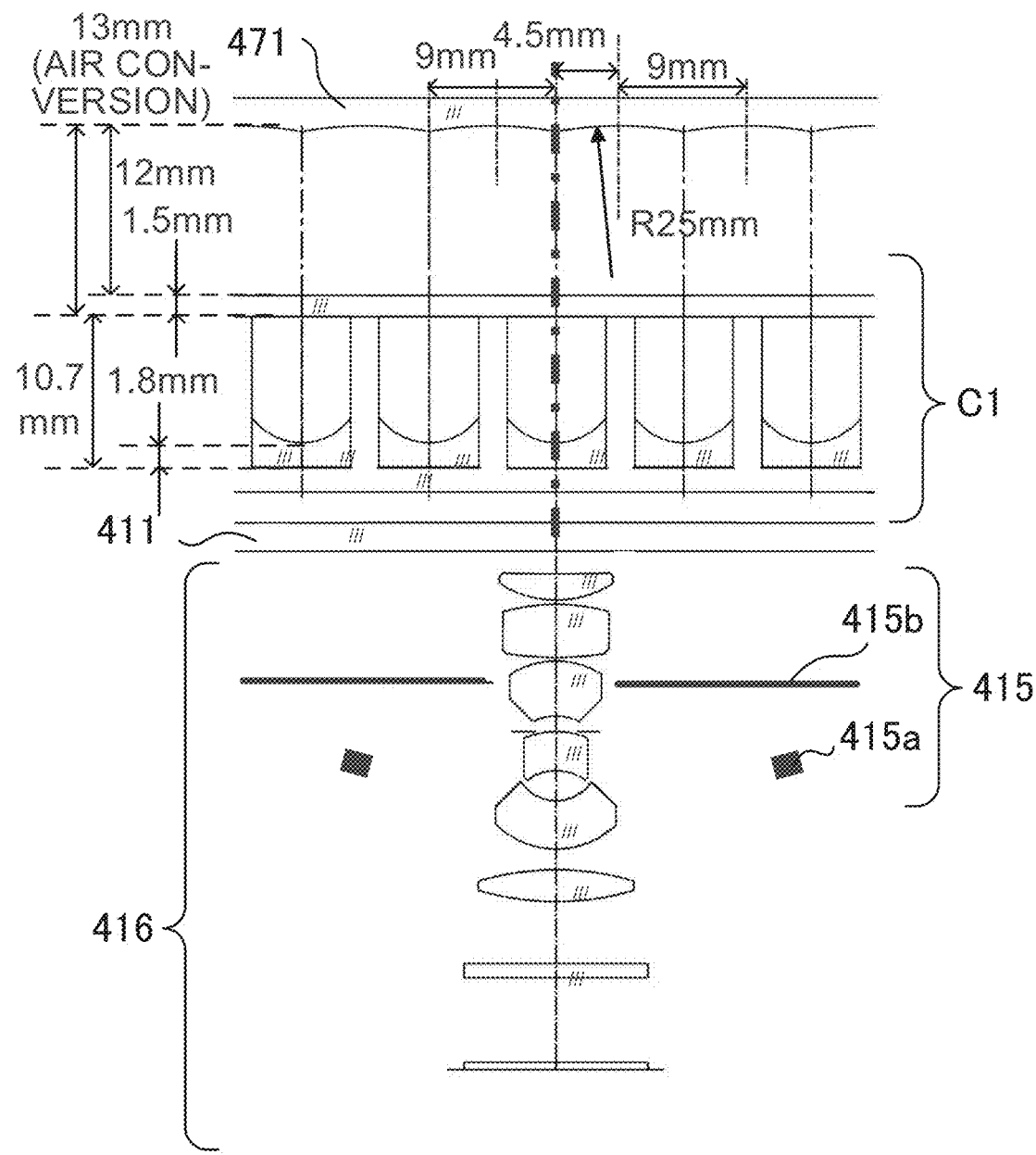
FIG. 63 is an explanatory view for setting in an observation apparatus according to fourth embodiment.
Figure 64:
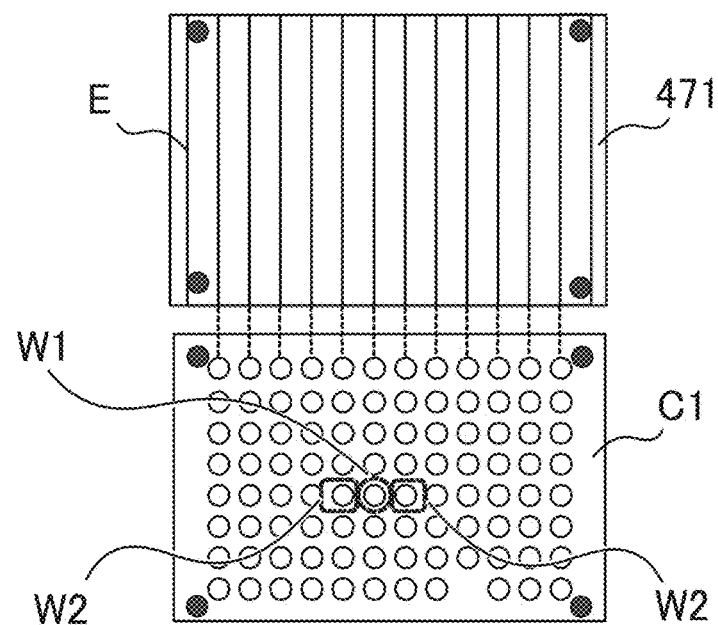
FIG. 64 is an explanatory view for the positional relationship between a multi-well plate and a reflector.

FIG. 63 is an explanatory view for setting in an observation apparatus 400 according to the present embodiment. FIG. 64 is an explanatory view for the positional relationship between a multi-well plate C1 and a reflector 471 for use in the observation apparatus 400 according to the present embodiment. The configuration and setting of the observation apparatus 400 will be described below with reference to FIGS. 63 and 64.

The observation apparatus 400 serves as an apparatus for observation of a sample in the multi-well plate C1 and achieves oblique illumination mainly with incident light from an adjacent well (k=1). The observation apparatus 400 has a configuration similar to that of the observation apparatus 10 and includes, as illustrated in FIG. 63, an illumination optical system 415, the reflector 471 that reflects light emitted from the illumination optical system 415, and an observation optical system 416 that condenses the light reflected by the reflector 471. The illumination optical system 415 includes a light source 415a and a diffusing plate 415b.

The illumination optical system 415 and the observation optical system 416 are provided below the installation position of the multi-well plate C1. In contrast to this, the reflector 471 is provided above the installation position of the multi-well plate C1. The reflector 471 serves as a curved mirror, particularly, a curved mirror of the first type described above and is installed such that an on-axis marginal ray to enter the observation optical system 416 travels via an adjacent well before reflection due to the reflector 471. More particularly, as illustrated in FIG. 64, either edge E of a reflective face of a recessed face is disposed in superimposition on the centers of wells.

In the observation apparatus 400, as illustrated in FIGS. 63 and 64, specifications of the observation optical system 416, specifications of the multi-well plate C1, the state of culture fluid in each well, and parameters regarding installation conditions of the reflector 471 are as follows. Note that the multi-well plate C1 serves as a 96-well plate. The thickness of the lid of the multi-well plate C1 is 1.5 mm and is 1.0 mm resulting from air conversion.

$N_a$=0.25, $P$=9 mm, $D_u$=6.9 mm, $D_b$=6.4 mm,
$n_w$=1.332, $A_{c2}$=0.11497/mm, $A$=0.0763/mm,
$H_b$=10.7 mm, $H_w$=1.8 mm, $H_m$=13 mm, and
$R$=25 mm.

In this case, in the observation apparatus 400, the values of parameters related to various types of conditions are as follows.

$N_{aCORU}$=0.31, $H_{mCLU-RB}$=3.1 mm, $H_{mSym+C}$=22.5 mm, $H_{mLUC}$=5 mm, $H_{mRBC}$=11.5 mm,
$R_{LUC}$=11.1 mm, $R_{RBC}$=101.7 mm,
$H_{mLU-BRSym\pm}$=10.3 mm, $R_{RBSym\pm}$=22.1 mm,
$R_{LUSym m\pm}$=25.5 mm, $H_{mSymORU}$=18.2 mm,
$Y_{sORU}$=0.39 mm, $Y_{sOSym\pm}$=−2.6 mm, and
$Y_{sSymHm}$=−2.4 mm.

Therefore, the observation apparatus 400 satisfies the conditions for oblique illumination of at least the center of a well, the conditions for widening negatively the range of oblique illumination, and the condition for widening positively the range of oblique illumination, enabling favorable observation of the sample in a well with high contrast.

Figure 65:
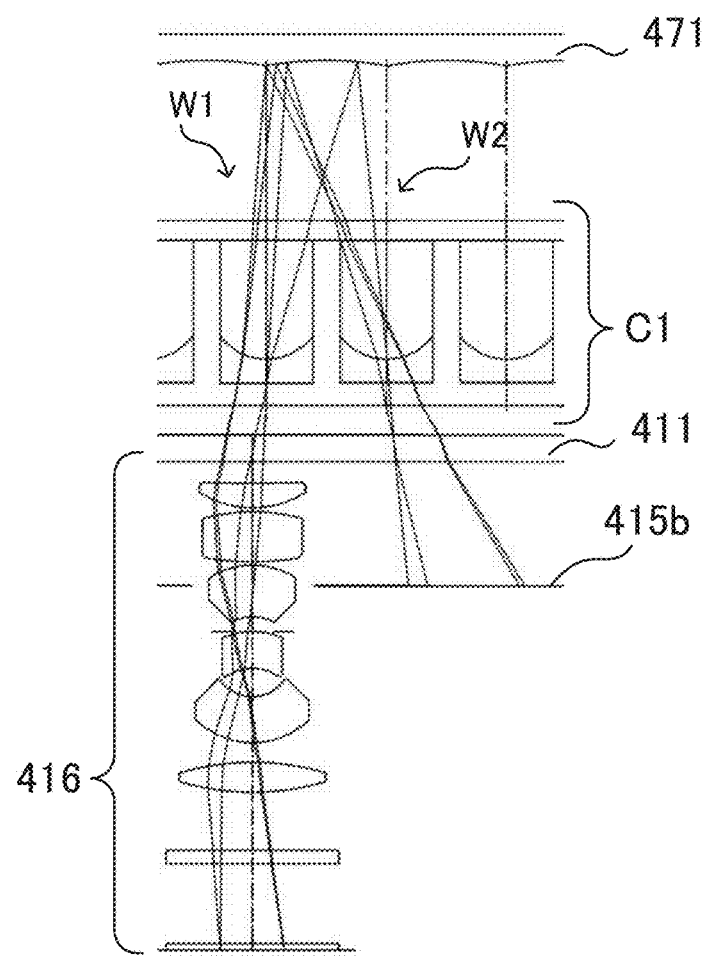
FIG. 65 is a ray diagram of incident light from an adjacent well.

The observation apparatus 400 having such a configuration as above achieves an on-axis well W1 with oblique illumination based on incident light from the adjacent well W2 as illustrated in FIG. 65 and captures such four image capturing regions as illustrated in FIG. 26.

Figure 66:
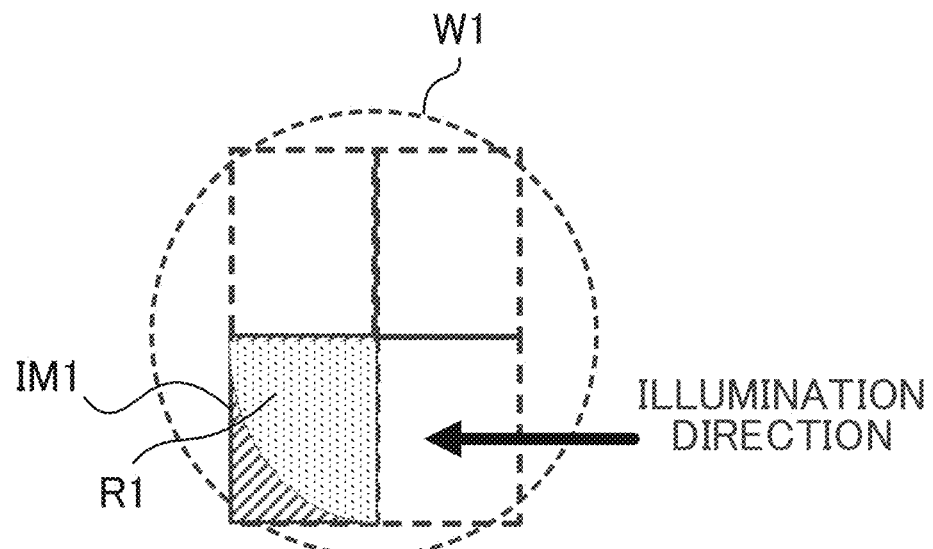
FIG. 66 illustrates the illumination direction at the time of capturing of an image capturing region and a distribution of contrast formed in the image capturing region.
Figure 67:
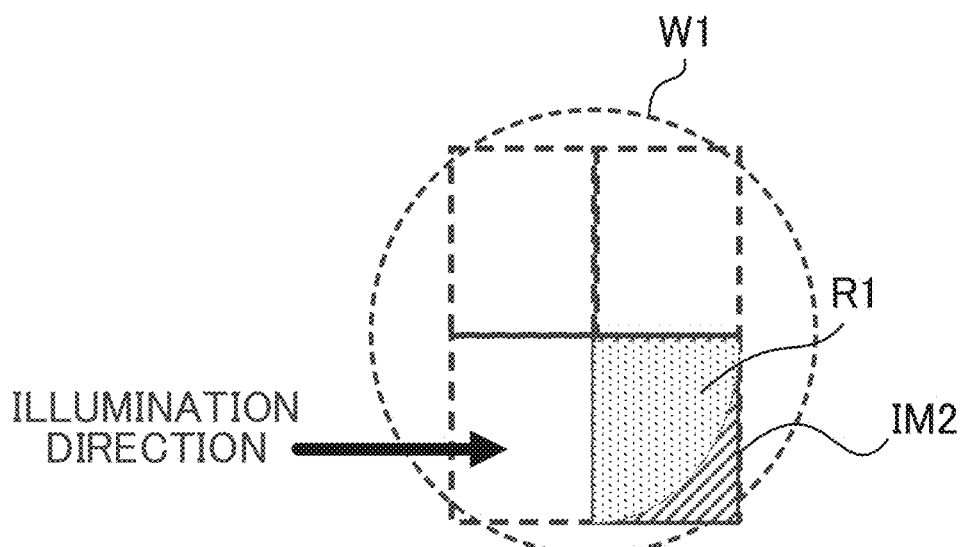
FIG. 67 illustrates the illumination direction at the time of capturing of an image capturing region and a distribution of contrast formed in the image capturing region.
Figure 68:
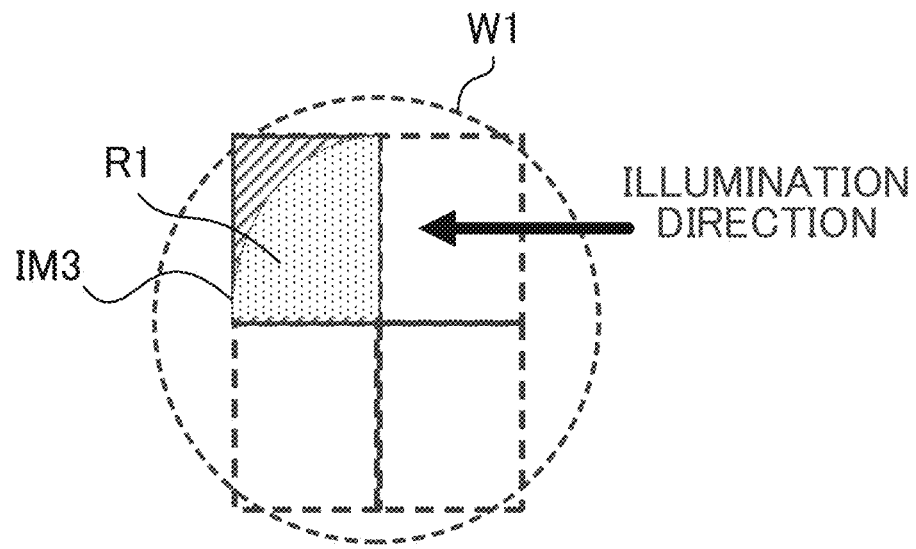
FIG. 68 illustrates the illumination direction at the time of capturing of an image capturing region and a distribution of contrast formed in the image capturing region.
Figure 69:
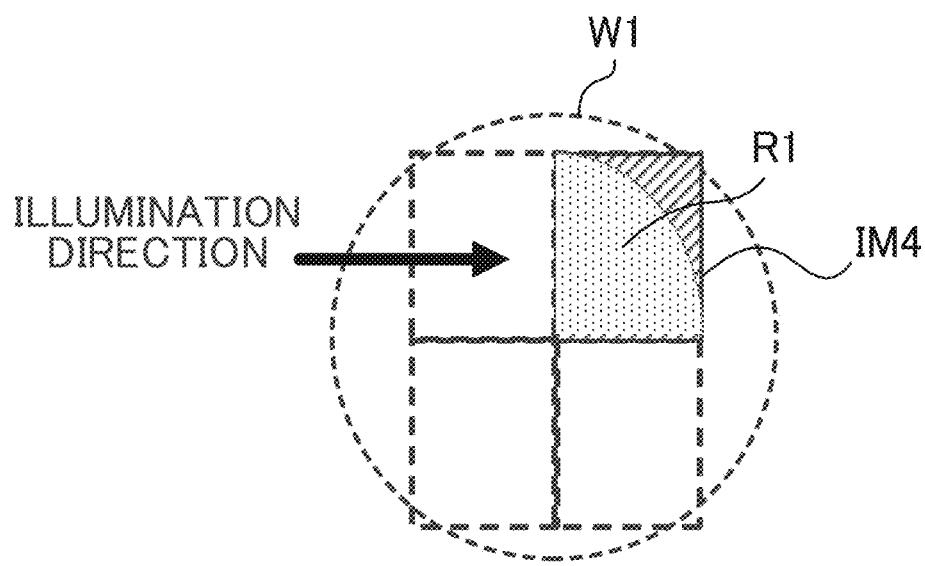
FIG. 69 illustrates the illumination direction at the time of capturing of an image capturing region and a distribution of contrast formed in the image capturing region.
Figure 70:
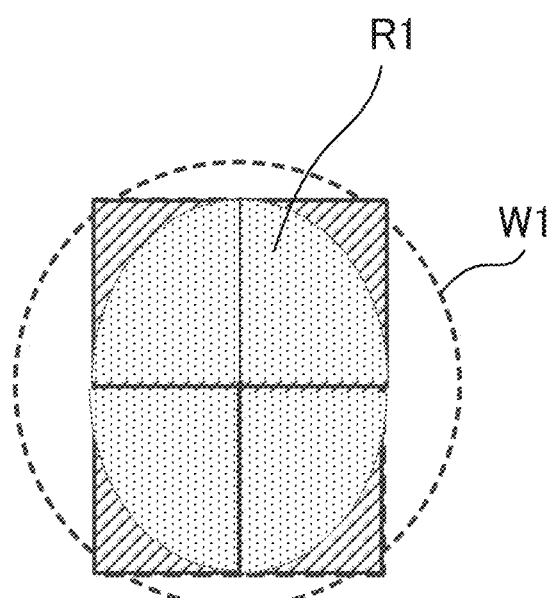
FIG. 70 illustrates a distribution of contrast acquired by combination of the distributions of contrast illustrated in FIGS. 66 to 69.

FIG. 65 is a ray diagram of incident light from an adjacent well. FIG. 66 illustrates the illumination direction at the time of capturing of an image capturing region IM1 and a distribution of contrast formed in the image capturing region IM1. FIG. 67 illustrates the illumination direction at the time of capturing of an image capturing region IM2 and a distribution of contrast formed in the image capturing region IM2. FIG. 68 illustrates the illumination direction at the time of capturing of an image capturing region IM3 and a distribution of contrast formed in the image capturing region IM3. FIG. 69 illustrates the illumination direction at the time of capturing of an image capturing region IM4 and a distribution of contrast formed in the image capturing region IM4. FIG. 70 illustrates a distribution of contrast acquired by combination of the distributions of contrast illustrated in FIGS. 66 to 69. Note that, in FIGS. 66 to 70, a region R1 indicates a region with fulfillment of oblique illumination.

The observation apparatus 400 performs illumination with incident light from the adjacent well W2, as illustrated in FIG. 65, with movement of the image capturing region, enabling oblique illumination of respective different regions in the image capturing regions as illustrated in FIGS. 66 to 69. Therefore, combination of images acquired due to switching in the illumination direction and changing of the image capturing region enables observation of a wide range (region R1) in the well W1 of the 96-well plate with oblique illumination as illustrated in FIG. 70.

Fifth Embodiment

Figure 71:
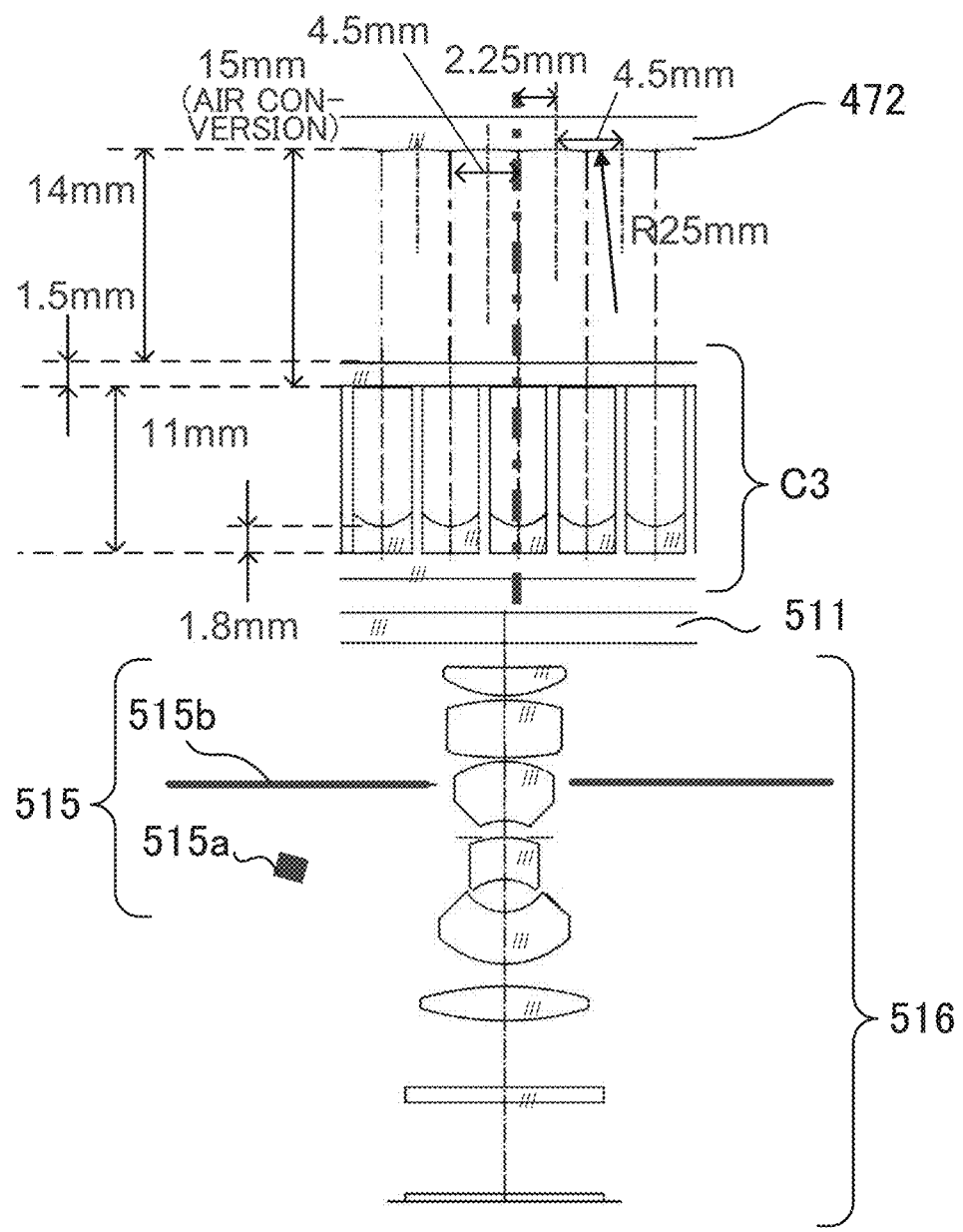
FIG. 71 is an explanatory view for setting in an observation apparatus according to a fifth embodiment.
Figure 72:
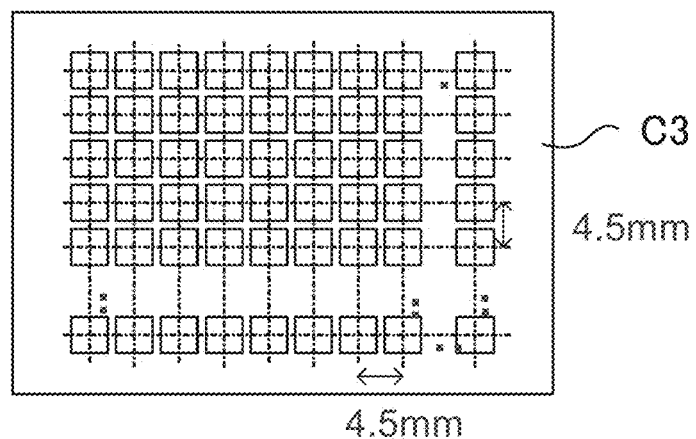
FIG. 72 is an explanatory view for specifications of a multi-well plate.

FIG. 71 is an explanatory view for setting in an observation apparatus 500 according to the present embodiment. FIG. 72 is an explanatory view for specifications of a multi-well plate C3. The configuration and setting of the observation apparatus 500 will be described below with reference to FIGS. 71 and 72.

The observation apparatus 500 serves as an apparatus for observation of a sample in the multi-well plate C3 and achieves oblique illumination mainly with incident light from an adjacent well (k=1). The observation apparatus 500 has a configuration similar to that of the observation apparatus 10 and includes, as illustrated in FIG. 71, an illumination optical system 515, a reflector 472 that reflects light emitted from the illumination optical system 515, and an observation optical system 516 that condenses the light reflected by the reflector 472. The illumination optical system 515 includes a light source 515a and a diffusing plate 515b.

The illumination optical system 515 and the observation optical system 516 are provided below the installation position of the multi-well plate C3. In contrast to this, the reflector 472 is provided above the installation position of the multi-well plate C3. The reflector 472 serves as a curved mirror, particularly, a curved mirror of the first type described above and is installed such that an on-axis marginal ray to enter the observation optical system 516 travels via an adjacent well before reflection due to the reflector 472.

In the observation apparatus 500, as illustrated in FIGS. 71 and 72, specifications of the observation optical system 516, specifications of the multi-well plate C3, the state of culture fluid in each well, and parameters regarding installation conditions of the reflector 472 are as follows. Note that the multi-well plate C3 serves as a 384-well plate. The thickness of the lid of the multi-well plate C3 is 1.5 mm and is 1.0 mm resulting from air conversion.

$N_a$=0.12, $P$=4.5 mm, $D_u$=3.8 mm, $D_b$=3.2 mm,
$n_w$=1.332, $A_{c2}$=0.2306/mm, $A$=0.1530/mm,
$H_b$=11 mm, $H_w$=1.8 mm, $H_m$=15 mm, and
$R$=25 mm.

In this case, in the observation apparatus 500, the values of parameters related to various types of conditions are as follows.

$N_{aCORU}$=0.15, $H_{mCLU-RB}$=2.4 mm, $H_{mSym+C}$=20.8 mm, $H_{mLUC}$=3.8 mm, $H_{mRBC}$=9.8 mm,
$R_{LUC}$=13.1 mm, $R_{RBC}$=47.6 mm, $H_{mLU-BRSym\pm}$=9.1 mm, $R_{RBSym\pm}$=22.2 mm,
$R_{LUSym m\pm}$=29.7 mm, $H_{mSymORU}$=15.2 mm,
$Y_{sORU}$=0.18 mm, $Y_{sOSym\pm}$=−0.81 mm, and
$Y_{sSymHm}$=−0.78 mm.

Therefore, the observation apparatus 500 satisfies the conditions for oblique illumination of at least the center of a well, the conditions for widening negatively the range of oblique illumination, and the condition for widening positively the range of oblique illumination, enabling favorable observation of the sample in a well with high contrast.

The observation apparatus 500 having such a configuration as above captures two image capturing regions each slightly shifted in the direction opposite to the illumination direction.

Figure 73:
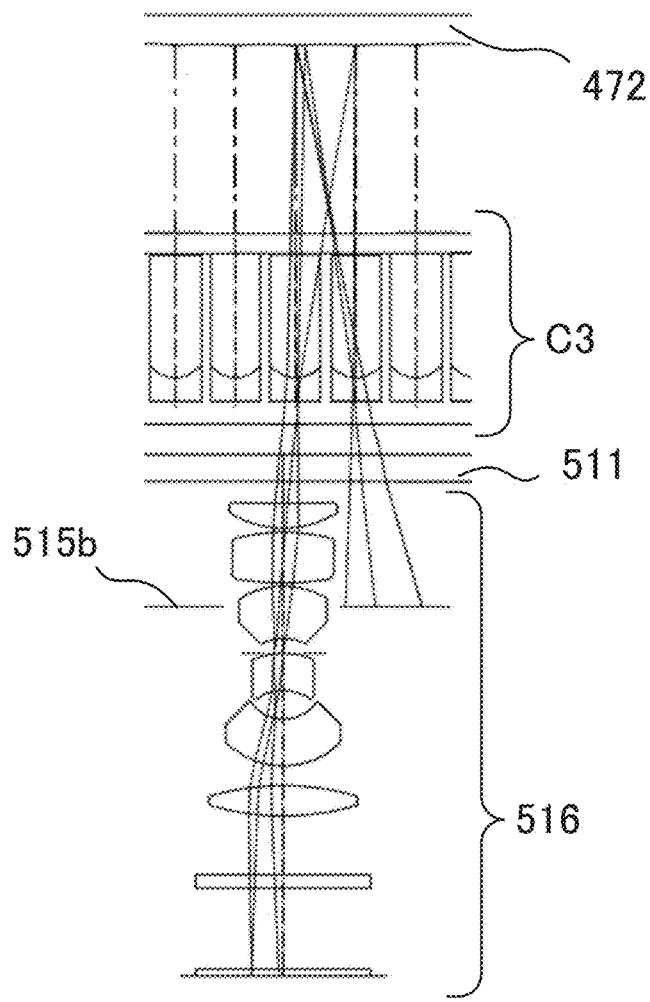
FIG. 73 is a ray diagram of incident light from an adjacent well.
Figure 74:
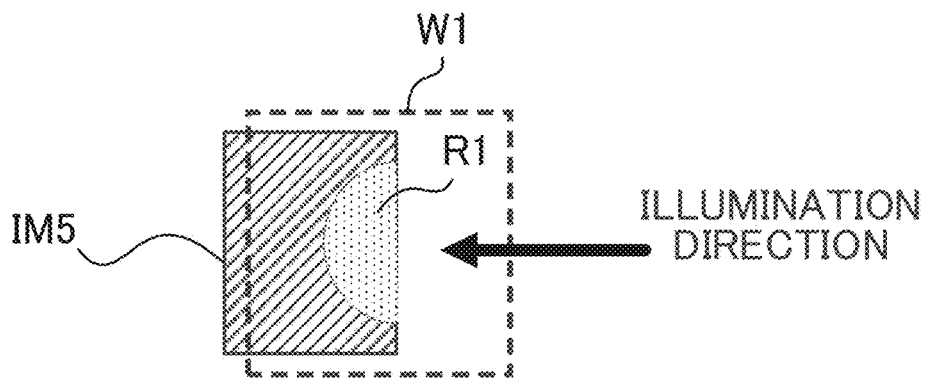
FIG. 74 illustrates a distribution of contrast formed in an image capturing region due to the light illustrated in FIG. 73.
Figure 75:
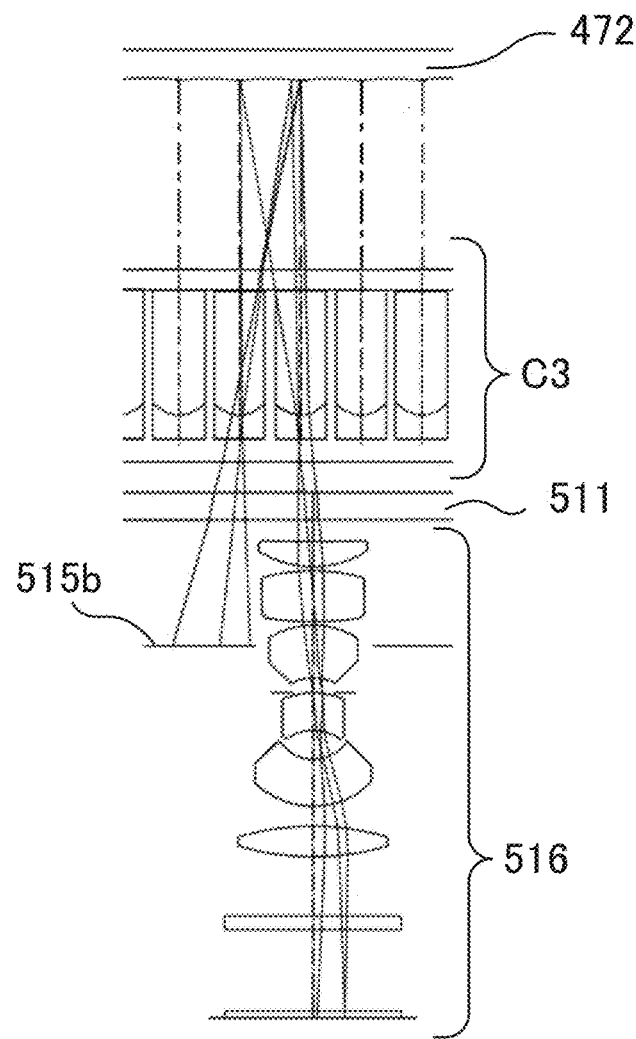
FIG. 75 is a ray diagram of incident light from an adjacent well in the direction opposite to the illumination direction illustrated in FIG. 73.
Figure 76:
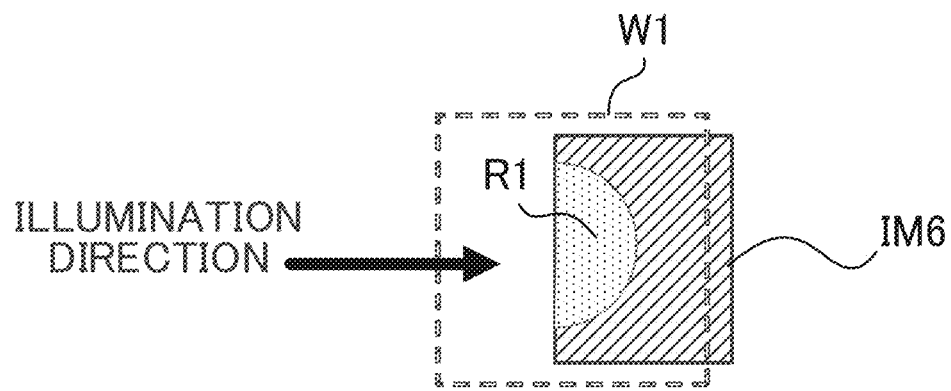
FIG. 76 illustrates a distribution of contrast formed in an image capturing region due to the light illustrated in FIG. 75.
Figure 77:
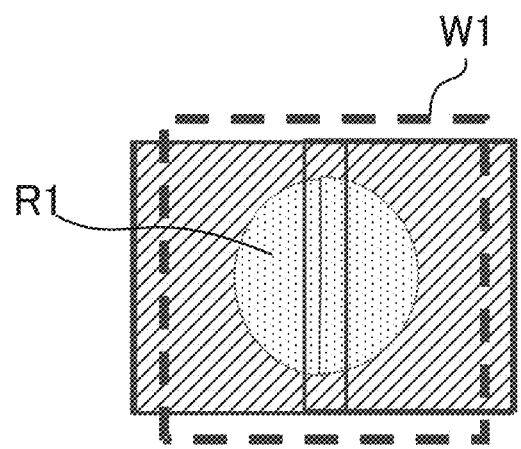
FIG. 77 illustrates a distribution of contrast acquired by combination of the distribution of contrast illustrated in FIG. 74 and the distribution of contrast illustrated in FIG. 76.

FIG. 73 is a ray diagram of incident light from an adjacent well. FIG. 74 illustrates a distribution of contrast formed in an image capturing region IM5 due to the light illustrated in FIG. 73. FIG. 75 is a ray diagram of incident light from an adjacent well in the direction opposite to the illumination direction illustrated in FIG. 73. FIG. 76 illustrates a distribution of contrast formed in an image capturing region IM6 due to the light illustrated in FIG. 75. FIG. 77 illustrates a distribution of contrast acquired by combination of the distribution of contrast illustrated in FIG. 74 and the distribution of contrast illustrated in FIG. 76. Note that, in FIGS. 74, 76, and 77, a region R1 indicates a region with fulfillment of oblique illumination.

The observation apparatus 500 performs illumination with incident light from the adjacent well W2 with movement of the image capturing region and with a switch in the illumination direction. Thus, the image capturing region IM5 illustrated in FIG. 74 is captured with illumination in $$H_{mLU\text{-}RBWide} < H_m \tag{112}$$

$$\text{If } Y_s > Y_{sASY}, H_{mWide-} < H_m < H_{mWide+} \tag{113}$$

$$\text{If } Y_s < Y_{sASY}, 0 < H_m < H_{mWide-} \tag{114}$$

Height parameters and coordinate parameters are as follows. Note that the coordinate parameters are identical to those in the first type. The height parameters are derived based on substitution of 1 for k in the height $H_{mLU\text{-}RB}$, substitution of $-P/2$ for the effective range $Y_{m-}$ in $H_{mYm-}$, and substitution of $3P/2$ for the effective range $Y_{m+}$ in $H_{mYm+}$.

$$H_{mLu\text{-}RBWide} = \frac{2\left\{\frac{H_w}{n_w} + \left(\frac{AH_w}{n_w} + 1\right)(H_b - H_w)\right\}\left[P - \frac{D_u}{2} - N_a\left\{\frac{H_2}{n_w} + \left(\frac{AH_w}{n_w} + 1\right)(H_b - H_w)\right\} - Y_s\{1 + A(H_b - H_w)\}\right]}{\left(\frac{AH_w}{n_w} + 1\right)D_u + D_b + 2\left\{\frac{H_w}{n_w} + \left(\frac{AH_w}{n_w} + 1\right)(H_b - H_w)\right\}\left\{N_a\left(\frac{AH_w}{n_w} + 1\right) + Y_s A\right\}} \tag{115}$$

$$H_{mWide+} \equiv \frac{3P/2 + \frac{N_a}{A}}{\left(\frac{AH_w}{n_w} + 1\right)N_a + Y_s A} - \frac{1}{A} - (H_b - H_w) \tag{116}$$

$$H_{mWide-} \equiv \frac{-P/2 + \frac{N_a}{A}}{\left(\frac{AH_w}{n_w} + 1\right)N_a + Y_s A} - \frac{1}{A} - (H_b - H_w) \tag{117}$$

$$Y_{sORU} \equiv \frac{\frac{D_u}{2} - N_a\left\{\frac{H_w}{n_w} + \left(\frac{AH_w}{n_w} + 1\right)(H_b - H_w)\right\}}{1 + A(H_b - H_w)} \tag{118}$$

$$Y_{sOLU} \equiv \frac{-\frac{D_u}{2} - N_a\left\{\frac{H_w}{n_w} + \left(\frac{AH_w}{n_w} + 1\right)(H_b - H_w)\right\}}{1 + A(H_b - H_w)} \tag{119}$$

$$Y_{sASY} \equiv \frac{-\left(\frac{AH_w}{n_w} + 1\right)N_a}{A} \tag{120}$$

the direction illustrated in FIG. 73, and the image capturing region IM6 illustrated in FIG. 76 is captured with illumination in the direction illustrated in FIG. 75. Combination of acquired images of such two different image capturing regions as above enables observation of a wide range (region R1) at the center of the well W1 of the 384-well plate with oblique illumination as illustrated in FIG. 77.

Next, the second type will be specifically described. For achievement of oblique illumination with a reflector 570 of the second type, the following expressions require simultaneously satisfying.

$$Y_{sOLU} < Y_s \tag{109}$$

$$-D_b/2 < Y_s \tag{110}$$

$$Y_s < Y_{sORU} \tag{111}$$

In a case where the above conditions described with the second type are applied to a 96-well plate, desirably, the height of location of the reflector 570 satisfies the following conditions.

$$\frac{5.03 - 10.1N_a - 1.52Y_s}{0.57 + N_a + 0.069Y_s} < H_m \tag{121}$$

$$\text{If } Y_s < -14.5N_a, H_m < \frac{-4.08 + 11.9N_a}{N_a + 0.069Y_s} - 22 \tag{122}$$

$$\text{If } Y_s > -14.5N_a, \frac{-4.08 + 11.9N_a}{N_a + 0.069Y_s} - 22 < H_m < \frac{12.2 + 11.9N_a}{N_a + 0.069Y_s} - 22 \tag{123}$$

Note that, in this case, various types of coordinates are as follows.

$$Y_{sORU} = 2.05 - 6.65N_a \tag{124}$$

$$Y_{sASY} = 14.5N_a \tag{125}$$

$$Y_{sOLU} = -2.05 - 6.65N_a \tag{126}$$

In a case where the above conditions described with the second type are applied to a 384-well plate, desirably, the height of location of the reflector 570 satisfies the following conditions.

$$\frac{2.15 - 10.3N_a - 2Y_s}{0.26 + N_a + 0.127Y_s} < H_m \tag{127}$$

If $Y_s < -7.89N_a$, $H_m < \dfrac{-1.86 + 5.41N_a}{N_a + 0.127Y_s} - 15.7$ (128)

If $Y_s > -7.89N_a$, $\dfrac{-1.86 + 5.41N_a}{N_a + 0.127Y_s} - 15.7 < H_m < \dfrac{5.59 + 5.41N_a}{N_a + 0.127Y_s} - 1.57$ (129)

Note that, in this case, various types of coordinates are as follows.

$$Y_{sORU} = 0.79 - 5.17N_a \tag{130}$$

$$Y_{sOLU} = -0.79 - 5.17N_a \tag{131}$$

$$Y_{sASY} = -7.89N_a \tag{132}$$

Conditions for observation of at least the center of a well with oblique illumination with the second type are as follows.

$$N_a < N_{aCORU} \tag{133}$$

$$H_{mCLU-RB} < H_m < H_{mWideC} \tag{134}$$

If $H_{mCLU-RB} < H_m < H_{mLUC}$, $R_{RBC} < R < R_{LUC}$ (135)

If $H_{mLUC} < H_m < H_{mRBC}$, $R > R_{LUC}$ and $R > R_{RBC}$ (136)

If $H_{mRBC} < H_m < H_{mWideC}$, $R_{LUC} < R < R_{RBC}$ (137)

Note that the height $H_{mWideC}$ results from substitution of 0 for $Y_s$ in the height $H_{mWide}$ and is as follows.

$$H_{mWideC} = \frac{\frac{3P}{2N_a} - \frac{H_w}{n_w}}{\left(\frac{AH_w}{n_w} + 1\right)} - (H_b - H_w) \tag{138}$$

Conditions for observation of the center of a well in a 96-well plate with oblique illumination with the second type are as follows.

$$N_a < 0.31 \tag{139}$$

$$\frac{5 - 10N_a}{0.57 + N_a} < H_m < \frac{12.2}{N_a} - 10.1 \tag{140}$$

If $\dfrac{5 - 10N_a}{0.57 + N_a} < H_m < \dfrac{2.5}{N_a} - 5.1$, $\dfrac{4.1 - N_a(10.1 + H_m)}{\dfrac{5.4}{10.1 + H_m} - N_a} < R < \dfrac{H_m[4.1 - N_a(10.1 + H_m)]}{2.5 - N_a(5.1 + H_m)}$ (141)

If $\dfrac{2.5}{N_a} - 5.1 < H_m < \dfrac{5.4}{N_a} - 10.1$, $R > \dfrac{H_m[4.1 - N_a(10.1 + H_m)]}{2.5 - N_a(5.1 + H_m)}$ and $R > \dfrac{4.1 - N_a(10.1 + H_m)}{\dfrac{5.4}{10.1 + H_m} - N_a}$ (142)

If $\dfrac{5.4}{N_a} - 10.1 < H_m < \dfrac{12.2}{N_a} - 10.1$, $\dfrac{H_m[4.1 - N_a(10.1 + H_m)]}{2.5 - N_a(5.1 + H_m)} < R < \dfrac{4.1 - N_a(10.1 + H_m)}{\dfrac{5.4}{10.1 + H_m} - N_a}$ (143)

Conditions for observation of the center of a well in a 384-well plate with oblique illumination with the second type are as follows.

$$N_a < 0.15 \tag{144}$$

$$\frac{2.2 - 10N_a}{0.26 + N_a} < H_m < \frac{5.6}{N_a} - 10.3 \tag{145}$$

If $\dfrac{2.2 - 10N_a}{0.26 + N_a} < H_m < \dfrac{1.1}{N_a} - 5.2$, $\dfrac{1.9 - N_a(10.3 + H_m)}{\dfrac{2.4}{10.3 + H_m} - N_a} < R < \dfrac{H_m[1.9 - N_a(5.2 + H_m)]}{1.1 - N_a(5.2 + H_m)}$ (146)

If $\dfrac{1.1}{N_a} - 5.2 < H_m < \dfrac{2.4}{N_a} - 10.3$, $R > \dfrac{H_m[1.9 - N_a(10.1 + H_m)]}{1.1 - N_a(5.2 + H_m)}$ and $R > \dfrac{1.9 - N_a(10.3 + H_m)}{\dfrac{2.4}{10.3 + H_m} - N_a}$ (147)

If $\dfrac{2.4}{N_a} - 10.3 < H_m < \dfrac{5.6}{N_a} - 10.3$, $\dfrac{H_m[1.9 - N_a(10.3 + H_m)]}{1.1 - N_a(5.2 + H_m)} < R < \dfrac{1.9 - N_a(10.3 + H_m)}{\dfrac{2.4}{10.3 + H_m} - N_a}$ (148)

Furthermore, conditions for widening negatively the range of oblique illumination with the second type are as follows.

$$H_{mELU-RB} < H_m < H_{mWideC} \tag{149}$$

$$R_{RBE} < R < R_{LUE} \tag{150}$$

Note that the above conditions can be applied if the following condition is satisfied.

$$\frac{D_b}{2} < \frac{\left(\frac{AH_w}{n_w} + 1\right) N_a}{A} \tag{151}$$

Note that the definition of each parameter is as follows and results from calculation with substitution of $-D_b/2$ for $Y_s$.

$$H_{mELU-RB} \equiv \frac{2P + D_b\{1 + A(H_b - H_w)\} - D_u - 2N_a\left\{\frac{H_w}{n_w} + \left(\frac{AH_w}{n_w} + 1\right)(H_b - H_w)\right\}}{\frac{\left(\frac{AH_w}{n_w} + 1\right) D_u}{\frac{H_w}{n_w} + \left(\frac{AH_w}{n_w} + 1\right)(H_b - H_w)} + D_b + 2N_a\left(\frac{AH_w}{n_w} + 1\right) - AD_b} \tag{152}$$

$$R_{LUE} \equiv \frac{H_m\left[P + D_b\{1 + A(H_b - H_w + H_m)\} - 2N_a\left\{\frac{H_w}{n_w} + \left(\frac{AH_w}{n_w} + 1\right)(H_b - H_w + H_m)\right\}\right]}{P - \frac{D_u}{2} + D_b\{1 + A(H_b - H_w + H_m)\} - N_a\left\{\frac{H_w}{n_w} + 1\right\}(H_b - H_w + H_m)\}} \tag{153}$$

$$R_{RBE} \equiv \frac{\frac{P}{2\left(\frac{AH_w}{n_w} + 1\right)} + D_b\left\{\frac{1 + A(H_b - H_w + H_m)}{2\left(\frac{AH_w}{n_w} + 1\right)}\right\} - N_a\left\{\frac{H_w}{n_w\left(\frac{AH_w}{n_w} + 1\right)} + (H_b - H_w + H_m)\right\}}{\frac{P\left(\frac{AH_w}{n_w} + 1\right) + D_b}{2\left(\frac{AH_w}{n_w} + 1\right)\left\{\frac{H_w}{n_w} + (H_b - H_w + H_m)\left(\frac{AH_w}{n_w} + 1\right)\right\}} + \frac{D_b A}{2\left(\frac{AH_w}{n_w} + 1\right)} - N_a} \tag{154}$$

Furthermore, with the range of oblique illumination widened to the coordinate $-D_b/2$ of an end of a well as described above with the second type, desirably, the following condition is satisfied. Thus, the range of oblique illumination can be widened to the positive limit $Y_{sORU}$.

$$H_{mELU-RB} < H_m < H_{mWideORU} \tag{155}$$

Note that $H_{mWideORU}$ is as follows.

$$H_{mWideORU} \equiv \frac{(3P - D_u)\{1 + A(H_b - H_w)\}}{2N_a + D_u A} \tag{156}$$

In a case where the conditions for widening positively and negatively the range of oblique illumination described above are applied to a 96-well plate, the height of location of the reflector 570 and the radius of the reflector 570, satisfying the following conditions in which $N_a$ is larger than 0.22, enable oblique illumination to $-D_b/2$.

$$\frac{10.9 - 11.2N_a}{0.38 + 1.1N_a} < H_m < \frac{12.2}{N_a} - 10.1 \tag{157}$$

$$\frac{8.9 + 0.22H_m - N_a(10.1 + H_m)}{\frac{16}{25 + 2.4H_m} + 0.22 - N_a} < R < \frac{H_m[8.9 + 0.22H_m - N_a(10.1 + H_m)]}{4.9 + 0.22H_m - N_a(5.1 + H_m)} \tag{158}$$

Furthermore, the height of location of the reflector 570, satisfying the following condition, enables oblique illumination to $Y_{sORU}$.

$$\frac{10.9 - 11.2N_a}{0.38 + 1.1N_a} < H_m < \frac{16.9}{N_a + 0.26} \tag{159}$$

Sixth Embodiment

Figure 78:
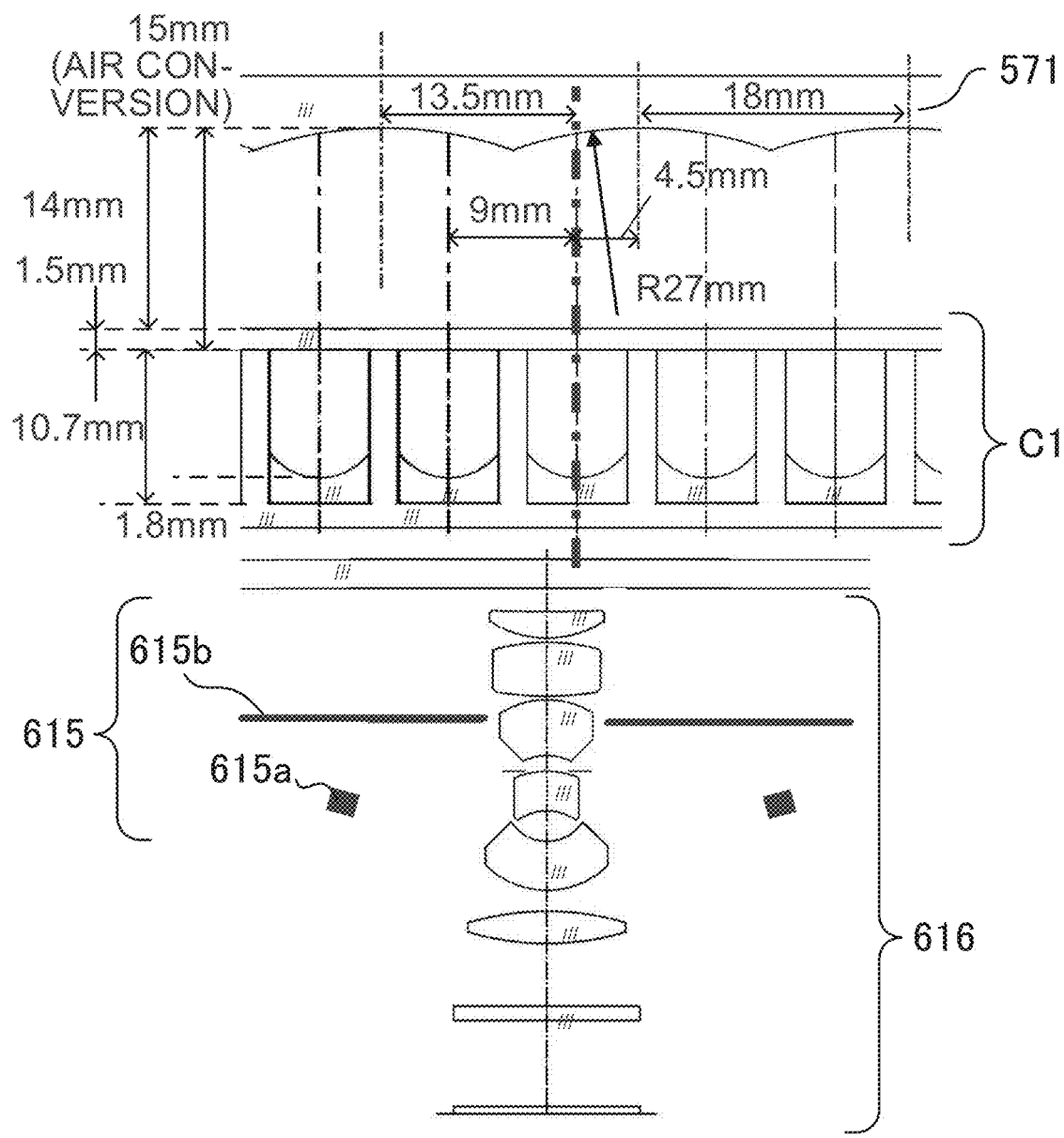
FIG. 78 is an explanatory view for setting in an observation apparatus according to a sixth embodiment.
Figure 79:
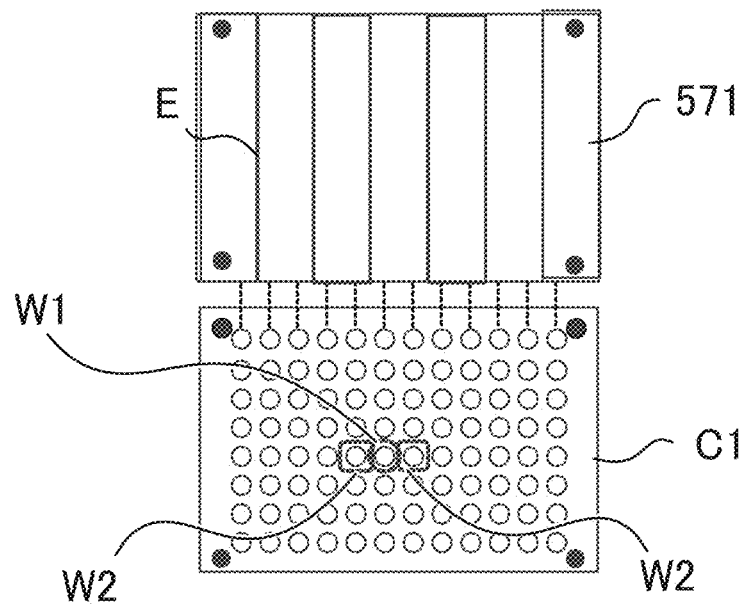
FIG. 79 is an explanatory view for the positional relationship between a multi-well plate and a reflector.

FIG. 78 is an explanatory view for setting in an observation apparatus 600 according to the present embodiment. FIG. 79 is an explanatory view for the positional relationship between a multi-well plate C1 and a reflector 571. The configuration and setting of the observation apparatus 600 will be described below with reference to FIGS. 78 and 79.

The observation apparatus 600 serves as an apparatus for observation of a sample in the multi-well plate C1 and achieves oblique illumination mainly with incident light from an adjacent well (k=1). The observation apparatus 600 has a configuration similar to that of the observation apparatus 10 and includes, as illustrated in FIG. 78, an illumination optical system 615, the reflector 571 that reflects light emitted from the illumination optical system 615, and an observation optical system 616 that condenses the light reflected by the reflector 571. The illumination optical system 615 includes a light source 615a and a diffusing plate 615b.

The illumination optical system 615 and the observation optical system 616 are provided below the installation position of the multi-well plate C1. In contrast to this, the reflector 571 is provided above the installation position of the multi-well plate C1. The reflector 571 serves as a curved mirror, particularly, a curved mirror of the second type described above and is installed such that an on-axis marginal ray to enter the observation optical system 616 travels via an adjacent well before reflection due to the reflector 571. More particularly, as illustrated in FIG. 79, either edge E of a reflective face of a recessed face is disposed between adjacent two wells.

In the observation apparatus 600, as illustrated in FIGS. 78 and 79, specifications of the observation optical system 616, specifications of the multi-well plate C1, the state of culture fluid in each well, and parameters regarding installation conditions of the reflector 571 are as follows. Note that the multi-well plate C1 serves as a 96-well plate. The thickness of the lid of the multi-well plate C1 is 1.5 mm and is 1.0 mm resulting from air conversion.

$N_a=0.25$, $P=9$ mm, $D_u=6.9$ mm, $D_b=6.4$ mm,
$n_w=1.332$, $A_{c2}=0.11497$/mm, $A=0.0763$/mm,
$H_b=10.7$ mm, $H_w=1.8$ mm, $H_m=15$ mm, and
$R=27$ mm.

In this case, in the observation apparatus 600, the values of parameters related to various types of conditions are as follows.

$N_{aCORU}=0.31$, $H_{mCLU-RB}=3.1$ mm, $H_{mWideC}=38.3$ mm, $H_{mLUC}=5$ mm, $H_{mRBC}=11.5$ mm,
$R_{LUC}=13.2$ mm, $R_{RBC}=62.4$ mm,
$H_{mELU-BR}=12.3$ mm, $R_{LUE}=27.6$ mm,
$R_{RBE}=25.1$ mm, $Y_{sORU}=0.39$ mm, $Y_{sWide\pm}=-3.9$ mm, and $Y_{sWideORU}=-3.9$ mm.

Therefore, the observation apparatus 600 satisfies the conditions for oblique illumination of at least the center of a well, the conditions for widening negatively the range of oblique illumination, and the condition for widening positively the range of oblique illumination, enabling favorable observation of the sample in a well with high contrast.

Figure 80:
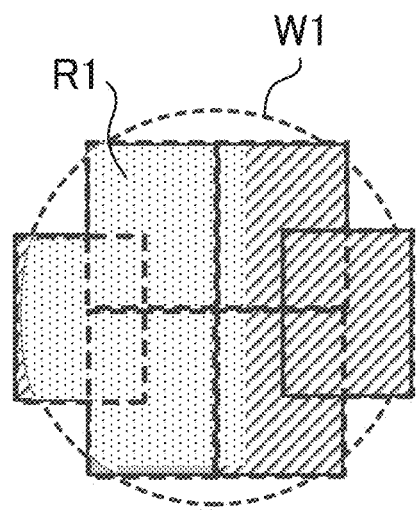
FIG. 80 illustrates a distribution of contrast acquired by the observation apparatus.

FIG. 80 illustrates a distribution of contrast acquired by the observation apparatus 600. The observation apparatus 600 having such a configuration as above achieves an on-axis well W1 with oblique illumination based on incident light from the adjacent well W2 and captures six image capturing regions, enabling observation of a wide range (range R1) in the well with oblique illumination as illustrated in FIG. 80.

Figure 81:
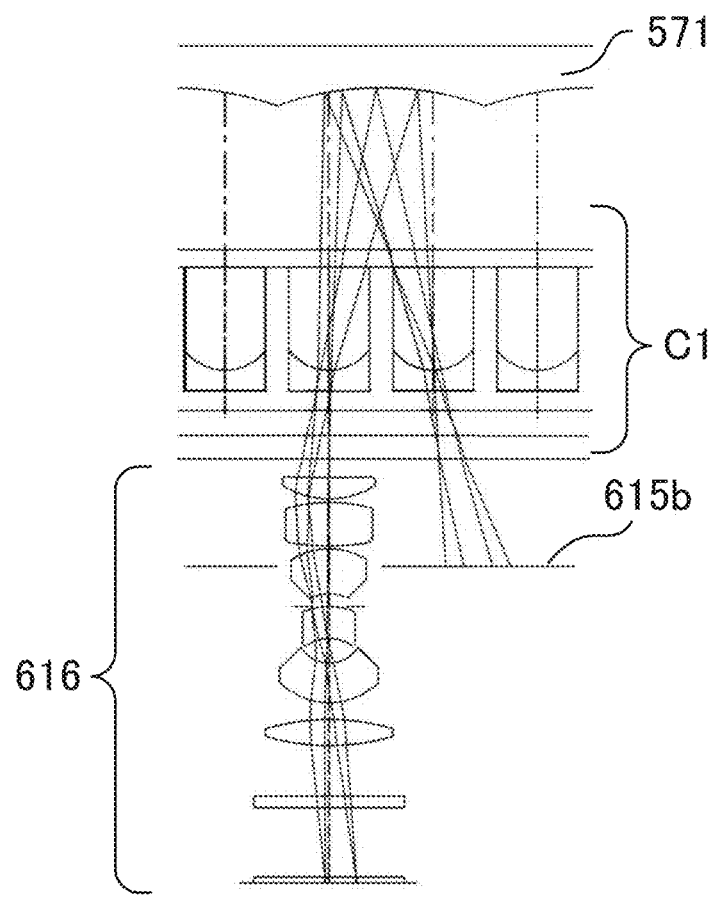
FIG. 81 is a ray diagram of incident light from an adjacent well.
Figure 82:
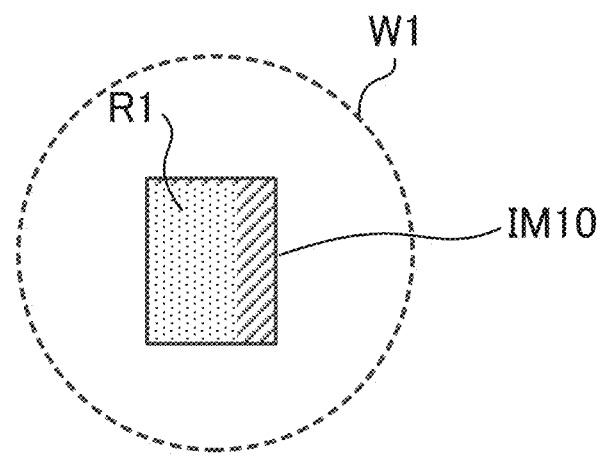
FIG. 82 illustrates a distribution of contrast formed in an image capturing region due to the light illustrated in FIG. 81.
Figure 83:
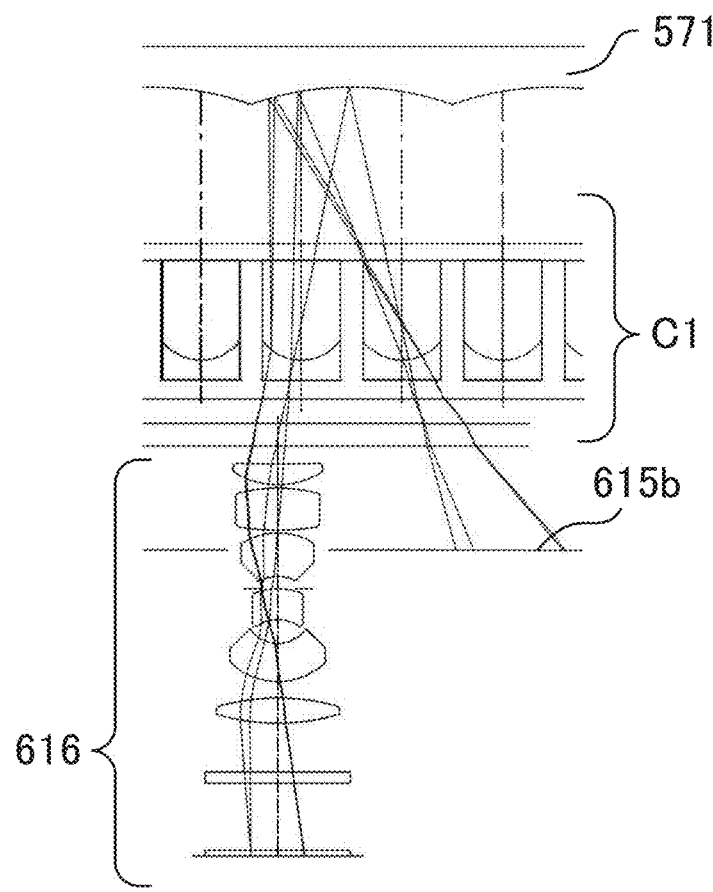
FIG. 83 is a ray diagram with the image capturing region slightly shifted in the illustration direction from the state illustrated in FIG. 81.
Figure 84:
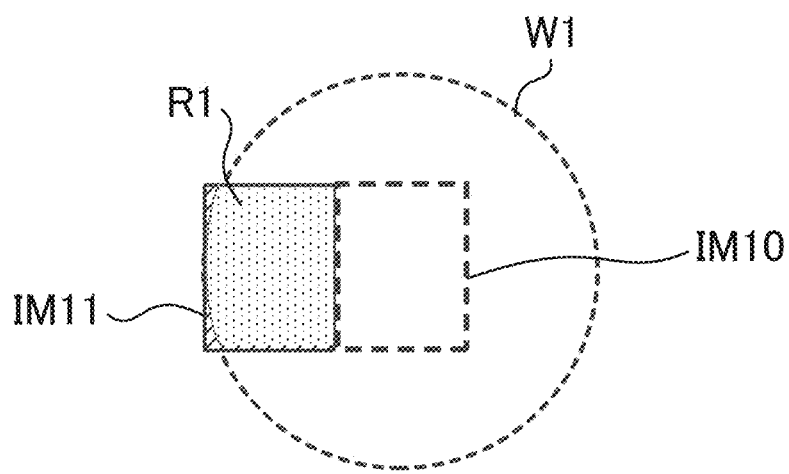
FIG. 84 illustrates a distribution of contrast formed in an image capturing region due to the light illustrated in FIG. 83.

FIG. 81 is a ray diagram of incident light from an adjacent well. FIG. 82 illustrates a distribution of contrast formed in an image capturing region IM10 due to the light illustrated in FIG. 81. FIG. 83 is a ray diagram with the image capturing region slightly shifted in the illustration direction from the state illustrated in FIG. 81. FIG. 84 illustrates a distribution of contrast formed in an image capturing region IM11 due to the light illustrated in FIG. 83. Note that, in FIGS. 82 and 84, a region R1 indicates a region with fulfillment of oblique illumination.

As illustrated in FIGS. 81 to 84, at the time of observation of the on-axis well, the observation apparatus 600 performs image capturing two times with the illumination direction remaining constant while moving the image capturing region to the image capturing region IM10 and the image capturing region IM11. Thus, as illustrated in FIG. 80, a wide range with oblique illumination can be achieved.

FIGS. 85A to 85D are explanatory views for the order of image capturing in the observation apparatus 600. FIG. 86 is an explanatory view for contrast acquired based on a well in each even line and contrast acquired based on a well in each odd line in the observation apparatus 600. Each well in each even line and each well in each odd line in the observation apparatus 600 are different in acquirable contrast.

Figure 85:
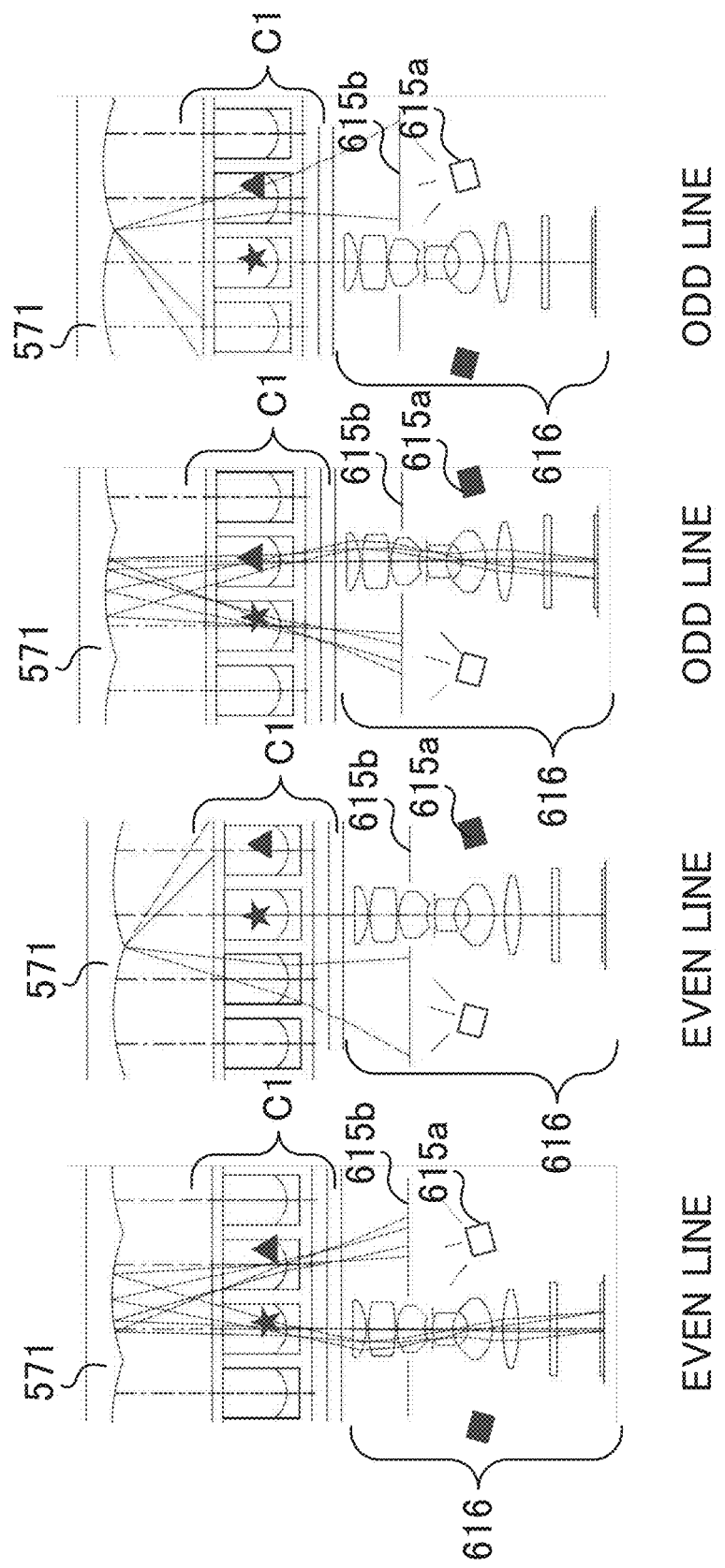
FIGS. 85A to 85D are explanatory views for the order of image capturing in the observation apparatus.
Figure 86:
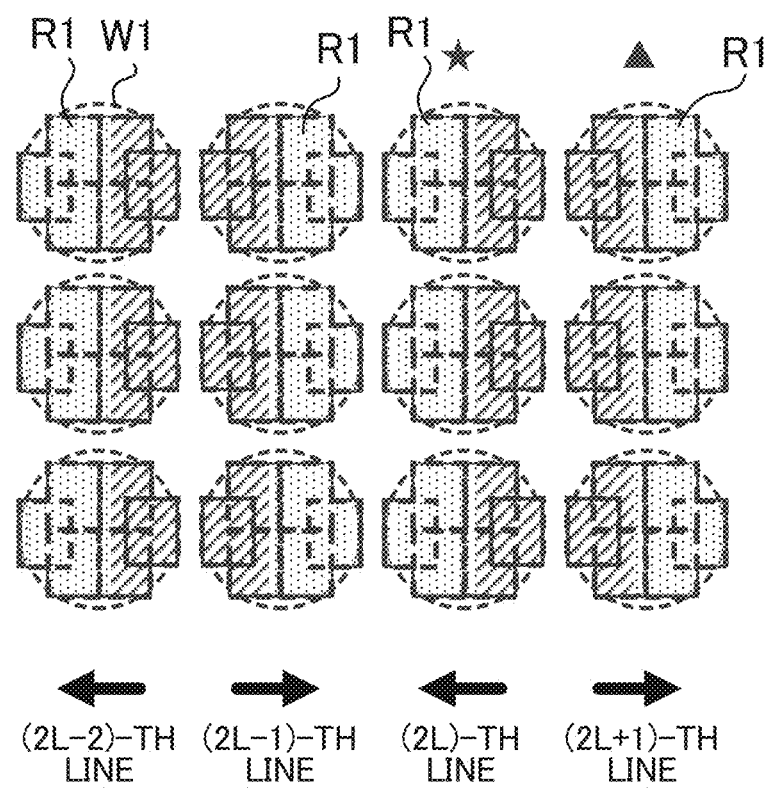
FIG. 86 is an explanatory view for contrast acquired based on a well in each even line and contrast acquired based on a well in each odd line in the observation apparatus.

Specifically, as illustrated in FIGS. 85A and 85B, in observation of the on-axis well in an even line, oblique illumination is fulfilled due to illumination from the right side. However, no oblique illumination is fulfilled even with illumination from the left side. In contrast, as illustrated in FIGS. 85C and 85D, in observation of the on-axis well in an odd line, oblique illumination is fulfilled due to illumination from the left side. However, no oblique illumination is fulfilled even with illumination from the right side. Thus, image capturing with a switch in the illumination direction is not required to the same well. Illumination in the respective directions previously determined to even and odd lines enables observation of a wide range of each well with oblique illumination as illustrated in FIG. 86.

Seventh Embodiment

Figure 87:
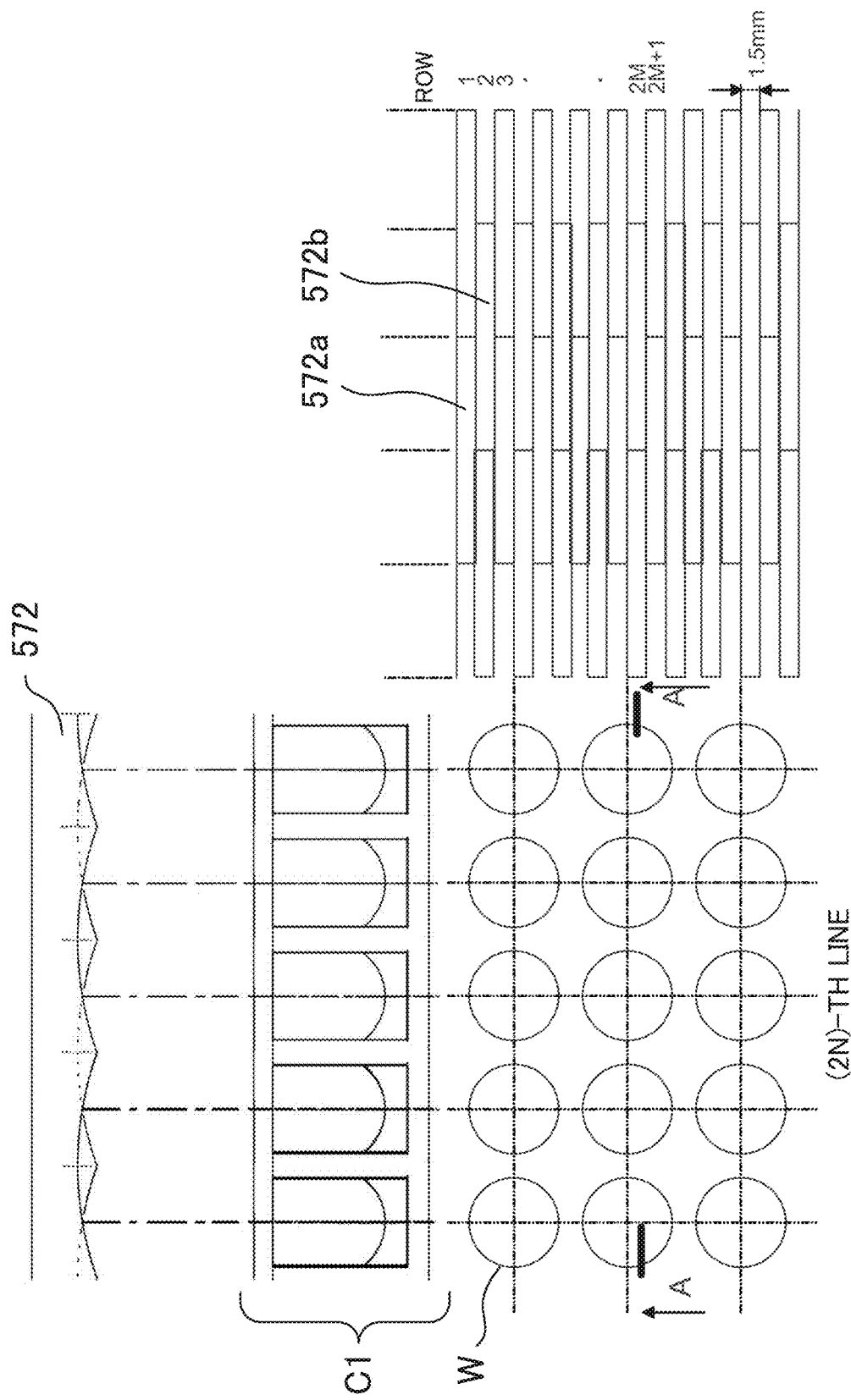
FIG. 87 is an explanatory view for the configuration of an observation apparatus according to a seventh embodiment.

FIG. 87 is an explanatory view for the configuration of an observation apparatus 700 according to the present embodiment. The reflective face of a reflector 572 of the observation apparatus 700 has six divisions per well in the axial direction (X direction) of cylindrical faces. Such six divided reflective faces each have a width of 1.5 mm and include three reflective faces 572a and three reflective faces 572b, the reflective faces 572a each having its center position of curvature different by one well from those of the reflective faces 572b. As illustrated in FIG. 87, the reflective faces 572a and the reflective faces 572b are disposed alternately in the axial direction.

Note that specifications of an observation optical system, specifications of a multi-well plate C1, the state of culture fluid in each well, and parameters regarding installation conditions of the reflector 572 in the observation apparatus 700 are similar to those in the sixth embodiment.

Figure 88:
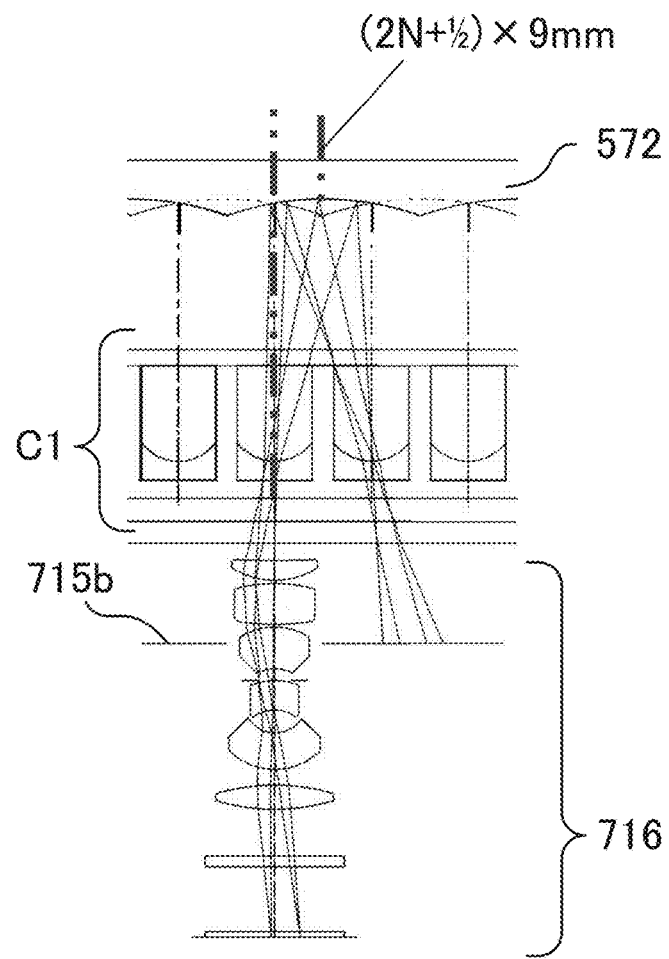
FIG. 88 is a ray diagram of incident light from an adjacent well.
Figure 89:
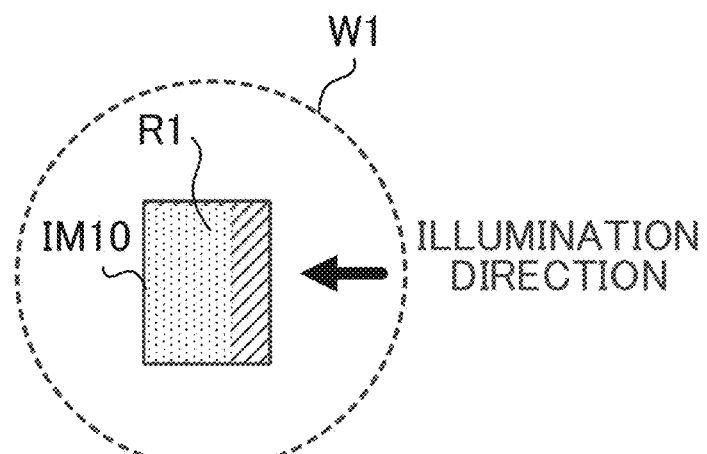
FIG. 89 illustrates a distribution of contras formed in an image capturing region due to the light illustrated in FIG. 88.
Figure 90:
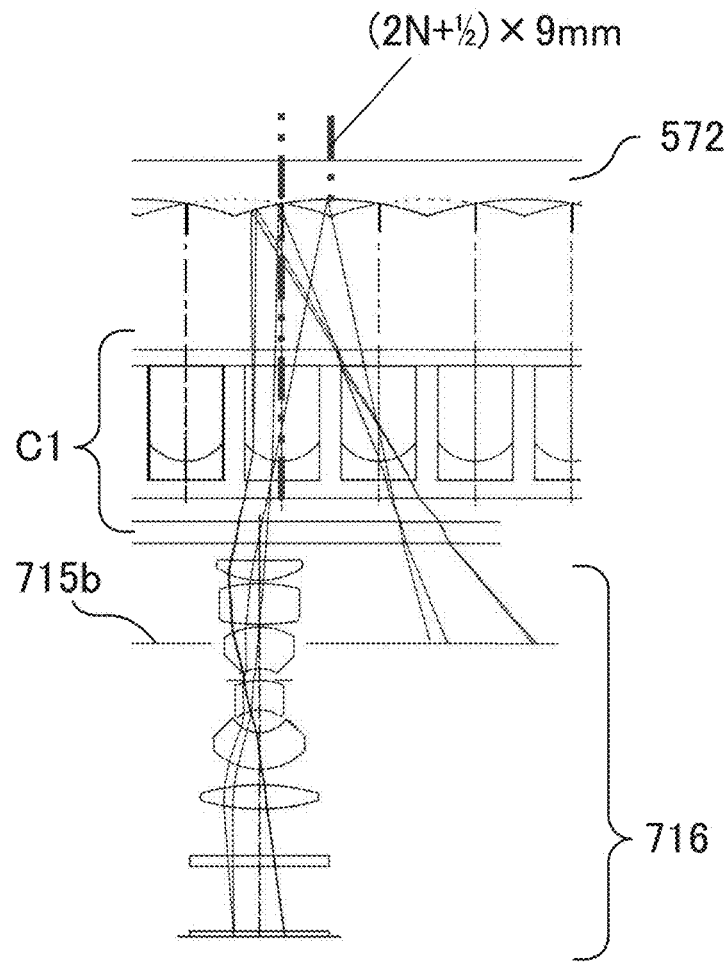
FIG. 90 is a ray diagram with the image capturing region slightly shifted in the illumination direction from the state illustrated in FIG. 88.
Figure 91:
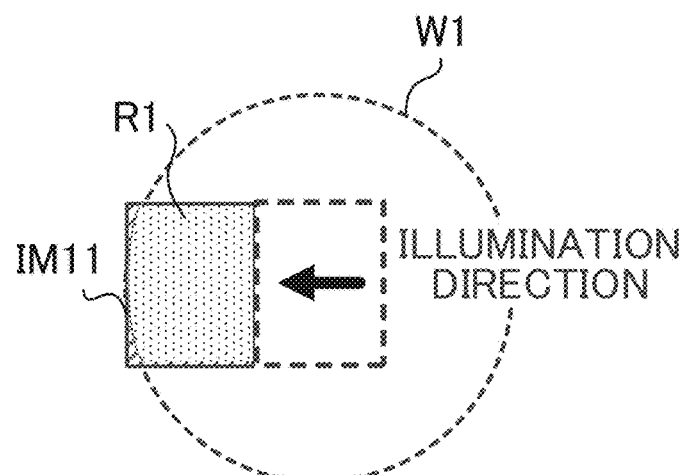
FIG. 91 illustrates a distribution of contrast formed in an image capturing region due to the light illustrated in FIG. 90.
Figure 92:
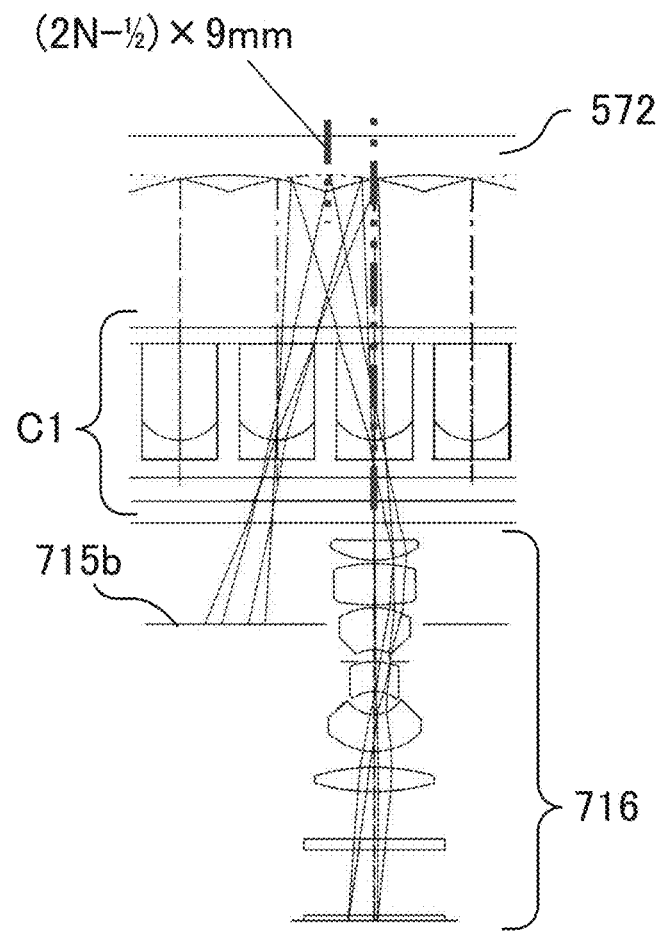
FIG. 92 is a ray diagram of incident light from the adjacent well opposite the adjacent well in FIG. 88.
Figure 93:
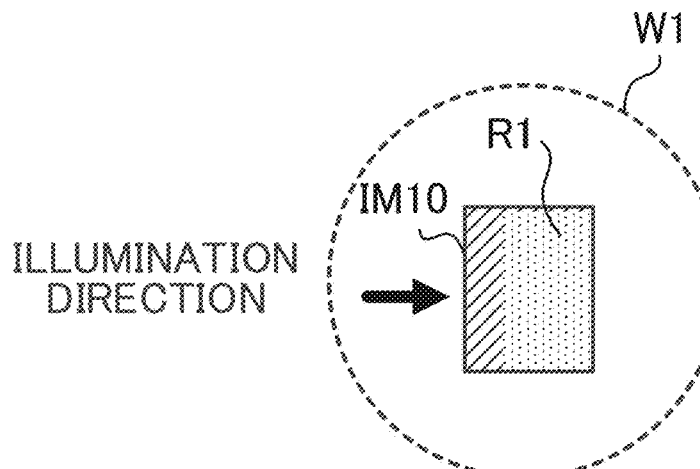
FIG. 93 illustrates a distribution of contrast formed in the image capturing region due to the light illustrated in FIG. 92.
Figure 94:
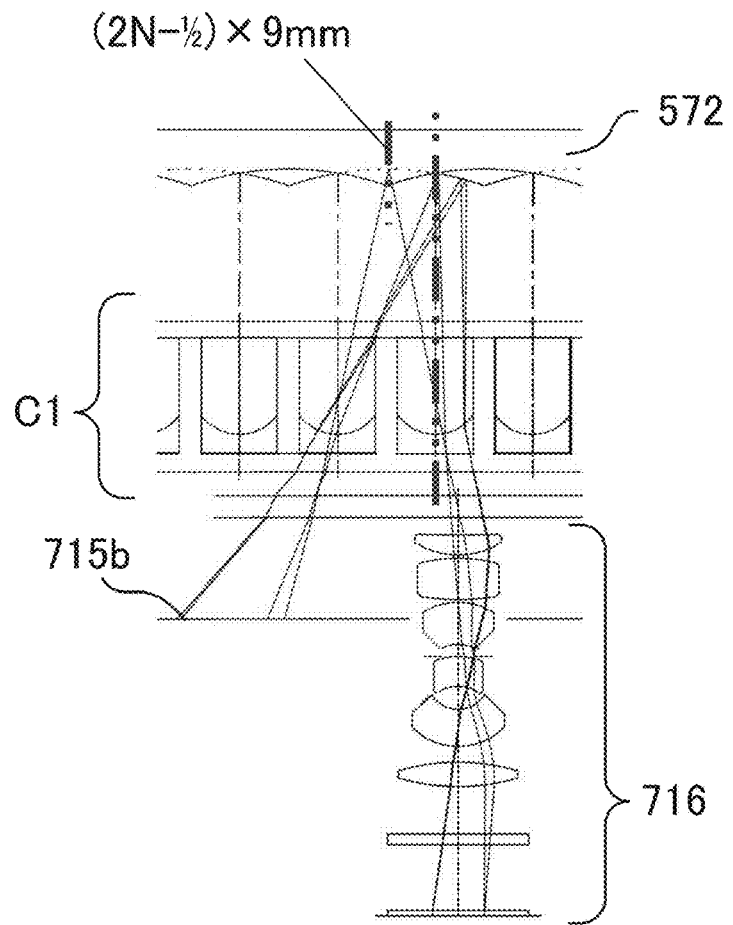
FIG. 94 is a ray diagram with the image capturing region slightly shifted in the illumination direction from the state illustrated in FIG. 92.
Figure 95:
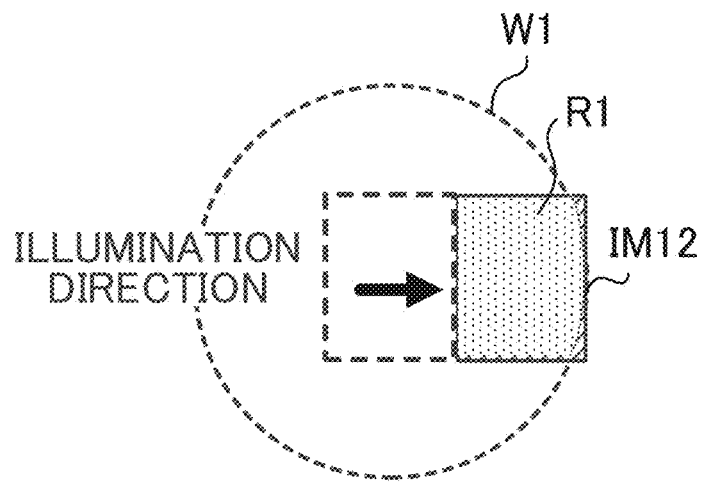
FIG. 95 illustrates a distribution of contrast formed in an image capturing region due to the light illustrated in FIG. 94.
Figure 96:
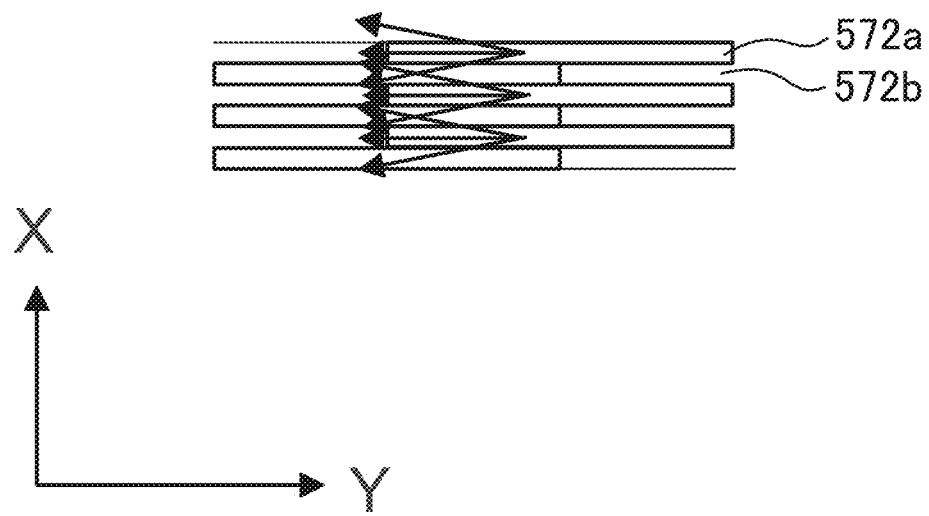
FIG. 96 is an explanatory view for the function of two types of reflective faces of a reflector.
Figure 97:
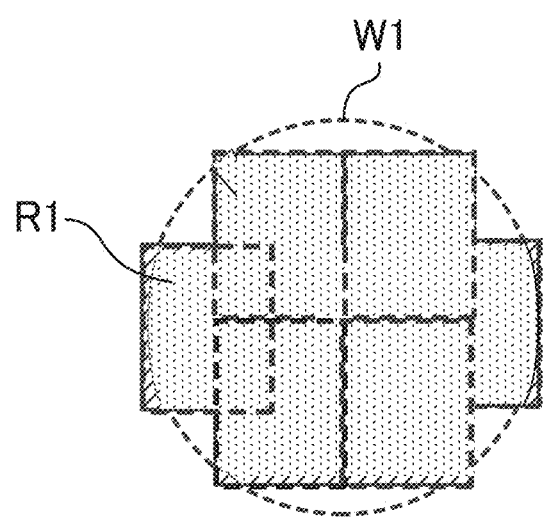
FIG. 97 illustrates a distribution of contrast acquired by the observation apparatus.

FIG. 88 is a ray diagram of incident light from an adjacent well. FIG. 89 illustrates a distribution of contrast formed in an image capturing region IM10 due to the light illustrated in FIG. 88. FIG. 90 is a ray diagram with the image capturing region slightly shifted in the illumination direction from the state illustrated in FIG. 88. FIG. 91 illustrates a distribution of contrast formed in an image capturing region IM11 due to the light illustrated in FIG. 90. FIG. 92 is a ray diagram of incident light from the adjacent well opposite the adjacent well in FIG. 88. FIG. 93 illustrates a distribution of contrast formed in the image capturing region IM10 due to the light illustrated in FIG. 92. FIG. 94 is a ray diagram with the image capturing region slightly shifted in the illumination direction from the state illustrated in FIG. 92. FIG. 95 illustrates a distribution of contrast formed in an image capturing region IM12 due to the light illustrated in FIG. 94. FIG. 96 is an explanatory view for the function of two types of reflective faces of the reflector 572. FIG. 97 illustrates a distribution of contrast acquired by the observation apparatus 700. Note that, in FIGS. 89, 91, 93, 95, and 97, a region R1 indicates a region with fulfillment of oblique illumination.

As illustrated in FIGS. 88 to 91, the observation apparatus 700 performs image capturing two time with illumination from the right side while moving the image capturing region to the image capturing region IM10 and the image capturing region IM11. Furthermore, as illustrated in FIGS. 92 to 95, the same well is captured two times with illumination from the left side due to a switch in the illumination direction while the image capturing region is being moved to the image capturing region IM10 and the image capturing region IM12.

As illustrated in FIG. 96, with the reflected light, from the reflector 572, widened in the X direction due to the two types of reflective faces (reflective faces 572a and 572b) side by side alternately, the well can be illuminated. Thus, totally four times of image capturing with the left illumination and the right illumination enables observation of an almost entire region in the well with oblique illumination, as illustrated in FIG. 97.

In the sixth and seventh embodiments, the examples in which Expression (151) is satisfied have been given. However, with the second type, the following conditional expression may be satisfied.

$$\frac{D_b}{2} > \frac{\left(\frac{AH_w}{n_w}+1\right)N_a}{A} \tag{160}$$

In this case, conditions for widening negatively the range of oblique illumination to the coordinate $Y_{sWide\pm}$ are as follows.

$$H_{mLU-RBWide\pm} < H_m < H_{mWideC} \tag{161}$$

$$R_{RBWideC} < R < R_{LUWideC} \tag{162}$$

Note that the definition of each parameter is as follows and results from calculation with substitution of the coordinate $Y_{sWide\pm}$ of $H_{mWide-}$ in the height $H_{mWideC}$ for $Y_s$. The coordinates $Y_{sWide\pm}$ corresponds to the coordinate of $H_{mWide-}$ in the height $H_{mWideC}$.

$$H_{mLu-RBWide\pm} = \frac{2\left\{\frac{H_w}{n_w}+\left(\frac{AH_w}{n_w}+1\right)(H_b-H_w)\right\}N_a(PA-2N_a)+N_a(12P-2D_u)+3PA(2P-D_u)}{2\left(\frac{AH_w}{n_w}+1\right)N_a(2N_a-PA)+\frac{(2N_a+3PA)\left\{D_u\left(\frac{AH_w}{n_w}+1\right)+D_b\right\}}{\frac{H_w}{n_w}+\left(\frac{AH_w}{n_w}+1\right)(H_b-H_w)}} \tag{163}$$

$$R_{LUWide\pm} = \frac{H_m\left[kP-2Y_s\{1+A(H_b-H_w+H_m)\}-2N_a\left\{\frac{H_w}{n_w}+\left(\frac{AH_w}{n_w}+1\right)(H_b-H_w+H_m)\right\}\right]}{kP-\frac{D_u}{2}-Y_s\{1+A(H_b-H_w+2H_m)\}-N_a\left\{\frac{H_w}{n_w}+\left(\frac{AH_w}{n_w}+1\right)(H_b-H_w+2H_m)\right\}} \tag{164}$$

$$R_{RBWide\pm} = \frac{\frac{kP}{2\left(\frac{AH_w}{n_w}+1\right)}-Y_s\left\{\frac{1+A(H_b-H_w+H_m)}{\left(\frac{AH_w}{n_w}+1\right)}\right\}-N_a\left\{\frac{H_w}{n_w\left(\frac{AH_w}{n_w}+1\right)}+(H_b-H_w+H_m)\right\}}{\frac{kP\left(\frac{AH_w}{n_w}+1\right)+\frac{D_b}{2}-Y_s}{2\left(\frac{AH_w}{n_w}+1\right)\left\{\frac{H_w}{n_w}+(H_b-H_w+H_m)\left(\frac{AH_w}{n_w}+1\right)\right\}}-\frac{Y_sA}{\left(\frac{AH_w}{n_w}+1\right)}-N_a} \tag{165}$$

Note that the coordinate $Y_{sWide\pm}$ is as follows.

$$Y_{sWide\pm} = \frac{-4N_aP\left(\frac{AH_w}{n_w}+1\right)}{3AP+2N_a} \tag{166}$$

Furthermore, with the range of oblique illumination widened to the coordinate $Y_{sWide+}$ as described above with the second type, desirably, the following condition is satisfied. Thus, the range of oblique illumination can be widened to the positive limit $Y_{sORU}$.

$$H_{mWOLU-RB} < H_m < H_{mWideORU} \tag{167}$$

Note that $H_{mWideORU}$ and $H_{mWOLU-RB}$ are as follows.

$$H_{mWideORU} \equiv \frac{(3-P)\{1+A(H_b-H_w)\}}{2N_a+D_uA} \tag{168}$$

$$H_{mWOLU-RB} = \frac{(2\{1+A(H_b-H_w)\}PA+2N_a)(3P-D_u))}{\frac{[(3PA+2N_a)\{D_u+D_b(1+A(H_b-H_w))\}]}{\frac{H_w}{n_w}+\left(\frac{AH_w}{n_w}+1\right)(H_b-H_w)}+2\{D_uA(PA+2N_a)-N_a(PA-2N_a)\}} \tag{169}$$

For the widest range of oblique illumination, the height of location of the reflector 570 is desirably the height $H_{mWideBest}$ at the intersection of $H_{mLU-RB}$ and $H_{mWide-}$ ($H_m = H_{mWideBest}$), and the radius of curvature R is desirably $R_{WideBest}$. In this case, the minimum value of the coordinate $Y_s$ with fulfillment of oblique illumination is $Y_{sWideBest}$.

$$H_{mWideBest} \equiv \frac{\left\{\frac{H_w}{n_w} + \left(\frac{AH_w}{n_w} + 1\right)(H_b - H_w)\right\}(3P - D_u)}{D_u\left(\frac{AH_w}{n_w} + 1\right) + D_b} \quad (170)$$

$$R_{WideBest} \equiv \frac{4P\left[3PA\left\{\frac{H_w}{n_w} + \left(\frac{AH_w}{n_w} + 1\right)(H_b - H_w)\right\} + D_u + D_b\{1 + A(H_b - H_w)\}\right]}{\left(D_u\left(\frac{AH_w}{n_w} + 1\right) + D_b\right)\left[\frac{D_u + D_b\{1 + A(H_b - H_w)\}}{\frac{H_w}{n_w} + \left(\frac{AH_w}{n_w} + 1\right)(H_b - H_w)} + 4PA - 2N_a\right]} \quad (171)$$

$$Y_{sWideBest} \equiv \frac{-N_a\left\{\frac{H_w}{n_w} + \left(\frac{AH_w}{n_w} + 1\right)(H_b - H_w)\right\}\left\{3P\left(\frac{AH_w}{n_w} + 1\right) + D_b\right\} - \frac{P}{2}\left\{D_u\left(\frac{AH_w}{n_w} + 1\right) + D_b\right\}}{3AP\left\{\frac{H_w}{n_w} + \left(\frac{AH_w}{n_w} + 1\right)(H_b - H_w)\right\} + D_u + D_b\{1 + A(H_b - H_w)\}} \quad (172)$$

In a case where the conditions for widening positively and negatively the range of oblique illumination described above are applied to a 96-well plate, the height of location of the reflector 570 and the radius of the reflector 570, satisfying the following conditions in which $N_a$ is smaller than 0.22, enable oblique illumination to $Y_{sWide\pm}$ short of $-D_b/2$ on the minus side.

$$\frac{-10.1N_a^2 + 24.8N_a + 5.2}{N_a^2 + 0.23N_a + 0.59} < H_m < \frac{12.2}{N_a} - 10.1 \quad (173)$$

$$\frac{4.2 + 23.9N_a + 0.34N_aH_m - 10.1N_a^2 - N_a^2\, H_m}{\frac{5.56 + 13.6N_a}{10.1 + H_m} + 0.34N_a - N_a^2} < R < \frac{H_m(12.2 + 69, 5N_a + N_aH_m - 2.91N_a^2\, H_m - 29.5N_a^2)}{7.55 + 36.2N_a + N_aH_m - 2.91N_a^2\, H_m - 14.7N_a^2} \quad (174)$$

Note that, in this case, $Y_{sWide\pm}$ is as follows.

$$Y_{sWide\pm} = \frac{-19.94N_a}{1 + N_a} \quad (175)$$

Furthermore, the height of location of the reflector 570, satisfying the following condition, enables oblique illumination to $Y_{sORU}$.

$$\frac{33.7N_a + 11.6}{N_a^2 + 0.97N_a + 0.99} < H_m < \frac{16.9}{N_a + 0.26} \quad (176)$$

Furthermore, the height of location of the reflector 570 and the radius of curvature of the reflector 570, satisfying the following conditions, cause the widest range of oblique illumination.

$$H_{mWideBest} = 16 \quad (177)$$

$$R_{WideBest} = \frac{52.2}{2.16 - N_a} \quad (178)$$

In a case where the conditions for widening positively and negatively the range of oblique illumination described above are applied to a 384-well plate, the height of location of the reflector 570, satisfying the following conditions in which $N_a$ is smaller than 0.2, enable oblique illumination to $Y_{sWide\pm}$ short of $-D_b/2$ on the minus side.

$$\frac{-10.1N_a^2 + 24.8N_a + 5.2}{N_a^2 + 0.23N_a + 0.59} < H_m < \frac{5.6}{N_a} - 10.3 \tag{179}$$

$$\frac{1.93 + 12.9N_a + 0.34N_aH_m - 10.3N_a^2 - N_a^2\ H_m}{\frac{2.49 + 6.14N_a}{10.3 + H_m} + 0.34N_a - N_a^2} < R < \frac{H_m(5.59 + 37.4N_a + N_aH_m - 2.9N_a^2\ H_m - 30N_a^2)}{3.23 + 19.1N_a + N_aH_m - 2.9N_a^2\ H_m - 15N_a^2} \tag{180}$$

Note that, in this case, $Y_{sWide\pm}$ is as follows.

$$Y_{sWide\pm} = \frac{-10.9N_a}{1 + N_a} \tag{181}$$

Furthermore, the height of location of the reflector 570, satisfying the following condition, enables oblique illumination to $Y_{sORU}$.

$$\frac{23.4N_a + 8.04}{N_a^2 + 0.7N_a + 0.677} < H_m < \frac{11.7}{N_a + 0.29} \tag{182}$$

Furthermore, the height of location of the reflector 570 and the radius of curvature of the reflector 570, satisfying the following conditions, cause the widest range of oblique illumination.

$$H_{mLu-RB-WideBest} = 15.5 \tag{183}$$

$$R_{mLu-RB-WideBest} = \frac{43}{1.84 - N_a} \tag{184}$$

Eighth Embodiment

Figure 98:
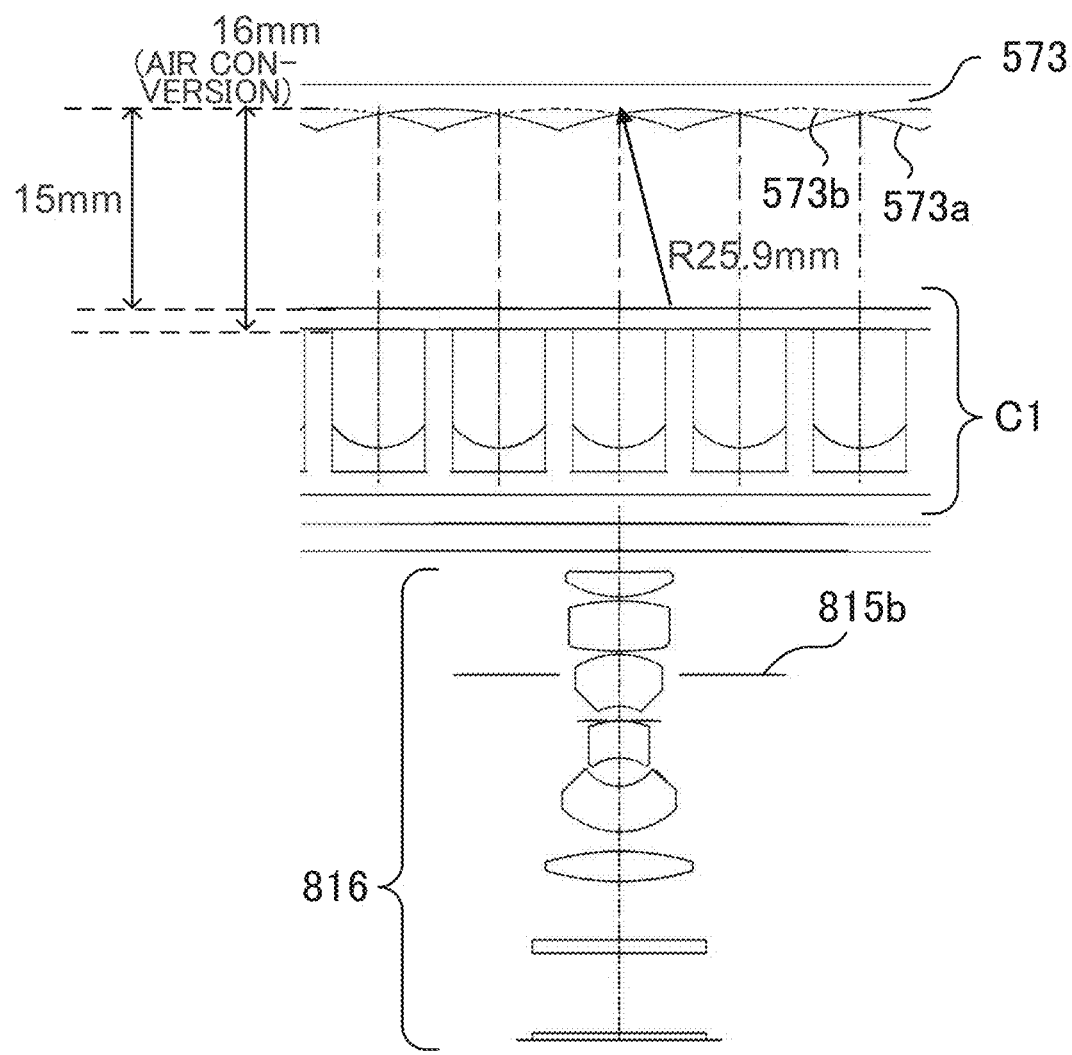
FIG. 98 is an explanatory view for the configuration of an observation apparatus according to an eighth embodiment.

FIG. 98 is an explanatory view for setting in an observation apparatus 800 according to the present embodiment. The configuration and setting of the observation apparatus 800 will be described below with reference to FIG. 98.

The observation apparatus 800 serves as an apparatus for observation of a sample in a multi-well plate C1 and achieves oblique illumination mainly with incident light from an adjacent well (k=1). The observation apparatus 800 has a configuration similar to that of the observation apparatus 10 and includes, as illustrated in FIG. 98, an illumination optical system, a reflector 573 that reflects light emitted from the illumination optical system, and an observation optical system 816 that condenses the light reflected by the reflector 573. The illumination optical system includes a light source and a diffusing plate 815b.

The illumination optical system and the observation optical system 816 are provided below the installation position of the multi-well plate C1. In contrast to this, the reflector 573 is provided above the installation position of the multi-well plate C1. The reflector 573 serves as a curved mirror, particularly, a curved mirror of the second type described above and is installed such that an on-axis marginal ray to enter the observation optical system 816 travels via an adjacent well before reflection due to the reflector 573.

Like the reflective face of the reflector 572 of the observation apparatus 700, the reflective face of the reflector 573 of the observation apparatus 800 has six divisions per well in the axial direction (X direction) of cylindrical faces. Such six divided reflective faces each have a width of 1.5 mm and include three reflective faces 573a and three reflective faces 573b, the reflective faces 573a each having its center position of curvature different by one well from those of the reflective faces 573b. The reflective faces 573a and the reflective faces 573b are disposed alternately in the axial direction.

In the observation apparatus 800, as illustrated in FIG. 98, specifications of the observation optical system 816, specifications of the multi-well plate C1, the state of culture fluid in each well, and parameters regarding installation conditions of the reflector 573 are as follows. Note that the multi-well plate C1 serves as a 96-well plate. The thickness of the lid of the multi-well plate C1 is 1.5 mm and is 1.0 mm resulting from air conversion.

$N_a$=0.15, P=9 mm, $D_u$=6.9 mm, $D_b$=6.4 mm, $n_w$=1.332, $A_{c2}$=0.11497/mm, A=0.0763/mm, $H_b$=10.7 mm, $H_w$=1.8 mm, $H_m$=16 mm, and R=25.9 mm.

In this case, in the observation apparatus 800, the values of parameters related to various types of conditions are as follows.

$N_{aCORU}$=0.31, $H_{mCLU-RB}$=4.9 mm, $H_{mWideC}$=71.5 mm, $H_{mLUC}$=11.7 mm, $H_{mRBC}$=25.8 mm, $R_{LUC}$=−3.99 mm, $R_{RBC}$=2.84 mm, $H_{mLU-BR-WideC}$=13.5 mm, $R_{LUWideC}$=26.7 mm, $R_{RB}$=25.1 mm, $H_{mWideORU}$=40.8 mm, $H_{mwORU-RB}$=14.3 mm, $H_{mWideBest}$=16 mm, $R_{WideBest}$=25.9 mm, $Y_{sORU}$=1.1 mm, $Y_{sWide\pm}$=−2.5 mm, $Y_{sWideORU}$=−2.7 mm, and $Y_{sWideBest}$=−3 mm.

Therefore, the observation apparatus 800 satisfies the conditions for oblique illumination of at least the center of a well, the conditions for widening negatively the range of oblique illumination, and the condition for widening positively the range of oblique illumination, enabling favorable observation of the sample in a well with high contrast.

Figure 99:
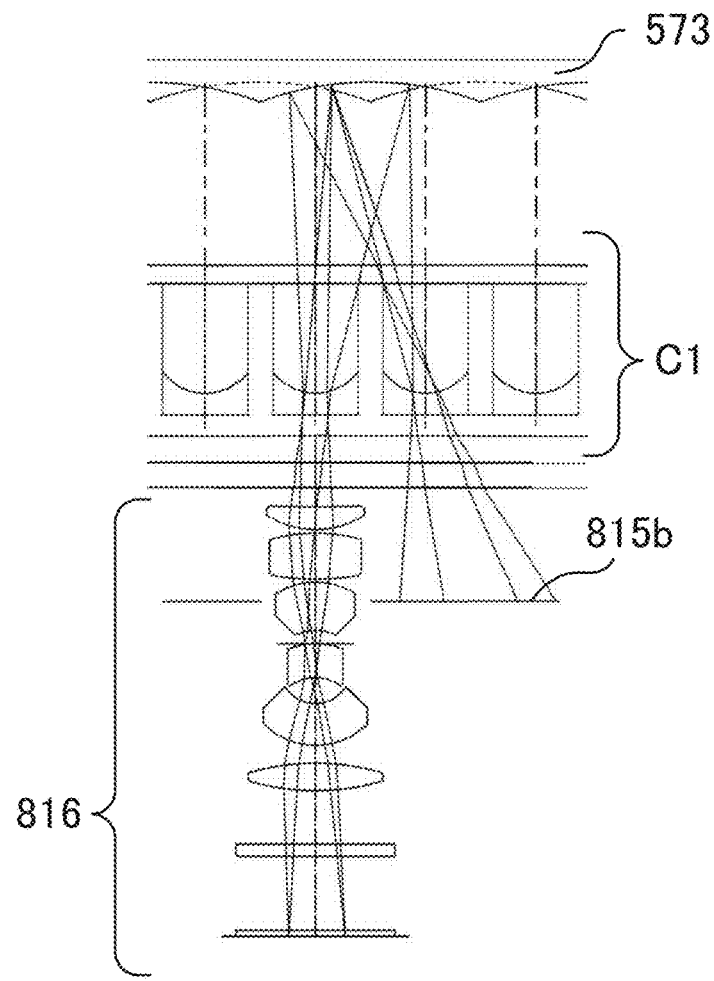
FIG. 99 is a ray diagram of incident light from an adjacent well.
Figure 100:
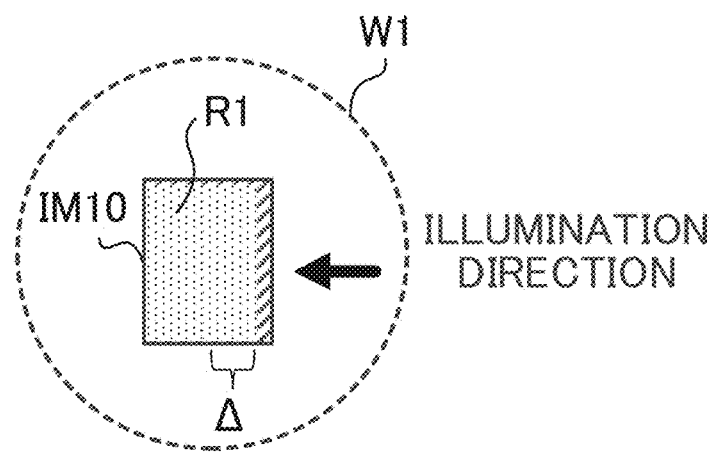
FIG. 100 illustrates a distribution of contrast formed in an image capturing region due to the light illustrated in FIG. 99.
Figure 101:
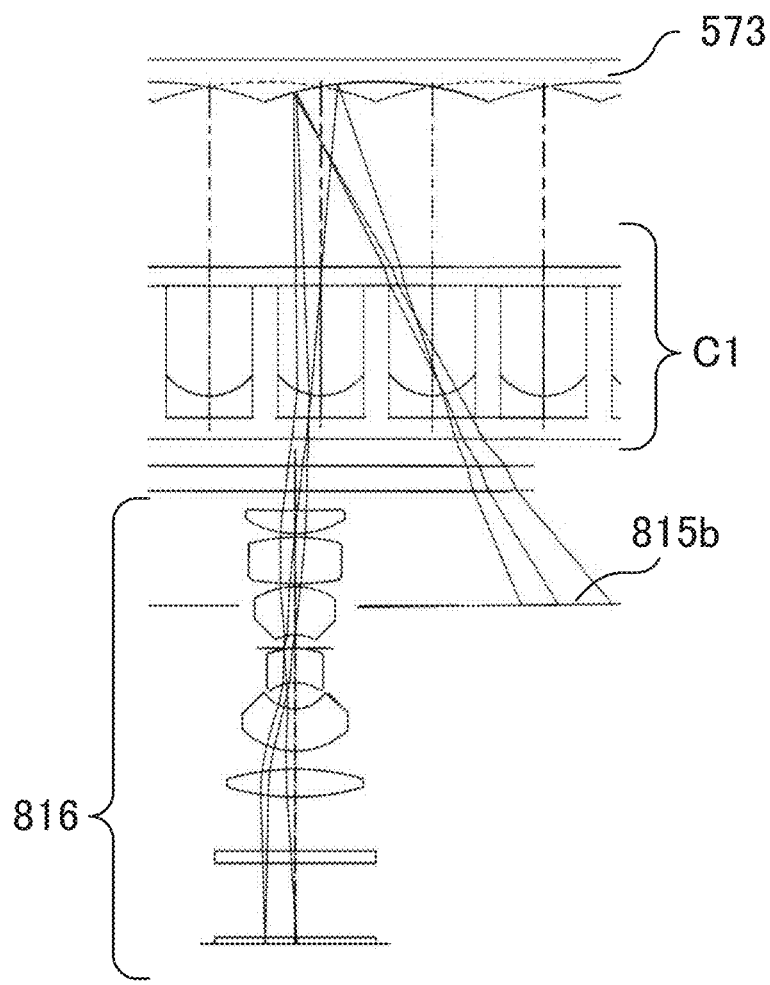
FIG. 101 is a ray diagram with the image capturing region slightly shifted in the illumination direction from the state illustrated in FIG. 99.
Figure 102:
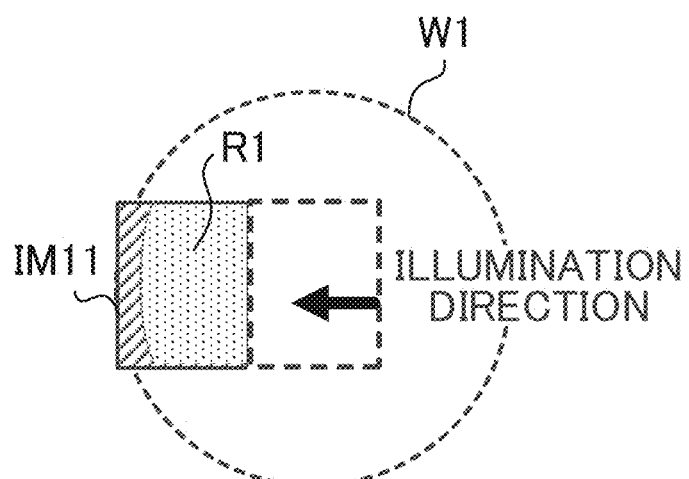
FIG. 102 illustrates a distribution of contrast formed in an image capturing region due to the light illustrated in FIG. 101.
Figure 103:
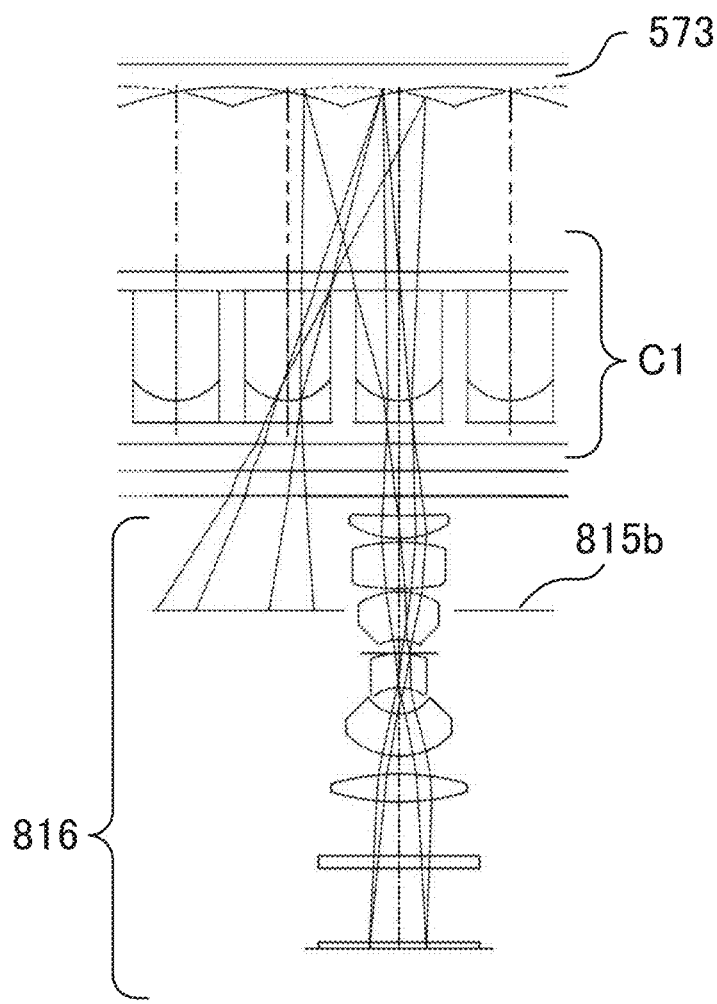
FIG. 103 is a ray diagram of incident light from the adjacent well opposite the adjacent well in FIG. 99.
Figure 104:
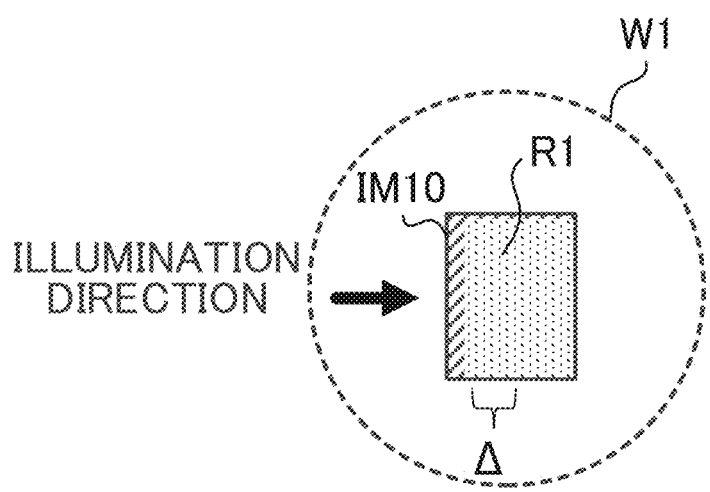
FIG. 104 illustrates a distribution of contrast formed in the image capturing region due to the light illustrated in FIG. 103.
Figure 105:
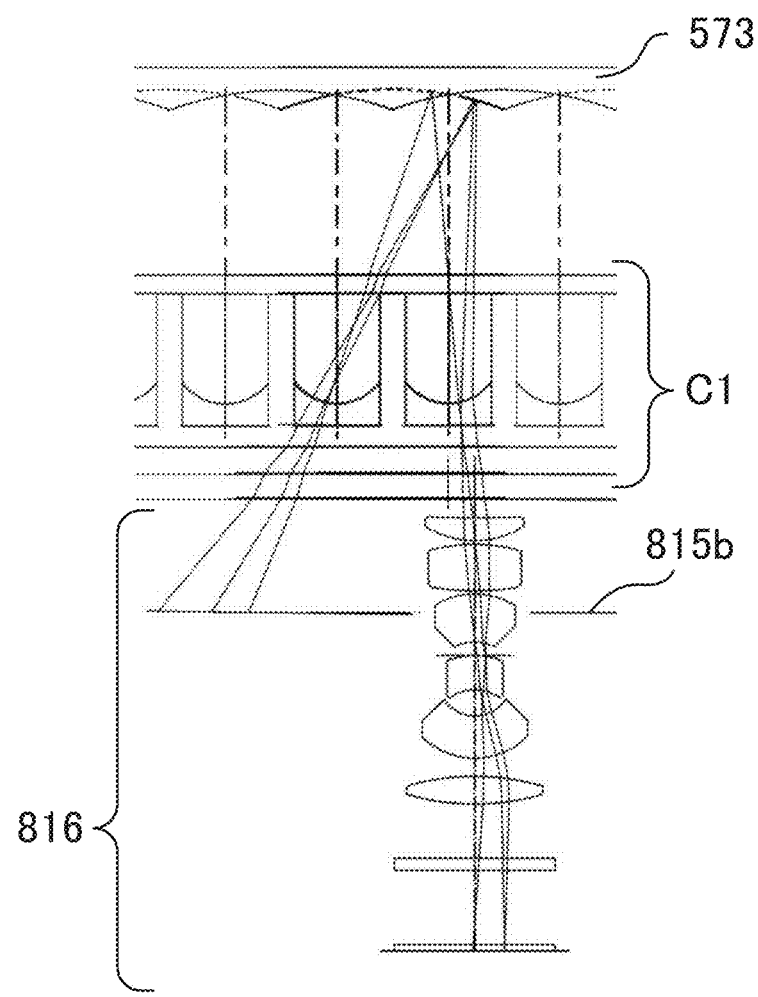
FIG. 105 is a ray diagram with the image capturing region slightly shifted in the illumination direction from the state illustrated in FIG. 103.
Figure 106:
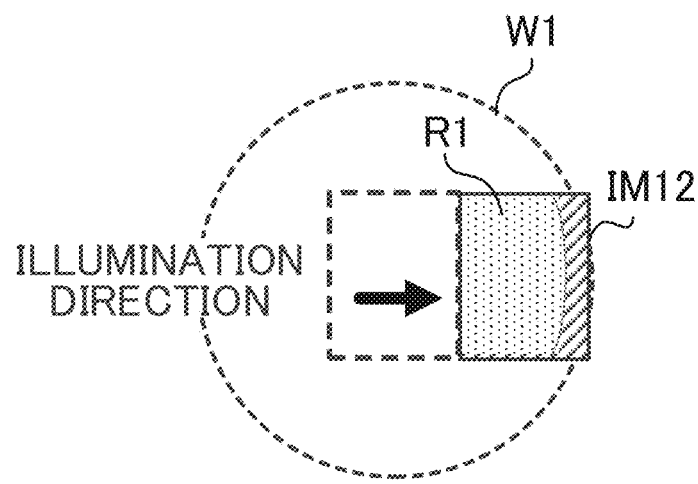
FIG. 106 illustrates a distribution of contrast formed in an image capturing region due to the light illustrated in FIG. 105.

FIG. 99 is a ray diagram of incident light from an adjacent well. FIG. 100 illustrates a distribution of contrast formed in an image capturing region IM10 due to the light illustrated in FIG. 99. FIG. 101 is a ray diagram with the image capturing region slightly shifted in the illumination direction from the state illustrated in FIG. 99. FIG. 102 illustrates a distribution of contrast formed in an image capturing region IM11 due to the light illustrated in FIG. 101. FIG. 103 is a ray diagram of incident light from the adjacent well opposite the adjacent well in FIG. 99. FIG. 104 illustrates a distribution of contrast formed in the image capturing region IM10 due to the light illustrated in FIG. 103. FIG. 105 is a ray diagram with the image capturing region slightly shifted in the illumination direction from the state illustrated in FIG. 103. FIG. 106 illustrates a distribution of contrast formed in an image capturing region IM12 due to the light illustrated in FIG. 105. Note that, in FIGS. 100, 102, 104, and 106, a region R1 indicates a region with fulfillment of oblique illumination.

As illustrated in FIGS. 99 to 102, the observation apparatus 800 performs image capturing two times with illumination from the right side while moving the image capturing region to the image capturing region IM10 and the image capturing region IM11. Furthermore, as illustrated in FIGS. 103 to 106, the same well is captured two times with illumination from the left side due to a switch in the illumination direction while the image capturing region is being moved to the image capturing region IM10 and the image capturing region IM12.

Thus, similarly to the seventh embodiment, with the reflected light, from the reflector 573, widened in the X direction due to the two types of reflective faces side by side alternately, the well is illuminated, so that an almost entire region in the well can be observed with oblique illumination. In comparison to the seventh embodiment, illumination of the center of the well enables the range of oblique illumination to be widened by A in the illumination direction.

Ninth Embodiment

Figure 107:
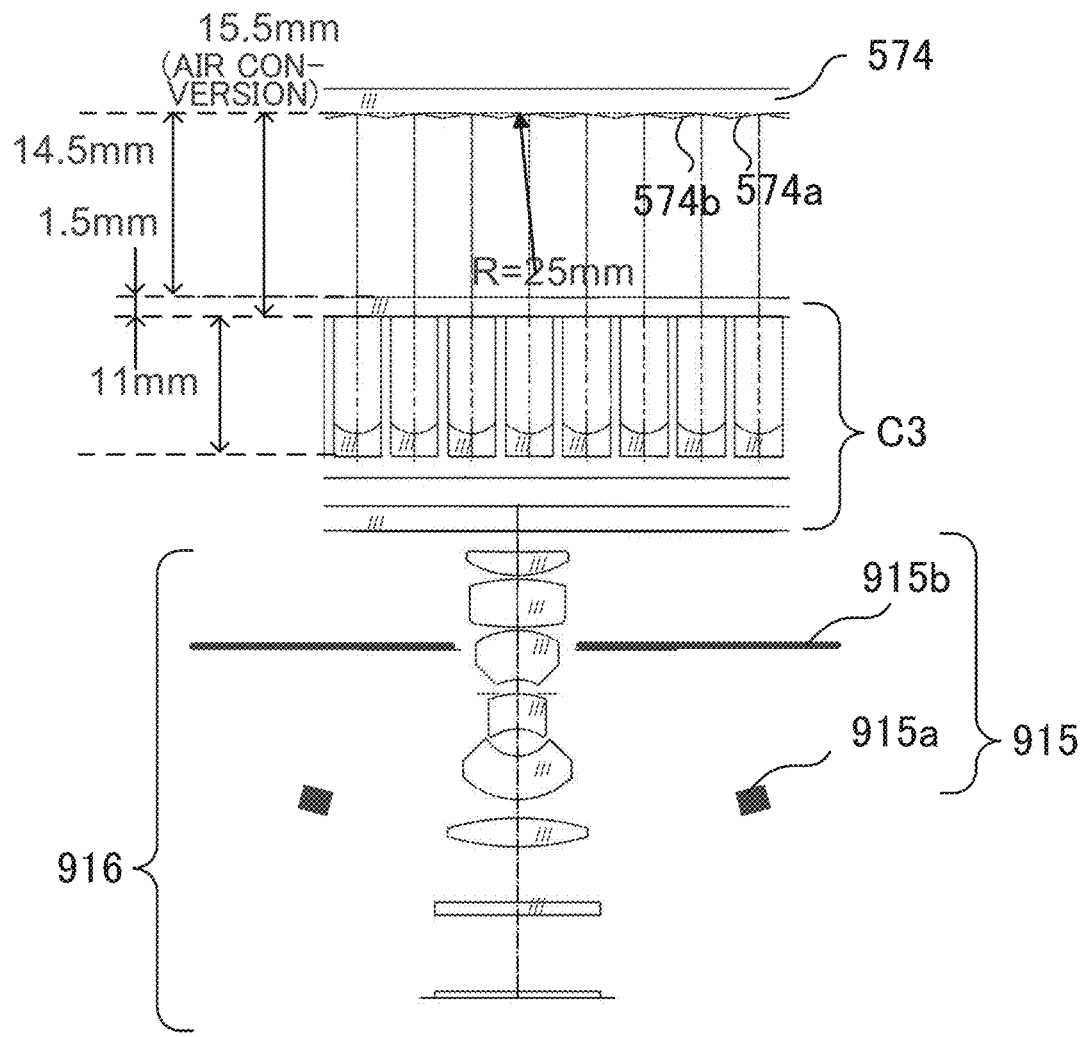
FIG. 107 is an explanatory view for the configuration of an observation apparatus according to a ninth embodiment.
Figure 108:
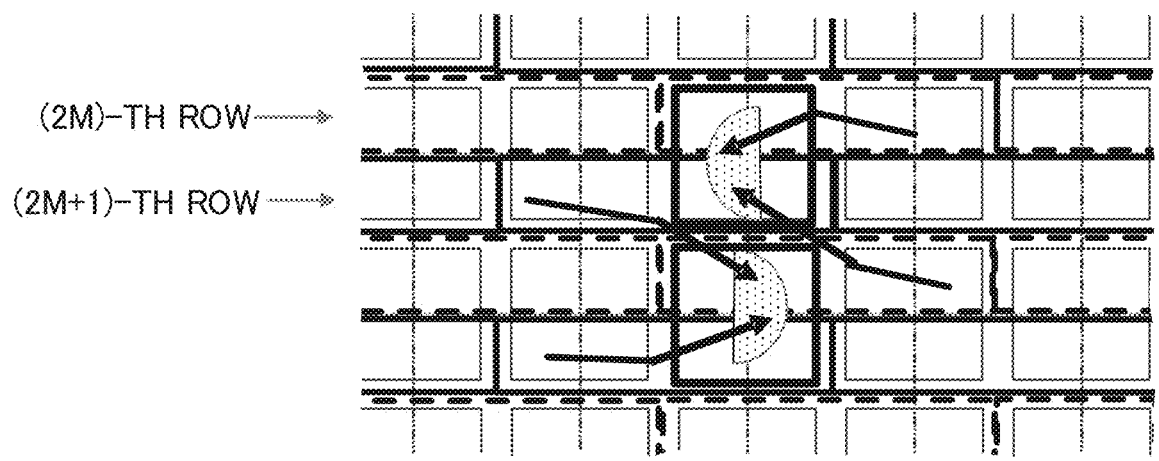
FIG. 108 is an explanatory view for an adjacent well via which illuminating light to enter the on-axis well travels.

FIG. 107 is an explanatory view for setting in an observation apparatus 900 according to the present embodiment. FIG. 108 is an explanatory view for an adjacent well via which illuminating light to enter the on-axis well travels. The configuration and setting of the observation apparatus 900 will be described below with reference to FIGS. 107 and 108.

The observation apparatus 900 serves as an apparatus for observation of a sample in a multi-well plate C3 and achieves oblique illumination mainly with incident light from an adjacent well (k=1). The observation apparatus 900 has a configuration similar to that of the observation apparatus 10 and includes, as illustrated in FIG. 107, an illumination optical system 915, a reflector 574 that reflects light emitted from the illumination optical system 915, and an observation optical system 916 that condenses the light reflected by the reflector 574. The illumination optical system 915 includes a light source 915a and a diffusing plate 915b.

The illumination optical system 915 and the observation optical system 916 are provided below the installation position of the multi-well plate C3. In contrast to this, the reflector 574 is provided above the installation position of the multi-well plate C3. The reflector 574 serves as a curved mirror, particularly, a curved mirror of the second type described above and is installed such that an on-axis marginal ray to enter the observation optical system 916 travels via an adjacent well before reflection due to the reflector 574. Specifically, as illustrated in FIG. 108, not only illuminating light from an adjacent well to the on-axis well in the illumination direction but also illuminating light from an obliquely adjacent well (well adjacent in the X direction to the adjacent well) enters the on-axis well.

The reflective face of the reflector 574 of the observation apparatus 900 has two divisions per well in the axial direction (X direction) of cylindrical faces. Such two divided reflective faces each have a width of 2.25 mm and include a reflective face 574a and a reflective face 574b, the reflective face 574a having its center position of curvature different by one well from that of the reflective face 574b. The reflective faces 574a and 574b are disposed alternately in the axial direction.

In the observation apparatus 900, as illustrated in FIG. 107, specifications of the observation optical system 916, specifications of the multi-well plate C3, the state of culture fluid in each well, and parameters regarding installation conditions of the reflector 574 are as follows. Note that the multi-well plate C3 serves as a 384-well plate. The thickness of the lid of the multi-well plate C3 is 1.5 mm and is 1.0 mm resulting from air conversion.

$N_a$=0.12, $P$=4.5 mm, $D_u$=3.8 mm, $D_b$=3.2 mm,
$n_w$=1.332, $A_{c2}$=0.2306/mm, $A$=0.1530/mm,
$H_b$=11 mm, $H_w$=1.8 mm, $H_m$=15.5 mm, and
$R$=25 mm.

In this case, in the observation apparatus 900, the values of parameters related to various types of conditions are as follows.

$N_{aCORU}$=0.15, $H_{mCLU-RB}$=2.4 mm, $H_{mWideC}$=36.3 mm, $H_{mLUC}$=3.8 mm, $H_{mRBC}$=9.8 mm,
$R_{LUC}$=13.6 mm, $R_{RBC}$=46.5 mm,
$H_{mLU-BR-WideC}$=13.5 mm, $R_{LUWideC}$=25.8 mm,
$R_{RBwideC}$=24.6 mm, $H_{mWideORU}$=28.4 mm,
$H_{mwORU-RB}$=14.04 mm, $H_{mLU-RB-WideBest}$=15.5 mm, $R_{WideBest}$=25 mm, $Y_{sORU}$=0.17 mm,
$Y_{sWide\pm}$=-1.13 mm, $Y_{sWideORU}$=-1.16 mm, and
$Y_{sWideBest}$=-1.25 mm.

Therefore, the observation apparatus 900 satisfies the conditions for oblique illumination of at least the center of a well, the conditions for widening negatively the range of oblique illumination, and the condition for widening positively the range of oblique illumination, enabling favorable observation of the sample in a well with high contrast.

Figure 109:
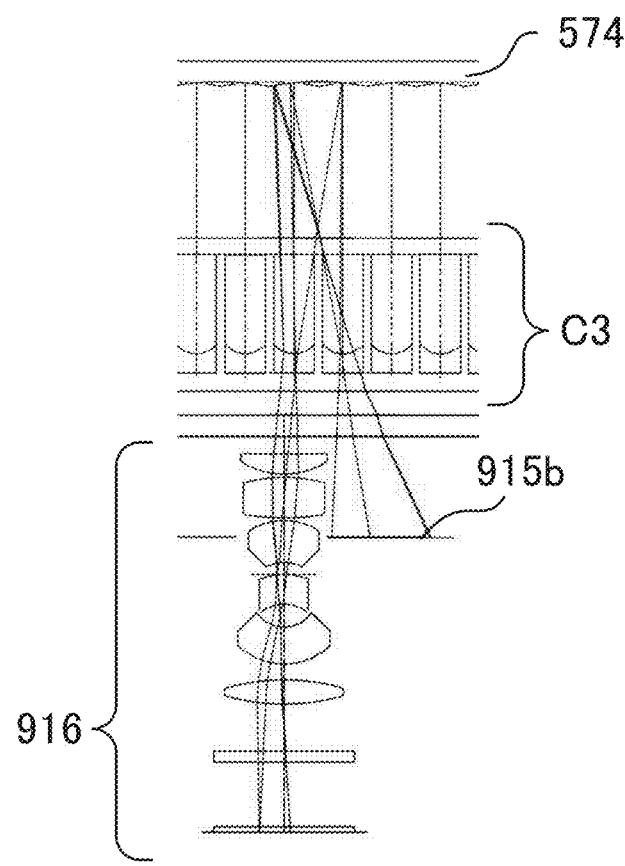
FIG. 109 is a ray diagram of incident light from an adjacent well.
Figure 110:
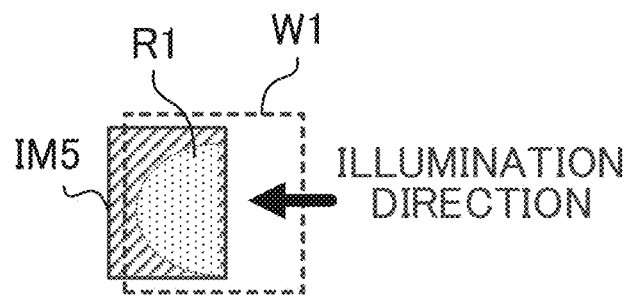
FIG. 110 illustrates a distribution of contrast formed in an image capturing region due to the light illustrated in FIG. 109.
Figure 111:
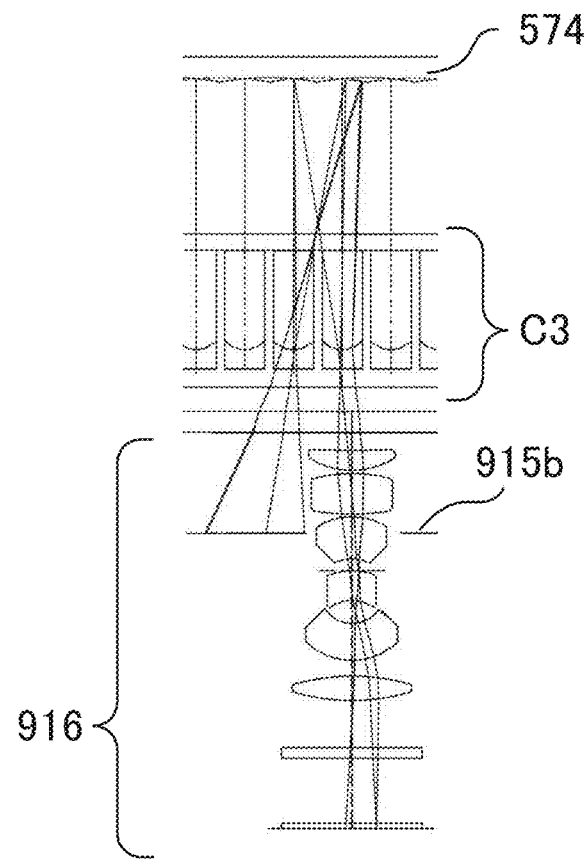
FIG. 111 is a ray diagram of incident light from the adjacent well opposite the adjacent well in FIG. 109.
Figure 112:
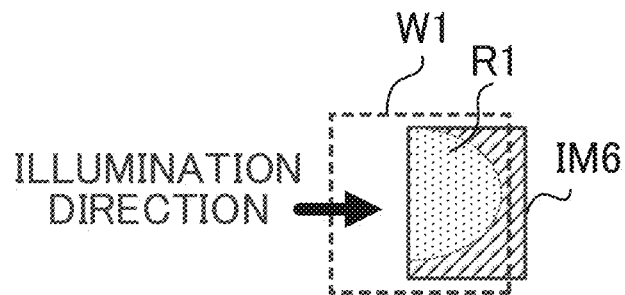
FIG. 112 illustrates a distribution of contrast formed in an image capturing region due to the light illustrated in FIG. 111.
Figure 113:
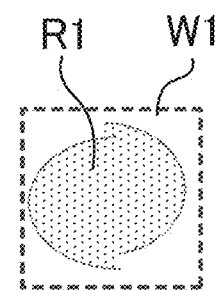
FIG. 113 illustrates a distribution of contrast acquired by the observation apparatus.

FIG. 109 is a ray diagram of incident light from an adjacent well. FIG. 110 illustrates a distribution of contrast formed in an image capturing region IM5 due to the light illustrated in FIG. 109. FIG. 111 is a ray diagram of incident light from the adjacent well opposite the adjacent well in FIG. 109. FIG. 112 illustrates a distribution of contrast formed in an image capturing region IM6 due to the light illustrated in FIG. 111. FIG. 113 illustrates a distribution of contrast acquired by the observation apparatus 900. Note that, in FIGS. 110, 112, and 113, a region R1 indicates a region with fulfillment of oblique illumination.

As illustrated in FIGS. 109 to 112, the observation apparatus 900 varies the image capturing region slightly in the illumination direction between the time of illumination from the right side and the time of illumination from the left side. That is, the image capturing region varies in response to a switch in the illumination direction. Thus, as illustrated in FIG. 113, a wide range (region R1) in the well can be observed with oblique illumination.

Next, the third type will be specifically described. For achievement of oblique illumination with a reflector 670 of the third type, the following expressions require simultaneously satisfying.

$$Y_{sOLU} < Y_s \qquad (185)$$

$$-D_b/2 < Y_s \qquad (186)$$

$$Y_{sASY} < Y_s \qquad (187)$$

$$Y_s < Y_{sORU} \qquad (188)$$

$$H_{mLU-RBSStp} < H_m \qquad (189)$$

$$H_{mStp-} < H_m < H_{mStp+} \qquad (190)$$

Height parameters and coordinate parameters are as follows. Note that the coordinate parameters are identical to those in the first type and those in the second type. The height parameters are derived based on substitution of 2 for k in the height $H_{mLU-RB}$, substitution of −0 for the effective range $Y_{m-}$ in $H_m Y_{m-}$, and substitution of 2P for the effective range $Y_{m+}$ in $H_m Y_{m+}$.

$$H_{mLu-RBStp} = \frac{2\left\{\frac{H_w}{n_w} + \left(\frac{AH_w}{n_w} + 1\right)(H_b - H_w)\right\}\left[2P - \frac{D_u}{2} - N_a\left\{\frac{H_w}{n_w} + \left(\frac{AH_w}{n_w} + 1\right)(H_b - H_w)\right\} - Y_s\{1 + A(H_b - H_w)\}\right]}{\left(\frac{AH_w}{n_w} + 1\right)D_u + D_b + 2\left\{\frac{H_w}{n_w} + \left(\frac{AH_w}{n_w} + 1\right)(H_b - H_w)\right\}\left\{N_a\left(\frac{AH_w}{n_w} + 1\right) + Y_sA\right\}} \quad (191)$$

$$H_{mStp+} \equiv \frac{2P + \frac{N_a}{A}}{\left(\frac{AH_w}{n_w} + 1\right)N_a + Y_sA} - \frac{1}{A} - (H_b - H_w) \quad (192)$$

$$H_{mStp-} \equiv \frac{\frac{N_a}{A}}{\left(\frac{AH_w}{n_w} + 1\right)N_a + Y_sA} - \frac{1}{A} - (H_b - H_w) \quad (193)$$

$$Y_{sORU} \equiv \frac{\frac{D_u}{2} - N_a\left\{\frac{H_w}{n_w} + \left(\frac{AH_w}{n_w} + 1\right)(H_b - H_w)\right\}}{1 + A(H_b - H_w)} \quad (194)$$

$$Y_{sOLU} \equiv \frac{-\frac{D_u}{2} - N_a\left\{\frac{H_w}{n_w} + \left(\frac{AH_w}{n_w} + 1\right)(H_b - H_w)\right\}}{1 + A(H_b - H_w)} \quad (195)$$

$$Y_{sASY} \equiv \frac{-\left(\frac{AH_w}{n_w} + 1\right)N_a}{A} \quad (196)$$

In a case where the above conditions described with the third type are applied to a 96-well plate, desirably, the height of location of the reflector 670 satisfies the following conditions.

$$\frac{13.19 - 10.1N_a - 1.52Y_s}{0.57 + N_a + 0.069Y_s} < H_m \quad (197)$$

If $Y_s > -14.5N_a$, $\frac{11.9N_a}{N_a + 0.069Y_s} - 22 < H_m < \frac{16.3 + 11.9N_a}{N_a + 0.069Y_s} - 22$ (198)

Note that, in this case, various types of coordinates are similar to those in the second type as follows.

$Y_{sORU} = 2.05 - 6.65N_a$ (199)

$Y_{sASY} = -14.5N_a$ (200)

$Y_{sOLU} = -2.05 - 6.65N_a$ (201)

In a case where the above conditions described with the third type are applied to a 384-well plate, desirably, the height of location of the reflector 670 satisfies the following conditions.

$$\frac{5.88 - 10.3N_a - 2Y_s}{0.26 + N_a + 0.127Y_s} < H_m \quad (202)$$

If $Y_s > -7.89N_a$, $\frac{5.411N_a}{N_a + 0.127Y_s} - 15.7 < H_m < \frac{7.46 + 5.41N_a}{N_a + 0.127Y_s} - 15.7$ (203)

Note that, in this case, various types of coordinates are similar to those in the second type as follows.

$Y_{sORU} = 0.79 - 5.17N_a$ (204)

$Y_{sOLU} = -0.79 - 5.17N_a$ (205)

$Y_{sASY} = -7.89N_a$ (206)

Conditions for observation of at least the center of a well with oblique illumination with the third type are as follows.

$N_a \leq N_{aCORU}$ (207)

$H_{mC2LU-RB} \leq H_m \leq H_{mStpC}$ (208)

If $H_{mCLU-RBStp} \leq H_m \leq H_{mLUStpC}$, $R_{RBStpC} \leq R \leq R_{LUStpC}$ (209)

If $H_{mLUStpC} \leq H_m \leq H_{mRBStpC}$, $R > R_{LUStpC}$ and $R > R_{RBStpC}$ (210)

If $H_{mRBStpC} \leq H_m \leq H_{mStpC}$, $R_{LUStpC} \leq R \leq R_{RBStpC}$ (211)

Note that the parameters are based on substitution of 0 for $Y_s$ and substitution of 2 for k in $H_{mStoc+}$, $H_{mLU-RB}$, $H_{mLU}$, $H_{mRB}$, $R_{LU}$, and $R_{RB}$ and are as follows.

$$N_{aCORU} \equiv \frac{D_u}{2\left\{\frac{H_w}{n_w} + \left(\frac{AH_w}{n_w} + 1\right)(H_b - H_w)\right\}} \quad (212)$$

$$H_{mStpC} \equiv \frac{2P + \frac{N_a}{A}}{\left(\frac{AH_w}{n_w} + 1\right)N_a} - \frac{1}{A} - (H_b - H_w) \quad (213)$$

$$H_{mC2LU-RB} \equiv \frac{\left(2\left\{\frac{H_w}{n_w} + \left(\frac{AH_w}{n_w} + 1\right)(H_b - H_w)\right\}\left[2P - \frac{D_u}{2} - N_a\left\{\frac{H_w}{n_w} + \left(\frac{AH_w}{n_w} + 1\right)(H_b - H_w)\right\}\right]\right)}{\left(\left(\frac{AH_w}{n_w} + 1\right)D_u + D_b + 2\left\{\frac{H_w}{n_w} + \left(\frac{AH_w}{n_w} + 1\right)(H_b - H_w)\right\}\left\{N_a\left(\frac{AH_w}{n_w} + 1\right)\right\}\right)} \quad (214)$$

$$H_{mLUStpC} \equiv \frac{2P - \frac{D_u}{2} - N_a\frac{H_w}{n_w}}{2N_a\left(\frac{AH_w}{n_w} + 1\right)} - \frac{H_b - H_w}{2} \quad (215)$$

$$H_{mRBStpC} \equiv \frac{2P\left(\frac{AH_w}{n_w} + 1\right) + \frac{D_b}{2^2}}{2N_a\left(\frac{AH_w}{n_w} + 1\right)} - \frac{H_w}{n_w\left(\frac{AH_w}{n_w} + 1\right)} - (H_b - H_w) \quad (216)$$

$$R_{LUStpC} \equiv \frac{2H_m\left[P - N_a\left\{\frac{H_w}{n_w} + \left(\frac{AH_w}{n_w} + 1\right)(H_b - H_w + H_m)\right\}\right]}{2P - \frac{D_u}{2} - N_a\left\{\frac{H_w}{n_w} + \left(\frac{AH_w}{n_w} + 1\right)(H_b - H_w + 2H_m)\right\}} \quad (217)$$

$$R_{RBStpC} \equiv \frac{\dfrac{P}{\left(\dfrac{AH_w}{n_w}+1\right)} - N_a\left\{\dfrac{H_w}{n_w\left(\dfrac{AH_w}{n_w}+1\right)} + (H_b - H_w + H_m)\right\}}{2\left(\dfrac{AH_w}{n_w}+1\right)\left\{\dfrac{H_w}{n_w} + (H_b - H_w + H_m)\left(\dfrac{AH_w}{n_w}+1\right)\right\}} - N_a \quad (218)$$

Furthermore, conditions for widening negatively the range of oblique illumination with the third type are as follows.

$$H_{mLU\text{-}RB\text{-}Stpm} < H_m < H_{mStpC} \quad (219)$$

$$R_{RBStp-} < R < R_{LUStp-} \quad (220)$$

Note that the respective definitions of the parameters are as follows and result from calculation with substitution of $Y_{sStp}$ for $Y_s$ in $H_{mLU\text{-}RB}$, $H_{mLU}$, $H_{mRB}$, $R_{LU}$, and $R_{RB}$. $Y_{sStp}$ represents the coordinate Y of $H_{mStp-}$ in the height $H_{mStpC}$.

$$H_{mStpC} = \frac{2P + \dfrac{N_a}{A}}{\left(\dfrac{AH_w}{n_w}+1\right)N_a} - \frac{1}{A} - (H_b - H_w) \quad (221)$$

$$H_{mLU\text{-}RB\text{-}Stpm} \equiv \frac{\left[2AP\left(2P - \dfrac{D_u}{2}\right) + N_a\left(4P - \dfrac{D_u}{2}\right) - N_a^2\left\{\dfrac{H_w}{n_w} + \left(\dfrac{AH_w}{n_w}+1\right)(H_b - H_W)\right\}\right]2\left\{\dfrac{H_w}{n_w} + \left(\dfrac{AH_w}{n_w}+1\right)(H_b - H_w)\right\}}{\left\{\left(\dfrac{AH_w}{n_w}+1\right)D_u + D_b\right\}(2AP + N_a) + 2N_a^2\left(\dfrac{AH_w}{n_w}+1\right)\left\{\dfrac{H_w}{n_w} + \left(\dfrac{AH_w}{n_w}+1\right)(H_b - H_w)\right\}} \quad (222)$$

$$R_{RBStpm} = \frac{P(2PA + 3N_a) - N_a^2\left\{\dfrac{H_w}{n_w} + \left(\dfrac{AH_w}{n_w}+1\right)(H_b - H_w + H_m)\right\}}{PA\left\{4P\left(\dfrac{AH_w}{n_w}+1\right) + D_b\right\} + N_a\left\{4P\left(\dfrac{AH_w}{n_w}+1\right) + \dfrac{D_b}{2}\right\}} - N_a^2\left(\dfrac{AH_w}{n_w}+1\right)$$

$$\overline{2\left\{\dfrac{H_w}{n_w} + \left(\dfrac{AH_w}{n_w}+1\right)(H_b - H_w + H_m)\right\}} \quad (224)$$

Furthermore, with the range of oblique illumination widened negatively as described above with the third type, desirably, the following condition is satisfied. Thus, the range of oblique illumination can be widened to the positive limit $Y_{sORU}$.

$$H_m < H_{mStp\text{-}oRU} \quad (225)$$

Note that $H_{mStp\text{-}ORU}$ is as follows.

$$H_{mStp\text{-}ORU} \equiv \frac{(4P - D_u)\{1 + A(H_b - H_w)\}}{2N_a + D_uA} \quad (226)$$

Application of the conditions to be satisfied with the third type to a 96-well plate leads to the following. Conditions for oblique illumination of the center of a well are as follows.

$$\frac{13.1 - 10.1N_a}{0.57 + N_a} < H_m < \frac{16.3}{N_a} - 10.1 \quad (227)$$

$$\text{If } \frac{13.1 - 10.1N_a}{0.57 + N_a} < H_m < \frac{6.6}{N_a} - 5.1, \quad (228)$$

$$\frac{8.2 - N_a(10.1 + H_m)}{\dfrac{9.5}{9.9 - H_m} - N_a} < R < \frac{H_m[8.2 - N_a(10.1 + H_m)]}{6.6 - N_a(10.1 + 2H_m)}$$

$$\text{If } \frac{6.6}{N_a} - 5.1 < H_m < \frac{9.5}{N_a} - 10.1, \quad (229)$$

$$R > \frac{H_m[4.1 - N_a(10.1 + H_m)]}{2.5 - N_a(5.1 + H_m)} \text{ and } R > \frac{8.2 - N_a(10.1 + H_m)}{\dfrac{9.5}{9.9 - H_m} - N_a}$$

$$\text{If } \frac{9.5}{N_a} - 10.1 < H_m < \frac{16.3}{N_a} - 10.1, \quad (230)$$

$$\frac{H_m[4.1 - N_a(10.1 + H_m)]}{2.5 - N_a(5.1 + H_m)} < R < \frac{8.2 - N_a(10.1 + H_m)}{\dfrac{9.5}{9.9 - H_m} - N_a}$$

Furthermore, conditions for widening negatively the region of oblique illumination are as follows.

$$\frac{31.9 + 51.9N_a - 17.8N_a^2}{1.37 + N_a + 1.76N_a^2} < H_m < \frac{16.3}{N_a} - 10.1 \quad (231)$$

$$\frac{5.1 + 11.2N_a - N_a^2(10.3 + H_m)}{\dfrac{13 + 17.6N_a}{10.1 + H_m} - N_a^2} < \quad (232)$$

$$R < \frac{H_m[11.2 + 24.5N_a - N_a^2(10.1 + H_m)]}{9.1 + 14.8N_a - N_a^2\{5.1 + H_m\}}$$

Furthermore, a condition for widening positively the region of oblique illumination is as follows.

$$H_m < \frac{24.4}{N_a + 0.26} \quad (233)$$

Application of the conditions to be satisfied with the third type to a 384-well plate leads to the following. Conditions for oblique illumination of the center of a well are as follows.

$$N_a < 0.15 \frac{5.9 - 10.3 N_a}{0.26 + N_a} < H_m < \frac{7.46}{N_a} - 10.3 \quad (234)$$

$$\text{If } \frac{5.9 - 10 N_a}{0.26 + N_a} < H_m < \frac{2.9}{N_a} - 5.2, \quad (235)$$

$$\frac{3.7 - N_a(10.3 + H_m)}{\frac{4.3}{10.3 + H_m} - N_a} < R < \frac{H_m[3.7 - N_a(10.3 + H_m)]}{2.9 - N_a(5.2 + H_m)}$$

$$\text{If } \frac{2.9}{N_a} - 5.2 < H_m < \frac{4.3}{N_a} - 10.3, \quad (236)$$

$$R > \frac{H_m[3.7 - N_a(10.3 + H_m)]}{2.9 - N_a(5.2 + H_m)} \text{ and } R > \frac{3.7 - N_a(10.3 + H_m)}{\frac{4.3}{10.3 + H_m} N_a}$$

$$\text{If } \frac{2.4}{N_a} - 10.3 < H_m < \frac{7.46}{N_a} - 10.3, \quad (237)$$

$$\frac{H_m[3.7 - N_a(10.3 + H_m)]}{2.9 - N_a(5.2 + H_m)} < R < \frac{3.7 - N_a(10.3 + H_m)}{\frac{4.3}{10.3 + H_m} - N_a}$$

Furthermore, conditions for widening negatively the region of oblique illumination are as follows.

$$\frac{31.3 + 51.5 N_a - 39.8 N_a^2}{1.38 + N_a + 3.86 N_a^2} < H_m < \frac{7.46}{N_a} - 10.3$$

$$\frac{5.1 + 11.2 N_a - N_a^2(10.3 + H_m)}{\frac{5.9 + 8 N_a}{10.3 + H_m} - N_a^2} < \quad (239)$$

$$R < \frac{H_m[5.1 + 11.2 N_a - N_a^2(10.3 + H_m)]}{4.1 + 6.7 N_a - N_a^2\{5.2 + H_m\}}$$

Furthermore, a condition for widening positively the region of oblique illumination is as follows.

$$H_m < \frac{17.1}{N_a + 0.29} \quad (240)$$

Tenth Embodiment

Figure 114:
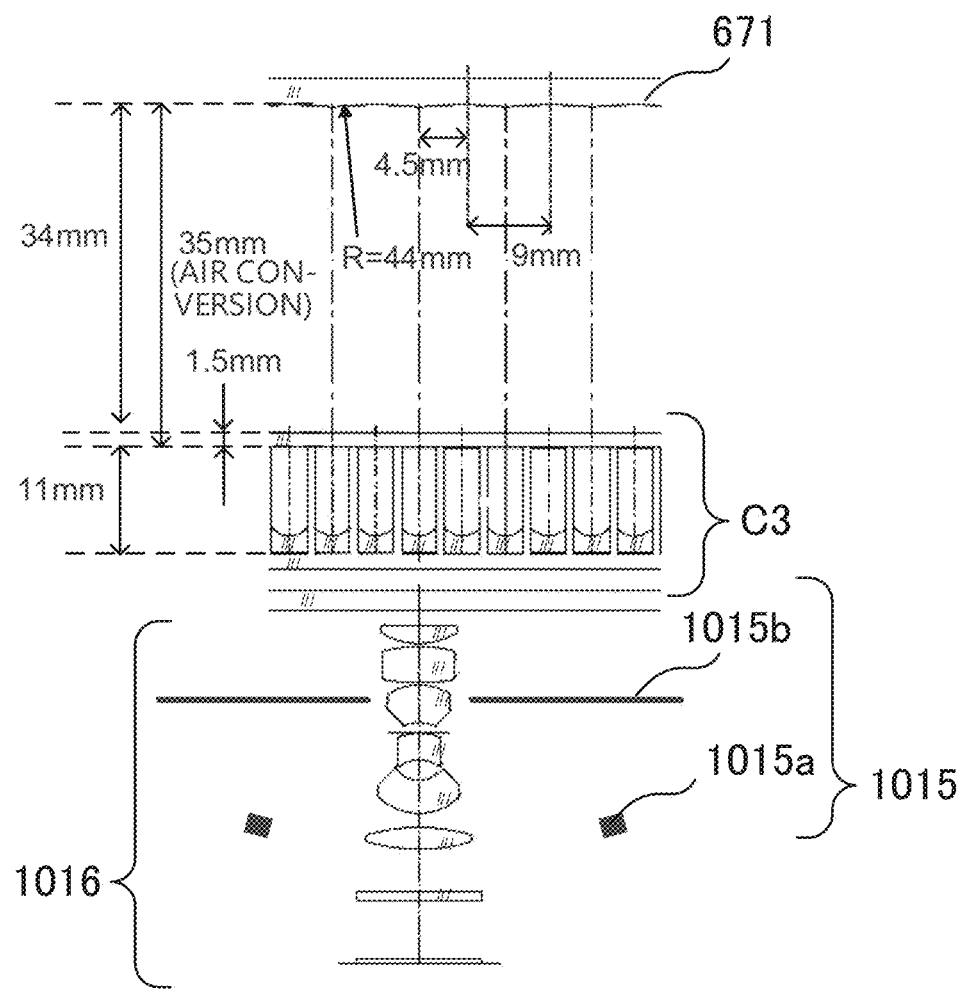
FIG. 114 is an explanatory view for setting in an observation apparatus according to a tenth embodiment.
Figure 115:
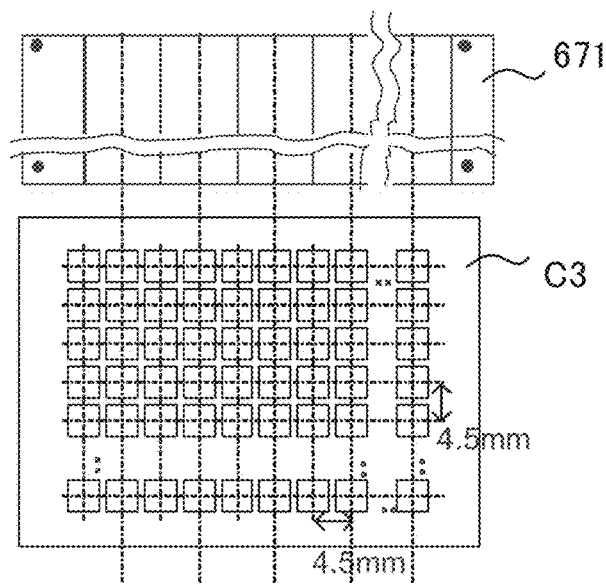
FIG. 115 is an explanatory view for the positional relationship between a multi-well plate and a reflector.

FIG. 114 is an explanatory view for setting in an observation apparatus 1000 according to the present embodiment. FIG. 115 is an explanatory view for the positional relationship between a multi-well plate C3 and a reflector 671. The configuration and setting of the observation apparatus 1000 will be described below with reference to FIGS. 114 and 115.

The observation apparatus 1000 serves as an apparatus for observation of a sample in the multi-well plate C3 and achieves oblique illumination mainly with incident light from a second well (k=2). The observation apparatus 1000 has a configuration similar to that of the observation apparatus 10 and includes, as illustrated in FIG. 114, an illumination optical system 1015, the reflector 671 that reflects light emitted from the illumination optical system 1015, and an observation optical system 1016 that condenses the light reflected by the reflector 671. The illumination optical system 1015 includes a light source 1015a and a diffusing plate 1015b.

Figure 116:
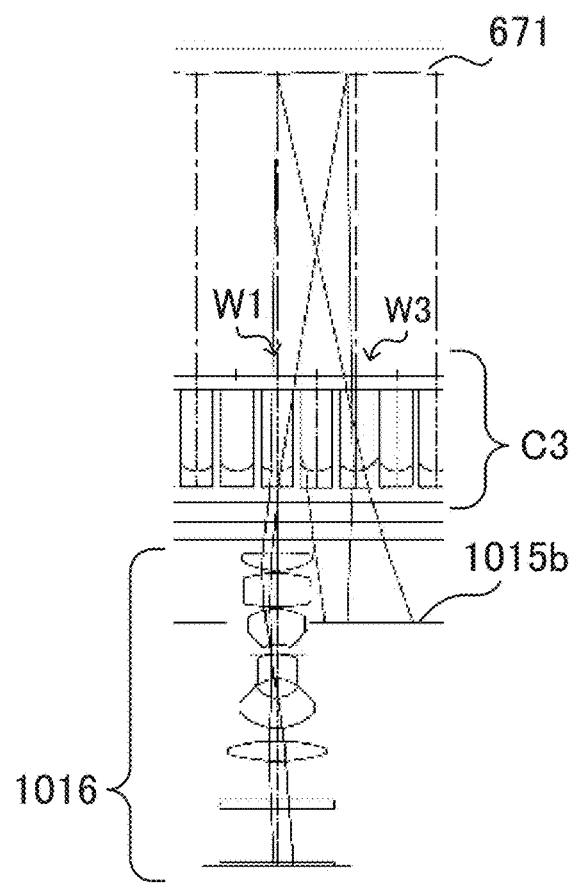
FIG. 116 is a ray diagram of incident light from a peripheral well.

The illumination optical system 1015 and the observation optical system 1016 are provided below the installation position of the multi-well plate C3. In contrast to this, the reflector 671 is provided above the installation position of the multi-well plate C3. The reflector 671 serves as a curved mirror, particularly, a curved mirror of the third type described above and is installed such that an on-axis marginal ray to enter the observation optical system 1016 travels via a peripheral well before reflection due to the reflector 671. Specifically, as illustrated in FIG. 116, the reflector 671 is disposed such that illuminating light having traveled via the second well from the on-axis well enters the observation optical system 1016.

In the observation apparatus 1000, as illustrated in FIGS. 114 and 115, specifications of the observation optical system 1016, specifications of the multi-well plate C3, the state of culture fluid in each well, and parameters regarding installation conditions of the reflector 671 are as follows. Note that the multi-well plate C3 serves as a 384-well plate. The thickness of the lid of the multi-well plate C3 is 1.5 mm and is 1.0 mm resulting from air conversion.

$N_a$=0.12, P=4.5 mm, $D_u$=3.8 mm, $D_b$=3.2 mm,
$n_w$=1.332, $A_{c2}$=0.2306/mm, A=0.1530/mm,
$H_b$=11 mm, $H_w$=1.8 mm, $H_m$=35 mm, and
R=44 mm.

In this case, in the observation apparatus 1000, the values of parameters related to various types of conditions are as follows.

$N_{aCORU}$=0.15, $H_{mC2LU-RB}$=12.3 mm, $H_{mStpC}$=51.8 mm, $H_{mLUStpC}$=19.4 mm, $H_{mRBStpC}$=25.3 mm, $R_{LUStpC}$=31.9 mm, $R_{RBStpC}$=66.8 mm, $H_{mLU-BR-StpC}$=23.8 mm, $H_{mStpC}$= 51.8 mm, $R_{LUStpC}$=47.7 mm, $R_{RBStpC}$=42.6 mm, $H_{mStpORU}$=41.6 mm, $Y_{sORU}$=0.17 mm, $Y_{sStp\pm}$=− 0.87 mm, and $Y_{sStpORU}$=−0.86 mm.

Therefore, the observation apparatus 1000 satisfies the conditions for oblique illumination of at least the center of a well, the conditions for widening negatively the range of oblique illumination, and the condition for widening positively the range of oblique illumination, enabling favorable observation of the sample in a well with high contrast.

Figure 117:
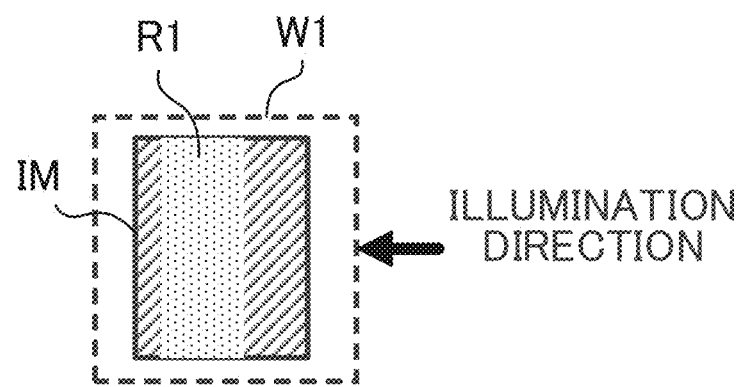
FIG. 117 illustrates a distribution of contrast formed in an image capturing region due to the light illustrated in FIG. 116.
Figure 118:
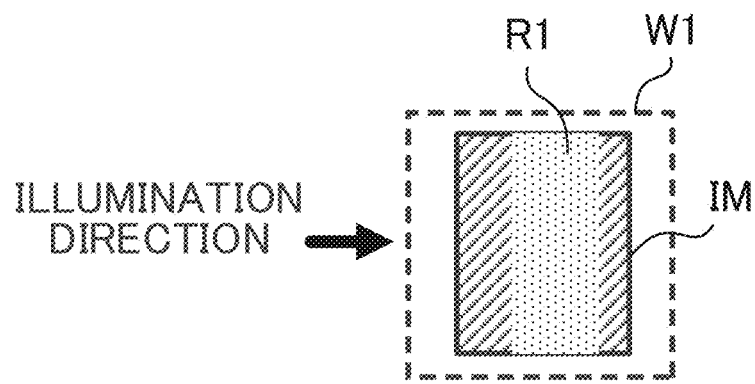
FIG. 118 illustrates a distribution of contrast formed in the image capturing region due to incident light from the peripheral well opposite the peripheral well in FIG. 116.
Figure 119:
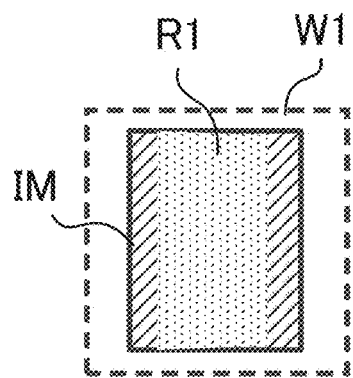
Figure 120:
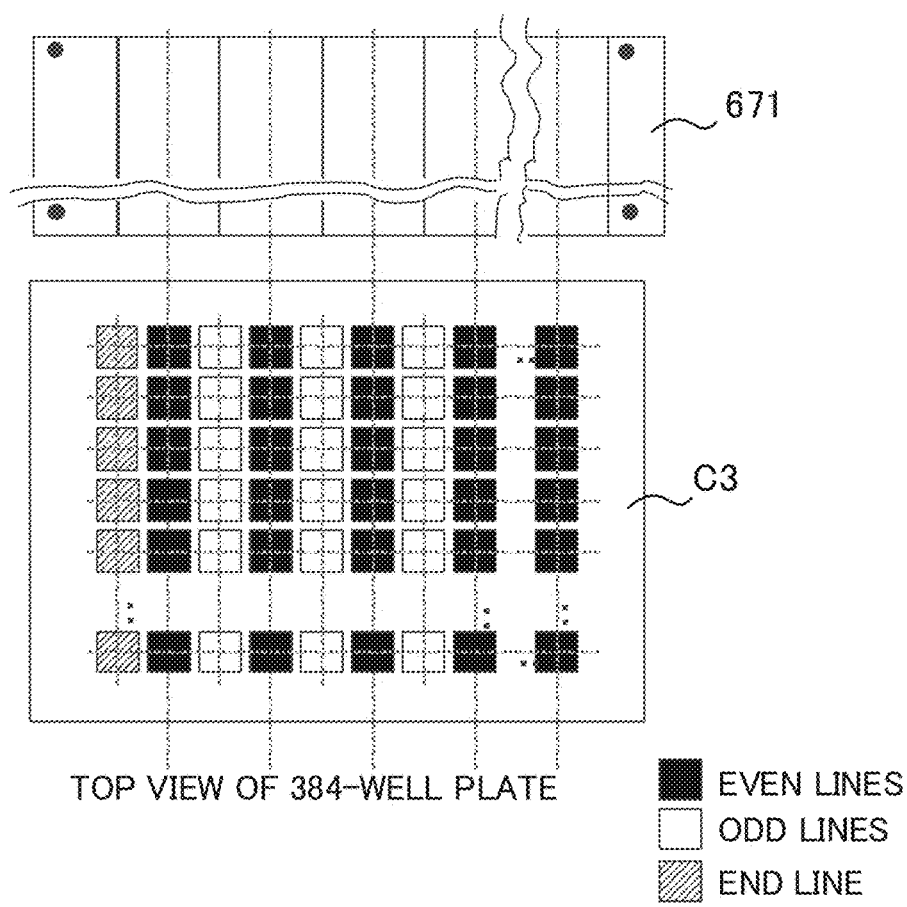

FIG. 116 is a ray diagram of incident light from a peripheral well. FIG. 117 illustrates a distribution of contrast formed in an image capturing region IM due to the light illustrated in FIG. 116. FIG. 118 illustrates a distribution of contrast formed in the image capturing region IM due to incident light from the peripheral well opposite the peripheral well in FIG. 116. FIG. 119 illustrates a distribution of contrast acquired by the observation apparatus 1000. FIG. 120 is an explanatory view for the contrast of each well in the multi-well plate C3. Note that, in FIGS. 117 to 119, a region R1 indicates a region with fulfillment of oblique illumination.

As illustrated in FIGS. 116 to 118, the observation apparatus 1000 guides illuminating light from the second well to the on-axis well, enabling oblique illumination of different regions in the image capturing region with illumination from the right side and illumination from the left side. Thus, even with a 384-well plate, a wide range (region R1) in the well can be observed with oblique illumination, as illustrated in FIG. 119.

Note that, in the observation apparatus 1000, as illustrated in FIG. 120, oblique illumination is fulfilled only to the wells in even lines or odd lines. However, a switch in the illumination direction enables a wide region with oblique illumination in the on-axis well. Because of entry of illuminating light from the second well, even in a case where the observation optical system is relatively large, the illuminating light is unlikely to be blocked by the observation optical system. Therefore, this configuration is favorable to an observation apparatus including a large observation optical system.

Eleventh Embodiment

Figure 121:
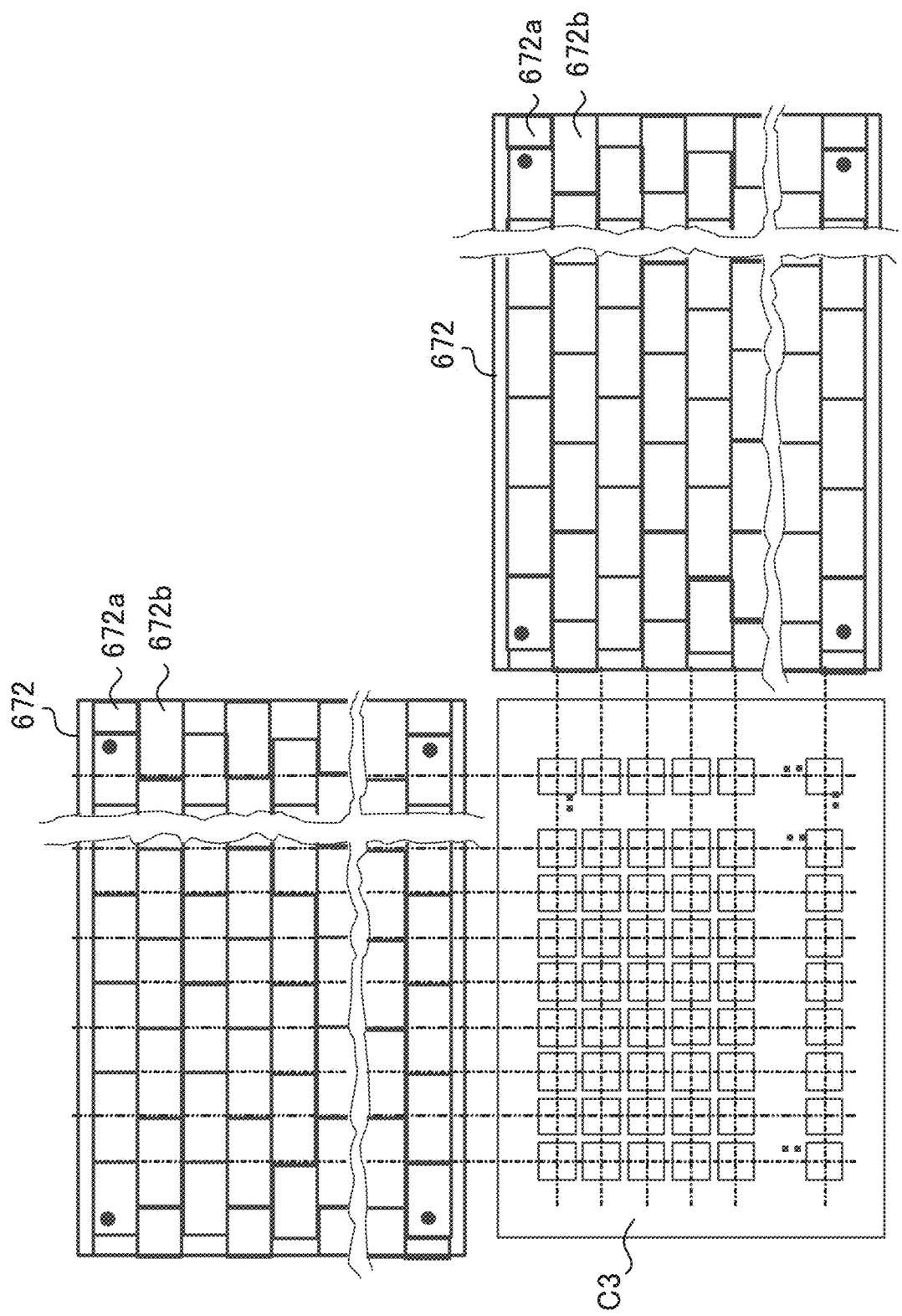
Figure 122:
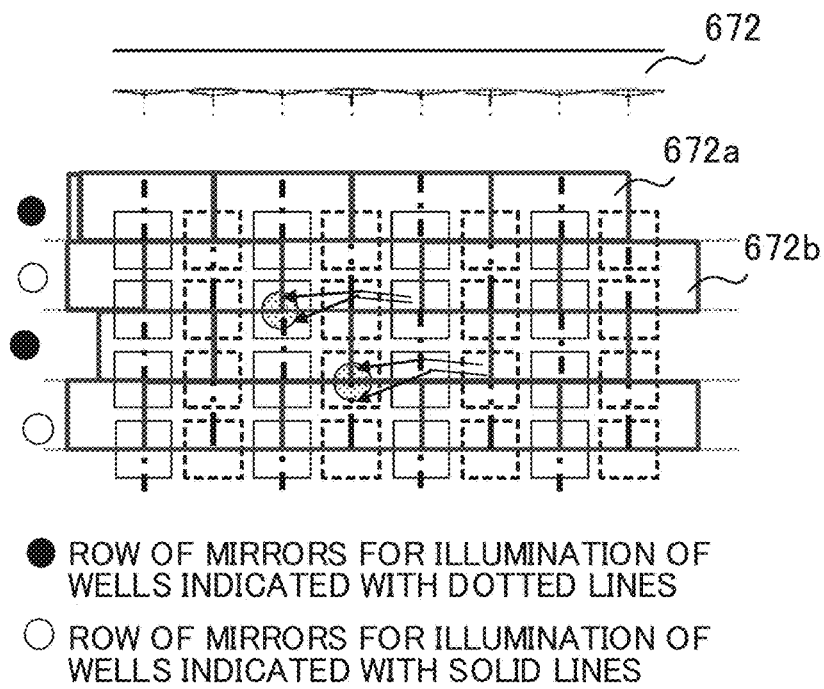
Figure 123:
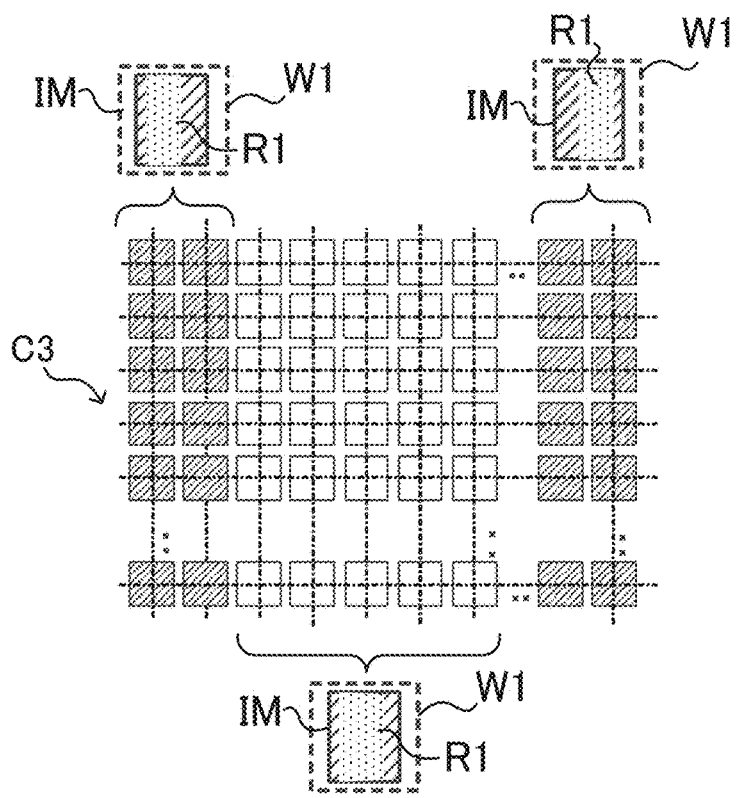

FIG. 121 is an explanatory view for the configuration of an observation apparatus 1100 according to the present embodiment. FIG. 122 is an explanatory view for the relationship between a reflective face and a well line that reflected light enters. FIG. 123 is an explanatory view for the contrast of each well in a multi-well plate C3. The configuration and setting of the observation apparatus 1100 will be described below with reference to FIGS. 121 and 123.

The observation apparatus 1100 serves as an apparatus for observation of a sample in the multi-well plate C3 and achieves oblique illumination mainly with incident light from a second well (k=2). The observation apparatus 1100 has a configuration similar to that of the observation apparatus 10 and is different from the observation apparatus 1000 in terms of including a reflector 672 instead of a reflector 671.

The reflector 672 serves as a curved mirror, particularly, a curved mirror of the third type described above and is installed such that an on-axis marginal ray to enter an observation optical system not illustrated travels via a second well before reflection due to the reflector 672. The reflective face of the reflector 672 has two divisions per well in the axial direction (X direction) of cylindrical faces. A reflective face 672a that is one of the two divided reflective faces and a reflective face 672b that is the other are mutually shifted in the Y direction such that the cylindrical center of the reflective face 672a is aligned with an end of the reflective face 672b. The reflective faces 672a and 672b are disposed alternately in the axial direction.

Each reflective face functions like the reflective face of the observation apparatus 1000. That is, depending on reflected light from each reflective face, oblique illumination is fulfilled to a well in either an even line or an odd line. Note that the reflective faces 672a and 672b are different in terms of the line to be illuminated as illustrated in FIG. 122. That is, one of the reflective faces 672a and 672b causes a region with oblique illumination to a well in an even line, and the other of the reflective faces 672a and 672b causes a region with oblique illumination to a well in an odd line. As a result, as illustrated in FIG. 123, all the wells can have a region with oblique illumination (region R1). A switch in the illumination direction enables a wide region with oblique illumination in each well except the wells in the first and second lines from the left end and the wells in the first and second lines from the right end.

The above embodiments are specific examples for facilitating understanding of the invention, and thus the present invention is not limited to the embodiments. Modifications of the above embodiments and alternatives to the above embodiments are to be included. That is, the constituent elements in each embodiment can be modified without departing from the spirit and scope thereof. Appropriate combination of a plurality of constituent elements disclosed in one or more of the embodiments enables a new embodiment. Some constituent elements may be omitted from the constituent elements in each embodiment, or some constituent elements may be added to the constituent elements in each embodiment. Furthermore, the procedure of processing in each embodiment may be changed in order as long as there is no contradiction. That is, the observation apparatus and the method of visualizing a phase object according to the present invention can be variously modified or altered without departing from the scope of the claims.

In the present specification, the expression "based on A" does not indicate "based on only A" but indicates "based on at least A" and further indicates "based partially on at least A". That is, "based on A" may be "based on B in addition to A" or "based on part of A".

What is claimed is:

1. An observation apparatus, comprising:
an illumination optical system provided below an installation position of a multi-well plate;
a reflector provided above the installation position, the reflector being configured to reflect light emitted from the illumination optical system; and
an observation optical system provided below the installation position, the observation optical system being configured to condense the light reflected by the reflector,
wherein the reflector is installed such that a marginal ray to enter the observation optical system travels via a peripheral well different from an on-axis well located on an optical axis of the observation optical system before reflection due to the reflector;
the reflector is installed such that at least an on-axis marginal ray included in the marginal ray to enter the observation optical system travels via the peripheral well before reflection due to the reflector;
the reflector serves as a plane mirror, and
the following conditional expressions are satisfied:

$$H_{mFCLU} < H_m < H_{mFCRB} \quad (9\text{-}1)$$

$$H_{mFCLU} \equiv \frac{kP - \dfrac{D_u}{2} - \dfrac{N_a \cdot H_w}{n_w}}{2N_a} + \frac{H_w - H_b}{2} \quad (10\text{-}1)$$

$$H_{mFCRB} \equiv \frac{k\left[P + \dfrac{D_b}{2} + \dfrac{AkPH_w}{n_w} - \dfrac{2N_a \cdot H_w\left(1 + \dfrac{AH_w}{n_w}\right)}{n_w}\right]}{2N_a\left(1 + \dfrac{AH_w}{n_w}\right)^2} + H_w - H_b \quad (11\text{-}1)$$

where $H_m$ represents a height of location of the reflector with respect to an upper end portion of each well of the multi-well plate,
$N_a$ represents a numerical aperture of the observation optical system,
k represents an integer of 1 or more,
P represents a pitch between each well of the multi-well plate,
$D_u$ represents an inner diameter of the upper end portion of each well of the multi-well plate,
$D_b$ represents an inner diameter of a bottom of each well of the multi-well plate,
$n_w$ represents a refractive index of solution housed in each well of the multi-well plate,
$H_w$ represents a distance from a liquid level of the solution at a center of each well of the multi-well plate to the bottom of the well,
$H_b$ represents a depth of each well of the multi-well plate, and
A represents a refractive power of the liquid level.

2. The observation apparatus according to claim 1, wherein the illumination optical system switches an illumination direction between two directions symmetrical with respect to the optical axis of the observation optical system.

3. The observation apparatus according to claim 1, further comprising:
a moving device configured to move the illumination optical system and the observation optical system relative to the multi-well plate in a direction orthogonal to the optical axis of the observation optical system, wherein
the observation optical system includes an image capturing element configured to capture a sample in the on-axis well, and
the image capturing element captures the sample at a plurality of different positions due to relative movement of the illumination optical system and the observation optical system to the multi-well plate by the moving device.

4. The observation apparatus according to claim 1, further comprising a support member by which the reflector is disposed at a predetermined height.

5. An observation apparatus, comprising:
an illumination optical system provided below an installation position of a multi-well plate;
a reflector provided above the installation position, the reflector being configured to reflect light emitted from the illumination optical system; and
an observation optical system provided below the installation position, the observation optical system being configured to condense the light reflected by the reflector,
wherein the reflector is installed such that a marginal ray to enter the observation optical system travels via a peripheral well different from an on-axis well located on an optical axis of the observation optical system before reflection due to the reflector;
the reflector is installed such that at least an on-axis marginal ray included in the marginal ray to enter the observation optical system travels via the peripheral well before reflection due to the reflector;
the multi-well plate serves as a 96-well plate,
the reflector serves as a plane mirror, and
the following conditional expressions are satisfied:

$$\frac{2.8}{N_a} - 5.1[\text{mm}] < H_m < \frac{5.4}{N_a} - 10.1[\text{mm}] \quad (9\text{-}2)$$

$$N_a < 0.31 \quad (3\text{-}2)$$

where $H_m$ represents a height of location of the reflector with respect to an upper end portion of each well of the multi-well plate, and
$N_a$ represents a numerical aperture on a well side of the observation optical system.

6. The observation apparatus according to claim 5, wherein the illumination optical system switches an illumination direction between two directions symmetrical with respect to the optical axis of the observation optical system.

7. The observation apparatus according to claim 5, further comprising:
a moving device configured to move the illumination optical system and the observation optical system relative to the multi-well plate in a direction orthogonal to the optical axis of the observation optical system, wherein
the observation optical system includes an image capturing element configured to capture a sample in the on-axis well, and
the image capturing element captures the sample at a plurality of different positions due to relative movement of the illumination optical system and the observation optical system to the multi-well plate by the moving device.

8. The observation apparatus according to claim 5, further comprising a support member by which the reflector is disposed at a predetermined height.

9. An observation apparatus, comprising:
an illumination optical system provided below an installation position of a multi-well plate;
a reflector provided above the installation position, the reflector being configured to reflect light emitted from the illumination optical system; and
an observation optical system provided below the installation position, the observation optical system being configured to condense the light reflected by the reflector,
wherein the reflector is installed such that a marginal ray to enter the observation optical system travels via a peripheral well different from an on-axis well located on an optical axis of the observation optical system before reflection due to the reflector;
the reflector is installed such that at least an on-axis marginal ray included in the marginal ray to enter the observation optical system travels via the peripheral well before reflection due to the reflector;
the multi-well plate serves as a 384-well plate,
the reflector serves as a plane mirror, and
the following conditional expressions are satisfied:

$$\frac{2.25k - 0.95}{N_a} - 5.3[\text{mm}] < H_m < \frac{1.86k + 0.55}{N_a} - 10.3[\text{mm}] \quad (9\text{-}3)$$

$$N_a < 0.15 \quad (3\text{-}3)$$

where $H_m$ represents a height of location of the reflector with respect to an upper end portion of each well of the multi-well plate, and
$N_a$ represents a numerical aperture on a well side of the observation optical system, and
k is 1 or 2.

10. The observation apparatus according to claim 9, wherein the illumination optical system switches an illumination direction between two directions symmetrical with respect to the optical axis of the observation optical system.

11. The observation apparatus according to claim 9, further comprising:
a moving device configured to move the illumination optical system and the observation optical system relative to the multi-well plate in a direction orthogonal to the optical axis of the observation optical system, wherein
the observation optical system includes an image capturing element configured to capture a sample in the on-axis well, and
the image capturing element captures the sample at a plurality of different positions due to relative movement of the illumination optical system and the observation optical system to the multi-well plate by the moving device.

12. The observation apparatus according to claim 9, further comprising a support member by which the reflector is disposed at a predetermined height.

13. A method of visualizing a phase object housed in a multi-well plate, the method comprising:

emitting light from an illumination optical system provided below an installation position of the multi-well plate to the multi-well plate;

reflecting the light emitted from the illumination optical system with a reflector provided above the installation position; and condensing the light reflected by the reflector with an observation optical system provided below the installation position, wherein the reflecting the light emitted from the illumination optical system includes causing light having traveled via a peripheral well different from an on-axis well located on an optical axis of the observation optical system before reflection due to the reflector, to enter, as a marginal ray, the observation optical system;

the reflector is installed such that at least an on-axis marginal ray included in the marginal ray to enter the observation optical system travels via the peripheral well before reflection due to the reflector;

the multi-well plate serves as a 96-well plate, the reflector serves as a plane mirror, and the following conditional expressions are satisfied:

$$\frac{2.8}{N_a} - 5.1[\text{mm}] < H_m < \frac{5.4}{N_a} - 10.1[\text{mm}] \qquad (9\text{-}2)$$

$$N_a < 0.31 \qquad (3\text{-}2)$$

where $H_m$ represents a height of location of the reflector with respect to an upper end portion of each well of the multi-well plate, and $N_a$ represents a numerical aperture on a well side of the observation optical system.

14. A method of visualizing a phase object housed in a multi-well plate, the method comprising:

emitting light from an illumination optical system provided below an installation position of the multi-well plate to the multi-well plate;

reflecting the light emitted from the illumination optical system with a reflector provided above the installation position; and condensing the light reflected by the reflector with an observation optical system provided below the installation position, wherein the reflecting the light emitted from the illumination optical system includes causing light having traveled via a peripheral well different from an on-axis well located on an optical axis of the observation optical system before reflection due to the reflector, to enter, as a marginal ray, the observation optical system;

the reflector is installed such that at least an on-axis marginal ray included in the marginal ray to enter the observation optical system travels via the peripheral well before reflection due to the reflector;

the multi-well plate serves as a 384-well plate, the reflector serves as a plane mirror, and the following conditional expressions are satisfied:

$$\frac{2.25k - 0.95}{N_a} - 5.3[\text{mm}] < H_m < \frac{1.86k + 0.55}{N_a} - 10.3[\text{mm}] \qquad (9\text{-}3)$$

$$N_a < 0.15 \qquad (3\text{-}3)$$

where $H_m$ represents a height of location of the reflector with respect to an upper end portion of each well of the multi-well plate, and $N_a$ represents a numerical aperture on a well side of the observation optical system, and k is 1 or 2.

* * * * *